(12) United States Patent
Cohen et al.

(10) Patent No.: US 12,403,352 B2
(45) Date of Patent: Sep. 2, 2025

(54) SYSTEMS AND METHODS FOR AN ELECTRONIC WALL MOUNTED EXERCISE MACHINE

(71) Applicant: AMP FIT ISRAEL LTD, Tel Aviv (IL)

(72) Inventors: Shahar Cohen, Ramat Hasharon (IL); Guy Shneorson, Ra+3 anana (IL)

(73) Assignee: AMP FIT ISRAEL LTD, Tel Aviv (IL)

( * ) Notice: Subject to any disclaimer, the term of this patent is extended or adjusted under 35 U.S.C. 154(b) by 0 days.

(21) Appl. No.: 18/638,131

(22) Filed: Apr. 17, 2024

(65) Prior Publication Data

US 2024/0261623 A1  Aug. 8, 2024

Related U.S. Application Data

(63) Continuation-in-part of application No. PCT/IB2023/056058, filed on Dec. 6, 2023.

(60) Provisional application No. 63/611,051, filed on Dec. 15, 2023, provisional application No. 63/513,546, filed on Jul. 13, 2023, provisional application No. 63/496,605, filed on Apr. 17, 2023, provisional application No. 63/433,463, filed on Dec. 18, 2022.

(30) Foreign Application Priority Data

Jun. 12, 2023 (TW) ................................. 112121899

(51) Int. Cl.
| | | |
|---|---|---|
| A63B 21/16 | (2006.01) | |
| A63B 21/00 | (2006.01) | |
| A63B 21/005 | (2006.01) | |
| A63B 24/00 | (2006.01) | |
| A63B 71/06 | (2006.01) | |

(52) U.S. Cl.
CPC ........ *A63B 21/169* (2015.10); *A63B 21/0058* (2013.01); *A63B 21/153* (2013.01); *A63B 21/156* (2013.01); *A63B 24/0087* (2013.01); *A63B 71/0622* (2013.01)

(58) Field of Classification Search
CPC ... A63B 21/156; A63B 21/154; A63B 21/169; A63B 21/153
See application file for complete search history.

(56) References Cited

U.S. PATENT DOCUMENTS

| | | |
|---|---|---|
| 4,624,457 A | 11/1986 | Silberman et al. |
| 5,385,525 A | 1/1995 | Davis |
| 5,588,938 A | 12/1996 | Schneider et al. |

(Continued)

FOREIGN PATENT DOCUMENTS

| | | |
|---|---|---|
| CN | 113616976 A | 11/2021 |
| CN | 217724440 U | 11/2022 |

(Continued)

*Primary Examiner* — Joshua T Kennedy
(74) *Attorney, Agent, or Firm* — Workman Nydegger

(57) ABSTRACT

An exercise equipment, that includes (a) a frame that includes a vertically wall-mountable beam; (b) one or more brackets for connecting the vertically wall-mountable beam to a wall; (c) an arm that rotatable in relation to the vertically wall-mountable beam and is selectively positionable along the vertically wall-mountable beam; (d) a cable; (e) a resistance source, and (f) a cable transfer unit that is configured to convey the cable through a cable path formed within the frame.

30 Claims, 77 Drawing Sheets

(56) References Cited

U.S. PATENT DOCUMENTS

| | | | |
|---|---|---|---|
| 5,626,546 A | 5/1997 | Little | |
| 5,820,529 A * | 10/1998 | Weintraub | A63B 21/0552 482/904 |
| 5,820,629 A | 10/1998 | Cox | |
| 6,123,649 A | 9/2000 | Lee et al. | |
| 7,686,746 B2 * | 3/2010 | Koyama | A63B 23/14 482/92 |
| 8,485,950 B2 * | 7/2013 | Adams | A63B 21/151 482/904 |
| 9,132,330 B2 | 9/2015 | Brendle | |
| 9,656,116 B2 * | 5/2017 | Giannelli | A63B 21/4035 |
| 9,708,164 B2 * | 7/2017 | Jakob | B66C 11/12 |
| 9,782,625 B1 | 10/2017 | Blum et al. | |
| 10,022,590 B2 | 7/2018 | Foley et al. | |
| 10,052,026 B1 | 8/2018 | Tran | |
| 10,161,488 B1 | 12/2018 | Meyer | |
| 10,179,265 B2 | 1/2019 | Carr | |
| 10,322,315 B2 | 6/2019 | Foley et al. | |
| 10,486,026 B2 | 11/2019 | Foley et al. | |
| 10,500,442 B2 * | 12/2019 | Hong | A63B 21/156 |
| D873,935 S | 1/2020 | Van Den Berg | |
| 10,617,903 B2 | 4/2020 | Orady et al. | |
| 10,639,521 B2 | 5/2020 | Foley et al. | |
| 10,737,134 B2 | 8/2020 | Anderson et al. | |
| 10,758,780 B2 | 9/2020 | Putnam | |
| 10,772,786 B2 * | 9/2020 | Suzuki | A63B 21/153 |
| 10,814,172 B1 | 10/2020 | Ilfrey et al. | |
| 10,828,551 B2 | 11/2020 | Putnam | |
| 10,864,406 B2 | 12/2020 | Foley et al. | |
| 10,905,916 B1 | 2/2021 | Malik | |
| 10,946,238 B1 | 3/2021 | Rogus | |
| 10,974,094 B2 | 4/2021 | Consiglio et al. | |
| 10,981,047 B2 | 4/2021 | Putnam | |
| 10,987,565 B2 | 4/2021 | Orady et al. | |
| D921,132 S | 6/2021 | Orady et al. | |
| 11,045,709 B2 | 6/2021 | Putnam | |
| 11,065,527 B2 | 7/2021 | Putnam | |
| 11,090,547 B2 | 8/2021 | Putnam | |
| 11,097,148 B2 | 8/2021 | Kennington | |
| 11,110,336 B2 | 9/2021 | Putnam | |
| 11,117,038 B2 | 9/2021 | Putnam | |
| 11,117,039 B2 | 9/2021 | Putnam | |
| 11,123,626 B1 | 9/2021 | Putnam | |
| 11,135,503 B2 | 10/2021 | Putnam | |
| 11,135,504 B1 | 10/2021 | Putnam | |
| 11,135,505 B2 | 10/2021 | Putnam | |
| 11,139,061 B2 | 10/2021 | Foley et al. | |
| 11,145,398 B2 | 10/2021 | Foley et al. | |
| 11,145,399 B2 | 10/2021 | Foley et al. | |
| 11,167,172 B1 | 11/2021 | Putnam et al. | |
| 11,170,886 B2 | 11/2021 | Foley et al. | |
| 11,173,377 B1 | 11/2021 | Putnam | |
| 11,173,378 B2 | 11/2021 | Putnam | |
| 11,179,620 B2 | 11/2021 | Putnam | |
| 11,183,288 B2 | 11/2021 | Foley et al. | |
| 11,202,951 B1 | 12/2021 | Augustin et al. | |
| 11,207,564 B2 | 12/2021 | Ward et al. | |
| 11,219,799 B2 | 1/2022 | Poure et al. | |
| 11,219,816 B2 | 1/2022 | Putnam | |
| 11,220,412 B2 * | 1/2022 | Peuker | B65H 57/26 |
| 11,253,770 B2 | 2/2022 | Putnam | |
| 11,273,343 B2 | 3/2022 | Augustin et al. | |
| 11,285,355 B1 | 3/2022 | Nicholson et al. | |
| 11,289,185 B2 | 3/2022 | Foley et al. | |
| 11,295,849 B2 | 4/2022 | Foley et al. | |
| 11,295,850 B2 | 4/2022 | Foley et al. | |
| 11,298,591 B2 | 4/2022 | Evancha et al. | |
| 11,298,606 B2 | 4/2022 | Putnam | |
| 11,311,778 B2 | 4/2022 | Ward et al. | |
| 11,311,791 B2 | 4/2022 | Dion et al. | |
| 11,324,983 B2 | 5/2022 | Orady et al. | |
| 11,331,538 B2 | 5/2022 | Ward et al. | |
| 11,389,687 B2 | 7/2022 | Orady et al. | |
| 11,517,785 B1 | 12/2022 | Nolan | |
| 11,623,126 B1 | 4/2023 | Lagree et al. | |
| 11,642,560 B1 | 5/2023 | Hewlett | |
| 11,642,569 B2 | 5/2023 | Zhang | |
| 11,779,793 B2 * | 10/2023 | Peal | A63B 21/00069 482/92 |
| 11,806,580 B1 | 11/2023 | Nolan | |
| 11,931,616 B2 | 3/2024 | Orady et al. | |
| 2002/0039954 A1 * | 4/2002 | Simonson | A63B 23/035 482/99 |
| 2002/0091043 A1 | 7/2002 | Rexach | |
| 2003/0015414 A1 | 1/2003 | Kajiura et al. | |
| 2004/0229730 A1 | 11/2004 | Ainsworth et al. | |
| 2009/0170675 A1 * | 7/2009 | Giannelli | A63B 21/156 482/139 |
| 2010/0125026 A1 | 5/2010 | Zavadsky et al. | |
| 2011/0082010 A1 | 4/2011 | Dyer et al. | |
| 2011/0105278 A1 | 5/2011 | Fabbri et al. | |
| 2011/0319230 A1 | 12/2011 | Brendle | |
| 2012/0237911 A1 | 9/2012 | Watterson | |
| 2013/0035220 A1 | 2/2013 | Adams | |
| 2013/0123071 A1 | 5/2013 | Rhea | |
| 2013/0345883 A1 | 12/2013 | Sloo et al. | |
| 2014/0038777 A1 | 2/2014 | Bird | |
| 2014/0038781 A1 | 2/2014 | Foley et al. | |
| 2014/0121072 A1 | 5/2014 | Ercanbrack | |
| 2014/0135181 A1 | 5/2014 | Smith | |
| 2015/0044648 A1 | 2/2015 | White et al. | |
| 2015/0087486 A1 * | 3/2015 | Franks | A63B 21/0442 482/129 |
| 2015/0182773 A1 | 7/2015 | Olson et al. | |
| 2015/0290488 A1 | 10/2015 | Hopperstad et al. | |
| 2017/0007886 A1 | 1/2017 | Alessandri | |
| 2017/0177295 A1 | 6/2017 | Bowen | |
| 2017/0312564 A1 | 11/2017 | Perez Gomez | |
| 2017/0319941 A1 * | 11/2017 | Smith | A63B 24/0003 |
| 2017/0333755 A1 | 11/2017 | Rider | |
| 2018/0005615 A1 | 1/2018 | MacPherson | |
| 2018/0048196 A1 | 2/2018 | Kuo et al. | |
| 2018/0159618 A1 | 6/2018 | Winata | |
| 2018/0174347 A1 | 6/2018 | Chaney | |
| 2018/0253840 A1 | 9/2018 | Tran | |
| 2019/0005373 A1 | 1/2019 | Nims et al. | |
| 2019/0099632 A1 | 4/2019 | Orady et al. | |
| 2019/0099633 A1 | 4/2019 | Orady et al. | |
| 2019/0143194 A1 | 5/2019 | Evancha et al. | |
| 2019/0184234 A1 | 6/2019 | Packles et al. | |
| 2019/0290964 A1 | 9/2019 | Oren | |
| 2019/0299043 A1 * | 10/2019 | Gisin | A63B 21/155 |
| 2019/0336827 A1 | 11/2019 | Intonato et al. | |
| 2019/0371114 A1 | 12/2019 | Diefenbach et al. | |
| 2020/0009444 A1 | 1/2020 | Putnam | |
| 2020/0014967 A1 | 1/2020 | Putnam | |
| 2020/0047027 A1 | 2/2020 | Ward et al. | |
| 2020/0047030 A1 | 2/2020 | Ward et al. | |
| 2020/0047031 A1 | 2/2020 | Orady et al. | |
| 2020/0047053 A1 | 2/2020 | Ward et al. | |
| 2020/0047055 A1 | 2/2020 | Ward et al. | |
| 2020/0054922 A1 | 2/2020 | Azaria et al. | |
| 2020/0070032 A1 | 3/2020 | Orady et al. | |
| 2020/0114194 A1 | 4/2020 | McGhee | |
| 2020/0139187 A1 | 5/2020 | Kennington | |
| 2020/0139194 A1 | 5/2020 | Min et al. | |
| 2020/0147445 A1 | 5/2020 | Anderson et al. | |
| 2020/0254311 A1 | 8/2020 | Watterson et al. | |
| 2020/0272311 A1 | 8/2020 | Rotta | |
| 2020/0276465 A1 | 9/2020 | Orady et al. | |
| 2021/0004981 A1 | 1/2021 | Song et al. | |
| 2021/0093921 A1 | 4/2021 | Foley et al. | |
| 2021/0128978 A1 | 5/2021 | Gilstrom et al. | |
| 2021/0170222 A1 | 6/2021 | Consiglio et al. | |
| 2021/0170224 A1 | 6/2021 | Rogus | |
| 2021/0205688 A1 | 7/2021 | Liao et al. | |
| 2021/0236874 A1 | 8/2021 | Ward et al. | |
| 2021/0291015 A1 | 9/2021 | Consiglio et al. | |
| 2021/0299520 A1 | 9/2021 | Evancha et al. | |
| 2021/0308528 A1 | 10/2021 | Soifer | |
| 2021/0339110 A1 | 11/2021 | Putnam et al. | |
| 2021/0342952 A1 | 11/2021 | Putnam et al. | |
| 2021/0362030 A1 | 11/2021 | Putnam | |
| 2021/0362031 A1 | 11/2021 | Putnam | |

(56) References Cited

U.S. PATENT DOCUMENTS

| | | |
|---|---|---|
| 2021/0370154 A1 | 12/2021 | Putnam |
| 2021/0379447 A1 | 12/2021 | Lee |
| 2021/0379471 A1 | 12/2021 | Putnam |
| 2021/0379472 A1 | 12/2021 | Putnam |
| 2021/0379473 A1 | 12/2021 | Putnam |
| 2021/0387038 A1 | 12/2021 | Premachandra et al. |
| 2022/0023738 A1 | 1/2022 | Putnam |
| 2022/0032115 A1 | 2/2022 | Mallard et al. |
| 2022/0032162 A1 | 2/2022 | Putnam |
| 2022/0032163 A1 | 2/2022 | Putnam |
| 2022/0040535 A1 | 2/2022 | Warren |
| 2022/0050655 A1 | 2/2022 | Chiang et al. |
| 2022/0054891 A1 | 2/2022 | Owusu |
| 2022/0054925 A1 | 2/2022 | Chiang et al. |
| 2022/0062680 A1 | 3/2022 | Orady et al. |
| 2022/0071415 A1 | 3/2022 | Putnam et al. |
| 2022/0072375 A1 | 3/2022 | Putnam et al. |
| 2022/0072376 A1 | 3/2022 | Putnam et al. |
| 2022/0072379 A1 | 3/2022 | Putnam et al. |
| 2022/0072380 A1 | 3/2022 | Trehan |
| 2022/0078503 A1 | 3/2022 | Putnam et al. |
| 2022/0105417 A1 | 4/2022 | Putnam |
| 2022/0118301 A1 | 4/2022 | Valente et al. |
| 2022/0118304 A1 | 4/2022 | McNally et al. |
| 2022/0118338 A1 | 4/2022 | Putnam |
| 2022/0118339 A1 | 4/2022 | Putnam |
| 2022/0118340 A1 | 4/2022 | Putnam |
| 2022/0212055 A1 | 7/2022 | Valente et al. |
| 2022/0225769 A1 | 7/2022 | Brown et al. |
| 2022/0266084 A1 | 8/2022 | Hoover |
| 2022/0368260 A1 | 11/2022 | Chen |
| 2022/0370854 A1* | 11/2022 | Zhang ................. A63B 21/169 |
| 2022/0386260 A1 | 12/2022 | Lee et al. |
| 2023/0067732 A1 | 3/2023 | Neuhaus |
| 2023/0089962 A1 | 3/2023 | Shavit |
| 2023/0123415 A1 | 4/2023 | White et al. |
| 2023/0128721 A1 | 4/2023 | Plummer |
| 2023/0264062 A1* | 8/2023 | Parker ................ A63B 21/0058 482/5 |
| 2023/0277890 A1 | 9/2023 | Peal et al. |
| 2023/0285806 A1 | 9/2023 | Webster et al. |
| 2023/0338770 A1* | 10/2023 | Chen ................. A63B 21/0058 |
| 2024/0033571 A1 | 2/2024 | James et al. |
| 2024/0042266 A1* | 2/2024 | Chevalier ............ A63B 21/169 |
| 2024/0226661 A1 | 7/2024 | Schloss et al. |

FOREIGN PATENT DOCUMENTS

| | | |
|---|---|---|
| CN | 116139456 A | 5/2023 |
| EP | 655264 A1 | 5/1995 |
| GB | 2414078 A | 11/2005 |
| GB | 2531038 A | 4/2016 |
| KR | 101425769 B1 | 8/2014 |
| WO | 2018044721 A1 | 3/2018 |
| WO | 2019063960 A1 | 4/2019 |
| WO | 2019143488 A1 | 7/2019 |
| WO | 2019231982 | 12/2019 |
| WO | 2020033508 | 2/2020 |
| WO | 2020033530 | 2/2020 |
| WO | 2020033544 | 2/2020 |
| WO | 2020033548 | 2/2020 |
| WO | 2020123756 | 6/2020 |
| WO | 2021021447 | 2/2021 |
| WO | 2021118859 | 6/2021 |
| WO | 2021154298 | 8/2021 |
| WO | 2021222497 | 11/2021 |
| WO | 2022011448 A1 | 1/2022 |
| WO | 2022026486 A1 | 2/2022 |
| WO | 2022051474 A2 | 3/2022 |
| WO | 2022132814 A1 | 6/2022 |
| WO | 2024175972 A1 | 8/2024 |

* cited by examiner

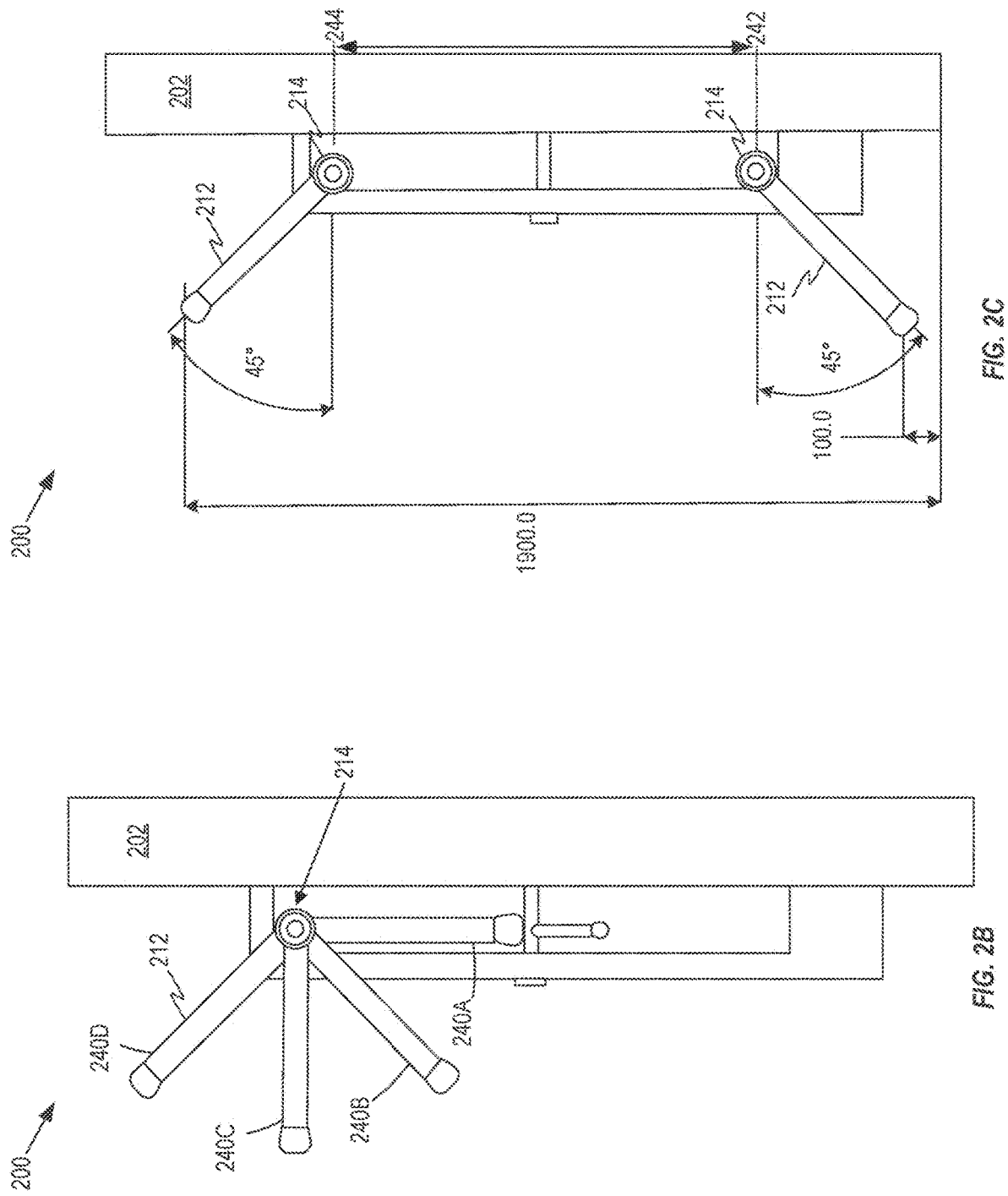

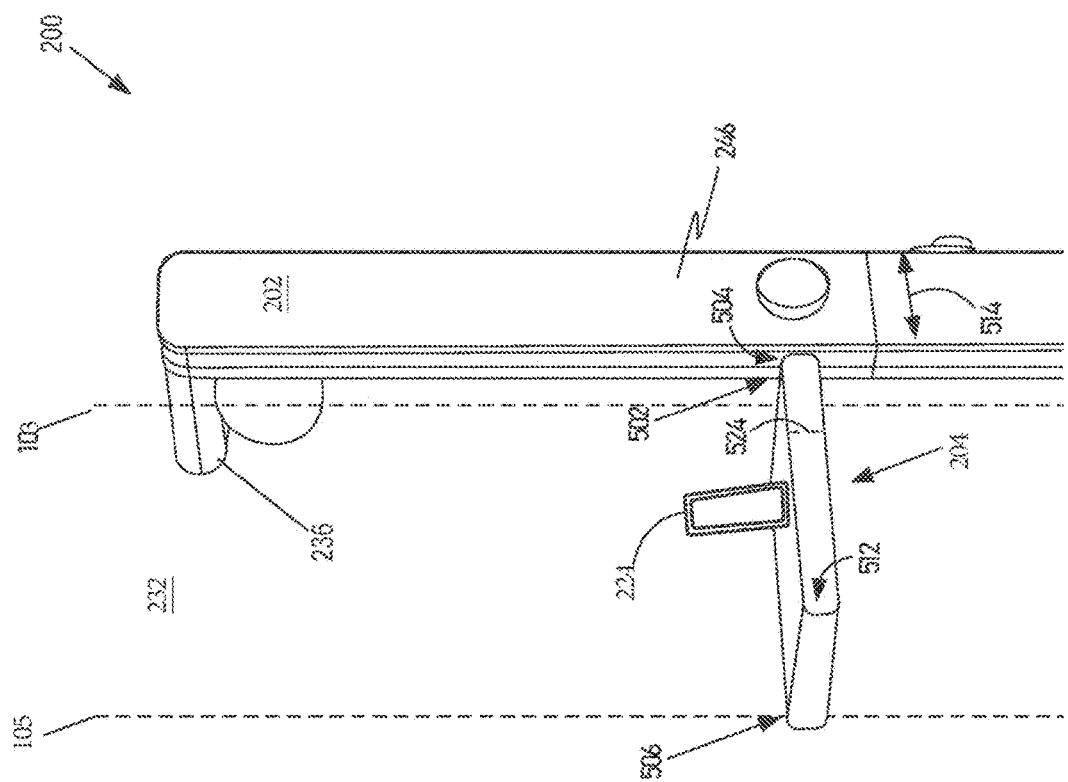

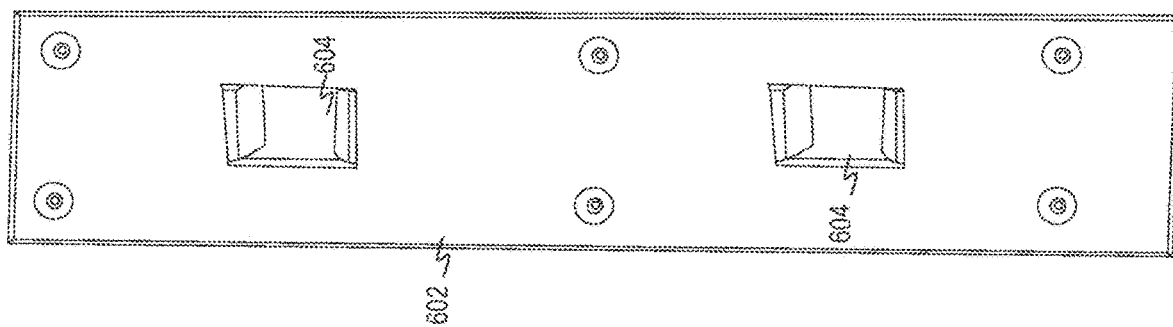

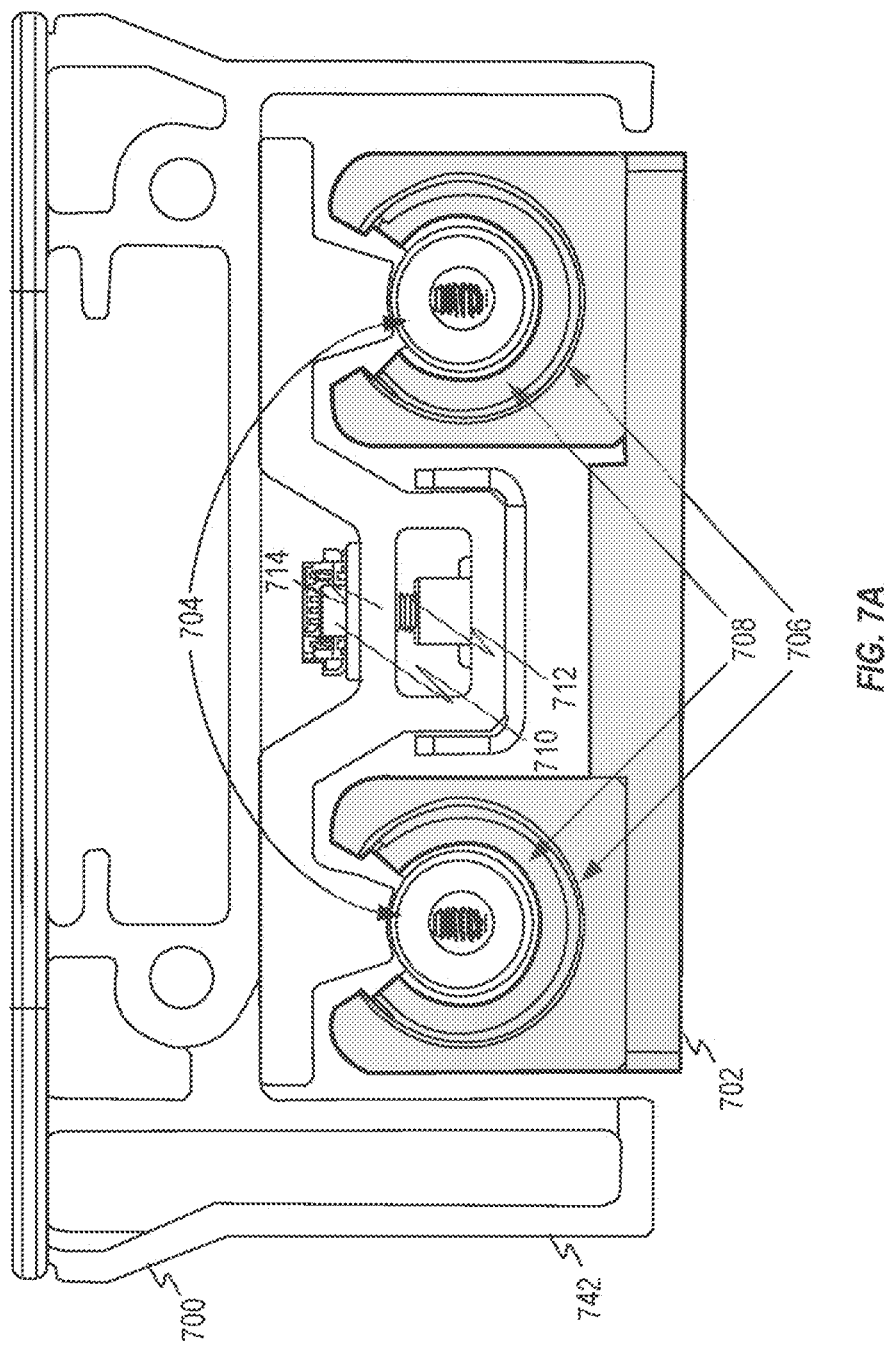

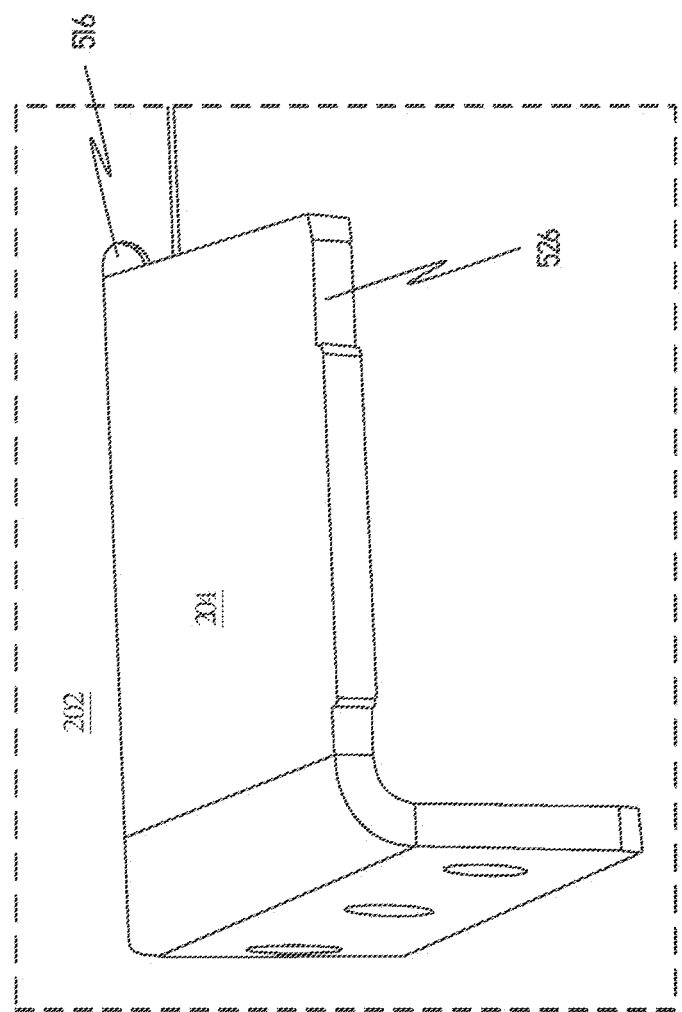

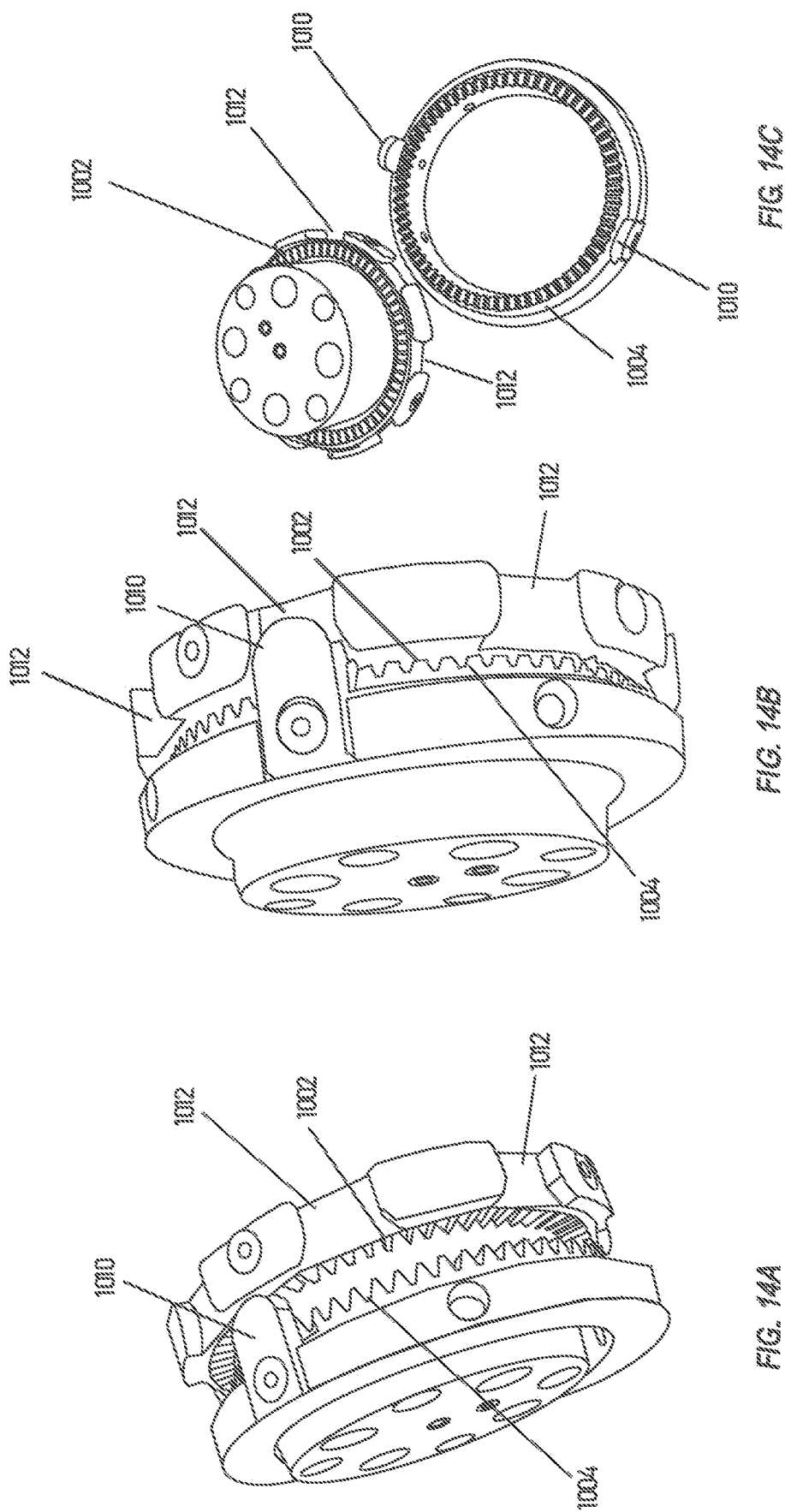

1841

1846

SYSTEMS AND METHODS FOR AN ELECTRONIC WALL MOUNTED EXERCISE MACHINE

TECHNICAL FIELD

This disclosure relates to systems, methods, and computer readable media associated with electronic wall-mounted exercise machines.

BACKGROUND

Resistance training promotes the building and strengthening of muscles and bone tissue, and burns fat. While electronic exercise machines may facilitate resistance training, such machines tend to be large, bulky, and heavy. Wall mounted exercise machines may require a significant amount of wall space, limiting where such machines may be mounted from both physical and esthetic considerations. In addition, wall mounted exercise machines may have numerous controls and adjustment mechanisms that may be cumbersome to use. For example, some exercise machines have mechanical and/or electrical controls that require two-handed adjustments. Some electronic exercise systems may be programmed with predefined routines, that while providing some degree of convenience, may offer only limited adjustment or customization capability to accommodate individual users. Consequently, some electronic exercise systems may be awkward or difficult to use and may discourage users from engaging in exercise routines beneficial to their health. Therefore, there is a need for unconventional innovative streamlined technologies that occupy less space and offer a convenient interface to allow adjusting and customizing exercise routines to suit individual needs.

SUMMARY

Embodiments consistent with the present disclosure provide systems, methods, and devices for electronic exercise machines.

The foregoing general description and the following detailed description are exemplary and explanatory only and are not restrictive of the claims.

BRIEF DESCRIPTION OF THE FIGURES

FIG. 2B is a side view of the exemplary wall-mountable electronic exercise machine of FIG. 2A, showing various arm positions, consistent with some embodiments of the present disclosure.

FIG. 2C is another side view of the exemplary wall-mountable electronic exercise machine of FIG. 2A, showing two extreme trolley and arm positions, consistent with some embodiments of the present disclosure.

FIG. 2D is another perspective view of the exemplary wall-mountable electronic exercise machine of FIG. 2A, illustrating positioning relative to wall studs, consistent with some embodiments of the present disclosure.

FIG. 6D is a perspective view of a portion of a beam with tapered openings for receiving a trolley locking pin, consistent with some embodiments of the present disclosure.

FIG. 7A is a cross-sectional view of another exemplary vertically wall-mountable beam with an alternative trolley consistent with some embodiments of the present disclosure.

FIG. 10 is an illustration of an exemplary slot in vertically wall-mountable beam receiving a T-bar, consistent with some embodiments of the present disclosure.

FIG. 14A illustrates mating surfaces in a disengaged configuration, consistent with some disclosed embodiments.

FIG. 14B illustrates mating surfaces in an engaged configuration, consistent with some embodiments of the present disclosure.

FIG. 14C illustrates disassembled mating surface components of an exercise machine shoulder, consistent with some embodiments of the present disclosure.

DETAILED DESCRIPTION

Figure 1A:
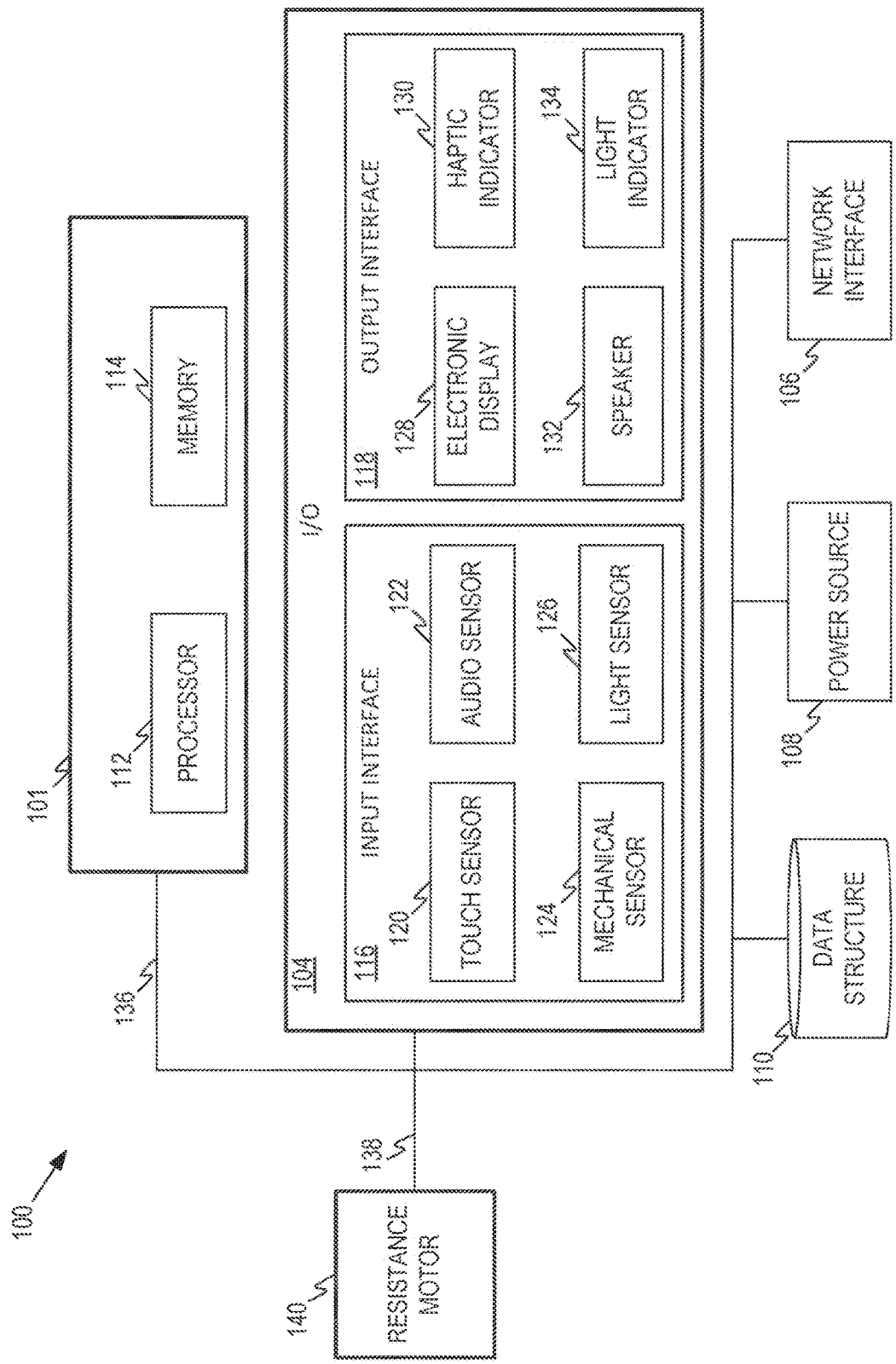
FIG. 1A is a schematic diagram of system architecture for an electronic exercise machine, consistent with some embodiments of the present disclosure.

This application claims priority from the following patent applications:
a. U.S. provisional patent Ser. No. 63/496,605 filing date Apr. 17, 2023.

b. U.S. provisional patent Ser. No. 63/513,546 filing date Jul. 13, 2023.
c. U.S. provisional patent Ser. No. 63/611,051 filing date Dec. 15, 2023.
d. PCT patent application serial number PCT/IB2023/056058 filing date Jun. 12, 2023 which claims priority from (i) U.S. provisional patent Ser. No. 63/433,463 filing date Dec. 18, 2022, and (ii) U.S. provisional patent Ser. No. 63/496,605 filing date Apr. 17, 2023.

This application incorporated each one of the mentioned above patent applications (including U.S. provisional patent Ser. No. 63/433,463) in its entirety.

Disclosed herein are systems, methods, and non-transitory computer readable media relating to performance of exercise routines, optionally using electronic exercise machines. Some disclosed embodiments relate to mechanical features of an electronic exercise machine. Some disclosed embodiments relate to software applications for using an electronic exercise machine. Some embodiments relate to a modular electronic exercise machine, allowing integration of a plurality of individual electronic exercise machines. Some disclosed embodiments relate to performance of exercise routines (e.g., with or without an electronic exercise machine). Some disclosed embodiments relate one or more combinations of mechanical features, software applications, and/or modular electronic exercise machines.

Wall-mountable electronic exercise machines tend to be bulky, often occupying significant wall-space. Some disclosed embodiments involve a streamlined or minimalist wall-mountable electronic exercise machine that may avoid bulkiness while withstanding stresses that could pull a different exercise machine off a wall and cause injury and/or damage. Such embodiments may involve a minimalist design that is primarily defined by a vertical wall-mounted beam associated with a resistance motor, and configured to be mounted on a single stud in a wall. To withstand significant torque forces that could cause the vertical beam to rotate, and, without further support, pull the beam off the wall, a smaller horizontal beam may extend from the vertical beam in a T-like configuration. The smaller, horizontal beam (e.g., a T-bar) may be configured to fasten to a second, adjacent stud in the wall. The connection to an adjacent stud may resist a destructive torquing of the vertical wall-mounted beam. In addition to providing torque resistance, the smaller, horizontal beam may also serve as shelf, (e.g., to support a mobile communications device, a towel, a water bottle) for added utility. Consequently, disclosed embodiments for a minimalist, T-shaped wall-mountable electronic exercise machine may provide advantages over conventional exercise machines, being less bulky and occupying less wall space, and being sufficiently strong and stable to withstand stresses exacted during performance of exercise routines.

In some embodiments, the T-bar may include three attachment points. A first attachment point may connect the T-bar to the vertical wall-mounted beam. A second attachment point may connect the T-bar to the first stud (e.g., the same stud to which the beam is attached). A third attachment point may connect the T-bar to a second, adjacent stud in the wall.

Some conventional exercise machines include an adjustable arm that may be both rotatable and movable along a rail to adjust height. However, reorienting the arm position in such machines position may be cumbersome, requiring the manipulation of multiple buttons. Some disclosed embodiments involve a single button or knob for adjusting both an angle and a height of an arm of an exercise machine. Moving the knob in one direction permits the arm to travel longitudinally (e.g., to adjust a height of the arm). Moving the knob in a second direction permits the arm to rotate, allowing adjustment to the angle of the arm. The knob (or button) allows at least two different types of movement and any combination therebetween—rotation, pull, push, etc., to provide a simple and sleek adjustment mechanism.

Some conventional exercise machines offer touch screen controls, often requiring a user to divert attention to manipulating the controls using both hands. Some disclosed embodiments involve a single dial for a wall-mountable electronic exercise machine permitting a user to make electronic adjustments with one hand. The dial may have a sleek, minimalist design while offering a diverse array of functions. For example, resistance of a resistance motor may be adjusted by rotating the dial, and a mode of operation for the exercise machine may be changed by pressing the dial. As another example, a mode of operation may be changed by touching a touch-sensitive screen included with the dial.

Some conventional exercise machines are designed as a single unit. Disclosed embodiments include modular exercise equipment operable in two modes. In a standalone mode, a single unit of exercise equipment unit may permit exercises using a single resistive motor and cable. In a paired mode, two side-by-side exercise equipment units may be electronically paired and operate in a synchronized manner, for coordinated workouts using both motors and cables simultaneously.

Some disclosed embodiments involve a cloud service configured to communicate with an electronic device and/or with an electronic exercise machine, e.g., allowing a user to participate in one or more pre-programmed exercise routines, and/or change one or more exercise routines. For example, a software application associated with a cloud service may be installed on a mobile communications device of a user. The software application may permit the cloud service to receive data from the user, and/or to provide recording, monitoring, tracking, and/or feedback services related to performances of exercise routines. In addition, the cloud service may communicate with a controller of an electronic exercise machine, allowing the cloud service to receive data from the electronic exercise machine. The cloud server may analyze data received from the mobile communications device and/or the electronic exercise machine, provide feedback, e.g., to modify one or more aspects of an exercise routine. Such modifications may include, for example, changing a timing, a frequency, a speed, an intensity, and/or a mode of one or more exercise routine (e.g., by making corresponding changes to a resistance of a resistance motor of the exercise machine), changing a height and/or angle of an arm of the exercise machine, switching an accessory connected to the arm, recommending a change of posture or position of the user, and/or make any other change to an exercise routine. In some embodiments, a cloud service may collect and analyze data unrelated to an exercise machine and associated with a user and/or user training aspects. In some applications, a cloud service may use data unrelated to an exercise machine and associated with a user and/or user training aspect to operate an electronic exercise machine.

For example, during a workout of a predefined length, a user may desire to shorten the workout. Rather than simply truncate the workout in progress, the cloud service may permit a user to modify the workout duration, e.g., by shortening the workout in a manner customized to the user, for example, in a manner to meet an exercise goal.

As another example, the cloud service may permit gamification of exercise routines. A user may initiate an exercise challenge and send the exercise challenge to other users of exercise machines via the cloud service. Each challenge recipient may be enabled to accept challenges and compete the exercise challenge asynchronously, e.g., at the challenge recipient's convenience. The cloud service may collect data from the initiator and each challenge recipient while performing the exercise challenge, and compare the data to determine performance results. The cloud service may notify the initiator and each challenge recipient of the results to permit an interactive exercise experience for remote users.

While a number of the foregoing examples are described in connection with a cloud service, similar functionality may be achieved with disclosed embodiments by incorporating the various functions into the exercise equipment itself, into software paired with the exercise equipment, or through networking with another device or server that aids in providing the associated functionality.

Various terms used in this detailed description and in the claims may be defined or summarized differently when discussed in connection with differing examples. It is to be understood that the definitions, summaries, and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments and examples are described throughout this disclosure. The fact that some "disclosed embodiments" are described as exhibiting a feature or characteristic does not mean that other disclosed embodiments necessarily lack that feature or characteristic.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples but is inclusive of general principles described herein and illustrated in the figures in addition to the general principles encompassed by the appended claims.

Some embodiments described herein involve an exercise machine. An exercise machine may refer to a mechanical device that may be used to perform physical exercise. Examples of exercise machines may include wall-mountable resistance devices, free standing resistance devices, treadmills, stationary bicycles, elliptical machines, weight machines, other resistance machines, and/or any other machine designed to engage a user in physical exercise.

Some disclosed embodiments involve an electronic exercise machine. An electronic exercise machine may refer to an exercise machine including a resistance motor associated with electronics for controlling the resistance. The electronics may control an amount of resistance applied during a weightlifting exercise by regulating, for example, a level, a frequency, a duration, a speed, a duty cycle, a range of motion, an exercise type, an operational mode, and/or any other attribute associated with resistance applied by a resistance motor. In some embodiments, electronics, including for example, at least one processor, may control force applied by a resistance motor in response to one or more user inputs.

In some embodiments, an electronic exercise machine may be associated with a user interface. Such a user interface may include one or more of an electronic display, a touch-sensitive screen, a microphone, a speaker, a haptic interface, a light emitting diode (LED), one or more adjustable dials, knobs, buttons, switches, and/or levers and/or any other type of manipulatable control enabling user inputs and/or information display. For example, a user may provide one or more inputs via a user interface associated with an electronic exercise machine to initiate, select, modify, share, and/or terminate an exercise routine. Such an interface may initiate signals to at least one processor associated with an electronic exercise machine. In a similar manner, the at least one processor may transmit one or more signals to convey information via a user interface to a user of an electronic exercise machine.

Some disclosed embodiments involve an electromagnet. An electromagnet may refer to a temporary magnet created by intermittent electrical currents. For example, an electromagnet may be formed by passing an electrical current through an electrically conductive wire wrapped around a piece of magnetic metal to produce an electromagnetic field. Some examples of electrically conductive wires may include copper, steel, and/or aluminum wires. Some examples of magnetic metal may include cast iron, wrought iron, galvanized steel, ferritic and martensitic stainless steel. The strength of an electromagnetic field produced by an electromagnet may be increased, decreased, or terminated by controlling a level of electrical current through the wire. Electromagnetic fields produced by one or more electromagnets may be used to introduce resistance to mechanical motion. Overcoming such resistance may require an application of a mechanical force.

Some disclosed embodiments involve a motor (e.g., a resistance motor). Such a motor may include a one or more electromagnets configured to apply a variable electromagnetic field as resistance. For example, a level of resistance produced by a resistance motor may correspond to an amount of weight (e.g., "digital weight") needed to be overcome by muscles during performance of a weight-bearing exercise. A resistance motor may be associated with at least one processor configured to control a level of electrical current flowing therethrough, allowing the at least one processor to control attributes associated with resistance or digital weight produced by the resistance motor. In some embodiments, a resistance motor may be associated with a lower bracket configured to connect a bottom end of a vertical wall-mountable beam to a wall. For example, a resistance motor may be located inside a housing configured as a lower bracket for connecting a vertical wall-mountable beam to a wall. A lower bracket may be made of durable metal, such as stainless or galvanized steel, or aluminum.

Some disclosed embodiments involve an electronic wall-mountable exercise machine. An electronic wall-mountable exercise machine may refer to an electronic exercise machine including a frame (e.g., a vertically wall-mountable beam) for attachment to a wall via a plurality of supporting brackets. The frame and brackets may be made of durable metal (e.g., steel and/or aluminum) for sturdiness and may support a pulley system, allowing a first end of a cable to be connected to a resistance motor and a second end of the cable to be connected to exercise equipment. In some embodiments, an electronic wall-mountable exercise machine may include a user interface (e.g., including one or more adjustable dials, knobs, buttons, switches, and/or levers) allowing interaction with a controller of the wall-mountable exercise machine, e.g., to receive feedback and/or customize a workout to meet a fitness level and/or goal. For example, a dial may allow adjusting a resistance of a resistance motor, and a button may allow changing a direction and/or mode for exerting a force on a cable.

Consistent with the present disclosure, a vertically wall-mountable beam or a vertically-mountable beam may include a pole, column, post, pillar, and/or any other elongated form configured for connection to a wall in a substantially vertical orientation. Such a structure may be made of metal (e.g., aluminum and/or steel), composite, high strength polymer, or any other material or combinations of materials sufficiently sturdy to withstand forces exerted during exercise.

Some embodiments involve a pair of tracks. A pair of tracks may include two parallel rails. Such rails may include, for example elongated bars with grooves running along the length of the bars). Each rail may provide a smooth and stable surface and at least one delimiting wall for guiding one or more wheels (e.g., of a trolley). The pair of rails, like the beam, may be made of a hard durable material, such as metal (e.g., steel, aluminum, or other alloys), composite, high strength polymer, or any other material or combinations of materials sufficiently sturdy to withstand forces exerted during usage. The rails may be integrally formed with the vertically-mountable beam or may be connectable to the beam. In some embodiments, a pair of tracks may be symmetric (e.g., each track of a pair of tracks may have substantially similar cross-sections). In some embodiments, a pair of tracks may be asymmetric (e.g., each track of a pair of tracks may have differing cross-sections). In some embodiments, one or both tracks of a pair of tracks may have an L-shaped cross-section (e.g., a single delimiting wall) for guiding one or more wheels of a trolley. In some embodiments, one or both tracks of a pair of tracks may have a U-shaped cross-section or a V-shaped cross-section (e.g., two delimiting walls) for guiding one or more wheels of a trolley. In some embodiments, one or both tracks of a pair of tracks may have a substantially circular or partially circular-shaped cross-section for guiding one or more wheels of a trolley. In some embodiments, a vertically wall-mountable beam may be manufactured via an extrusion process involving forcing a material through a pre-shaped die to produce a vertically wall-mountable beam including a pair of rails, e.g., from a single piece of metal.

Some disclosed embodiments may involve a cable. A cable may include a rope, cord, chain, belt, and/or any other band or cordage having a tensile strength for withstanding repeated applications of tension. A cable may include a plurality of fibers (e.g., stainless and/or galvanized steel) that may be combined and twisted to form an elongated structure, and may optionally include a coating such as nylon and/or PVC to reduce friction and wear. In some embodiments, a cable may have a tensile strength suitable for withstanding a resistance force associated with a resistance motor of an electronic exercise machine. For instance, a first end of a cable may connect to a resistive motor and a second end of the cable may connect to a moveable arm of an electronic exercise machine, allowing for a mechanical force applied to move the arm to be at least partially resisted by the resistive motor.

Some disclosed embodiments may involve a pulley or a pulley system. Either such term refers to a mechanical device including at least one wheel that acts to change the direction of a force applied to a cable circumscribing the wheel. The wheel may have a grooved edge or rim around which the cable passes. The pulley may be supported by a frame or shell (e.g., a block) for guiding a cable around the wheel such that rotation of the wheel may cause a direction of the cable to change (e.g., such that a downwards motion on one end of the cable may cause a corresponding upwards motion on the other end of the cable and the reverse). In some embodiments, a vertical wall-mountable beam may include a pulley located at an upper section thereof. A pulley of a vertical wall-mountable beam may be associated with an upper bracket configured to affix an upper end of the vertical wall-mountable beam to a wall. For example, a pulley may be located inside a housing configured as an upper bracket for connecting a vertical wall-mountable beam to a wall. The upper bracket may be made of durable metal, such as stainless or galvanized steel, or aluminum.

Some disclosed embodiments involve a trolley. A trolley may include a chassis or frame connected to at least one pair of wheels configured to roll along a rail or pair of rails (e.g., of a vertically wall-mountable beam associated with an electronic exercise machine). In some embodiments, a trolley may be associated with two pairs of wheels, three pairs of wheel, four pairs of wheels, or any other pluralities of sets of wheels. A trolley may include components made of metal, plastic, wood, resin, and/or any other stiff durable material. The trolley may be associated with a locking mechanism allowing the trolley to selectively lock at locations along a vertically wall-mountable beam of an electronic exercise machine. The trolley may be associated with an arm of an electronic exercise machine, such that moving the trolley along a rail or pair of rails of a vertically wall-mountable beam of the electronic exercise machine allows adjusting a height of the arm, and locking the trolley at a selected location allows fixing the height of the arm. In some embodiments, a trolley may include a catching mechanism (e.g., a loop or hook) for directing a cable, originating from the resistive motor to a proximal an of the arm of an electronic exercise machine via a pulley system. The cable may be fed through the arm and may exit a distal end of the arm where it may connect to an accessory, such that maneuvering the arm via the accessory exerts a tension on the cable, which may be at least partially resisted by the resistance motor.

Consistent with the present disclosure, an arm refers to an elongated structure. An arm of an exercise machine is an elongated structure that extends from the exercise machine to enable a user to apply exertions to the machine. In some embodiments, this may be enabled by a hollow within the arm for a cable associated with a pulley and connected to a resistance motor, such that exertion of a mechanical force via the cable (e.g., by a user of an electronic exercise machine exerting a force on the cable) may be at least partially resisted by the resistance motor. The arm of an electronic exercise machine may be adjustably associated with a vertically wall-mountable beam of the electronic exercise machine. For example, the arm may connect to a trolley configured to ride along a pair of tracks of a vertically wall-mountable beam, allowing adjustment to a height of the arm along the vertically wall-mountable beam by adjusting a location of the trolley along the pair of tracks. As another example, the arm may connect to a shoulder configure to rotate relative to a vertically wall-mountable beam of an electronic exercise machine, permitting adjustment to an angle of the arm relative the vertically wall-mountable beam through adjustment of an orientation of the shoulder.

Consistent with the present disclosure, a housing (e.g., motor housing) may include a rigid casing or enclosure encasement configured to protect equipment (e.g., a motor). A housing may be made of any durable material, such as metal, plastic, and/or resin. In some embodiments, a housing may include one or more vents, gaps, or holes to enable dissipation of heat. In some embodiments, a housing may include an opening therein for a power cable to connect to a power source (e.g., an electrical wall outlet and/or a battery).

Some disclosed embodiments include at least one processor. "At least one processor" may involve any physical device or group of devices having electric circuitry that performs a logic operation on an input or inputs. For example, the at least one processor may include one or more integrated circuits (IC), including an application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively and may be co-located or located remotely from each other. The processors may be coupled electrically, magnetically, optically, acoustically, mechanically, or by other means that permit them to interact At least one processor may include a single processor or multiple processors communicatively linked to each other and capable of performing computations in a cooperative manner, such as to collectively perform a single task by dividing the task into subtasks and distributing the subtasks among the multiple processors, e.g., using a load balancer. In some embodiments, at least one processor may include multiple processors communicatively linked over a communications network (e.g., a local and/or remote communications network including wired and/or wireless communications links). The multiple linked processors may be configured to collectively perform computations in a distributed manner (e.g., as known in the art of distributed computing).

Some disclosed embodiments involve a non-transitory computer-readable medium or a memory. Such terms may refer to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within a wearable device or at a remote location. Additionally, one or more computer-readable storage mediums can be utilized in implementing a computer-implemented method. Accordingly, the term computer-readable storage medium should be understood to include tangible items and exclude carrier waves and transient signals.

Some disclosed embodiments involve a touch sensor. A touch sensor may include any type of equipment that captures and records physical touch or contact. Touch sensors, for example, may be capacitive and/or may include one or more of complementary metal-oxide-semiconductor (CMOS) integrated circuit (IC) chips, an application-specific integrated circuit (ASIC) controller and a digital signal processor (DSP) for sensing pressure, temperature, humidity, and/or any other indicator of touch. A touch sensor may convert an indication of touch to an electronic signal, which may be transmitted to at least one processor.

Some disclosed embodiments involve an audio sensor. An audio sensor may include any device that detects sound waves and coverts the sound waves into at least one electrical signal. An audio sensor may include, for example, one or more microphones. Some examples of such microphones include, unidirectional microphones, bidirectional microphones, cardioid microphones, omnidirectional microphones, onboard microphones, wired microphones, wireless microphones, or any combination of the above. The electronic signals from an audio sensor may be transmitted to at least one processor.

Some disclosed embodiments involve a mechanical sensor. A mechanical sensor includes any device that detects some sort of mechanical deformation or movement and translates that detection into an electrical signal. A mechanical sensor may be associated with a mechanical interface (e.g., a button, key, ball, switch, lever, touch pad, or dial) such that applying a mechanical force on the mechanical interface may cause the mechanical sensor to transmit a signal to at least one processor.

Some disclosed embodiments involve a light sensor. A light sensor may be included any device or be capable of detecting and converting optical signals in the near-infrared, infrared, visible, and ultraviolet spectrums into electrical signals. Examples of light sensors include photodetectors, photosensors, digital cameras, semiconductor charge-coupled devices (CCDs), active pixel sensors in complementary metal-oxide semiconductor (CMOS), or N-type metal-oxide-semiconductor (NMOS, Live MOS). The electrical signals may be used to generate image data. Consistent with the present disclosure, the image data may include pixel data streams, digital images, digital video streams, data derived from captured images, and data that may be used to construct one or more 3D images, a sequence of 3D images, 3D videos, or a virtual 3D representation. A light sensor may convert an optic signal to an electronic signal, which may be transmitted to at least one processor.

Some disclosed embodiments involve an electronic display. An electronic display includes any device or element capable of generating a visible image from electrical signals. For example, an electronic display may include a screen (e.g., LCD or dot-matrix screen), an electroluminescent (EL)

display, a liquid crystal display (LCD), light-emitting diode (LED)-backlit Liquid crystal display (LCD), a light-emitting diode (LED) display, an organic light-emitting diode (OLED) display, an active matrix organic light-emitting diode (AMOLED) display, a plasma (P) display, a quantum dot (QD) display, and/or any other type of technology for rendering information visually. At least one processor may transmit signals to an electronic display to cause information to be displayed visually.

Some disclosed embodiments involve a haptic indicator. A haptic indicator may include any element or device that outputs vibrations or forces detectable to a human when in contact with a portion of the human body, such as a finger or hand. A haptic indicator may include, for example, a vibrating motor, linear actuator, vibrational transducer, or any other force feedback device that provide tactile or haptic cues or that is capable of converting an electrical signal into corresponding vibrations or force applications. At least one processor may transmit signals to a haptic indicator to cause information to be rendered haptically.

Some disclosed embodiments involve a speaker. A speaker may include any element or device capable of outputting sound. For example, a speaker may include one or more transducers for converting electromagnetic waves into sound waves. At least one processor may transmit signals to a speaker to cause information to be rendered as sound.

Some disclosed embodiments involve a light indicator. A light indicator may include any element or device that emits light in order to convey information. (e.g., indicating that a machine is powered on, indicating a mode of operation, indicating proper or improper usage, or indicating any other information. A light indicator may include a single light source (e.g., an LED), an array of light sources, (e.g., an LED array associated with different colors). At least one processor may transmit signals to a light indicator to cause information to be rendered visually.

Some disclosed embodiments involve a data structure. A data structure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures. A data structure may also include any hardware, software, firmware, or combination thereof for storing and facilitating the retrieval of information in the data structure.

Some disclosed embodiments involve a mobile communications device. A mobile communications device is a portable electronic instrument designed to facilitate information transmission to other devices or networks. Mobile communications devices may, for example, use cellular or other wireless and/or wired networks to transmit information such as voice and/or other data. For example, such transmissions may be in the form of voice calls, text messages, internet access, and application usage.

Mobile communications devices come in various forms, such as smartphones, tablets, laptop computers, IoT devices, wearable electronics (such as smart watches, smart rings, fitness trackers, smart glasses, smart clothing, smart jewelry, smart headphones, wearable digital assistants), and portable wireless hotspots. Depending on configuration and intended use, they may include features such as a touchscreen interface, a built-in camera, Wi-Fi, NFC, and/or Bluetooth connectivity, and GPS navigation.

Some disclosed embodiments involve a power source. A power source may include any element, device, or system for providing electrical energy to an electrical load or a circuit. Examples of power sources include one or more batteries (e.g., a lead-acid battery, a lithium-ion battery, a nickel-metal hydride battery, a nickel-cadmium battery), fuel cells, generators, capacitors, power converters, or connections (e.g., an electrical wall outlet) to an external source of electrical energy (e.g., an electric grid or other mechanism for supplying electricity). A power source may further include combinations of any of the foregoing.

Some disclosed embodiments involve a communications network. A communications network may include any type of physical or wireless infrastructure used to exchange data. For example, a communications network may be the Internet, a private data network, a virtual private network using a public network, a Wi-Fi network, a LAN or WAN network, a combination of one or more of the forgoing, and/or other suitable connections that may enable information exchange among or between various system components. In some embodiments, a communications network may include one or more physical links used to exchange data, such as Ethernet, coaxial cables, twisted pair cables, fiber optics, or any other suitable physical medium for exchanging data. A communications network may also include a public switched telephone network ("PSTN") and/or a wireless cellular network. A communications network may be secured or unsecured network. In other embodiments, one or more system components may communicate directly through a dedicated communications network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

A communications network may include a plurality of nodes interconnected via network infrastructure allowing encoded information to flow therebetween. Such network infrastructure may include, for example, one or more routers, switches, boosters, cables (e.g., Ethernet, coaxial cables, twisted pair cables, fiber optics, wires, buses), antennae, and/or any other wired and/or wireless computer networking technology configured for exchanging data.

Some disclosed embodiments involve a network interface. A network interface may include electronic circuitry and/or software code enabling at least one processor to communicate with another processor or processors via a network according to a communications protocol (e.g., Transmission Control Protocol/Internet Protocol or TCP/IP). Such circuitry may include, for example, at least one processor, a memory, one or more antennae configured to send and/or receive wireless signals from other devices, one or more wires and/or cables configured to send and/or receive wired signals from other devices, a plurality of physical and/or virtual ports, one or more software interface layers for implementing one or more communications protocols (e.g., lower layer protocols such as TCP, User Datagram Protocol (UDP), IP, and Internet Control Message Protocol (ICMP), and application layer protocols, such as Hypertext Transfer Protocol (HTTP), Secure Socket Shell (SSH), Transport Layer Security (TLS), and Secure Sockets Layer (SSL), and/or any other component required to enable networked communication between a plurality of computing devices.

Some disclosed embodiments involve a cloud service. A cloud service is a product that enables access to computing resources, such as servers, storage, and applications, over a network such as the internet. Cloud services are typically provided by third-party vendors who manage and maintain the underlying infrastructure allowing users to access and use the services via the internet. Non-limiting examples of types of cloud services, include Infrastructure as a Service (IaaS), Platform as a Service (PaaS), and Software as a Service (SaaS). In some embodiments, a cloud service may execute program code instructions to implement one or more virtual machines.

In some embodiments, a communications network may be associated with a client-server model, allowing a cloud service to provide data storage and/or computational services to one or more client devices via the communications network. For example, a cloud service may store data and software associated with one or more electronic exercise machines and/or mobile communications devices (e.g., client devices) and/or execute program code instructions associated with using one or more electronic exercise machines. For example, a cloud server may store data and/or execute program code instructions for implementing a plurality of operational modes for an electronic exercise machine (e.g., in association with one or more exercise routines), creating an interface between a mobile communications device and one or more electronic exercise machines, and/or pairing two or more modular electronic exercise machines.

As another example, a cloud server may store data and execute program code instructions associated with performances of exercise routines (e.g., with or without an electronic exercise machine). For example, a cloud server may store results or achievements and/or provide feedback associated with performances of exercise routines (e.g., by a single or by multiple users), provide instructions for using an electronic exercise machine and/or for implementing differing modes of operation of an electronic exercise machine, facilitate interactions between remote users performing exercise routines (e.g., with or without an electronic exercise machine), and/or provide any other service associated with performances of exercise routines.

Some disclosed embodiments may involve signals. Signals may refer to an electrical or electromagnetic wave that carries information such as voice, video, or data. Signals can take various forms, including analog signals and digital signals. Other signal examples include radio signals, optical signals, microwave signals, infrared signals, ultrasonic signals, or any other wave or other conveyance that carries information. Non-limiting examples of signals include signals in the electromagnetic radiation spectrum (e.g., AM or FM radio, Wi-Fi, Bluetooth, radar, visible light, lidar, IR, Zigbee, Z-wave, and/or GPS signals), sound or ultrasonic signals, electrical signals (e.g., voltage, current, or electrical charge signals), electronic signals (e.g., as digital data), tactile signals (e.g., touch), and/or any other type of information encoded for transmission between two entities via a physical medium.

Some disclosed embodiments involve an indication. An indication may include a measurement, sign, and/or a signal conveying information about a state and/or level of a physical phenomenon. For example, an indication may signal the presence, occurrence, or status of something. An indication may be provided in a form that can be detected by a person or a system. For example, computers or other electronics may detect indications through signals, and humans may detect indications through light, audio, haptics, odor, or taste. In some instances, electronic sensors can also detect indications through light, audio, haptics, and odor, as well as through substance or image sensing.

Some disclosed embodiments may involve a mode of operation. A mode of operation refers to a way in which something works. For example, a device or system may work in a number of different ways, depending on a mode selection. A mode of operation may, by way of example, refer to a manner and/or a set of conditions for performing one or more procedures. A mode of operation may tune or adjust an operation of a system to accommodate a particular set or range of conditions. For instance, a first mode of operation may be associated with a first set of conditions and a second mode of operations may be associated with a second set of conditions, where the first mode of operation may be incompatible with the second set of conditions, and the second mode of operation may be incompatible with the first set of conditions. However, modes need not be incompatible. In some instances, a mode reflects a use preference, and the mode may be changed when preferences change.

FIG. TA is a block diagram of exemplary system architecture of an electronic exercise machine, consistent with some embodiments of the present disclosure. It is to be noted that FIG. 1A is a representation of just one embodiment, and it is to be understood that some illustrated elements might be omitted, and others added within the scope of this disclosure. For example, some elements of FIG. 1A may be grouped and/or housed separately. In some embodiments, circuitry associated with a resistance motor of an electronic exercise machine may be housed and/or positioned separately from at least one processor configured to control settings for operating the electronic exercise machine (e.g., a control unit may be located in proximity to a resistance motor and at least one processor may be located elsewhere, and may be in electronic communication with the control unit). While housed and/or located separately, the control unit and the at least one processor may be in communication via wired and/or wireless means. For example, a user may set a desired resistance weight via a software application installed on a mobile communications device. The mobile communications device may transmit an indication of the desired resistance weight to at least one processor. Based on the indication, the at least one processor may transmit a control signal to the control unit to cause the resistance motor to apply the desired resistance weight.

System architecture 100 may include a control circuit 101, an I/O (input-output) unit 236', a network interface 106, a power source 108, and a data structure 230'. Control circuit 101 may include at least one processor 112 and a memory 114. I/O unit 236' may include an input interface 116 and an output interface 118. Input interface 116 may include one or more of a touch sensor 120, an audio sensor 216, a mechanical sensor 204, and a light sensor 126, and/or any other type of sensor configured to receive an input. Output interface 118 may include one or more of an electronic display 128, a haptic indicator 130, a speaker 132, one or more light indicators 134, and/or any other type of output interface. Control circuit 101, I/O unit 236', network interface 106, power source 108, and data structure 230' may be interconnected via bus system 136. Control circuit 101 may be connected to a resistance motor 140 via one or more wires and/or cables 138. In some embodiments, one or more components of control circuit 101 may be located inside a housing encasing resistance motor 140, however this is not required.

For example, upon receiving a selection of an exercise routine to be performed using an electronic exercise machine via input interface 116, at least one processor 112 may retrieve data from memory 114 associated with the selected exercise routine. Such data may include, for instance, settings, preferences, a history of prior performances of the selected exercise routine, and/or any other data associated with the selected exercise routine. The at least one processor 112 may apply the retrieved data to control a current supplied to resistance motor 140, to thereby control the resistance applied by resistance motor 140 during performance of the selected exercise routine.

Figure 1B:
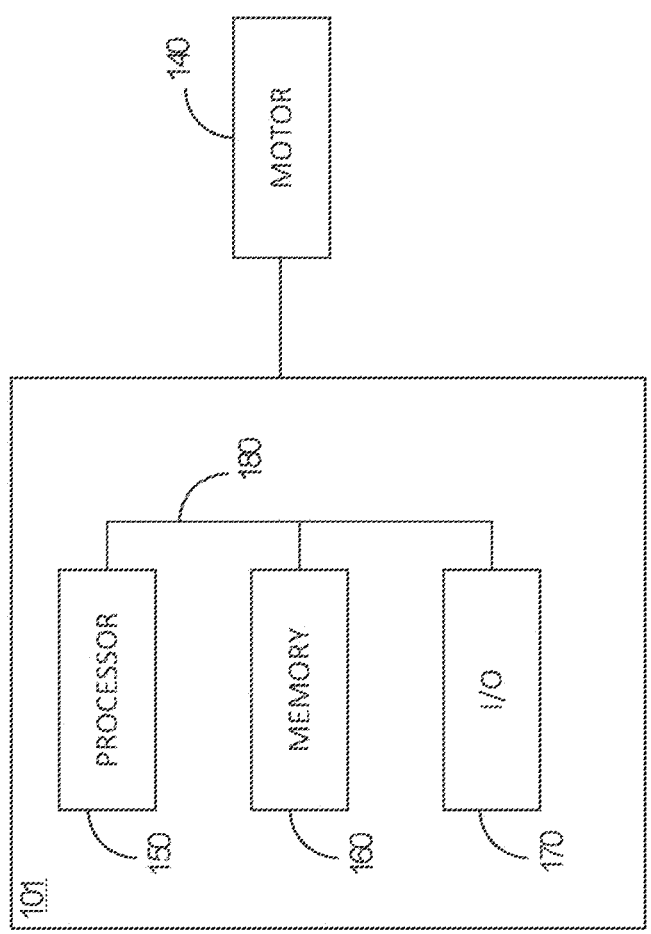
FIG. 1B is a block diagram of a controller for controlling an electronic exercise machine, consistent with some embodiments of the present disclosure.

FIG. 1B is a block diagram of a controller for controlling an electronic exercise machine, consistent with some embodiments of the present disclosure. Components of FIG. 1B may be similar in description to the corresponding components of FIG. 1A. A controller 101 of a T-shaped wall-mounted gym 200 may include at least one processor 150, at least one memory 160, and an input output (I/O) 170 connected via a bus system 180. I/O 170 may include wired and/or wireless (e.g., one or more antennas) communications means enabling electronic communication between at least one processor 150 and another processor and/or device via a communications network. For instance, at least one processor 150 may communicate with mobile communications device 224 and/or another at least one processor 150 configured with another instance of T-shaped wall-mounted gym 200 (e.g., see FIG. 2E showing paired T-shaped wall-mounted gyms 200A and 200B) via a pairing interface such as I/O 170. In some embodiments, at least one processor 150 may communicate with a wearable extended reality appliance via I/O 170. Some or all of controller 101 may be located within a motor housing 140, while some elements such as at least one processor 150, at least one memory 160, input output (I/O) 170, a bus system 180 may be encased within other portions of the equipment.

Figure 2A:
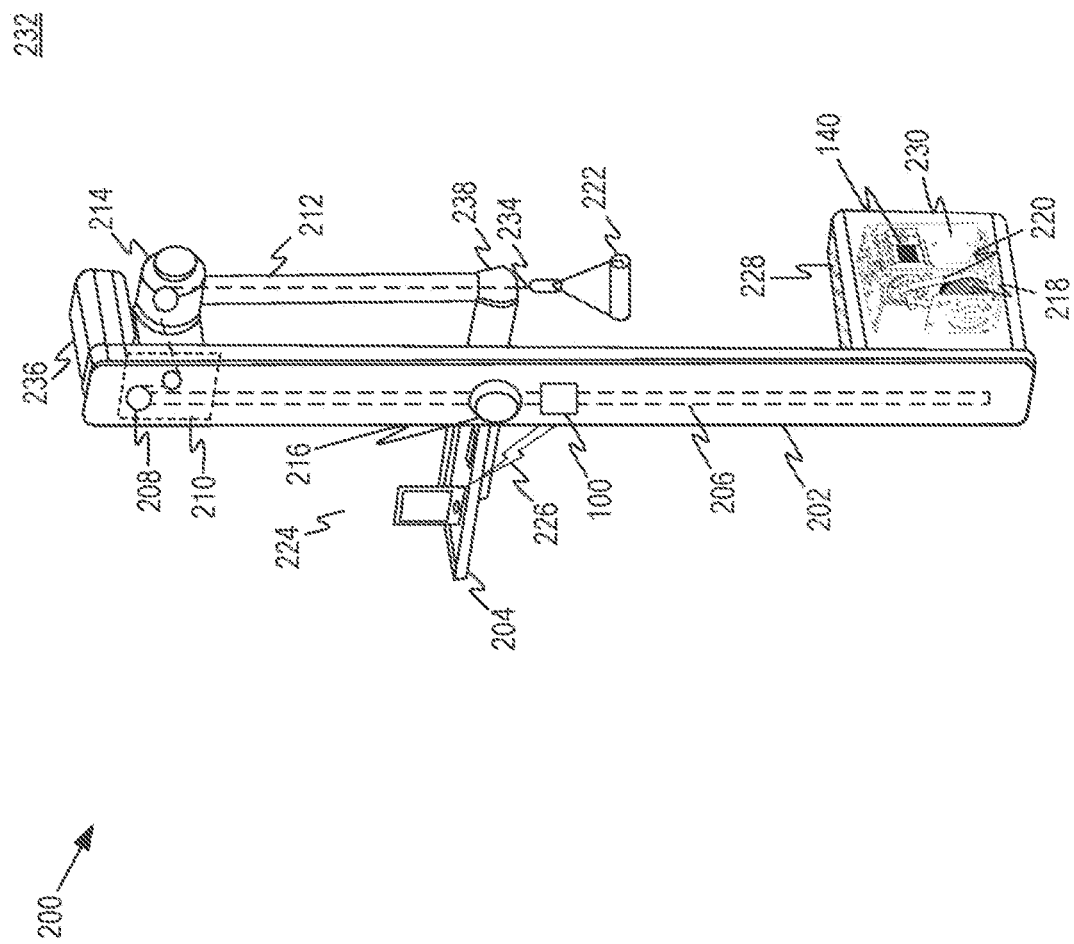
FIG. 2A is a perspective view of an exemplary wall-mountable electronic exercise machine, consistent with some embodiments of the present disclosure.
Figure 2E:
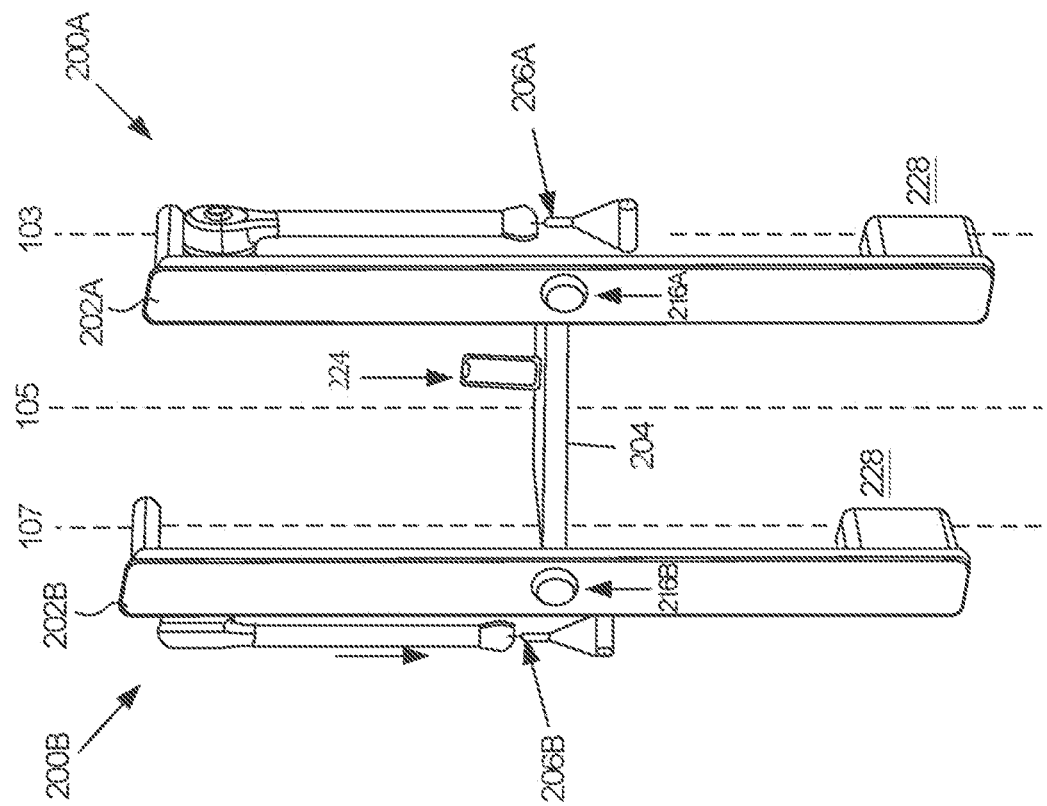
FIG. 2E is a perspective view of two paired T-shaped wall-mounted gyms illustrating positioning relative to wall studs, consistent with some embodiments of the present disclosure.

FIG. 2A is a perspective view of an exemplary wall-mountable electronic exercise machine 200, consistent with some embodiments of the present disclosure. Wall-mountable electronic exercise machine 200 may include a vertically wall-mountable beam 202 connected to a T-bar 204, resistance motor 140, control circuit 100 (e.g., see FIG. 1B) or controller 101 (not shown in FIG. 2A), a cable 206, a pulley system 208, a trolley 210, an arm 212, a rotatable shoulder 214, and a control knob or dial 216. Resistance motor 140 may be located towards a base of vertically wall-mountable beam 202, however this is not required. Resistance motor 140 may be housed inside a housing 228 including a bracket 230 (e.g., a lower bracket) for attaching to a lower section of wall 232. Vertically wall-mountable beam 202 may include an upper bracket 236 for attaching to an upper section of wall 232.

In some embodiments, T-bar 204 may include a bracket and a shelf. The bracket may be configured to attach to the wall and to vertically wall-mountable beam 202 and the shelf may be configured to cover the bracket and support one or more accessories (e.g., a cellular phone, a water bottle, and/or any other accessory.) As an example, a width of vertically wall-mountable beam 202 may be approximately 130 mm, a distance from a base of vertically wall-mountable beam 202 and T-bar 204 may be approximately 806 mm, and a length of T-bar 204 may be approximately 322 mm.

Pulley system 208 may be located towards a top of vertically wall-mountable beam 202. Resistance motor 140 may be connected to a spool 218 via a belt 220. Cable 206 may extend from spool 218, running substantially along the length of vertically wall-mountable beam 202, through pulley system 208, to trolley 210 and rotatable shoulder 214 through arm 212, exiting from a wrist 238 to connect to an exercise accessory 222 connected thereto, such that a pulling force applied to exercise accessory 222 may be at least partially resisted by resistance motor 140 via cable 206. Trolley 210 may be configured to move along the length of vertically wall-mountable beam 202 and lock at differing heights, allowing to adjust a height of arm 212, as described in greater detail herein. Rotatable shoulder 214 may allow adjusting an angle of arm 212 relative to vertically wall-mountable beam 202, as described in greater detail herein. At least one processor 112 of control circuit 101 may transmit one or more signals to control a level of current flowing through resistance motor 140, thereby controlling a level of resistance applied by resistance motor 140 onto cable 206.

A control knob such as dial 216 may provide a user interface allowing a user to engage in electronic communication with wall-mountable electronic exercise machine 200. Dial 216 may be associated with I/O unit 236'. For example, a user may use dial 216 to adjust one or more operational parameters and/or attributes associated with a resistance applied by resistance motor 140 onto cable 206. At least one processor 112 of control circuit 101 may receive an indication of an attribute selection via dial 216 from I/O unit 236' and may transmit a signal causing an adjustment to a current or a voltage flowing to resistance motor 140, to thereby cause resistance motor 140 to apply resistance characterized by the selected attributes to cable 206.

In some embodiments, control circuit 101 may pair to a mobile communications device 224 via network interface 106 (e.g., see FIG. 1A) to establish a (e.g., wireless) communications channel 226. Mobile communications device 224 may be configured with a user interface associated with wall-mountable electronic exercise machine 200, allowing a user to engage in electronic communication with at least one processor 112 of wall-mountable electronic exercise machine 200 via communications channel 226. For example, a user may use mobile communications device 224 to adjust a resistance and/or receive an indication of resistance applied by resistance motor 140 onto cable 206, change a mode of operation wall-mountable electronic exercise machine 200, receive updates and/or a report associated with an exercise routine performed using wall-mountable electronic exercise machine 200, as described in greater detail herein.

In some embodiments, an electronic exercise machine and/or a paired mobile communications device may communicate with an associated cloud service via a communications network. For example, the cloud service may include a server and a data structure configured to provide data and/or processing services associated with operating an electronic exercise machine, and/or for with performances of one or more exercise routines (e.g., with or without an electronic exercise machine).

FIG. 2B is a side view of exemplary wall-mountable electronic exercise machine 202 of FIG. 2A, consistent with some embodiments of the present disclosure. Rotatable shoulder 214 may allow adjusting an angle of arm 212 relative to vertically wall-mountable beam 202 in four differing orientations, 240A, 240B, 240C, and 240D. Orientation 240A may be substantially parallel to vertically wall-mountable beam 202. Orientation 240B may be substantially at a 45° angle to vertically wall-mountable beam 202. Orientation 240c may be substantially perpendicular to vertically wall-mountable beam 202 (e.g., and substantially parallel to a floor). Orientation 240D may be substantially at a 135° angle to vertically wall-mountable beam 202. While four different orientations are shown, this does not limit this disclosure, and arm 212 may be oriented at greater than four, or less than four orientations.

FIG. 2C is another side view of exemplary wall-mountable electronic exercise 202 machine of FIG. 2A, showing arm 212 selectively positioned at two differing heights, 242 and 244, consistent with some embodiments of the present disclosure. Trolley 210 (see FIG. 2A) may slide along vertically wall-mountable beam 202 to position rotatable shoulder 214 and arm 212 at heights 242 and 244. While only two different heights are shown, this does not limit the disclosure, and arm 212 may be selectively positioned at more than two different heights along vertically wall-mountable beam 202. In some embodiments, arm 212 may be selectively positioned at ten different heights along vertically wall-mountable beam 202 (e.g., spaced 10 cm apart).

Reference is now made to FIG. 2D, which illustrates an exemplary T-bar 204 connected to vertically wall-mountable beam 202, consistent with some disclosed embodiments. T-bar 204 may have a first end 502 configured to connect to an intermediate portion 504 of vertically wall-mountable beam 202 and a second end 506 configured for connection to second stud 105 spaced from first stud 103 in the wall 232 (e.g., both shown indicated by dashed centerline lines). Connecting T-bar 204 thus may thereby resist the torque component of the exercise force, e.g., which may otherwise be exerted on vertically wall-mountable beam 202 and which would otherwise tend to pull vertically wall-mountable beam 202 out of wall 232. T-bar 204 may be oriented horizontally, perpendicular to vertically wall-mountable beam 202 such T-bar 204 connected to vertically wall-mountable beam 202 at intermediate portion 504 may form a "T" shape rotated by 90°. In some embodiments, T-bar 204 may be connectable to vertically wall-mountable beam 202 at a mid-location on vertically wall-mountable beam 202 (e.g., between upper bracket 236 and lower bracket 230).

In some embodiments, T-bar 204 may be configured as a shelf In some embodiments, a shelf may attach to T-bar 204, the shelf may be shorter that T-bar 204. For instance, the shelf may be configured to hold a mobile communications device 224 such as a cell phone in an upright position, a bottle of water, a towel, and the like. In some embodiments, the shelf may include a phone charger integrated therewith, allowing mobile communications device 224 to be charged during an exercise session. The shelf may include hooks or other connectors thereon to permit accessories (e.g., various handles) to be stored thereon. In some embodiments, vertically wall-mountable beam 202 may include a faceplate 246 thereon (e.g., as an esthetic cover that may be suited to a living space in a home), where a height 524 of an edge 512 of the shelf may be narrower than a width 514 of the faceplate 246 of wall-mountable beam 202. For instance, these dimensions may give T-shaped wall-mounted gym 200 a sleek and esthetic appearance for a home gym.

Reference is made to FIG. 2E illustrating an exemplary configuration for two paired T-shaped wall-mounted gyms 200A and 200B, consistent with some disclosed embodiments. T-shaped wall-mounted gyms 200A and 200B may correspond to T-shaped wall-mounted gym 200 of FIG. 2D. FIG. 2E illustrates three wall studs 103, 105, and 107, indicated as dashed lines. In some embodiments, T-bar 204 may be configured to extend between and connect to an additional vertically wall-mountable beam 202B mounted on a third stud 107 adjacent to second stud 105 and on a side of the second stud 105 opposite the first stud 103. In some embodiments, vertically wall-mountable beam 202A, the additional vertically wall-mountable beam 202B, and the T-bar 204 cooperate for form an H-configuration, with the T-bar 204 configured to resist torquing of both the vertically wall-mountable beam 202A and the additional vertically wall-mountable beam 202B.

FIG. 2E shows devices 200A and 200B each comprised of a vertical beam and joined by a single T-bar in an H-configuration (i.e., the T-bar of a single device becomes an H-bar when two devices share the T-bar).

Figure 2F:
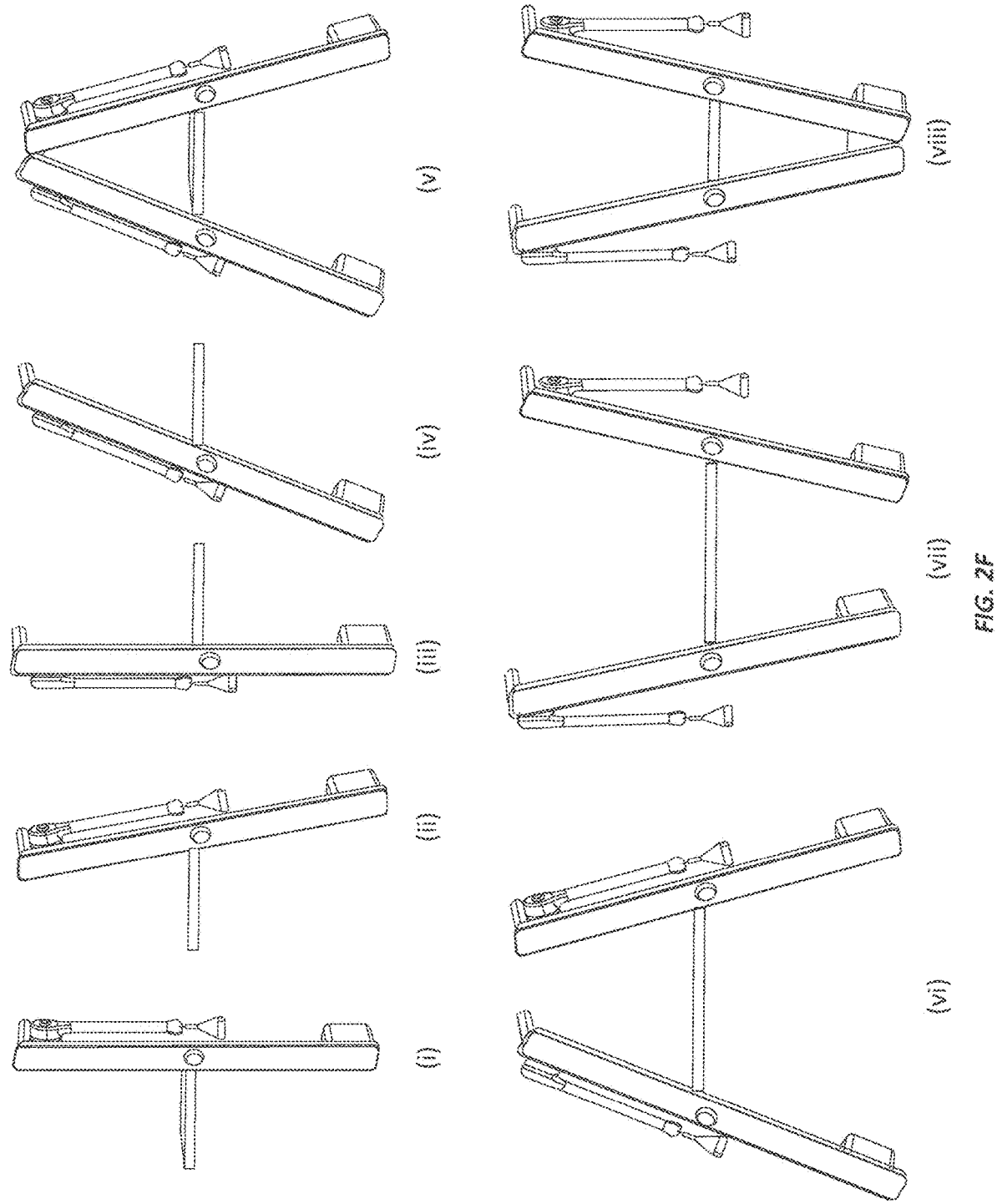
FIG. 2F(i)-(viii) illustrate various mounting positions of exemplary wall-mountable electronic exercise machines consistent with some disclosed embodiments.
Figure 2G:
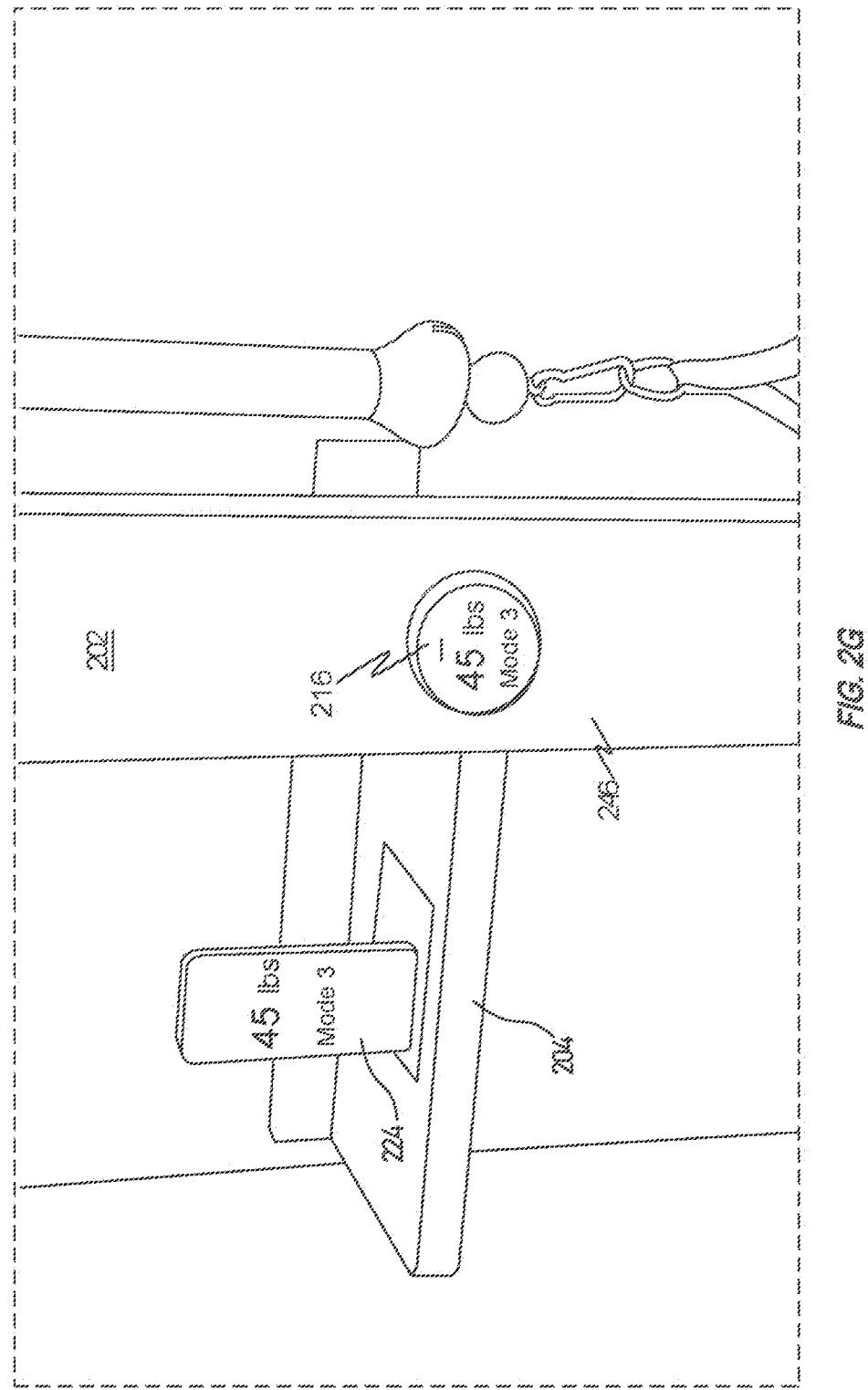
FIG. 2G is a perspective view of a portion of an exemplary wall-mountable electronic exercise machine in use with a paired cell phone, consistent with some embodiments of the present disclosure.

Reference is made to FIG. 2G illustrating an exemplary dial 216 for T-shaped wall-mounted gym 200, consistent with some disclosed embodiments. In some embodiments, T-shaped wall-mounted gym 200 may include a dial 216 mounted on faceplate 246 of vertically wall-mountable beam 202. Dial 216 may be aligned with a connection location of T-bar 204. In some embodiments, dial 216 may function as a user interface for T-shaped wall-mounted gym 200, for controlling the resistance, selecting modes of operation, and/or control an operation of vertically wall-mountable beam 202.

Figure 3:
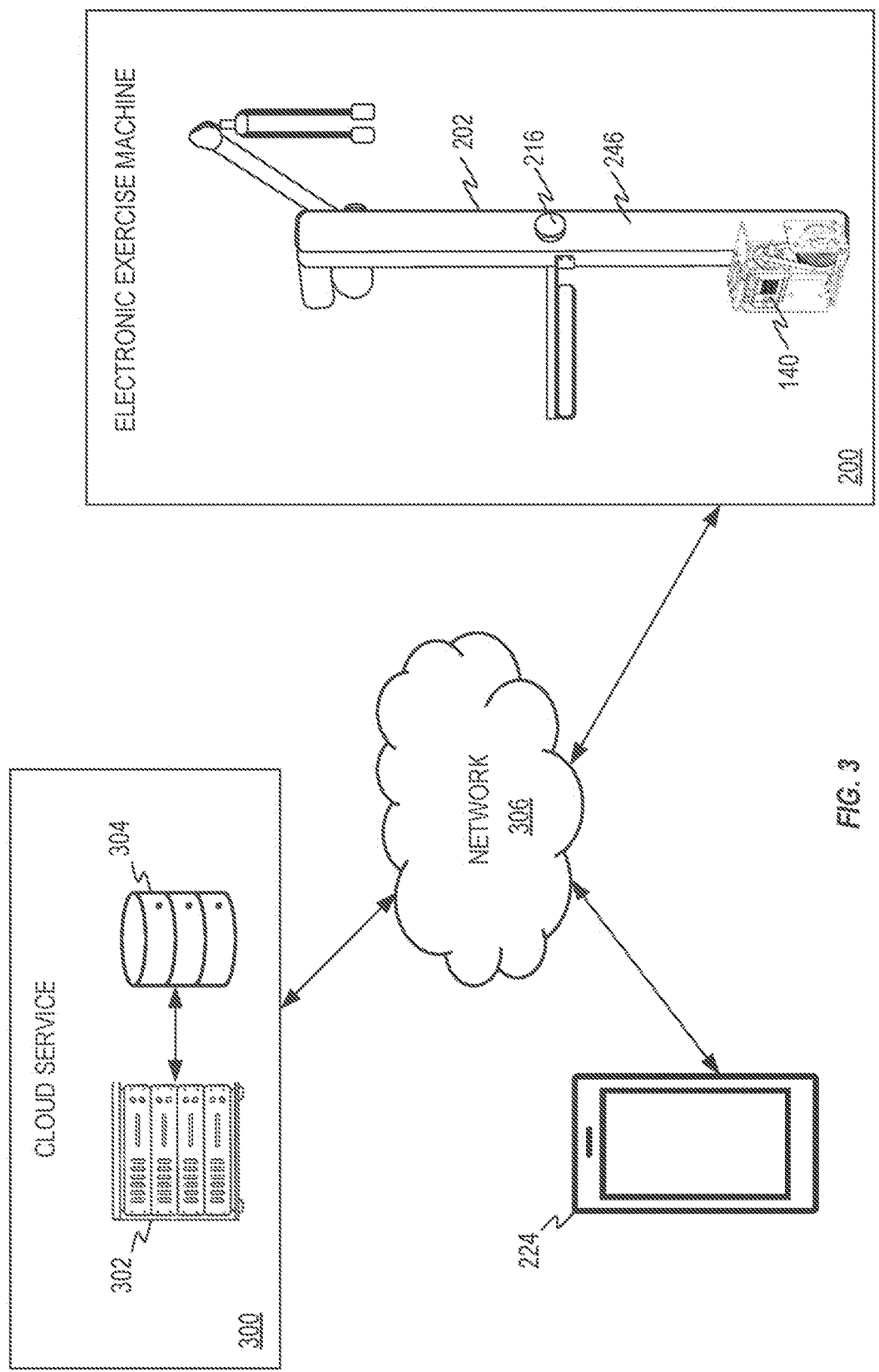
FIG. 3 is a schematic network diagram, consistent with some embodiments of the present disclosure.

FIG. 3 is a schematic illustration of a cloud service 300 associated with wall-mountable electronic exercise machine 200, consistent with some embodiments of the present disclosure. Cloud service 300 includes at least one server 302 (e.g., including at least one processor), and a data structure 304 connected to a communications network 306. Cloud service 300, wall-mountable electronic exercise machine 200 and mobile communications device 224 may communicate via a communications network 306. In some embodiments, communications network 306 may include a dedicated communications network, such as a Bluetooth communications channel connection mobile communications device 224 with at least one processor 112 of electronic exercise machine 200. In some embodiments, a light sensor (e.g., a camera) associated with mobile communications device 224 may capture images (e.g., of a user performing an exercise routine with or without wall-mountable electronic exercise machine 200). Cloud service 300 may store and analyze the images or videos, for example, to allow a first user of a first instance of wall-mountable electronic exercise machine 200 compete with a second user (e.g., of a second instance of wall-mountable electronic exercise machine 200), to provide feedback and/or instructions to a user performing an exercise routine, and/or provide any other service associated with performances of exercise routines (e.g., with or without wall-mountable electronic exercise machine 200).

Figure 4:
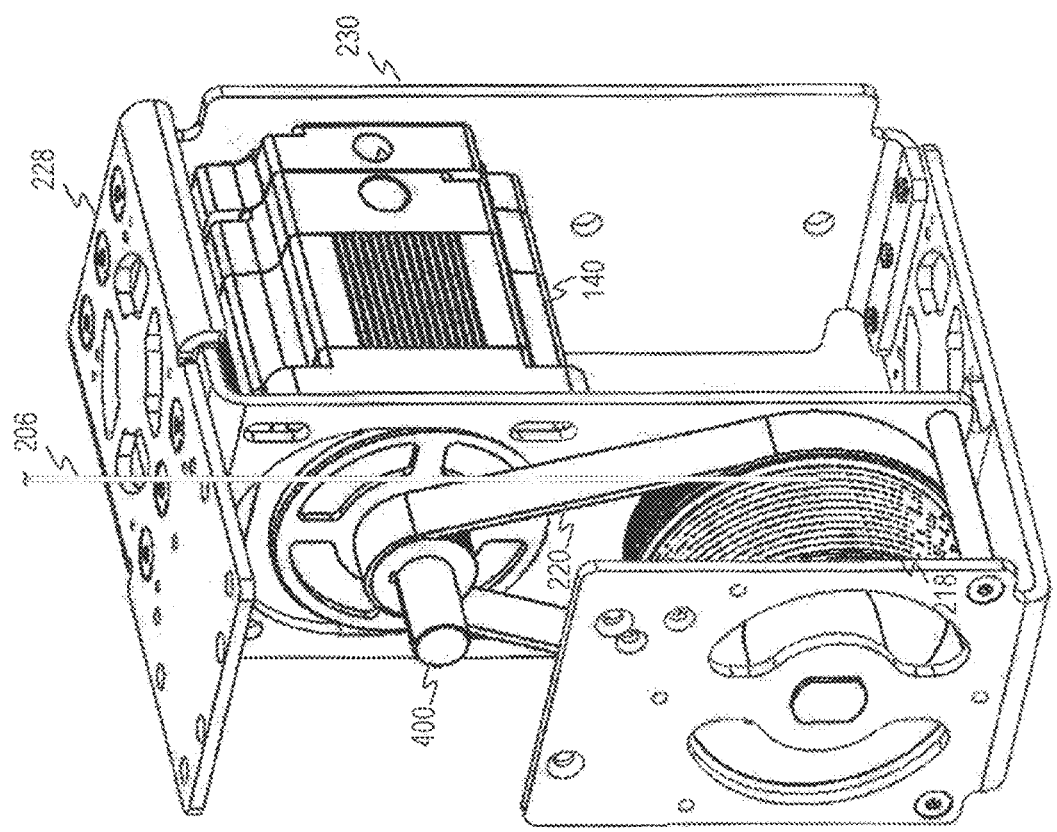
FIG. 4 is a perspective view of an exemplary resistance motor, spool, partial housing and mounting bracket of a wall-mountable electronic exercise machine, consistent with some embodiments of the present disclosure.

FIG. 4 is an illustration of exemplary resistance motor 140 of wall-mountable electronic exercise machine 200, consistent with some embodiments of the present disclosure. Resistance motor 140 may be housed in housing 228 connected to wall-mountable electronic exercise machine 200.

In some embodiments, housing 228 may be located at a base of wall-mountable electronic exercise machine 200. Housing 228 may include a bracket 230 (e.g., a lower bracket) for connect housing 228 to wall 232, thereby connecting a first (e.g., lower) end of wall-mountable electronic exercise machine 200 to wall 232. For example, bracket 230 may connect to wall 232 using one or more screws, bolts, anchors, washers, clips, and/or hooks.

Resistance motor 140 may include wiring connected to a power source (not shown) for carrying an electrical current, one or more permanent magnets (also not shown), and an axle 212. In response to a current flowing through the wiring of resistance motor 140, the one or more permanent magnets of resistance motor 140 may produce a magnetic resistance (e.g., impedance) resisting a rotation of axle 212. A magnetic resistance imposed on axle 212 by resistance motor 140 may have characteristics corresponding to characteristics of a current flowing through the wiring of resistance motor 140. Such characteristics may include, for example, an amplitude, a frequency, a phase, a timing (e.g., on/off), a direction, and/or any other characteristic of an electrical and/or an electromagnetic signal. At least one processor 112 (e.g., see FIG. 1) may control characteristics of a current or voltage flowing through the wiring to thereby control characteristics of the magnetic resistance produced by resistance motor 140 and resisting a rotation of axle 212.

In FIG. 4, belt 220 may wrap around axle 212 and spool 218 to thereby connect spool 218 to axle 212 of resistance motor 140. A first end of cable 206 may be fastened to spool 218, and a first length of cable 206 may be wound around spool 218. A second length of cable 206 may run through wall-mountable electronic exercise machine 200, through pulley system 208, and exit from a distal end of arm 212. A second end 234 of cable 206 may exit from arm 212 and may be connected to exercise accessory 222, such that manipulating exercise accessory 222 may pull on cable 206, and impose a rotational force (e.g., a torque) on spool 218 and axle 212 via belt 220. The torque imposed on spool 218 by manipulating exercise accessory 222 may be at least partially resisted by axle 212 due to the magnetic resistance produced by resistance motor 140.

Figure 5B:
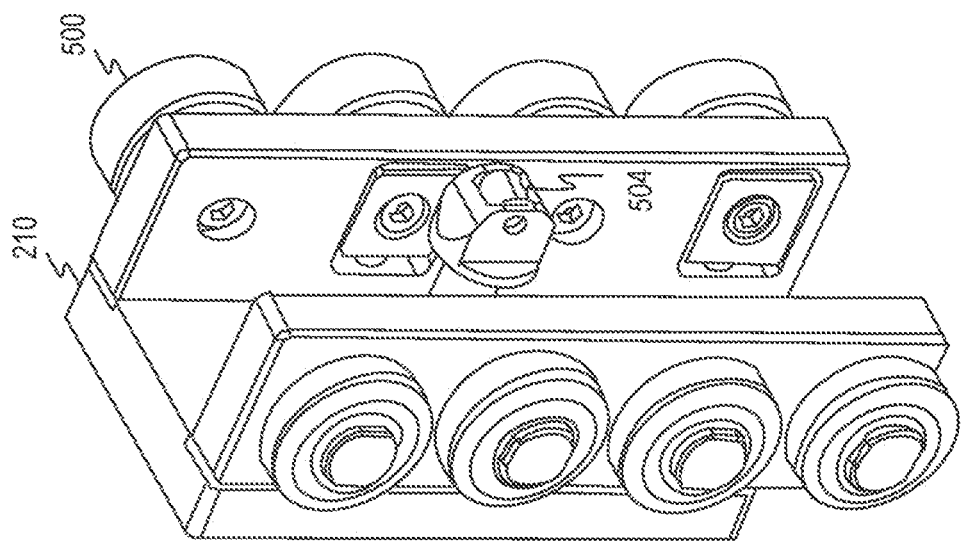
FIG. 5B is another perspective view of an exemplary trolley configured to ride along a vertically wall-mountable beam, consistent with some embodiments of the present disclosure.
Figure 5A:
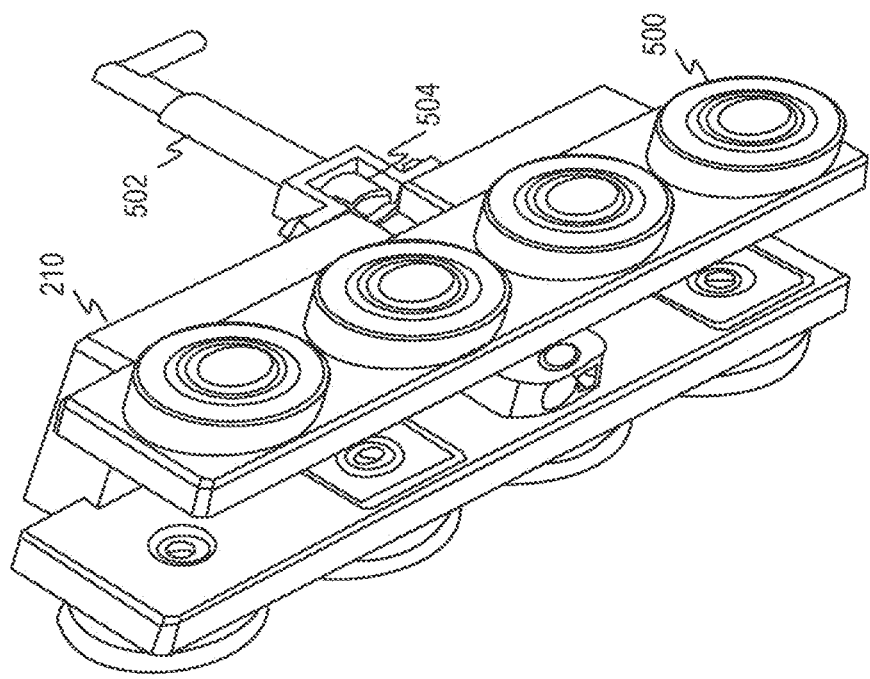
FIG. 5A is perspective view of an exemplary trolley configured to ride along a vertically wall-mountable beam, consistent with some embodiments of the present disclosure.

FIGS. 5A-5B illustrate an exemplary trolley 210 configured to ride along vertically wall-mountable beam 202, consistent with some embodiments of the present disclosure. Trolley 210 may include a plurality of pairs of wheels 500. In the example shown, trolley 210 includes four pairs of wheels 500, however this is not intended to be limiting, and some embodiments may include fewer pairs of wheels 500, or additional pairs of wheels 500. Wheels 500 may be made from at least partially flexible material (e.g., plastic and/or rubber) having sufficient elasticity to allow trolley 210 to roll along a pair of tracks in a manner to at least partially smooth away bumps, distortions, warps, and/or any other irregularities. A cross-sectional shape of at least some of wheels 500 may be substantially round, oval, rectangular, square, beveled, hexagonal, octagonal, and/or have any other shape suitable for rolling along a pair of tracks. In some embodiments, each wheel of pairs of wheels 500 may be substantially similar in shape. In some embodiments, a first wheel of each pair of wheels 500 may have a first shape (e.g., a substantially rectangular cross-section) and a second wheel of each pair of wheels 500 may have a second shape (e.g., a beveled cross-section). Pairs of wheels 500 may be associated with a pair of tracks of wall-mountable beam 202, as described in greater detail herein, allowing trolley 210 to ride along vertically wall-mountable beam 202 by rolling along the pair of tracks.

Trolley 210 may include a lock 502 having an adjustable pin 504. Pin 504 may be configured for engaging with any of a plurality of holes distributed along the length of vertically wall-mountable beam 202 with a spring mechanism, such that engaging pin 504 with a specific hole of vertically wall-mountable beam 202 may allow locking a location of trolley 210 at an associated height along the length of vertically wall-mountable beam 202. Lock 502 may be associated with a button or knob of a shoulder connected to an arm of wall-mountable electronic exercise machine 200, as described in greater detail herein, allowing to lock and unlock a location of trolley 210 along vertically wall-mountable beam 202 by manipulating the button. In some embodiments, trolley 210 may be associated with one or more safety position sensors, as described elsewhere herein.

Figure 6C:
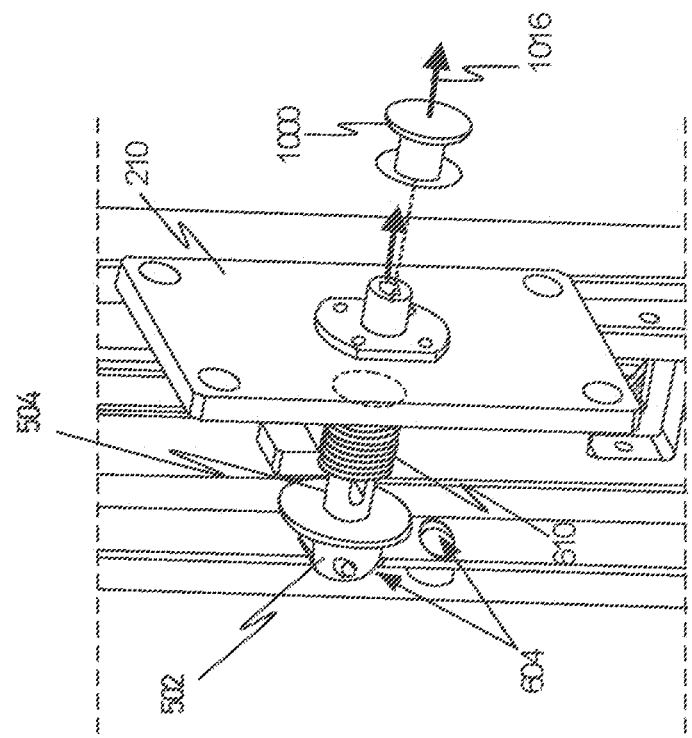
FIG. 6C illustrates an exemplary trolley selectively engaging with an opening along a vertically wall-mountable beam, consistent with some embodiments of the present disclosure.
Figure 6B:
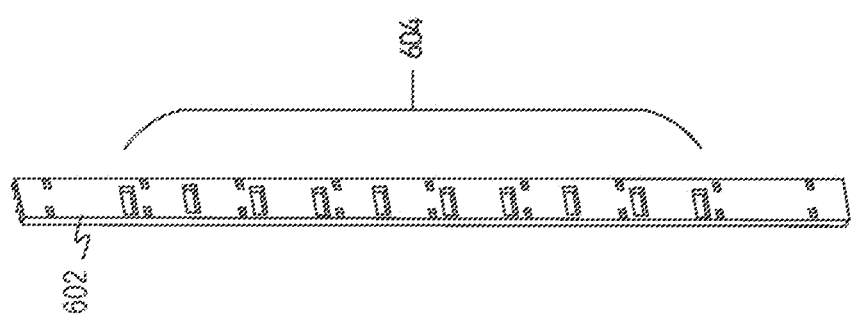
FIG. 6B illustrates a portion of an exemplary vertically wall-mountable beam including multiple openings for engaging with a lock of a trolley, consistent with some embodiments of the present disclosure.
Figure 6A:
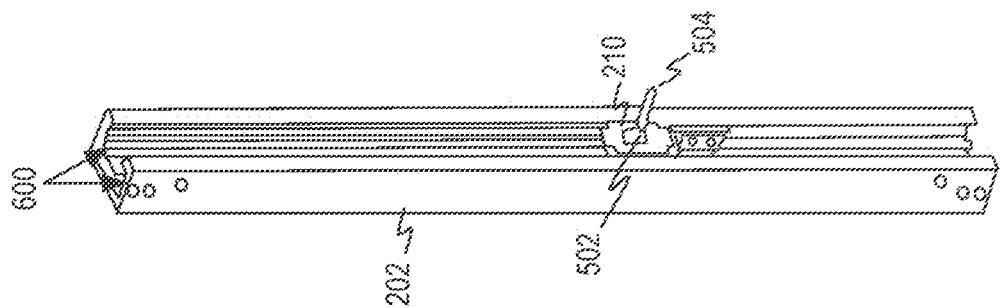
FIG. 6A is a perspective view of an exemplary vertically wall-mountable beam including a trolley riding on a pair of tracks, consistent with some embodiments of the present disclosure.

FIG. 6A illustrates an exemplary vertically wall-mountable beam 202 including trolley 210 riding on a pair of tracks 228, consistent with some embodiments of the present disclosure. Plurality of pairs of wheels 500 (not shown) of trolley 210 may be associated with pair of tracks 228, such that rolling plurality of pairs of wheels 500 along pair of tracks 228 (e.g., when pin 504 of lock 502 is disengaged from any holes of vertically wall-mountable beam 202) may allow moving trolley 210 to adjust a height of trolley along the length of vertically wall-mountable beam 202. Tracks 228 may have a cross-sectional shape corresponding to cross-sectional shapes of plurality of pairs of wheels 500 of trolley 210. In some embodiments, pair of tracks 228 may face wall 232 when vertically wall-mountable beam 202 is mounted on wall 232, allowing a smooth face of vertically wall-mountable beam 202 (e.g., opposite pair of tracks 228) to face away from wall 232. In some embodiments, the face of vertically wall-mountable beam 202 opposite pair of tracks 228 may be covered by a coating or plate.

FIG. 6B illustrates a portion 140 of exemplary vertically wall-mountable beam 202 of FIG. 2A, including multiple openings 604 for engaging with a lock of trolley 210, consistent with some embodiments of the present disclosure. Pin 504 of lock 502 of trolley 210 may selectively engage with any one of openings 604 to set a height of arm 212 along the length of vertically wall-mountable beam 202.

FIG. 6C illustrates exemplary trolley 210 selectively engaging with one of openings 604 along a vertically wall-mountable beam 202, consistent with some embodiments of the present disclosure. Pin 502 of lock 504 may engage with a selected opening 604 along vertically wall-mountable beam 202 to position trolley 210 at a selected height, thereby positioning arm 212 (not shown) at a selected height along vertically wall-mountable beam 202. FIG. 6D illustrates a series of tapered openings configured to receive a tapered protrusion, consistent with some disclosed embodiments.

FIG. 7A illustrates a cross-section of exemplary vertically wall-mountable beam 700 with a trolley 702 riding along pair of tracks 704, consistent with some embodiments of the present disclosure. Tracks 704 may also be referred to as rails. In the embodiment shown, a pair of tracks 704 may have a rounded or cylindrical profile (e.g., a pair of tubular rails). Vertically wall-mountable beam 700 may be made of a single extrusion (e.g., aluminum extrusion) however this is not required. Trolley 702 may include a pair of sliders 706, each fitted with one or more bushings or sleeve bearings 708. Sleeve bearings 708 may have a hollowed-out tubular shape (e.g., sleeves) configured to fit and partially enclose a portion of pair of tracks 704, allowing trolley 702 to ride along pair of tracks 704 in a sliding motion (e.g., as a sled).

Trolley 702 may include a lock 710 having a protrusion 712 configured to selectively engage with one opening 714 of a plurality of openings (not shown) spaced along vertically wall-mountable beam 700 to lock trolley 702 at a selected vertical position.

Figure 7B:
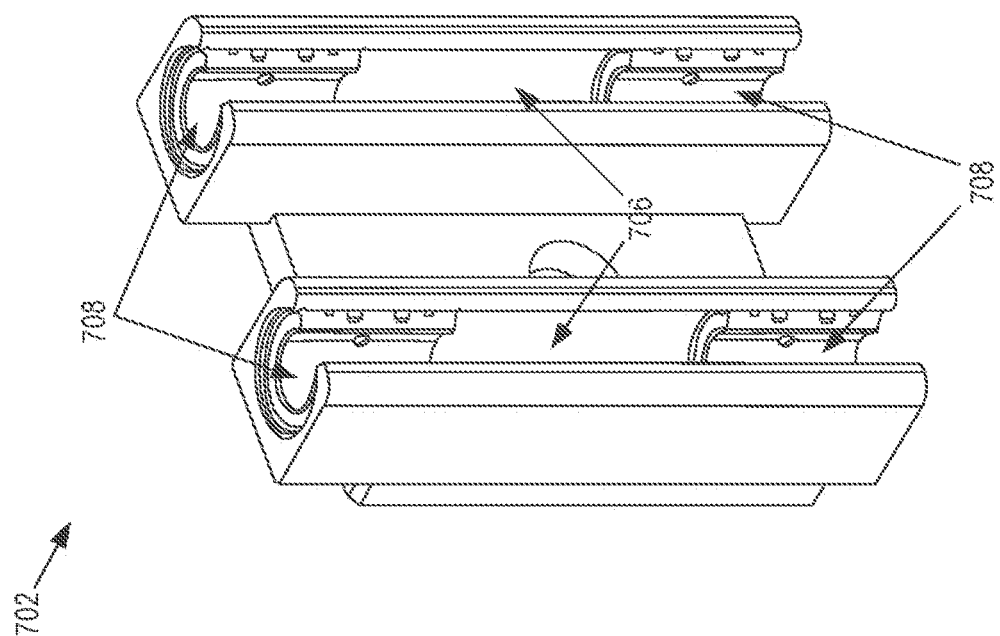
FIG. 7B is a perspective view of the trolley illustrated in FIG. 7A, consistent with some embodiments of the present disclosure.

FIG. 7B illustrates a perspective view of trolley 702 illustrated in FIG. 7A, consistent with some embodiments of the present disclosure. Trolley 702 may include pair of sliders 706 (e.g., shaped as hollowed sleeves). Each of sliders 706 may be fitted with two sleeve bearings 708 configured to fit over pair of tracks 704 (e.g., see FIG. 7A), allowing trolley 702 to ride along the length of vertically wall-mountable beam 700. In some embodiments, each of sliders 706 may be fitted with a single sleeve bearing 708, or more than two sleeve bearings 708. Sleeve bearings 708 may fit over pair of tracks 704, permitting trolley 702 to slide along a length of vertically wall-mountable beam 700 and selectively engage with differing openings distributed along vertically wall-mountable beam 700 (e.g., via protrusion 712 of lock 710).

Figure 8:
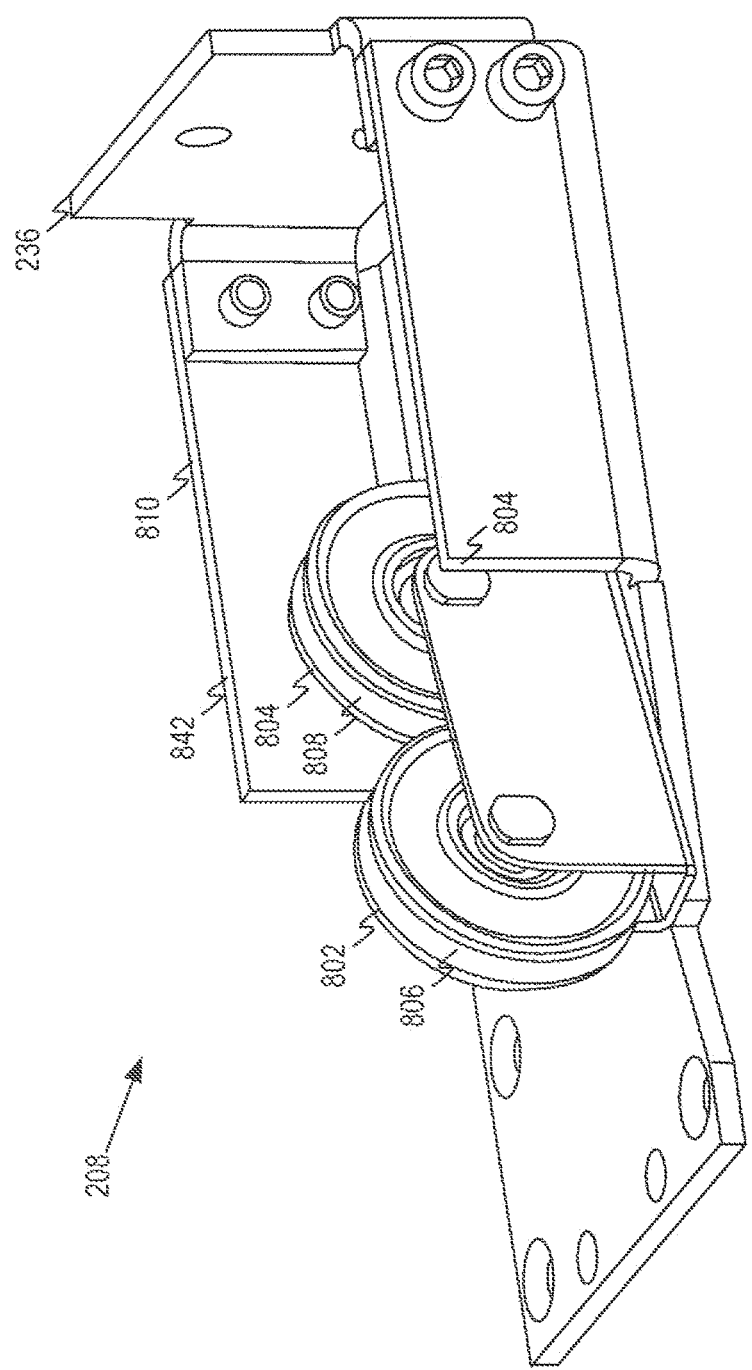
FIG. 8 is a perspective view of an exemplary pulley arrangement with wall bracket for an electronic wall-mountable exercise machine, consistent with some embodiments of the present disclosure.

FIG. 8 illustrates an exemplary pulley system 208 for electronic wall-mountable exercise machine 200, consistent with some embodiments of the present disclosure. Pulley arrangement 208 may include a pair of sheaves 802 and 804 (e.g., rotatable disks or wheels), each having grooves 806 and 808 on a rim thereof, respectively. Grooves 806 and 808 may have a width to allow accommodating cable 206 (e.g., see FIG. 2A) therein, such that rotating sheaves 802 and 804 may allow cable 206 to slip through pulley system 208 (e.g., to extend a section of cable 206 away from spool 218 or to retract a section of cable 206 back to spool 218). Pulley system 208 may be associated with a housing 810 located in an upper section of electronic wall-mountable exercise machine 200, allowing cable 206 to extend to substantially the full height of electronic wall-mountable exercise machine 200, e.g., beginning from spool 218 located at a base of vertically wall-mountable beam 202, to housing 810 at an upper section of vertically wall-mountable beam 202. Housing 810 may include upper bracket 236 for attaching to wall 232 (e.g., via one or more screws, bolts, anchors, washers, clips, and/or hooks). Pulley system 208 may cause cable 206 to change direction and extend down from pulley system 208 to trolley 210, which may be locked at a specific height of vertically wall-mountable beam 202, thereby locking arm 212 at a specific height of electronic wall-mountable exercise machine 200. Cable 206 may extend, through trolley 210 to arm 212, and may exit from a distal end of arm 212, where end 234 of cable 206 may connect to exercise accessory 222. Pulling on exercise accessory 222 may unwind a first section of cable 206 from spool 218, causing a second section of cable 206 to slip through pulley system 208 and lengthen end 234 of cable 206 by a third section. Resistance motor 140 may at least partially resist a pulling force exerted on accessory 222. Releasing exercise accessory 222 may cause end 234 of cable 206 to retreat towards the distal end arm 212, causing a first section of cable 206 to slip through pulley system 208, and causing a second section of cable 206 to wind around spool 218. This process may be repeated for any number of repetitions as part of an exercise routine. Resistance motor 140 may avoid resisting cable 206 from winding around spool 218.

Figure 11:
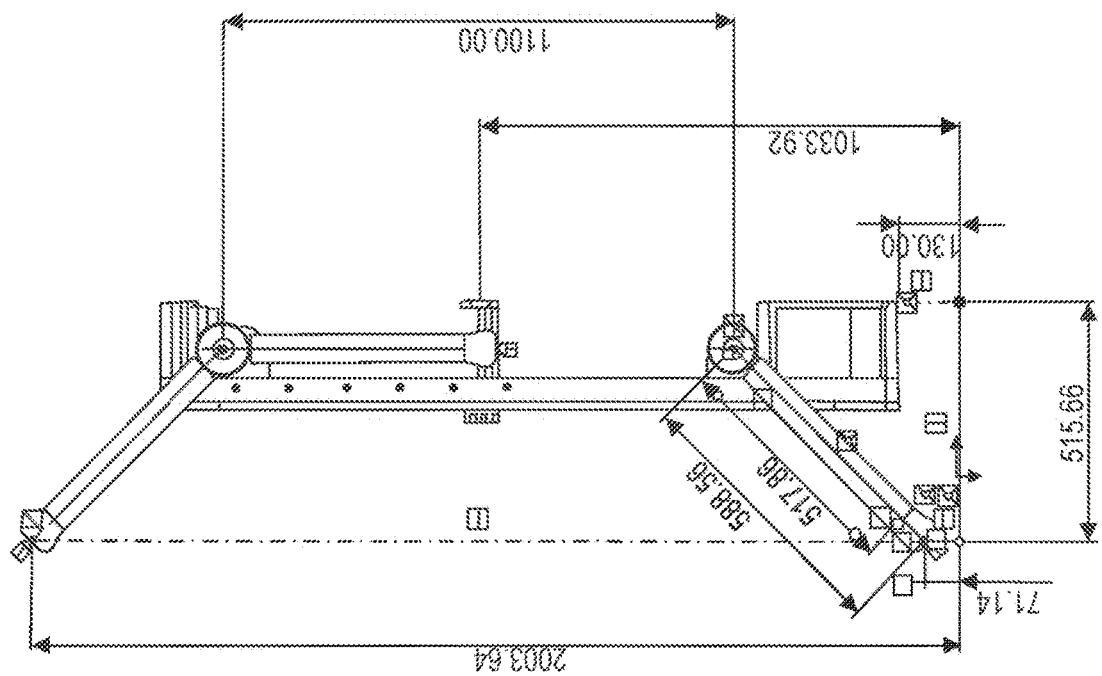
FIG. 11 illustrates exemplary dimensions for a wall-mountable gym, consistent with some disclosed embodiments of the present disclosure.

FIG. 11 illustrates exemplary dimensions in millimeters for a wall-mountable gym, consistent with some disclosed embodiments of the present disclosure. The wall-mountable gym of FIG. 11 may be spaced from the wall to allow the arm to be relatively short, to improve stability of the wall-mountable gym. For example, when in a lowered position, a distance between the floor and an arm of the wall-mountable gym may be about 70 mm. This relatively short distance may allow for a variety of exercises. This configuration illustrates a gap between the wall and the wall-mountable beam along the length of the beam.

Figure 12:
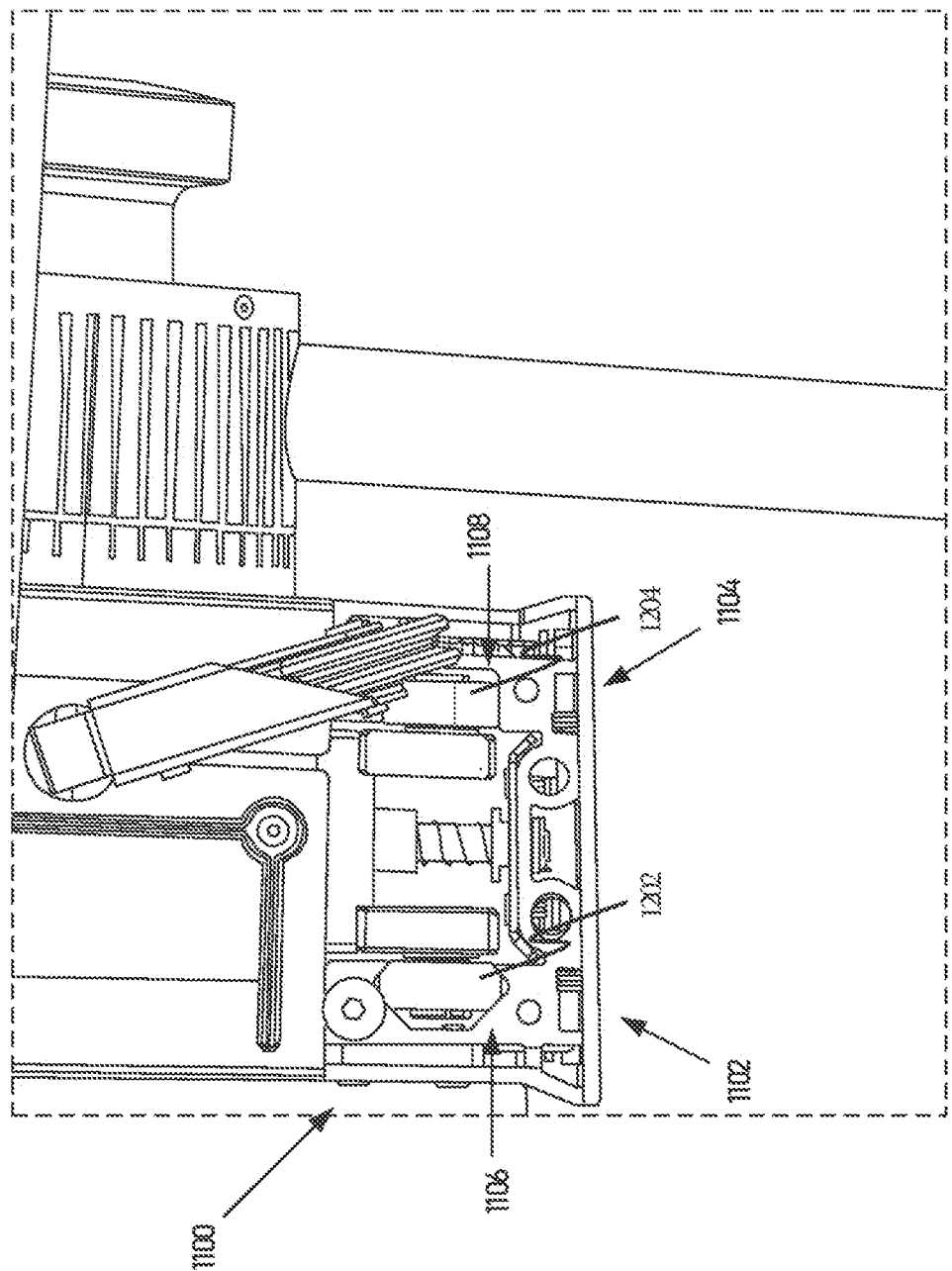
FIG. 12 illustrates an exemplary trolley chassis for an exercise machine, consistent with some disclosed embodiments of the present disclosure.

FIG. 12 illustrates an exemplary trolley chassis for an exercise machine, consistent with some disclosed embodiments of the present disclosure. Trolley chassis 2300 may have a first side 1202 and a second side 2304. Trolley chassis 2300 may additionally have a first set of wheels 1202 rotatably mounted on the first side 1202 of trolley chassis 2300, and a second set of wheels 1204 rotatably mounted on second side 2304 of trolley chassis 2300. Trolley chassis 2300 may include a first rail 2306 associated with the first set of wheels 1202, where first rail 2306 and wheels 1202 may be configured to cooperate in a manner permitting wheels 1202 to longitudinally ride on the first rail 2306 while restricting a relative lateral position between wheels 1202 and first rail 2306. Trolley chassis 2300 may include a second rail 2308 associated with wheels 1204. Second rail 2308 and wheels 1204 may be configured to cooperate in a manner permitting wheels 1204 to longitudinally ride on the second rail 2308 without restricting a relative lateral position between wheels 1204 and the second rail 2308. In some embodiments, first rail 2306 may include a pair of tapered lateral walls. Wheels 1202 may be are tapered to correspond to the pair of tapered lateral walls.

In some embodiments, wheels 1204 may have rail engaging surfaces of a first width, where rail 2308 may have a wheel engaging surface of a second width greater than the first width. In other words, the wheels 1204 may be narrower than the engaging surface of rail 2308, such that wheels 1204 of different exercise machines may engage with rail 2308 at differing locations due to manufacturing tolerances.

In some embodiments, wheels 1202 may have a different profile (e.g., a different cross-sectional shape) than wheels 1204. In some embodiments, wheels 1202 and wheels 1204 may share a common profile (e.g., the same cross-sectional shape), and first rail 2306 and second rail 2308 may have differing profiles. In some embodiments, a cross-section of each of wheels 1202 may be octagonal and a cross-section of each of wheels may be rectangular. Alternatively, each of wheels 1202 may have a cross section corresponding to a beveled rectangle. For instance, the beveled shape of wheels 1202 may engaged with the tapered lateral walls of first rail 2306 to maintain wheels 1202 in a same lateral position in first rail 2306, independent of manufacturing tolerances.

The use of a first set of wheels on one side of the trolley whose movement is laterally restricted, and a second set of wheels that rides in an opposite track without lateral restriction may reduce wobble that might otherwise occur as either the result of manufacturing tolerances or as the result of wear.

In some embodiments, at least one axis of one of wheels 1202 may be offset from at least one other axis of another of wheels 1202. Similarly, at least one axis of one of wheels 1204 may be offset from at least one other axis of another of wheels 1204. For instance, the offset may allow differing ones of wheels 1202 to contact opposing surfaces within first rail 2306 and differing ones of wheels 1204 to contact opposing surfaces within first rail 2308.

In some embodiments, first set of wheels 1202 and second set of wheels 1204 each include four wheels, where two wheel axes in each set of wheels 1202 are offset from the axes of two other wheels in the same set of wheels 1202, and wherein two wheel axis in the second set of wheels 1204 are offset from the axes of two other wheel axes in the second set of wheels 1204.

In some embodiments, first rail 2306 and second rail 2308 are integrally formed. For example, first rail 2306 and second rail 2308 may be made of extruded aluminum. Some embodiments may involve a weight bearing arm (e.g., rotatable arm 212) movable with the trolley chassis 2300, such that longitudinal movement of trolley 210 results in longitudinal movement of the weight bearing arm.

Some disclosed embodiments involve a minimalist wall-mountable exercise machine comprising a vertically wall-mountable beam. "Minimalist" may refer to the prioritizing of essential functions and the streamlining of the user experience. Depending on implementation, a minimalist design may refer to an overall simple configuration. Moreover, a minimalist design may refer to compact dimensions, wherein such dimensions may refer to the length, width, height, and weight of a machine. For example, a minimalist design may have narrow width, particularly of the vertical portion of the machine. A wall-mountable exercise machine is a machine that is connectable to a wall for facilitating exercise exertions. In some embodiments, a minimalist wall-mountable exercise machine may allow the user to perform a plurality of exercise movements with a common piece of equipment. A vertically wall-mountable beam includes any elongated structure extending between a floor and a ceiling. While such a beam may extend at 90 degrees or at substantially 90 degrees (e.g., 88 degrees) to the floor, vertically mountable in a broadest sense does not require a right angle. FIG. 2F(i)-(viii) illustrate various examples of vertically mountable beams consistent with this disclosure, some of which extend at pronounced angles other than 90 degrees.

By way of another non-limiting example, each of FIGS. 2A-2C illustrates an exemplary wall-mountable electronic exercise machine, consistent with some embodiments of the present disclosure. As seen in each of FIGS. 2A-2C, such a wall-mountable electronic exercise machine 200 may include a vertically wall-mountable beam 202.

By way of another non-limiting example, FIG. 3 illustrates an exemplary wall-mountable electronic exercise machine, consistent with some embodiments of the present disclosure. FIG. 3, illustrates one example of a minimalist wall-mountable electronic exercise machine 200 with a vertically wall-mountable beam 202.

Some disclosed embodiments include a faceplate on the beam. A faceplate refers to a panel or covering extending along an outward facing, front, or visible surface of the beam. A faceplate may be a protective and or esthetic covering. The faceplate may be completely flat or may include textures, curves, chamfers, bevels or any other contour. The faceplate may be made of metal, plastic, glass material, acrylic, wood, ceramic, composite, and/or a combination of one or more of the aforementioned materials. The faceplate may be affixed with adhesive or otherwise connected to the beam through screws, rivets, plugs, or through friction fit.

By way of anon-limiting example, FIG. 2A illustrates an exemplary wall-mountable electronic exercise machine 200 with a faceplate 246 on beam 202.

Consistent with some disclosed embodiments, the vertically wall-mountable beam includes a pair of opposing tracks. A track refers to a rail or other elongated structure that serves as a guide and/or support. A pair of tracks or rails may be provided, meaning that there may be at least two tracks that may share a common structure or may have differing structures. The tracks may be considered opposing if they are opposite each other or next to each other. By way of example, the a pair of opposing tracks may mirror each other or may be asymmetrical. They may be separate structures or may be connected to each other. For example, the tracks may be attached to the beam or may be integrally formed with the beam. From a structural standpoint, the tracks may have ribs, vaulted ribs, ridges, arches, beams, joists, grooves, and/or trusses.

By way of anon-limiting example, FIG. 6A illustrates a vertically wall-mountable beam 202, including a pair of opposing tracks 228. As illustrated, tracks 228 face each other. However, in some embodiments, the tracks can face away from each other, face in opposite directions, or both face forward or rearward.

FIG. 7A illustrates another example where the tracks are tubular rails 704 connected to beam 700.

Consistent with some disclosed embodiments, the vertically wall-mountable beam includes an elongated aluminum extrusion with the pair of opposing tracks formed therein. Aluminum may be used due to favorable strength to weight, and cost characteristics. However, any other suitable material may be used. The aluminum may be extruded so that the tracks are integrally formed with the beam. For example, as illustrated in FIG. 6A the beam 202 may be an aluminum extrusion with integrally formed tracks 228. An extrusion is formed by subjecting the aluminum to high pressure and forcing the material through a die, thereby shaping the material into a continuous length with a consistent cross-section. An extrusion is only one example of a beam-track structure. Other known methods of machining or forming metal may be employed. Regardless of the mechanism of formation, in some embodiments, the beam-track structure may have a U-shaped cross-section as illustrated in FIG. 6A. Other embodiments may have differing shapes. For example, in FIG. 7A, the tracks include multiple parts including a common base structure 714, with each to two tubular rails 704 bolted to the base structure 714. Also, as seen in FIG. 7A, the beam 700 combined with the common base structure 714 may have a U-shaped cross-section. In some embodiments, beam 700 and common base structure 714 may be formed integrally from a single extrusion.

Some disclosed embodiments include a control knob mounted on a faceplate of the vertically wall-mountable beam for electronic regulation of a resistance motor. A control knob refers to a rounded dial or handle that can be turned, rotated and/or pushed to adjust, manipulate, change, and/or regulate settings. The control knob may serve as a user interface for enabling a control over at least one resistance motor, as described elsewhere herein. The control knob is mounted on the faceplate when it is positioned over the faceplate. FIGS. 2A, 2G and 3 illustrate examples of a dial 216 mounted on a faceplate 246.

Some disclosed embodiments involve an upper bracket and a lower bracket for respectively connecting upper and lower portions of the vertically wall-mountable beam to a first stud in a wall. A bracket refers to a structure configured to support, hold, and/or fasten. In this case, the upper bracket may connect to some location on the upper half of the beam and secure it to a wall while a lower bracket may connect another location on the lower half of the beam and secure it to a wall. When the upper and lower brackets are positioned over a wall stud by fastening the brackets to the wall, the brackets connect the beam to the wall stud. The connected upper portion may be any location on the upper half of the beam and the connected lower portion may be any location on the lower half of the beam, so long as the brackets accomplish the function of helping to secure the beam in place on the wall throughout the application of normal exercise forces. In some embodiments, the upper bracket may be configured for connection to the top of the beam or a position near the top of the beam and the lower bracket may be configured for connection to a bottom of the beam or a position near the bottom of the beam.

A resistive exercise machine as disclosed herein may have at least three attachment points to a wall at three locations of the machine: a first attachment point at an upper bracket, a second attachment point at a lower bracket, and one or more third attachment points connecting the T-bar to the studs or wall. In some embodiments, at least two attachment points are vertically aligned along a beam of the exercise equipment, while at least one additional attachment point is spaced laterally therefrom. By spacing at least one attachment point from other points that are vertically aligned, the resistive exercise machine may brace itself against a wall to resist torque or other lateral forces on the exercise equipment. In some embodiments, the resistive exercise machine may have three attachment points along the beam that are vertically aligned. Two attachment points are directly to the wall or studs, and at least one of the attachment points may be between the beam and a T-bar such as T-bar 204, rather than a third attachment point directly to the wall. The T-bar may be attached to the wall or to a second stud at a distance from the vertically aligned attachment points. Some embodiments may involve at least four attachment points, with two on the beam and two on the T-bar.

A stud refers to a vertical frame member or component used to create the framework for walls, partitions, and/or other structural elements within a building. Studs are installed vertically from floor to ceiling, spaced apart at regular intervals, and secured to horizontal plates at the top and bottom of the wall. In some constructions, studs such as wooden boards or metal channels are positioned 16 inches apart from each other, on center.

FIG. 2A illustrates one example of an upper bracket 236 and a lower bracket 230 for respectively connecting upper and lower portions of the vertically wall-mountable beam 202 to a first stud in the wall 232. In the example of FIG. 4, the lower bracket 230 also supports other components, such as the motor 140. As illustrated in FIG. 2D, centerline 103 of the first stud lies beneath the upper bracket 236 (as well as the lower bracket 230, not shown).

Consistent with some disclosed embodiments, a motor housing is associated with the lower bracket, and a motor is contained within the motor housing. A motor and a motor housing may be understood as described elsewhere herein. The motor housing may be associated with the lower bracket in that they may be connected to one another. For example, the lower bracket may connect to a wall and a housing may connect to the lower bracket, or the lower bracket may form a portion of the housing. In Some embodiments, the lower housing and the lower bracket may be integrally formed.

By way of anon-limiting example, FIG. 4 illustrates lower bracket 230. The lower bracket in this example is fastened with upper and lower screws or rivets to a portion of motor housing 228 which itself supports motor 140. the motor housing 228.

Consistent with some disclosed embodiments, the upper bracket and the lower bracket are configured to retain the vertically wall-mountable beam a predetermined distance from the wall. The brackets may retain the beam a distance from the wall by maintaining the prescribed distance by virtue of their dimensions. As illustrated in FIG. 2A, for example, vertical beam 202 is spaced from the wall 232 by a gap defined by a dimension of upper bracket 236 and lower bracket 230 (see also FIG. 4). The offset distance of each bracket from the wall determines a size of the predetermined distance the beam is maintained from the wall.

Some disclosed embodiments include a trolley for riding the vertically wall-mountable beam and being configured to lock at differing positions along the vertically wall-mountable beam. A trolley, as previously described, may be said to ride the vertically wall-mountable beam if it configured to move along the beam. For example, the trolley may include wheels, slides, guides, bushings, bearings, motion bearings, linear bearings, linear motion bearings, linear guide bearings, and/or any other mechanism or component that allows for movement of the trolley along the beam Wheels, for example, may be mounted on an axle or shaft, thereby allowing for rotational support and allowing for the wheel(s) to spin freely. Moreover, the wheel(s) may incorporate the use of bearing(s) and/or bushing(s) to reduce friction, enable smooth rotation, and/or provide support.

The trolley may be configured to lock if it may be fastened in place along the beam. Locking may be achieved through a locking mechanism, which, by way of non-limiting example may include a clamp, fastener, pin, hook, bolt, or any other structure that prevents substantial movement of the trolley along the beam during an exertion.

The trolley may enable the locking to occur in differing positions, meaning that the position of the trolley's fixed position may be adjustable. Some exercises may require the trolley to be higher or lower on the beam. The height of a user might also impact a desired height of the trolley. In any instance, a lock may be disengaged, the trolley moved, and the lock reengaged with the trolley in a new position. Differing positions for the trolley may be predefined, such as through a structure that has predefined locations, points, or positions where locking can occur. In other embodiments, the trolley may be able to lock at any position along the track.

By way of anon-limiting example, FIG. 5A and FIG. 5B illustrate examples of a trolley 210 having wheels 500 configured to ride the vertically wall-mountable beam 202, a lock 502 and an engaging pin 504 are illustrated as an example of a mechanism for locking the trolley in place. Such a lock 502 and an engaging pin 504 may allow the trolley 210 to be configured to lock at differing positions along the vertically wall-mountable beam 202.

Consistent with some disclosed embodiments, the trolley includes opposing wheels configured to ride on a pair of opposing tracks. The wheels may incorporate the use of bearing(s) and/or bushing(s) to reduce friction, enable smooth rotation, and/or provide support. Furthermore, the wheels may aid in the movement the trolley along the one or more tracks of the beam 202. The trolley wheels may oppose one another by engaging surfaces that are opposite to one another, such as opposite sides of a track or rail.

As described earlier in connection with FIGS. 6A-6C, trolley 210 is positioned on wall-mountable beam 202 and configured to lock at differing positions along the vertically wall-mountable beam 202 via lock 502 and an engaging pin 504.

In the alternative example of FIGS. 7A-7B where the trolley rides on tubular rails and lacks wheels, the trolley 702 slides along a pair of cylindrical tubular rails (tracks) 704 as described earlier, and may lock in place as described earlier.

Some disclosed embodiments involve a selectively positionable arm extending from the trolley, the arm configured to receive an exercise force applied thereto, the exercise force including a torque component on the vertically wall-mountable beam. An arm, as described previously, may be selectively positionable if a user is able to choose and set or otherwise vary the arm's position. Once the position is selected the arm may be able to receive an exercise force applied thereto. The exercise force may be applied through a user pulling on a cable extending through the arm, as described earlier.

By way of non-limiting example, FIG. 2B illustrates four exemplary arm positions, 240A-D. The user may be able to select these or other positions by rotating a shoulder 214 connected to the arm as described earlier. FIG. 2C demonstrates that the arm 212 and shoulder 214 can be moved up and down on the rail, between, for example the lower illustrated position and the upper illustrated position.

The exercise force applied may have a torque component on the vertically wall-mountable beam. A torque component is a portion of the exerted force in a twisting or rotational direction of the beam.

With reference to FIG. 2A, for example, if a user were to position arm 212 at an angle such as 45 degrees to the wall, and exert an exercise force on accessory (handle) 222, a portion or component of the force exerted during the exercise would exert a rotational or twisting force on the beam 202. Because the forces exerted during exercise can be quite significant, in an absence of some of the features described herein, the lower bracket 230 and upper bracket 236 might ultimately be ripped from the wall or otherwise twist relative to the wall.

Consistent with some disclosed embodiments, the selectively positionable arm is configured to rotate and to move vertically relative to the beam. The selectively positionable arm may spin, turn, or revolve about an axis. The axis of rotation may be located where the arm attaches to the exercise equipment. Furthermore, the arm may move upward and downward along an axis aligned with a track attached to the beam of the exercise machine. The axis may be a vertical axis, or may have a vertical component, such that the arm moves vertically relative to the beam. Vertically may also refer to movements, positions, and/or arrangements that occur in a top-to-bottom manner along a vertical axis.

Some disclosed embodiments include a T-bar having a first end configured to connect to an intermediate portion of the vertically wall-mountable beam and a second end configured for connection to a second stud spaced from the first stud in the wall to thereby resist the torque component of the exercise force. "T-bar" refers to a structure that extends from the vertically wall-mountable beam and together form a shape that resembles the letter "T". In other words, the bar itself need not be T-shaped, but rather forms a T-shape when viewed in conjunction with the vertically wall-mountable beam. Moreover, the T-bar may have any cross-sectional shape whether uniform or non-uniform so long as it serves the function of connecting to both the vertically wall-mountable beam and another wall stud. For example, the T-bar may have a cross-section that is round, oval, rectangular, or any other shape. The T-bar may be configured as a shelf, as described elsewhere herein.

FIGS. 2F (i)-(iv) illustrate arrangements where a horizontal T-bar forms a single T-shaped configuration. FIGS. 2E and 2F (vi)-(viii) illustrate arrangements where the horizontal bar forms two T's—one with each vertically wall-mountable beam. A T-bar may be a structural component or support in an overall system. A first end of the T-bar may be configured to connect to an intermediate portion of the vertically wall-mountable beam, meaning that at a location between the top and bottom of the vertically wall-mountable beam, a portion of the T-bar is mechanically engaged with the vertically wall-mountable beam. The connection location may be at any location on the vertically wall-mountable beam. In some embodiments, the location may be a midpoint or near midpoint of the vertically wall-mountable beam, or at a location convenient for the T-bar to act as a shelf. For purposes of this disclosure, any location on the T-bar that engages with the vertically wall-mountable beam is considered the first end, regardless of whether the T-bar extends beyond both sides of the vertically wall-mountable beam. Moreover, while the T-bar itself may be mechanically connected to the vertically wall-mountable beam, for purposes of this disclosure, a connection exists if it occurs indirectly through, for example, a bracket or other structure. The T-bar is configured to connect if it includes any structure or is adapted to be used with any structure that enables a mechanical connection with the vertically wall-mountable beam. Bolt holes in the T-bar for connection to the vertically wall-mountable beam is one example of the T-bar being configured for connection, as is a tongue/groove arrangement, a slot/tab arrangement, a bracket arrangement, or any other structural detail than enables connection. The second end of the T-bar refers to a portion of the T-bar that overlies or is adjacent to a second stud, spaced from the first stud to which the vertically wall-mountable beam is secured. As with the first end, the second end need not be the precise terminal portion of the T-bar. Rather it is the location on the T-bar used for connection to the second stud. Such an arrangement resists the torque component of the exercise force.

As described earlier, as the torque component of forces exerted during exercise exerts a rotational force on the vertically wall-mountable beam. The addition of the T-bar connected to both the vertically wall-mountable beam and to the next stud in the wall (or another stud in the wall) serves to resist the torque force. For in the absence of a connection to the second stud, all the torque force would be applied to the first stud. The T-bar connection to the second stud makes the vertically wall-mountable beam more secure by distributing the torque forces to a second stud, significantly reducing the chances of a torque component dislodging the vertically wall-mountable beam from the wall.

FIGS. 9A-9D illustrate views of an example of a T-bar 204 having a first end 902 configured to connect to an intermediate portion 904 of the vertically wall-mountable beam 202. T-bar 204 may also have a second end 906 configured for connection to a second stud (centerline 105) spaced from the first stud (centerline 103). Optionally, the T-bar may also connect to the first stud near the edge of T-bar 204. The second end 906 connection of T-bar 204 with the second stud that is spaced from the first stud allows for the resistance of the torque component of the exercise force.

In some disclosed embodiments, the T-bar is further configured for connection to the second stud (centerline 105) to thereby distribute at least some of the torque to the second stud. In such embodiments, connection to the second stud may distribute torque by dispersing and/or spreading a torque force to the second stud.

In some disclosed embodiments, the T-bar is configured for connection to the second stud via a stud bracket. The T-bar may include an integrated bracket or may be configured for connection to a bracket. In either example, the bracket may secure the T-bar to the second stud. By way of example, FIG. 9C illustrates a bracket 918 for securing the T-bar to the wall at one or more of a first stud (centerline 103) and a second stud (centerline 105). While FIGS. 9B and 9D show different views of the same configuration, FIGS. 9B and 9D depict a decorative cover over bracket 918.

Figure 9A:
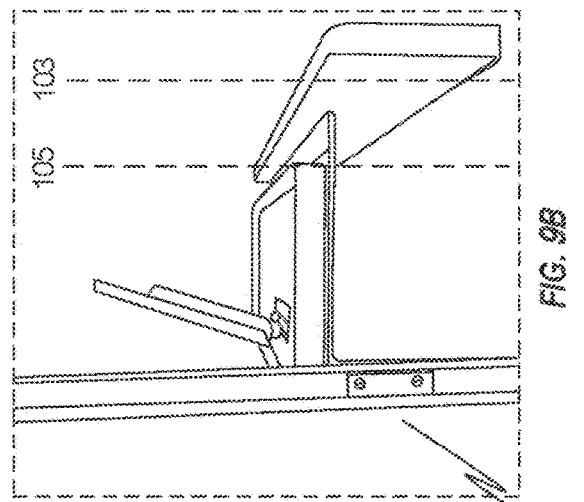
FIGS. 9A-9D are illustrations of a T-Bar or shelf arranged with connections to a wall and to a beam of a wall-mountable exercise machine, consistent with some embodiments of the present disclosure.
Figure 9B:
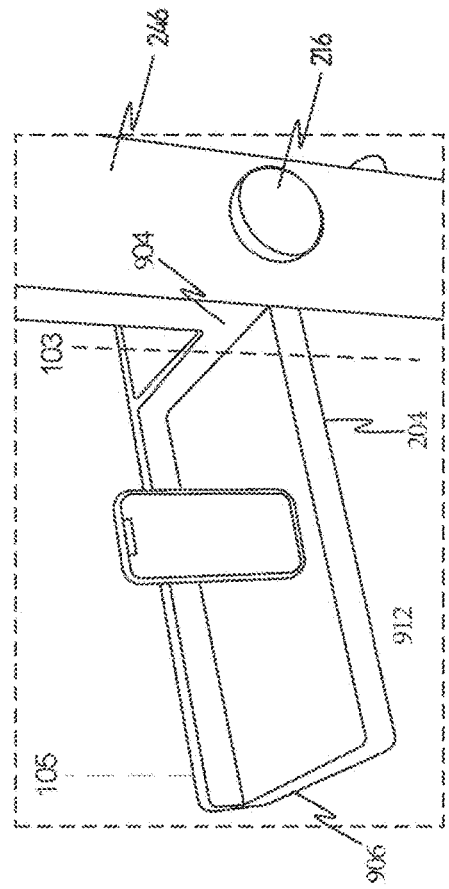
Figure 9C:
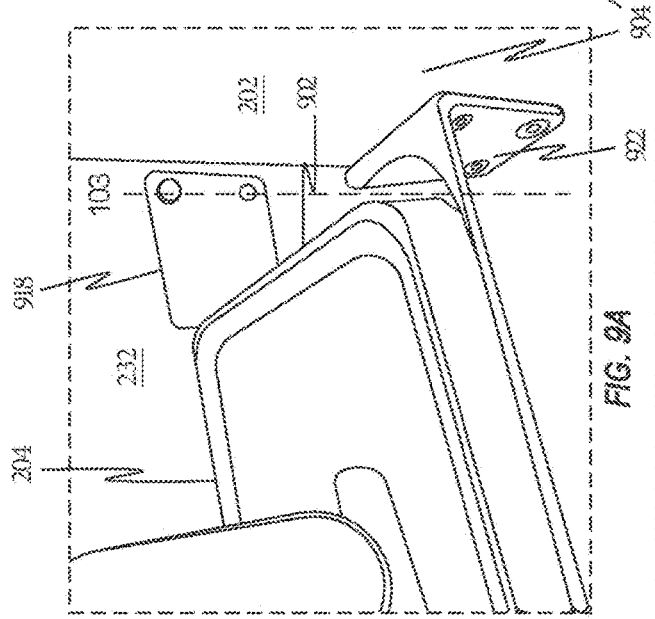
Figure 9D:
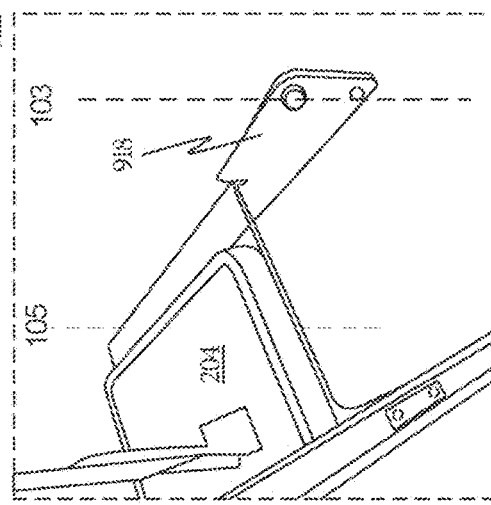
Figure 9G:
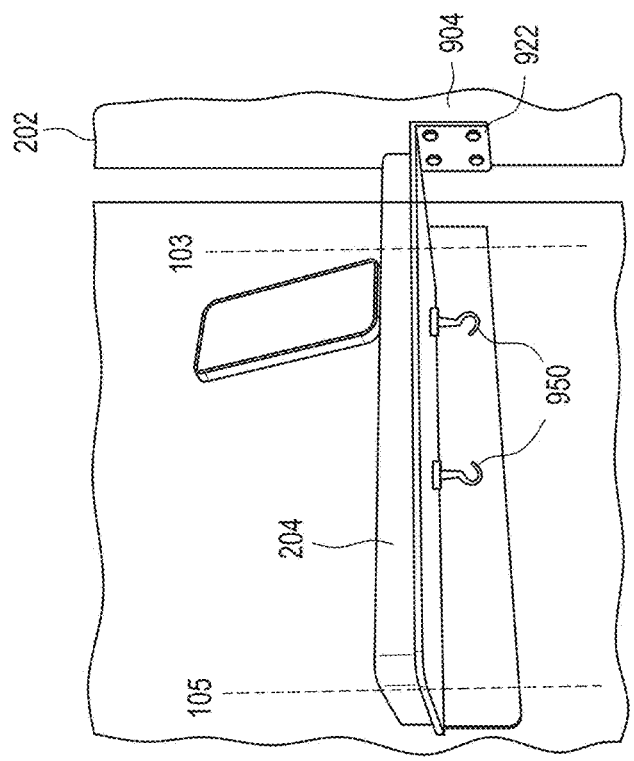
FIGS. 9E-9G are images of a T-Bar or shelf arranged with connections to a wall and to a beam of a wall-mountable exercise machine, consistent with some embodiments of the present disclosure.
Figure 9E:
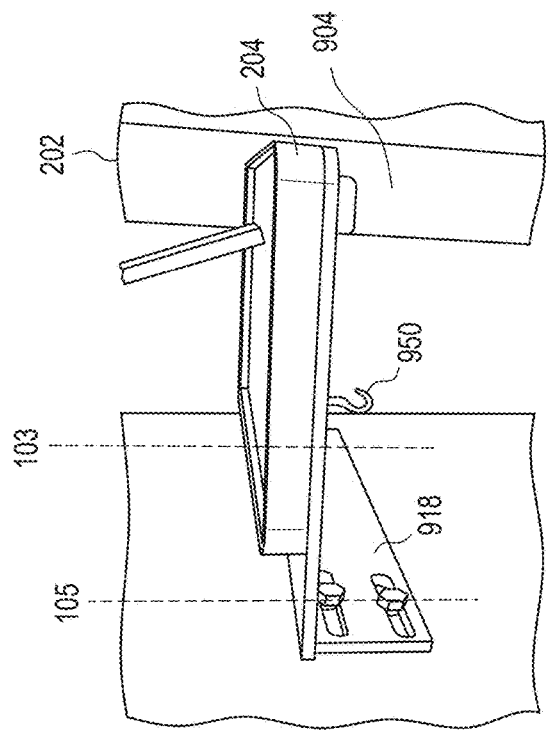
Figure 9F:
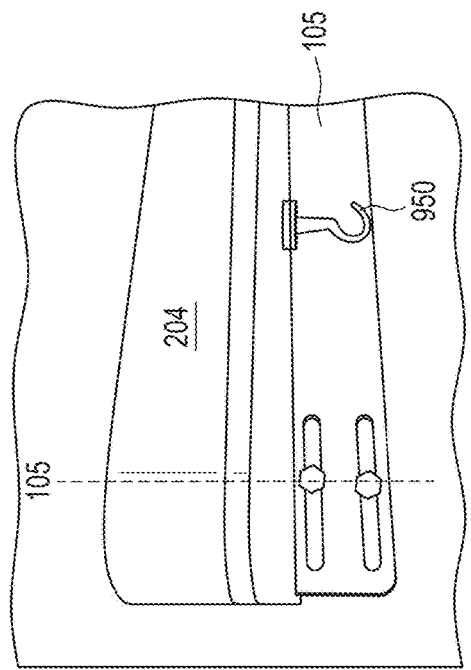

FIGS. 9E, 9F, and 9G illustrate additional views of T-bar 204 having bracket 918, relative to one or more of first stud (centerline 103), second stud (centerline 105), and intermediate portion 904 of the vertically wall-mountable beam 202. As shown in FIGS. 9E-9G, a shelf such as T-Bar 204 may include one or more hooks or other attachment points for hanging one or more items (e.g., accessories) such as a grip handle or other accessories usable with the resistive exercise machine.

Alternatively, the bracket for the T-bar may be integrated into a flange on the T-bar which can be secured to the second stud.

In some disclosed embodiments, the stud bracket is L-shaped in cross-section and includes a back plate through which the T-Bar is connectable to the first stud, and a second transverse surface for connection to the intermediate portion of the vertically wall-mountable beam. "L-shaped" refers to the characteristic of having a shape like the letter "L". "Back plate" may refer to a surface positioned at the back or rear side of the T-bar. The L-shaped structure may include a surface configured to rest against the wall, with one or more holes in the structure for securing the backplate to the wall. Such structures are illustrated, for example, in FIGS. 9A-9D. As seen in FIG. 9C, the T-bar 204 may be configured for connection to the second stud 105 via the L-shaped stud bracket 918. The connection surface is transverse in that it is perpendicular to the surface it transverses or cuts across.

As seen in FIG. 9A, the L-shaped stud bracket 918 may further comprise a back plate 920 through which the T-bar 204 is connectable to the first stud 103 in wall 232, and a second transverse surface 922 for connection to the intermediate portion 904 of the vertically wall-mountable beam 202.

Consistent with some disclosed embodiments, the T-bar 2 is configured as a shelf. A shelf refers to a generally horizontal surface used to support a thing, entity, object, and/or device. Thus, the T-bar may serve at least two functions: to resist torque forces during exercise and to serve as a shelf for the user's items.

Consistent with some disclosed embodiments, the shelf includes a mobile device charger integrated therewith. A mobile device charger refers to a connection for providing power to recharge the battery of a mobile electronic device such as a smartphone, tablet, smartwatch, headphone, laptop, a portable media player, and/or any other mobile electronic device. The mobile device charger may allow a user to replenish the power in a mobile device. The device charger may be wireless or wired. The charger may be "Integrated" in that it is incorporated within the shelf. For example, a wireless charger or a charging port may be integrated into the shelf. For example, the shelf may have one or more of a built in charging antenna, USB port(s), USBC ports, lightening ports, power outlets or any other wired or wireless electronic connection.

Additionally or alternatively, the T-bar 204 may be configured as a shelf, rack, ledge, and/or any other suitable stand. Hooks may extend from the bottom of the T-bar for hanging accessories such as cable handles, or various exercise accessories to be attached to the arm. Examples of such hooks 950 are shown in FIGS. 9E, 9F, and 9G.

In some disclosed embodiments, an edge of the shelf is narrower than width of the faceplate. In this context an edge refers to a thickness of the outer facing surface, and the width of the faceplate similarly refers to the width dimension of the faceplate. By way of example, in FIG. 2D, the edge of the shelf (i.e., the edge of T-bar 204) is depicted with dimension line 524, and a width of the faceplate is depicted with dimension line 514. As illustrated, dimension 524 is narrower than dimension 514 It is to be noted that the illustrations shown in the figures may not be shown to a particular scale.

Consistent with some disclosed embodiments, a motor is contained within the motor housing and connected to the selectively positionable arm via a cable as discussed elsewhere herein.

By way of a non-limiting example, the motor 140 is connected to the selectively positionable arm 212 via the cable 206.

By way of a further non-limiting example, FIG. 4 illustrates an exemplary motor, consistent with some embodiments of the present disclosure. Motor housing 228 is associated with the lower bracket 230, and a motor 140 is contained within the motor housing 228. Furthermore, the motor 140 is connected to the selectively positionable arm 212 via the cable 206.

Consistent with some disclosed embodiments, the beam is configured to connect to the T-bar via protrusion that fits within an opening. A protrusion refers to a structure that extends or juts out from its surrounding surface or environment. A protrusion may vary in size, shape, and/or form. It may take the form of a notched tab, for example, that fits into a slot or other opening such as a gap, hole, and/or empty space in a surface or structure. For example, a tab on the T-bar may fit into a slot in the side of the vertically wall-mountable beam (or vice versa).

By way of a non-limiting example, in some embodiments the vertically wall-mountable beam 202 may be configured to connect to the T-bar 204 via a protrusion 526 that fits within an opening 516. Specifically, as seen in FIG. 10, the protrusion 526 may be a tab 526 extending from a shelf of the T-bar 204, wherein the tab 526 fits within a slot 516 in the side of the vertically wall-mountable beam 202. Additionally or alternatively, a shelf of the T-bar 204 may bolt to vertically wall-mountable beam 202, via an L-bracket such as bracket 922 in FIG. 9G. Bracket 922 may be integrally formed with the T-Bar 204.

Consistent with some disclosed embodiments, the T-bar is configured to extend between and connect to an additional vertically wall-mountable beam mounted on a third stud adjacent to the second stud and on a side of the second stud opposite the first stud. In other words, two vertically wall-mountable exercise machines may be mounted on two different studs (such as first stud 103 and third stud 107, shown in FIG. 2E) with at least one intervening stud across which the T-bar passes. An example of this structure is illustrated in FIG. 2E where two wall-mountable exercise machines 200A and 200B are bridged by a single T-bar 204. In such an example, while the T-bar forms a T with each of the two wall-mountable exercise machines 200A and 200B individually, the entire construct forms an H-configuration, as illustrated. Consistent with some disclosed embodiments, the T-bar is connectable to the vertically wall-mountable beam at a mid-location on the vertically wall-mountable beam, as discussed earlier.

Consistent with some disclosed embodiments, the vertically wall-mountable beam, the additional vertically wall-mountable beam, and the T-bar cooperate to form an H-configuration, with the T-bar configured to resist torquing of both the vertically wall-mountable beam and the additional vertically wall-mountable beam. The H-configuration may provide additional structural stability, flexibility, and modularity. Moreover, the H-configuration also allows the T-bar to resist torque forces from each of the vertically wall-mountable beam and additional vertically wall-mountable beam. Such an H-configuration arrangement allows for stability of the minimalist wall-mountable exercise machine by mitigating unbalanced forces acting eccentrically on any one element. An example of the H-configuration is illustrated in FIG. 2E where two wall-mountable exercise machines 200A and 200B are bridged by a single T-bar 204.

Consistent with some disclosed embodiments, the control knob is positioned on the vertically wall-mountable beam at a location aligned with the T-bar. For example, the knob may be adjacent a location where the T-bar intersects with the vertically wall-mountable beam. One advantage of this arrangement when the T-bar functions as a shelf to support a cell phone, is that the control knob is logically close to the level of the cell phone. Another advantage of this arrangement is that the control knob may be easily and conveniently accessible and used by various user(s), regardless of the height of the respective user(s). For example, as illustrated in FIG. 2A, dial 216 is positioned on the vertically wall-mountable beam 202 at a location aligned with the T-bar 204.

Consistent with some disclosed embodiments, the T-bar includes a mounting bracket configured for connection to the first stud at a location between the wall and the vertically wall-mountable beam. A mounting bracket may refer to a device or component used to securely attach or support another object to a surface or structure. A mounting bracket may provide a strong, structurally sound, and stable connection.

By way of a non-limiting example, FIG. 9A illustrates T-bar 204 including a back plate of a mounting bracket 918 configured for connection to the first stud 103 at a location between the wall 232 and the vertically wall-mountable beam 202.

In some embodiments, mounting bracket 918 may have at least two surfaces, a first surface that supports T-bar 204, and a second surface perpendicular to the first surface, that attaches to a wall 232 in one or more locations corresponding to one or more studs. Bracket 918 may also include a transverse portion 922 that is configured to be attach to the beam 202 at an intermediate portion 904.

While some conventional fitness machines have adjustable arms that can rotate and move along a rail, reorienting the arm positions in conventional systems is cumbersome and requires the manipulation of multiple buttons or levers. Some of the disclosed embodiments simplify arm reorientation with a single knob on the shoulder of the arm. When the knob is moved in one direction the arm is permitted to travel along a rail or track, to change a height of the arm shoulder. When the knob is moved in a second direction, the arm is permitted to rotate about the shoulder, to change the arm orientation relative to the exercise equipment. The knob may take other forms, such as a button, directional pad, lever, joystick, or other suitable device that allows for manipulation in more than one direction and are capable of at least two different types of movement, such as rotating, pulling, pushing and any combination therebetween.

Some disclosed embodiments involve a wall-mountable exercise machine with a vertically-mountable beam and a trolley for riding the vertically-mountable wall beam and being configured to lock at differing positions along the vertically mountable wall beam. A wall-mountable exercise machine, a vertically mountable beam, and an associated trolley are defined and exemplified elsewhere herein and specific non-limiting examples are provided with reference to FIGS. 2A-2H, 3, 5A-B, 6A-C, and 7A-B. Therefore, those definitions, exemplifications, and illustrations are not repeated other than to emphasize that a vertically wall-mountable beam includes any elongated structure configured to extend on a portion of a wall in a direction between a floor and a ceiling, regardless of whether the beam extends only over a portion of the height of the wall and regardless of the angle of extension relative to a plane of the floor; a track and a rail may be interpreted synonymously, and a trolley includes any structure capable of riding one or more tracks or rails, regardless of the technical details of the interface between trolley and track/rail.

Some disclosed embodiments involve a shoulder rotatably connected to the trolley. A shoulder refers to a joint or connection between to mechanical components. In the current context, a shoulder is a joint between a trolley and an arm that permits the arm to articulate relative to the trolley.

The shoulder may be rotatably connected to the trolley, meaning that the shoulder is enabled to turn, pivot, or revolve relative to the trolley while maintaining a connection or linkage to the trolley.

Consistent with some disclosed embodiments, the wall-mountable exercise machine includes at least one pair of opposing engageable mating surfaces within the shoulder. "Opposing" may refer to two or more facing and/or diverging things, entities, and/or structures.

Engageable mating surfaces refer to two or more contoured structures in a mechanical system that are designed to come into contact with each other and establish a connection or fit. These surfaces are designed to interact and engage with each other to form a secure and functional interface. Engageable mating surfaces are typically designed to have specific shapes, dimensions, and features that allow them to fit together. They may include features such as grooves, slots, tabs, ridges, or other geometric elements that facilitate proper alignment and connection.

Figures 13B, 13C:
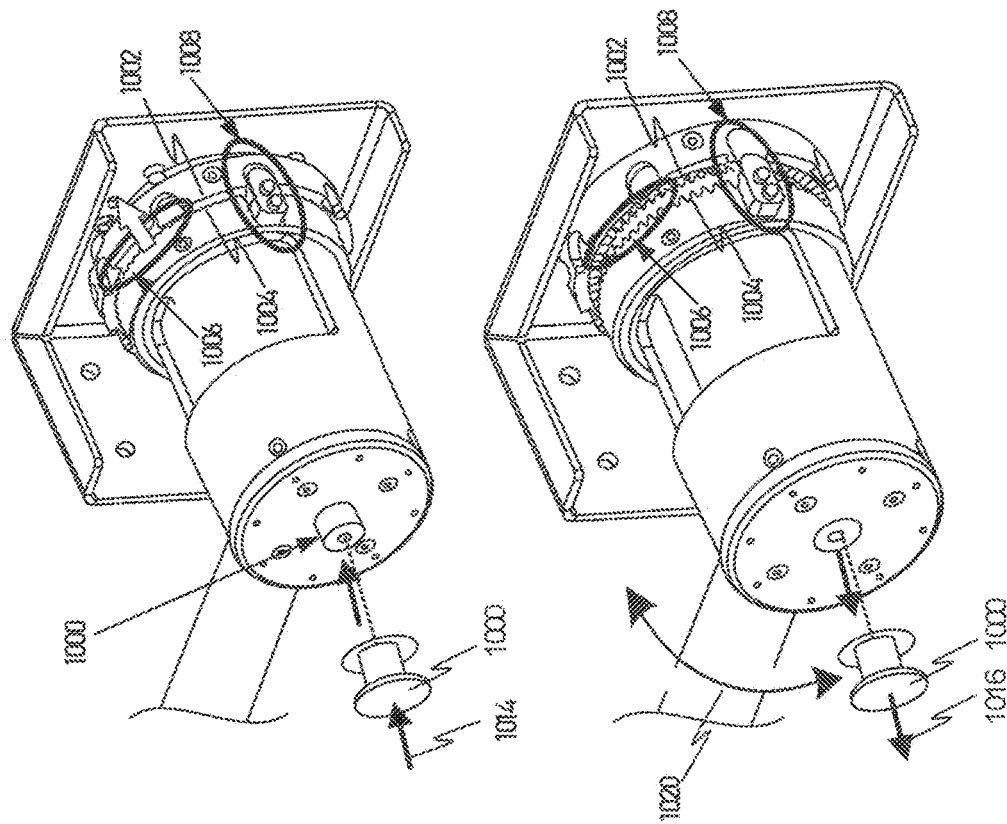
FIG. 13B illustrates an internal view of a knob and shoulder configured for adjusting an arm of an exercise machine, consistent with some embodiments of the present disclosure.
FIG. 13C illustrates another internal view of a knob and shoulder configured for adjusting an arm of an exercise machine, consistent with some embodiments of the present disclosure.
Figure 13A:
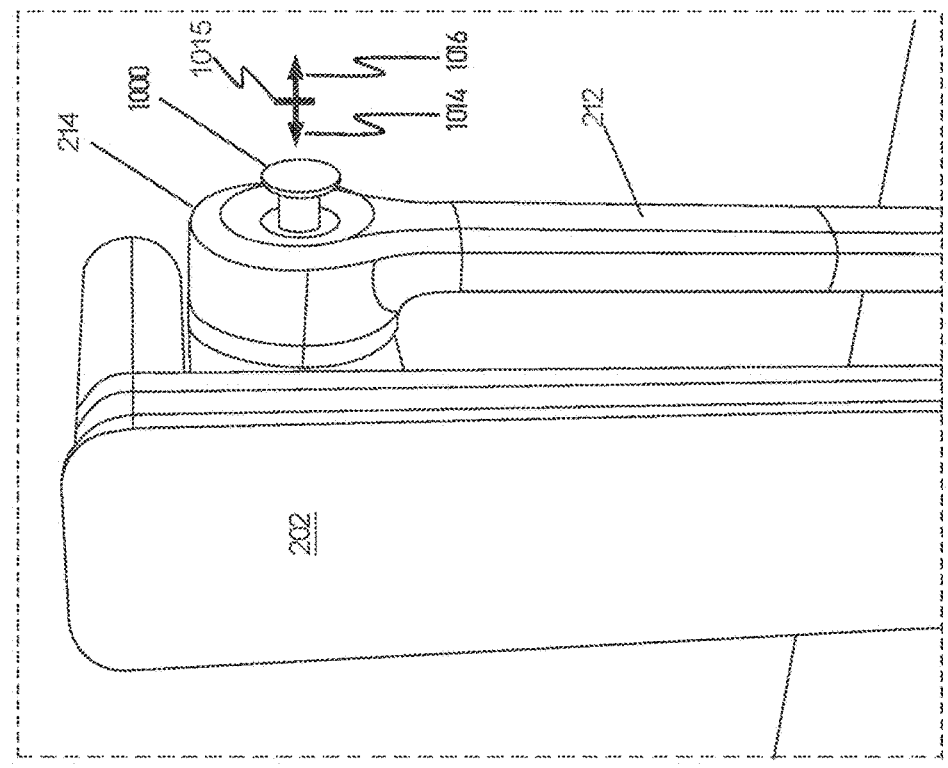
FIG. 13A is a perspective view of an upper portion of a wall mounted gym with an exemplary knob extending from a shoulder for adjusting an arm and trolley orientation, consistent with some embodiments of the present disclosure.

Reference is made to FIGS. 13A-13C illustrating a non-limiting example of a shoulder 214 to which knob 1000 is integrated for use in adjusting arm positions in wall-mounted gym. In some embodiments, shoulder of 214 may include at least one pair of opposing engageable mating surfaces 1002 and 1004. Shoulder 214 may be configured such that when the knob 1000 is actuated to disengage the mating surfaces, arm 212 and shoulder 214 are enabled to rotate relative to beam 202 (e.g., as shown in FIG. 4B). In some embodiments, the opposing engageable mating surfaces 1002 and 1004 may include opposing interlocking teeth 1006. In some embodiments, opposing engageable mating surfaces 1002 and 1004 may include an opposing tongue-and-groove 1008. In some embodiments, the tongue-and-groove may include a single tongue for selective engaging with any one of a plurality of grooves (e.g., the grooves may serve as an index). In some embodiments, the tongue-and-groove may include a single groove for selective engagement with a plurality of tongues (e.g., the tongues may serve as an index). In some embodiments, the tongue-and-groove may include a plurality of tongues for selective engagement with a plurality of grooves. Some embodiments may include only tongue and groove structures or only mating teeth, while other embodiments may include both. In embodiments that include both, the tongue and groove structure may provide indexing so that the teeth may only mate at specifically predefined rotational angles. While the tongue and groove arrangement may provide sufficient strength to lock the shoulder in place and withstand exercise forces, the teeth may provide even more strength. In some embodiments the tongue and groove structure may be omitted altogether with the teeth locking the shoulder against rotation.

By way of example, in the embodiment of FIGS. 13A-C employing both a tongue and groove and interlocking teeth, interlocking teeth 1006 may resist rotational movement while the tongue-and-groove 1008 indexes a rotation position of arm 212 and shoulder 214. In other words, tongue-and-groove 1008 may position an angle of arm 212 relative to vertically wall-mountable beam 202, and interlocking teeth 1006 may bear the load of the resistance weight of motor 140 during an exercise routine.

Reference is made to FIGS. 14A-14C illustrating different stages of engagement for mating surfaces 1002 and 1004, consistent with some disclosed embodiments. FIG. 14A illustrates mating surfaces in a disengaged state (e.g., neither tongue 1010 nor interlocking teeth 1006 of mating surfaces 1002 and 1004 are engaged). This configuration may allow selecting one of a plurality of grooves for engaging with a tongue, e.g., to set an angle for arm 214. FIG. 14B illustrates surfaces 1002 and 1004 in an engaged state, with tongue 1010 and groove 1012 engaged setting an orientation for arm 212, and interlocking teeth 1002 and 1004 engaged to bear a load of a weight-bearing exercise performed using arm 212. FIG. 14C illustrates mating surfaces 1002 and 1004 disassembled exposing teeth of mating surfaces 1002 and 1004. In some embodiments, each of mating surfaces 1002 and 1004 may be made of a metal, composite, or high strength plastic.

Some disclosed embodiments involve an arm connected to and rotatable with the shoulder, the arm and the shoulder being configured to lock at differing rotation positions relative to the trolley. An arm, as described previously, may be selectively positionable if a user is able to choose and set or otherwise vary the arm's position. Once the position is selected the arm may be able to receive an exercise force applied thereto. The exercise force may be applied through a user pulling on a cable extending through the arm, as described earlier.

As described previously, the shoulder may lock at various positions. An arm connected to a shoulder may therefore lock in the same rotational positions by virtue of the arm's connection to and extension from the shoulder. "Differing rotation positions" refers to more than one radial orientation. For example, depending on reference coordinates adopted, if straight up and down is a baseline for 0 degrees of rotation, 90 degrees may correspond to a horizontal arm. The specific angles of rotation that the arm is permitted to assume may depend on design choice.

Any one of the aforementioned various locking mechanisms may be utilized to lock each of the arm and shoulder at a permitted position with respect to the trolley.

By way of another non-limiting example, FIG. 2A illustrates an exemplary wall-mountable exercise machine 200 with a vertically wall-mountable beam 202, a trolley 210 for riding the vertically wall-mountable beam 202, a shoulder 214 rotatably connected to the trolley 210, and an arm 212 rotatably connected to the shoulder 214. Since the arm 212 is connected to the shoulder, it rotates with the shoulder 214.

By way of anon-limiting example, FIG. 2B illustrates an exemplary wall-mountable exercise machine, where the arm 212 and the shoulder 214 may be configured to lock at differing rotation positions 240A, 240B, 240C, and 240D relative to the trolley 210. Similarly, FIG. 2C illustrates an exemplary wall-mountable exercise machine where the arm 212 and the shoulder 214 may be locked at differing rotation positions, either 45 degrees above or 45 degrees below the horizontal line. FIG. 2C exemplifies extreme ends of the ranges of motion for the shoulder and the arm, with the lower arm illustration depicting the lowermost travel of the trolley and the arm and the upper arm depiction illustrating the uppermost orientation of the trolley and the arm.

Some disclosed embodiments involve a knob extending from the shoulder, the knob being movable in a first direction to enable rotation of the arm and being movable in a second direction to enable longitudinal movement of the trolley along the beam. A knob may include any graspable and manipulatable element. For example, a knob extending from the shoulder may be pushed or pulled to render adjustments to the exercise equipment. In some embodiments, knob rotation may affect adjustments. A knob may vary in size, shape, and/or form. A knob may be small and subtle, large and prominent, or of medium prominence. A knob may be a protrusion, a projection, ridge, and/or any other protruding feature. A knob is said to extend from the shoulder if it sticks out in any direction from the shoulder. Alternatively, a lever or button may be embedded in the shoulder to enable similar functionality.

A knob is considered movable if it its position is changeable. For example, a knob may be movable in on direction if it capable of being pushed in that direction, and a knob may be movable in an opposite direction if it can be pulled in a direction opposite the push direction. The directions of movement need not be opposite. In some embodiments, a first direction may be axial and a second direction may be rotational, or vice versa. Or, both directions may be rotational. Thus, a direction simply refers to a course, path, and/or orientation of movement or position in relation to an initial point, a reference point, and/or a frame of reference. A knob is enabled to move if it is designed so that a force acting on it is capable of moving it.

By way of example with reference to FIGS. 13A-C, when the knob is pushed in as is illustrated in FIG. 13C, the teeth 1002 and 1004 as well as the tongue and groove structure 1008 disengage, enabling the shoulder 214 to be rotated as illustrated by rotational arrow 2020. While the act of pushing the knob disengages the locked position of the shoulder in FIG. 13C, it is to be understood that in embodiments, pulling the knob or even rotating the knob may cause the disengagement. Therefore, while the first direction may be an axial inward direction such as exemplified in FIG. 13C, it is to be understood that the first direction can be an outward axial movement, a rotational movement (e.g., involving a chamfered or ramped surface where a rotational movement is translated into an axial movement) or any other movement, depending on mechanism employed, that causes the mating surfaces to disengage.

The differing manners and mechanisms of engagement and disengagement within the scope of this disclosure may be akin to a clutch disengagement where a clutch plate disengages from a flywheel, or, a gear disengagement, gear teeth are separated to halt transmission. Additionally or alternatively, disengagement may be a quick-release disengagement, wherein a quick-release lever or mechanism may be used to disengage and/or separate components. Disengagement may be a coupling disengagement, wherein two or more shafts and/or components that are coupled together are disengaged. Disengagement may be a brake disengagement, akin to the release of a brake pedal or lever to allow for free movement and/or rotation of the wheels and/or relevant components. Disengagement may be a lock disengagement, wherein locking mechanisms may be disengaged and/or released. Locking mechanisms may include a clamp, a fastener, a pin, a hook, a bolt, a cam lock, a cylinder lock, an electronic lock, a deadbolt lock, a padlock, and/or another device, mechanism, or system to secure, fasten, and/or hold a thing, entity, object, and/or structure in a fixed position.

Engagement/disengagement structures may involve a biasing mechanism that, for example, applies a spring tension and wherein a release of the spring tension either causes engagement or disengagement. Engagement/disengagement structures may involve a mechanical linkage wherein mechanical linkages may be separated or disconnected. This may include disengaging a connecting rod from a crankshaft like structure, releasing a pushrod from a valve, and/or disconnecting control rods.

In other embodiments, the engagement/disengagement structures may involve electronics. For example, activation/deactivation of a solenoid may enable disengagement and engagement of the arm. The foregoing are just a few examples of numerous structure contemplated for enabling the arm and the shoulder to rotate.

Consistent with some disclosed embodiments, the first direction is associated with a pushing motion configured to advance the knob towards the vertically-mountable beam. A user may cause the knob to move toward the vertically-mountable beam such that part of the knob recesses into the shoulder. A pushing motion refers to exerting force in a direction towards a thing, object, entity, structure, and/or device and away from a certain point and/or location.

In some embodiments, the knob extends from the shoulder of an arm. In the non-limiting example shown in FIG. 13A, knob 1000 extends from shoulder 214 that is connected to arm 212. Knob 1000 may be configured to be pushed toward beam 202, resulting in knob 1000 advancing toward shoulder 214 and beam 202. Movement of the knob in the first direction may disengage the mating surfaces, enabling the arm and the shoulder to rotate. The first direction may be associated, related, correlated, and/or in any way connected with a pushing motion. The pushing motion may be carried out and/or exerted via a body part, implement, machine, device, mechanical implement, a mechanical device, and/or any other appropriate or suitable actuating mechanism or device.

Consistent with some disclosed embodiments, the knob is configured such that a pushing motion causes disengagement of the opposing engageable mating surfaces, thereby enabling the arm and the shoulder to rotate. As previously discussed, when mating surfaces are disengaged by a pushing force, relative movement may be permitted between those surfaces. In this context, the push causes the disengagement, and once disengaged, rotation may occur when the user applies a rotational force to the arm.

Consistent with some disclosed embodiments, the opposing engageable mating surfaces include opposing interlocking teeth. "Interlocking teeth" may refer to opposing contours that are able to mate. Interlocking teeth may refer to specific profiles and/or shapes designed to fit together in a complementary manner. Interlocking teeth may refer to teeth that have raised ridges, grooves, notches, and/or any other features that enable an interlocking connection and/or engagement. Interlocking teeth may refer to gear teeth in a gear system, interlocking pieces, zipper teeth in a zipper mechanism, interlocking tabs and slots, and/or interlocking flanges. Teeth examples include spur gear teeth, helical gear teeth, bevel gear teeth, worm gear teeth, or any other form of teeth.

Consistent with some disclosed embodiments, the opposing engageable mating surfaces include an opposing tongue-and-groove. "Tongue-and-groove" may refer to a joint or interlocking system in which a tongue on one component fits into a corresponding groove on another component creating a secure connection. The tongue(s) may include one or more protrusions, projections, ridges, and/or any other protruding feature. The tongue may vary in size, shape, and/or form. The corresponding groove(s) may be channels, depressions, notches, and/or any recessed area. The corresponding groove may vary in size, shape, and/or form.

Consistent with some disclosed embodiments, the tongue-and-groove includes a single tongue for selective engagement with a plurality of grooves. "Single" refers to only one tongue while a plurality of grooves refers to more than one groove.

"Selective" or "selectively" in this context means that a choice may be made as to the groove with which the tongue engages. By way of example with reference to FIG. 14B, the tongue 1010 may be selectively engaged with any one of the illustrated grooves 1012. The choice of groove correlates to an indexed position of the arm connected to the shoulder.

Consistent with some disclosed embodiments, it is to be understood that in a similar manner the tongue-and-groove may include a single groove for selective engagement with a plurality of tongues. Although not illustrated, one example of this embodiment would be similar to FIG. 14B although instead of having a single tongue for engaging a plurality of grooves, a single groove might selectively engage a plurality of tongues. Or, for added security and perhaps in an embodiment that eliminates the teeth, the tongue-and-groove might include a plurality of tongues for selective engagement with a plurality of grooves. For example, in FIG. 14B, instead of a single tongue 1010, there might be two or more tongues so that multiple grooves 1012 might be engaged simultaneously.

Consistent with some disclosed embodiments, the opposing engageable mating surfaces include opposing interlocking teeth and an opposing tongue-and-groove, such that the opposing interlocking teeth upon engagement are configured to transfer rotational movement via the interlocking teeth and such that the tongue-and-groove upon engagement are configured to index a rotation position of the arm and the shoulder. As discussed previously, in situations where both a tongue and groove and an interlocking tooth structure are employed, the teeth may secure the rotational connection and the tongue and groove structure might index the location of connection.

Consistent with some disclosed embodiments, the knob is configured, upon movement in the second direction, to disengage a lock, permitting movement of the trolley. The same knob that is manipulatable in one direction to disengage the should and permit arm rotation might be moveable in a second direction to disengage the trolley from the rail(s) or track(s) permitting the trolley to ride along the beam.

The second direction may be any direction different from the first direction. The second direction may be a pushing direction, a pulling direction, a rotational direction, and/or any other suitable direction. The lock may be a locking mechanism, wherein the locking mechanism may be a clamp, a fastener, a pin, a hook, a bolt, a cam lock, a cylinder lock, an electronic lock, a deadbolt lock, a padlock, and/or another device, mechanism, or system to secure, fasten, and/or hold the trolley in position.

Consistent with some disclosed embodiments, the second direction is associated with a pulling motion configured to advance the knob away from the vertically-mountable beam. "Away" in this context refers to a direction other than towards the beam.

Consistent with some disclosed embodiments, when such a pulling motion is exerted on the knob, the lock is disengaged, thereby permitting movement of the trolley along the vertically-mountable wall beam. The lock may include a movable protrusion configured to selectively engage openings spaced along the beam. "Protrusion" may refer to a structure that extends or juts out from its surrounding surface or environment. A protrusion may vary in size, shape, and/or form. "Openings" may refer to gaps, holes, or voids in a surface or structure. Openings may be spaced from each other such that selective engagement from a protrusion selects a position of the trolley.

The movable protrusion may include a tapered edge, and wherein the openings are tapered in a manner corresponding to the tapered edge of the protrusion. "Taper", "tapered", or "tapering" may refer to a gradual reduction in width, thickness, or size from one end to another. An edge refers to the outermost part, boundary, border, margin, fringe, and/or periphery. "Correspond" or "Corresponding" may refer to the relationship between two surfaces that are designed or aligned to fit or interact with each other. When the protrusion engages with an opening (or is designed to engage with an opening), the protrusion and the opening are said to correspond.

FIG. 6D illustrates a non-limiting example of a portion 140 of beam 202, having a plurality of openings 604. As shown, openings 604 may have one or more tapered ends, edges, or surfaces, to assist with engaging and disengaging a protrusion from the trolley (not shown). Portion 140 of beam 202 may have several additional openings, such as the openings 604 shown in FIG. 6B.

In some embodiments, the first direction and the second direction may be reversed, such that the first direction is associated with a pulling motion for advancing the knob away from the vertically-mountable beam (1016 in FIG. 13A), and wherein the second direction is associated with a pushing motion for advancing the knob towards the vertically-mountable beam (1014 in FIG. 13A).

In some disclosed embodiments, the knob is configured to move between three positions including a trolley releasing position, an arm orienting position, and a neutral position for preventing movement of the trolley and for setting an orientation of the arm. When the knob is not being moved in a first direction or a second direction, the knob may rest in a neutral position that maintains both a rotational orientation of the arm and a position of the trolley along the beam.

A trolley releasing position is a position of the knob that unlocks the trolley and permits it to move along the beam. An arm orienting position is a position of the knob that unlocks one or more mating surfaces of the shoulder, to permit rotational movement and repositioning of the arm. from the beam. For example, a trolley releasing position may be a position in which the trolley is disengaged from its current position or state of restraint and is permitted to move along the beam in response to forces acting on the trolley, and an arm orienting position is a position of the knob that permits the shoulder to rotate in response to an applied rotational force.

A neutral position of the knob is a position that does not permit repositioning or reorientation of the trolley or the arm. A neutral position may be a default or resting position of the knob when no external forces, inputs, and/or movements are applied to it.

In some disclosed embodiments, the wall-mountable exercise machine further includes a biasing mechanism for biasing the knob towards the neutral position. "Biasing" may refer to the action or process of applying a force, tension, or displacement to create a specific predetermined condition or behavior within a system. Biasing may involve introducing a controlled force to establish a preferred or desired state of operation when no additional forces are applied by a user. "Biasing mechanism" may refer to a component, device, and/or system that is designed to apply a controlled force, in this case for urging the knob toward the neutral position. A biasing mechanism may include a spring that exerts a force to maintain contact, tension, or compression between components. Additionally or alternatively, a biasing mechanism may include preloaded bearings that apply a controlled force, a magnet, a pneumatic device, or any other structure that encourages the knob to move to the neutral position.

In some disclosed embodiments, the wall-mountable exercise machine further comprises that the biasing mechanism includes at least one of a spring, a magnet, a motor, or a pneumatic device. A spring refers to a component or components that have an elastic quality such that when deformed, they return to their original shape. magnet may utilize magnetic fields to move components to a desired location. A pneumatic device is one that may use air or gas to move a component to a desired location. In some embodiments, an actuator may use compressed air and/or gas to apply a controlled force or pressure. Pneumatic devices may involve one or more actuators, valves, tubing or piping to transfer gas, and a source of compressed gas such as a pump or tank. Some embodiments may include one or more hydraulic components, which are similar in function and nature to pneumatic devices, but use liquid instead of compressed gas to create or transfer force from one location to another.

By way of anon-limiting example, in FIG. 6C, the trolley 210 may be configured to lock at differing positions along the vertically wall-mountable beam 202. This may occur as the result of trolley 210 having a lock 502 with an associated movable protrusion 504. Such a lock 502 and a movable protrusion 504 may allow the trolley 210 to be configured to lock at differing positions along the vertically wall-mountable beam 202. Specifically, the lock 502 and its movable protrusion 504 may be configured to selectively engage openings 604 spaced along the beam 140. Additionally, the movable protrusion 504 may include a tapered edge. Also, the openings 604 may be tapered in a manner corresponding to the tapered edge of the protrusion 504. A non-limiting example of a tapering of the openings 604 is shown in FIG. 6D.

By way of a non-limiting example, as shown in FIG. 6D, tapered openings 604 may be tapered in a manner corresponding to the tapered edge of the protrusion 504 shown in FIG. 6C.

In some embodiments, the exercise equipment may include one or more sensors for tracking one or more locations of equipment components. Sensors may be embedded or attached to one or more components of the exercise equipment such as on beam 202, trolley 210, protrusion 504, one or more openings 604, arm 212, shoulder 214, knob 1000, and any other components associated with movement of the system components. As an example, each of openings 604 may be associated with a location sensor for confirming that protrusion 504 of trolley 210 is locked into an opening 604. In some embodiments, one or more sensors may be part of protrusion 504 (e.g., a contact sensor) in addition to or instead of sensors in openings 604. Tracking a position of the exercise equipment components or a status of protrusions and locking mechanisms may enhance the safety, performance, and user experience of using the exercise equipment.

As seen in FIG. 6C, the knob 1000 is configured to, upon movement in the second direction 1016, disengage the lock 502 and the movable protrusion 504 from the opening 604, thereby permitting movement of the trolley 210. As can be seen in each of FIGS. 6C, the second direction 1016 may be associated with a pulling motion 1016 configured to advance the knob 1000 away from the vertically mountable beam 202. As can be further understood from examining FIG. 6C, the knob 1000 may be configured such that the pulling motion 1016 disengages the lock 502 and the movable protrusion from the opening 604, thereby permitting movement of the trolley 210 along the vertically-mountable wall beam 202. However, prior to the application of a pulling motion 1016, the biasing mechanism (e.g., spring 218) biases the knob 1000 towards a neutral position, wherein the lock 502 and the movable protrusion 504 engage the opening 604.

By way of a non-limiting example, FIG. 13A illustrates an exemplary wall-mountable exercise machine, consistent with some embodiments of the present disclosure. As can be seen in FIG. 13A, the wall-mountable exercise machine may include a vertically-mountable beam 202, a shoulder 214, an arm 212 connected to and rotatable with the shoulder 214, and a knob 1000 extending from the shoulder 214. As can be further seen in FIG. 13A, the knob 1000 may be movable in a first direction 1014 to enable rotation of the arm 212. Also, the knob 1000 may be movable in a second direction 1016 to enable longitudinal movement of the trolley along the beam 202. The second direction 1016 may be associated with a pulling motion 1016. However, as seen in FIG. 13A, the second direction 1016 may be associated with a pushing motion for advancing the knob 1000 towards the vertically-mountable beam 202.

When comparing each of FIGS. 13A-C, it can be seen that the knob 1000 is configured to move between three positions: a trolley releasing position, an arm orienting position, and a neutral position. In FIG. 13A, when no force is exerted against knob 1000, the knob rests in a neutral position 1015. When the knob 1000 is moved in a second direction 1016 that is a pulling motion, the trolley is released as was previously described trolley. FIG. 13B shows a neutral position that prevents movement of the trolley and the arm. When the knob 1000 is moved in the first direction 1014, the shoulder is disengaged, allowing for orientation of an arm 212, as illustrated in FIG. 13C. A biasing mechanism biases the knob 1000 towards the neutral position shown in FIG. 13B.

Some disclosed embodiments include exercise equipment with a multifunctional single hand control. A multifunctional control is a user interface capable of adjusting more than one type of function. A single hand control is a user interface that may be manipulated with one hand. As discussed herein, a multifunction single hand control enables the adjustment of multiple functions by a single hand of a user. In some embodiments, the multifunctional single hand control may include a dial. Controlled functions may include operational parameters, settings, and modes of operation of the exercise equipment. Non-limiting examples of controlled functions include resistance levels of one or more resistance motors, resistance motor modes of operation (e.g., simulations of smooth, chains, bands, variable resistance), exercise types, a standalone equipment mode, a paired equipment mode, and other adjustable settings associated with an exercise or operational parameter of the exercise equipment, including other examples discussed herein.

Referring to FIG. 2A, dial 216 is an example of a multifunctional control. Dial 216 is located on a vertical beam 202 of electronic exercise machine 200. Exemplary operations and functionality of dial 216 are discussed in greater detail below.

In some embodiments, the exercise equipment includes a frame and a pulley associated with the frame. A frame in the context of this embodiment refers to a rigid structure for supporting a pulley. The frame may be a beam or another type of rigid structure that provides strength and structural integrity to the exercise equipment. The frame may be formed to provide structural support and bracing for the exercise equipment, and may be designed to withstand the physical forces exerted upon the exercise equipment during an exertion. In some embodiments, the frame may include a beam with an attached shelf extending from the side of the beam, and perpendicular to the beam or at an angle to the beam. A beam may be an elongated piece of rigid material. In some embodiments, a vertically wall-mountable beam may be attached to a wall via one or more supporting brackets. The frame and brackets may be made of durable metal (e.g., steel and/or aluminum) for sturdiness and may support a pulley system, allowing a first end of a cable to be connected to a resistance motor and a second end of the cable to be connected to exercise equipment.

A pulley is a mechanical device including at least one wheel that acts to change the direction of a force applied to a cable circumscribing the wheel. One or more pulleys may be attached to the frame to route a tension cable between a resistance motor and a handle or other type of device that a user moves to perform an exertion. The pulley wheel may have a grooved edge or rim around which the cable passes. The pulley may be supported by the frame or by a shell (e.g., a block) for guiding a cable around the wheel such that rotation of the wheel may cause a direction of the cable to change (e.g., such that a downwards motion on one end of the cable may cause a corresponding upwards motion on the other end of the cable and the reverse). In some embodiments, a vertical wall-mountable beam may include a pulley located at an upper section thereof. A pulley of a vertical wall-mountable beam may be associated with an upper bracket configured to affix an upper end of the vertical wall-mountable beam to a wall. For example, a pulley may be located inside a housing configured as an upper bracket for connecting a vertical wall-mountable beam to a wall. The upper bracket may be made of durable metal, such as stainless or galvanized steel, or aluminum.

Referring to FIG. 2A, electronic exercise equipment 200 may include a frame such as a wall mounted beam 202 for accommodating a pulley system 208. The frame may also include a T-Bar 204 extending laterally from a side of the beam, creating a T-shaped structure. Exercise equipment 200 may include an electronically-adjustable weight resistance motor 140 housed inside a motor housing 228 at a lower part of the frame. A tension cable 206 runs along a length of wall mounted beam 202 from a lower bracket 230 to an upper bracket 236 and may extend through pulley system 208.

FIG. 2E shows another exemplary setup with first and second pieces of exercise equipment 200A and 200B in an H-configuration (i.e., two T-configurations). Each piece of exercise equipment 200A and 200B includes a wall-mounted beam (202A and 202B, respectively), joined by a T-Bar 204 between the beams. In this example, beams 202A and 202B, in conjunction with T-Bar 204, form an H-shaped frame of the exercise equipment. The configurations are not so limited, and additional configurations and frame shapes may be contemplated, such as the examples shown in FIG. 2F including A and V-shaped frames.

FIG. 8 illustrates an exemplary pulley arrangement 208 for electronic wall-mountable exercise machine 200, consistent with some embodiments of the present disclosure. Pulley arrangement 208 may include a pair of sheaves 802 and 804 (e.g., rotatable disks or wheels), each having grooves 806 and 808 on a rim thereof, respectively. Grooves 806 and 808 may have a width to accommodate cable 206 (e.g., see FIG. 2) therein, such that rotating sheaves 802 and 804 may allow cable 206 to slip through pulley arrangement 208 (e.g., to extend a section of cable 206 away from spool 218 or to retract a section of cable 206 back to spool 218). Pulley arrangement 208 may be associated with a housing 810 located in an upper section of electronic wall-mountable exercise machine 200, allowing cable 206 to extend to substantially the full height of electronic wall-mountable exercise machine 200, e.g., beginning from spool 218 located at a base of vertically wall-mountable beam 202, to housing 810 at an upper section of vertically wall-mountable beam 202.

In some embodiments, the exercise equipment includes an arm associated with the pulley, wherein the arm is adjustable to alter an orientation of the pulley. An arm is an elongated part of the exercise equipment. The arm may be an elongated shaft having one end connected to the exercise equipment, and an opposite free end. The arm may articulate along one or more axes at the connection point to an associated main frame or beam. The arm carries or feeds a tension cable to the free end using the associated pulley. In some embodiments, the pulley may be one of several pulleys located along the tension cable between the free end of the arm and the resistance motor. The number of pulleys may vary depending on specific design considerations. In some embodiments, one end of the arm may be connected to the exercise equipment via a shoulder, a trolley, and/or another form of adjustable intermediary device. The arm may be configured to lock at differing rotation positions relative to the exercise equipment by adjustment of the shoulder, the trolley, or both.

With reference to FIGS. 2A and 2E, the exercise equipment 200 may include arm 212 associated with pulley system 208. Cable 206 may extend from motor 140 via pulley 208 through the length of arm 212, e.g., allowing a user to manipulate an accessory attached to the distal end of arm to perform a weight-bearing exercise routine. Arm 212 may be adjustable to alter an orientation of the arm relative to exercise equipment 200.

As shown in FIG. 2B, which is a side view of exemplary wall-mountable electronic exercise machine 200 of FIG. 2A, arm 212 may be adjustable relative to vertically wall-mountable beam 202 in four differing orientations, 240A, 240B, 240C, and 240D. Orientation 240A may be substantially parallel to vertically wall-mountable beam 202. Orientation 240B may be substantially at a 45° angle to vertically wall-mountable beam 202. Orientation 240c may be substantially perpendicular to vertically wall-mountable beam 202 (e.g., and substantially parallel to a floor). Orientation 240D may be substantially at a 135° angle to vertically wall-mountable beam 202. The four different orientations shown are non-limiting, and arm 212 may be oriented at greater than four, or less than four orientations. Although four arm positions are illustrated as an example, a fewer or greater number of arm positions may be employed consistent with disclosed embodiments.

As shown in FIG. 2C, which is another side view of exemplary wall-mountable electronic exercise machine 200 of FIG. 2A, arm 212 can be adjusted to be selectively positioned at two height extremes, 242 and 244. A trolley 210 (see FIG. 2A) may slide along vertically wall-mountable beam 202 to position arm 212 at heights 242 and 244. The trolley may be associated with arm 212, such that moving the trolley along a rail or pair of rails of a vertically wall-mountable beam of the electronic exercise machine allows adjusting a height of the arm, and locking the trolley at a selected location allows fixing the height of the arm. While only two different heights are shown, this does not limit the disclosure, and arm 212 may be selectively positioned at more than two different heights along vertically wall-mountable beam 202. An orientation of the pulley system 208 may adjust when the arm is adjusted to the orientations shown in FIGS. 2B and 2C, to maintain a proper routing and alignment of cable 206 from tension motor 140 through arm 212. For example, one or more pulleys of pulley system 208 may pivot or swivel automatically when arm 212 is adjusted and an angle at which tension cable 306 enters arm 212 changes.

In some embodiments, the exercise equipment includes an electronically-adjustable weight resistance motor, as discussed elsewhere herein. For example, as discussed, a resistance motor refers to a motor that applies a resistive force. Such a motor may be electronically adjustable through the inclusion of one or more electromagnets configured to apply a variable electromagnetic field as resistance, depending on control signals (e.g., a voltage) received by the motor. For example, a user might manipulate a control to vary a level of resistance produced by the resistance motor to correspond to an amount of weight (e.g., "digital weight") needed to be overcome by muscles during performance of a weight-bearing exercise. A resistance motor may be associated with at least one processor configured to control a level of electrical current flowing therethrough, allowing the at least one processor to control attributes associated with resistance or digital weight produced by the resistance motor. Such resistance or digital weight may be applied to the first tension cable.

A brushless DC motor (BLDC motor) is one non-limiting example of a motor that can be used to provide resistance. Such a motor may be integrated into the resistance mechanism of the exercise equipment, such as through a flywheel or pulley system. In some embodiments, the resistance motor is can be adjusted electronically. By varying the voltage or current applied to the motor, the resistance level can be adjusted. An electronic motor controller may receive input signals via a user interface or smart gym system and regulate the motor's speed and torque output accordingly. This allows users (or a program) to select and adjust the desired resistance level during workouts and provide users with different workout intensities.

In some embodiments, the exercise equipment includes a spool associated with the electronically-adjustable weight resistance motor. A spool refers to a rounded or cylindrical device used for winding or unwinding a cable, band, rope, or other elongated structure. It may include, for example, a central core and flanges on either end to hold the wound material in place. In disclosed embodiments that employ a cable, for example, the cable may be wound on the spool and the electronically-adjustable weight resistance motor may be configured to exert rotational resistance on the spool. Rotational resistance also known as torque, refers to the force or resistance encountered when trying to rotate the spool. For example, a user may exert a rotational force on the spool by pulling a cable wound around the spool, and a motor connected to the spool may exert a counter rotational force.

FIG. 4 is a perspective view containing an exemplary resistance motor 140 connected to spool 218 via belt 220.

Resistance motor 140 may include wiring connected to a power source (not shown), and one or more permanent magnets of resistance motor 140 may produce a magnetic resistance (e.g., impedance) resisting a rotation of axle 212. At least one processor or controller may control characteristics of a current or voltage flowing through the wiring to thereby control characteristics of the magnetic resistance produced by resistance motor 140 and resisting a rotation of axle 212. The at least one processor or controller may adjust the characteristics based on a program or by input from a user via one or more interfaces on electronic exercise machine 200, or via commands input via a mobile communications device (not shown).

In FIG. 4, belt 220 may wrap around axle 212 and spool 218 to thereby connect spool 218 to axle 212 of resistance motor 140. A first end of cable 206 may be fastened to spool 218, and a first length of cable 206 may be wound around spool 218. A second length of cable 206 may run through wall-mountable electronic exercise machine 200, through pulley system 208, and exit from a distal end of arm 212. A second end 234 of cable 206 may exit from arm 212 and may be connected to exercise accessory 222, such that manipulating exercise accessory 222 may pull on cable 206, and impose a rotational force (e.g., a torque) on spool 218 and axle 212 via belt 220. The torque imposed on spool 218 by manipulating exercise accessory 222 may be at least partially resisted by axle 212 due to the magnetic resistance produced by resistance motor 140. While a belt 220 is illustrated, in other embodiments, the spool 218 could be directly connected to the shaft 212 of the motor 220 or connected to the motor shaft 212 through gears.

As illustrated in FIG. 2A, T-shaped wall-mounted gym 200 may include a frame (e.g., wall mounted beam 202) for accommodating a pulley system 210. Wall mounted beam 202 may be associated with pulley system 208 located inside upper bracket (see FIG. 8) for attaching the upper part of wall mounted beam 202 to a wall stud. T-shaped wall-mounted gym 200 may include an electronically-adjustable weight resistance motor 140 connected to lower bracket 230 for attaching the lower part of the frame to a wall stud. Wall-mounted gym 200 may include a spool 218 associated with the electronically-adjustable weight resistance motor 140 such that electronically-adjustable weight resistance motor 140 may exert rotational resistance on spool 218. For example, spool 218 may be associated with motor 140 via a belt 220, allowing motor 140 to exert rotational resistance on spool 218.

In some embodiments, the exercise equipment includes a cable having a first end connected to the spool and extending through the pulley. A cable may be a tension cable as described herein, and may include a rope, cord, chain, belt, and/or any other band or cordage having a tensile strength for withstanding repeated applications of tension. Depending on overall design, the tension cable may include a plurality of fibers (e.g., stainless and/or galvanized steel) that may be combined and twisted to form an elongated structure, and may optionally include a coating such as nylon and/or PVC to reduce friction and wear. In some embodiments, a cable may have a tensile strength suitable for withstanding a resistance force associated with a resistance motor of an electronic exercise machine. For instance, a first end of a cable may be operatively connected to a resistive motor (i.e., via a spool), and a second end of the cable may connect to a handle for enabling a user to exert a force on the cable. The cable may extend a moveable arm of an electronic exercise machine, allowing for a mechanical force applied to move the arm to be at least partially resisted by the resistive motor. As discussed previously, cable 206 in FIG. 4 is one example of a tension cable. One end of cable 206 may be connected to spool 218, and may be threaded through an exercise machine to an accessory such as accessory 222 in FIG. 2A such that force applied to cable 206 via accessory 222 will be resisted by motor 140. As further shown in FIG. 2A, cable 206 may extend through the pulley such as pulley system 208.

FIG. 4 is an illustration of exemplary resistance motor 140 of wall-mountable electronic exercise machine 200, consistent with some embodiments of the present disclosure. Resistance motor 140 may include wiring connected to a power source (not shown), and one or more permanent magnets of resistance motor 140 may produce a magnetic resistance (e.g., impedance) resisting a rotation of axle 212. At least one processor or controller may control characteristics of a current or voltage flowing through the wiring to thereby control characteristics of the magnetic resistance produced by resistance motor 140 and resisting a rotation of axle 212. The at least one processor or controller may adjust the characteristics based on a program or by input from a user via one or more interfaces on electronic exercise machine 200, or via commands input via a mobile communications device (not shown).

In some embodiments, the exercise equipment includes at least one controller, electrically connected to the electronically-adjustable weight resistance motor. A controller refers to any electronics that manages or regulates operation of any portion of the equipment. In one example, a controller may be a processor. In another example, a controller may be a variable resistor or a logic circuit. The controller may be configured to control the resistance applied by a resistive element in the exercise machine. For example, in FIG. 1B, a controller 101 is connected to motor 140 to regulate resistance. The controller may be connected to motor 140, e.g., via one or more wires and/or cables, and/or a wireless communications link (e.g., WiFi or Bluetooth). Although memory 160 and I/O 170 is illustrated in FIG. 1B, in a broadest sense, the processor alone may be considered a controller. And although FIG. 1A illustrated control circuit 101 as with many components, this is but one example and is not intended to limit the interpretation of a controller, which as stated can be a single component or any group of components that provides a control function, such as the block diagram of controller 101 illustrated in FIG. 1B.

In some embodiments, the controller is configured to output a first set of signals for altering resistance applied to the cable via the spool connected to the electronically-adjustable weight resistance motor. The first set of signals may alter the resistance applied by the resistive motor to the spool (e.g., by increasing or decreasing resistance), thereby applying resistance to the cable attached to the spool. The first set of signals may be output based on a received input, command, or instruction from a program or from a user.

In some embodiments, the exercise equipment includes a rotatable and axially movable dial. The dial may be located at a location on a frame of the exercise equipment machine, and may protrude from the frame. In other embodiments, the dial may be substantially flush to the front surface of the frame. A dial is a control mechanism that is typically round in shape, although the disclosed embodiments are not limited to any particular shape of dial. The dial may include a graspable portion that can be manipulated by a user. For example, the dial may have a perimeter designed for a user to grip the dial with one or more fingers of a single hand, to rotate at least a portion of the dial. In some embodiments, the dial may have multiple axes of manipulation and control.

For example, the dial may rotate about an axis extending through the center of the dial and perpendicular to the exercise machine, similar to turning a knob. The dial may be axially movable in addition to rotation, to enable a greater level of control over the exercise equipment using a single hand and single dial. "Axially moveable" encompasses any type of movement other than rotation. In some embodiments, the dial may move axially along the rotation axis when pressed by a user, so that the dial acts as a button. In some embodiments, the dial may be axially moveable in one or more directions parallel to the exercise machine, such as by sliding or tilting leftward, rightward, upward, and downward. Additional or fewer axes of movement and manipulation may be contemplated depending on the desired level of control, capabilities of the dial, and simplicity of the user-machine interface. In some embodiments, the dial may rotate about an axis, and may not move axially.

The dial may provide signals to the controller indicative of inputs or manipulations by a user. In some embodiments, the controller may interpret different manipulations or patterns of manipulations as an intent to control different functions. For example, the controller sequential presses of the dial may change the control function, and subsequent dial rotations may alter parameters of that function. A display on the dial may indicate a current selected function. Additionally or alternatively, the dial may control a first function in response to the user rotating the dial slowly, and may control a second function in response to the user rotating the dial quickly, above a predetermined rotation rate threshold. The controller may control one or more functions based on other detected patterns or speeds of manipulating the dial.

Referring to FIG. 2A, exercise equipment 200 includes a dial 216 located on a front side of a vertical wall-mountable beam 202. In some embodiments, dial 216 may protrude from a front surface of exercise equipment 200 The dial is located at a suitable height and position on beam 202 to allow for easy reach and manipulation by a user. FIG. 2E shows an example of exercise equipment machines 200A and 200B in a H-configuration with T-bar 204. As shown, each of exercise machines 200A and 200B may have its own dial 216A and 216B, respectively. This configuration may result from pairing modular exercise machines that are identical or near-identical. In some embodiments, a simplified version of exercise machine 200 may omit a dial, so that a H-configuration may include two exercise machines but only one dial located on one of the two exercise machines of the H.

In some embodiments, the dial rotation is configured to alter the first set of signals thereby changing a resistive force on the cable. A level of resistance produced by a resistance motor may correspond to an amount of resistive force or weight (e.g., "digital weight") needed to be overcome by muscles during performance of a weight-bearing exercise. A resistance motor may be associated with at least one processor configured to control a level of electrical current flowing therethrough, allowing the at least one processor to control attributes associated with resistance or digital weight produced by the resistance motor. Such resistance or digital weight may be applied to the first tension cable. By rotating the dial in a first direction, such as clockwise, a user may change the resistive force to a higher or lower amount. By rotating the dial in the opposite direction, such as counter-clockwise, the user may change the resistive force in the opposite direction. Thus, the user may be able to "dial-in" an amount of digital weight, causing the controller to send a first set of signals to one or more resistive motors that apply resistance to one or more tension cables. In some embodiments, a single dial may automatically cause a controller or one or more processors to output signals to the resistance motors of both paired exercise machines in a paired setup, thereby providing single-handed control of both motors with the same dial. Indeed, although examples discussed herein relate to a dial controlling a resistive force applied by one resistance motor to a tension cable, in some embodiments, the at least one controller and the dial are configured to simultaneously manipulate an additional electronically-adjustable weight resistance motor of an additional piece of exercise equipment. An additional weight resistance motor of an additional piece of exercise equipment may include, for example, a second exercise machine that is paired with a first exercise machine (e.g., units paired in FIG. 2E.) In some embodiments, the at least one controller and dial may be configured to control one or more device that are paired or communicatively associated with the exercise equipment, such as one or more accessories or peripheral devices to the exercise equipment.

In some embodiments, a function associated with dial rotation may change depending on mode selection, e.g., depending on which mode is currently selected, rotating the dial may manipulate different functions of the exercise equipment. In some embodiments, the dial is configured to act as a switch for powering-on the exercise equipment. For example, when the exercise equipment is powered off, a user may manipulate the dial to power on the exercise equipment. By rotating, pressing, or manipulating the dial in another manner, the user may toggle the exercise equipment from a standby or dormant state to a powered and operational state.

In some embodiments, the dial includes a display on a face thereof, and the display is configured to provide visual feedback. Visual feedback can include any information about the exercise equipment, the user's performance, equipment settings, a current exercise session, and any other information relevant to disclosed embodiments. Visual feedback may include one or more navigating menus included in a user interface for the exercise equipment.

Figure 2H:
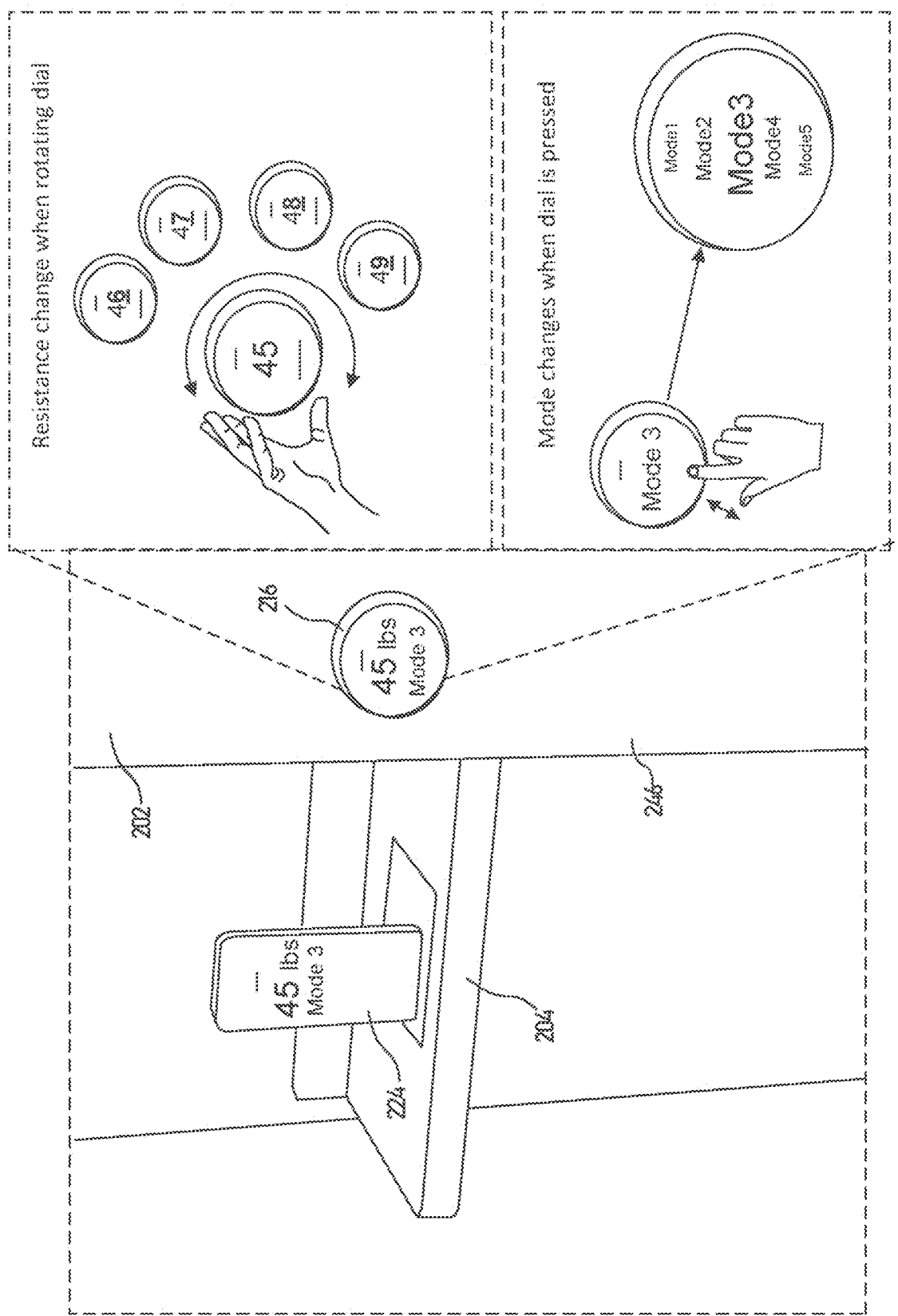
FIG. 2H include close-up perspective views of user interfaces including dial functions of an electronic exercise machine, consistent with some embodiments of the present disclosure.

Referring to FIG. 2G, an example of a dial 216 is shown having a display that provides a current resistance level setting. In the example shown, a resistance level of "45" is displayed. The displayed value may correspond to an amount of digital weight in pounds or kilograms, or a percentage of a maximum resistance level, or another value on a preset scale of resistance levels. As shown in FIG. 2H, dial 216 may be rotatable. When a user rotates dial 216 in a first direction, the dial rotation may alter the resistance level setting, as shown in the upper right hand of FIG. 2H. As a result, a controller in communication with dial 216 may alter a first set of signals that are sent to resistance motors such as resistance motors 140 in FIG. 2E, thereby changing the resistance level of the exercise.

In some embodiments, the controller is configured to output a second set of signals for altering a mode of operation of the electronically-adjustable weight resistance motor. The second set of signals may correspond to a different aspect of the exercise equipment than the first set of signals. For example, the second set of signals may be associated with a different user input or program command than the first set of signals. The second set of signals may additionally or alternatively be associated with a different setting of the exercise equipment. For example, in some embodiments, axial movement of the dial alters the second set of signals thereby changing the mode of operation of the electronically-adjustable weight resistance motor. A mode of operation may refer to a way in which the exercise machine works. In some embodiments, modes of operation may change the way one or more resistance motors provide resistance during an exertion. These modes of operation may include, for example, an elastic band mode, an eccentric mode, and a chains mode, consistent with the details of those modes as described herein. Modes of operation may also refer to different exercise programs, types of exertions, free/open workouts versus predefined exercise schedules, a challenge mode, and other modes that vary the exercises and levels of exertion during a workout session in various ways.

With reference to FIG. 2E, one or more of dials 216A or 216B may be axially movable. For example, dial 216A may be pressed to enter a program mode or mode of operation. In some embodiments, after entering a program mode, dial 216A may be rotated or slid sideways, up, or down to select a desired program or other mode of operation. In some embodiments, rotation of dial 216A and/or 216B may cause a change in a mode of operation. In such embodiments, a user may rotate the dial to alter characteristics other than a resistance level. For example, a user may rotate the dial in one direction to change resistance, and in a second different direction to change mode of operation. As another example, rotating the dial below a threshold rotation speed may change a resistance level, whereas rotating the dial above the threshold rotation speed may change a mode of operation, and vis versa.

In some embodiments, the display included in the dial includes a touch screen. A touch screen is a display device that allows users to interact with the exercise equipment by directly touching the screen with one or more fingers. A processor of the exercise equipment may receive input to modify a device setting or exercise parameter via a control on the exercise equipment dial. For instance, a user may provide input via a touch screen either on the dial or which replaces the dial altogether. Additionally or alternatively, the touch screen of a mobile communications device paired to the exercise equipment may be used for controlling the exercise machine. In some embodiments, the touch screen of a paired mobile communications device may mirror the information displayed on the dial display, and may function as an additional or alternative touch screen interface for the exercise equipment.

In some embodiments, the display may provide information such as one or more lists of options, menus, settings, icons, or other graphical elements, and allow a user to select a displayed item by direct touch, alternatively or in addition to physical movement of dial 216. As a non-limiting example, FIG. 2H shows a dial 216 that is axially movable and rotatable. If a user presses the dial 216 (an example of axial movement), a display on the face of dial 216 may display several items for selection, such as a list of operational modes as illustrated. If the display of dial 216 is a touch screen, a user may simply touch a portion of the touch screen corresponding to a desired selection.

In some embodiments, the second set of signals for altering the mode includes signals for initiating at least two of an elastic band mode, an eccentric mode, a chains mode, and a vibration mode. Each of the modes of operation may correspond to a different pattern of resistance levels on the motor and applied to a cable as the user performs a repetition, such that the resistance is different at different points of the user's range of motion. In an elastic band mode, the controller may cause the first and/or second resistance motor to increase resistance as the user progresses through the range of motion, to simulate the feeling of pulling an elastic band. For example, as the user pulls the cable, resistance may be increased gradually to 1.5× the starting resistance at the top of the user's range of motion in concentric phase of the movement. The increase in resistance in all modes may be linear or non-linear. In the eccentric mode, resistance may be increased in the eccentric phase of the user's movement. In eccentric mode, the controller may cause the first and/or second resistance motor to increase resistance immediately after the equipment detects that the user has reached their maximum range of motion in the concentric phase, so that the resistance level of the eccentric phase is greater than the resistance applied during the concentric phase. A chains mode may involve a gradual increase in resistance during the concentric phase, followed by a gradual decrease in resistance during the eccentric phase. Chains mode may simulate the clickety-clack feeling of a real chain connected to the load and moving over the pulleys. Additionally or alternatively, the chains mode may simulate the lifting of a chain attached to a weight, where most of the chain is initially laying on a surface (e.g., the floor) and provides no material resistance. As the user lifts the weight, links of the chain lift off the floor and add resistance to the weight. At the user's peak range of movement, several chain links have lifted off the floor, and the weight is at a maximum value. As the user lowers the weight, the simulated chain links return to the floor and decrease the overall resistance applied to the user. A vibration mode may involve the first and/or second resistance motors applying vibrations to the first and/or second cables, by oscillating at a certain frequency and amplitude. By vibrating the cable, a user may experience a greater workout of muscle groups used for balance and stabilization.

In some embodiments, the controller is configured to enable a function of dial rotation to change depending on mode selection. In a first mode, the rotation of the dial will change a variable associated with the first mode, and in a second mode, rotation of the same dial will change a different variable associated with the second mode. For example, if the first mode is a resistance mode, turning the dial will alter the resistance. If the second mode is a simulation mode, turning the dial may switch between the simulations discussed in the preceding paragraph.

In some embodiments, the controller may enable different functionalities of the dial depending on a selected operational mode among the elastic band mode, an eccentric mode, a chains mode, and a vibration mode. Whereas the dial may be configured to change the resistance level during a normal mode of performing a regular exertion, the controller may enable different functions of the dial rotation in other operational modes. For example, while in one of the additional operational modes, a base resistance level may remain constant, and dial rotation may be configured to alter a maximum increase (or delta) in resistance level during exertions in the operational modes. As another example, dial rotation may be configured to alter a maximum resistance level in the operational modes, and the controller may calculate the delta accordingly. As another non-limiting example, dial rotation may be configured to change an intensity of vibrational force applied to the tension cable in the vibration mode.

In some embodiments, the dial provides haptic feedback to the user. Haptic feedback is a tactile response, such as vibrations or other forces transmitted to the user through the dial. The dial may include one or more components that produce a force that can be felt by the user, such as a vibration, tap, click, or other suitable touch-based types of feedback. The dial hardware may include one or more actuators, motors, or piezoelectric devices capable of creating a physical force associated with the haptic feedback. In some embodiments, haptic feedback may enhance a user's experience by appealing to the user's senses, providing a more immersive experience, and substantiating the user's manipulation of the dial. For example, the dial may provide a "click" or "tap" haptic feedback as a user rotates the dial, to simulate the effect of the dial clicking as the dial causes selection of different resistance levels or items from a displayed list. As another example, the dial may vibrate in response to a particular manipulation of the dial, such as a press of the dial that causes selection of a displayed item.

In some embodiments, the dial includes one or more lights that provide feedback or indications to the user. For example, example, illuminations may be provided around the perimeter front face of the dial-like hour or minute markings on a watch face. The perimeter lights may illuminate corresponding to rotation of the dial, or corresponding to a characteristic of the displayed information. In other embodiments, more simple illuminations such as LEDs may provide feedback.

In some embodiments, the dial includes a backlight configured to communicate feedback. The backlight may be backlighting to the display within the dial. For example, the entire face of the dial may change appearance in brightness, light intensity, or color, to covey information and feedback to a user. In some embodiments, feedback could be associated with a resistance level of an exertion, a performance level of the user, a warning or notification to the user, a praise or reward to the user, and any other suitable type of information to provide to the user. Additionally or alternatively to the appearance of the dial face, the backlight may illuminate the edge of the dial, or illuminate behind the dial perimeter, thereby providing an illuminated glow around the dial to provide feedback to a user consistent with the examples discussed above. For example, when a press of the dial is recognized, a flash of the backlight may signal the recognition.

Some embodiments may include an antenna associated with the at least one controller the antenna for enabling at least one of transmission of control signals to the at least one controller or transmission of exercise data to a remote device. An antenna is a device used in telecommunications and radio systems to transmit or receive radio frequency (RF) signals. It is designed to convert electrical signals into electromagnetic waves. An antenna may enable exercise equipment to communicate with one or more of a mobile communications device or a router. The antenna may be configured for radio communication protocols, including Wi-Fi, NFC, Bluetooth, or any other communications protocol. In some embodiments, multiple antenna may be employed for differing communications protocols. The antenna may permit transmission of exercise data to a remote device, such as a server. This may occur through intermediate local devices such as the user's paired mobile communications network or through a local router. In this way, a remote server may track a user's progress and/or a user may be enabled to engage in challenges or to be monitored by a trainer. In some embodiments, the at least one controller is configured to communicate with a mobile communications device via the antenna, such that manipulation of the dial causes a change in display on the mobile communications device. When a user's mobile communications device is paired with the exercise equipment, the rotation or axial movement of the dial cause signals to be sent to the mobile communications device via the antenna. In this way, manipulations of the dial may change a display on the user's mobile communications device. By way of example, with reference to FIG. 2H, when a user dials a weight of 45, that same weight may appear on the user's cell phone or other mobile communications device 224 as a result of a wireless connection through an antenna in the exercise equipment. Alternatively, the cell phone may be connected via a cable to the exercise equipment. In some embodiments, the mobile communications device may be used to receive control inputs. When the user manipulates one or more buttons or user interface elements of a mobile communications device, the dial of the exercise equipment may reflect the manipulations and display updated equipment settings.

More generally, if a mobile communications device such as a smartphone is in communication with the exercise equipment, a display of the mobile communications device may display information reflecting the operational parameters of the exercise equipment. In some embodiments, the mobile communications device may display changes to the equipment parameters entered using the interface of the exercise equipment. For example, the mobile communications device may display a resistance level associated with one or more tension cables of the exercise equipment, or an operational mode. Information displayed on the mobile communication device may be transmitted from the exercise equipment controller to the mobile communications device, via a communication interface such as an antenna.

In some embodiments, the at least one controller is configured to transmit, via the antenna, a resistance change or a mode change from the dial, for display on the mobile communications device. As discussed above, a controller may transmit, via the antenna, a resistance change or mode change from manipulation of the dial (such as dial 216), for displaying on mobile communications device, allowing the user to view settings for the exercise equipment via the mobile communications device. When machines are paired such as is illustrated in FIG. 2E, manipulation of either dial 216A or 216B may cause simultaneous changes on a display of the other dial and on the display of any paired mobile communications device.

In some embodiments, the at least one controller is configured to learn usage patterns of a user and to alter available modes of operation based on the learned usage patterns. In the context of the disclosed embodiments, a smart controller such as one that employs artificial intelligence, may employ machine learning techniques to analyze and understand how users interact with the exercise equipment over time. For example, the controller may collect data about user interactions and behavior. This can include inputs, commands, settings, preferences, and usage patterns. For example, it can record which buttons or controls are pressed, and which settings or modes are selected, the frequency of certain actions, and the sequences of operations performed by the user. The collected data can be preprocessed to clean and transform it into a suitable format for analysis. This step may involve filtering out irrelevant or noisy data, normalizing or scaling values, and structuring the data for further processing. Relevant features or characteristics may be extracted from the preprocessed data. These features can be specific actions, patterns, or contextual information that capture important aspects of user behavior. For instance the controller may learn the duration modes and resistance are employed, time intervals between actions, and/or the sequence of actions.

A machine learning model, such as a classification or clustering algorithm, may be trained using the extracted features and labeled data. The labeled data provides information about how certain usage patterns or behaviors are categorized or classified. The model learns to recognize and predict similar patterns or behaviors based on the input features. Once the model is trained, it can analyze new data and identify usage patterns based on the learned knowledge. This can involve recognizing common sequences, predicting user actions, or identifying anomalies or deviations from established patterns. As the controller continues to collect more user data, the machine learning model can adapt and refine its understanding of usage patterns. It can update its knowledge and predictions based on new information, improving its accuracy and responsiveness to user behavior. By continuously analyzing and learning from user interactions, the controller can adapt to individual users' preferences and provide a personalized experience. This can lead to features like predictive suggestions, customized settings, or intelligent automation based on the recognized usage patterns.

The controller may associate different usage patterns with different modes of operation using one or more stored rule sets, lookup tables, or other associative database links. In some embodiments, a redefined rule set may associate a first mode of operation with a first usage pattern, and a second mode of operation with a second usage pattern. For example, if usage data indicates that a user is proficient at a particular exercise by determining that the user performs repetitions at a particular resistance level very quickly and without struggling, the controller may automatically toggle a chains or elastic band mode of operation, to cause the resistance level to increase throughout the concentric phase of the movement. In this scenario, chains mode may force the user to work harder to complete a repetition, thereby enhancing the user's strength and fitness level over time. As another example, if the controller determines that a user consistently struggles to complete the concentric phase of an exertion, by moving slowly or with excessive hesitation during the concentric phase, then the controller may automatically toggle an eccentric mode of operation and set a lower resistance level during the concentric phase than during the eccentric phase of the movement.

One or more machine learning models may be trained with an initial set of training data prepared based on a particular user's information, or based on information associated with a plurality of known or anonymous users. One or more processors of the exercise equipment or of a remote server in communication with the exercise equipment may continuously refine and update the machine learning model (s) based on subsequent usage pattern information, to refine and update hyperparameters of the machine learning model (s). In some embodiments, such usage pattern information may include data about how frequently a user works out, which exercises the user performs, resistance levels for each exercise, proficiency in performing the exercises, time between repetitions of an exercise, an amplitude of a range of movement for each exercise or each repetition of an exercise, a speed or power level of repetitions performed for a particular exercise, and any other information that may be sensed or calculated based on information gathered about the user's performance during an exercise session.

In some disclosed embodiments the at least one controller is configured to receive from the mobile communications device via the antenna an input configured to change at least one of a mode or a resistive force on the cable. For example, a touchscreen, one or more buttons, or a microphone of the mobile communications device may receive an input associated with a command to change a resistive force of a tension cable or change an operational mode of the exercise equipment. A processor of a controller in the exercise equipment may receive information associated with the inputted command, and may effectuate a corresponding change of the exercise equipment parameters.

In some embodiments, the mobile communications device may act as a supplemental control interface for the exercise equipment. In some embodiments, the mobile communications device may operate as the primary control interface for the exercise equipment. In some embodiments, the at least one controller is configured to alter information on a display interface of the dial based on the received input. That is, a display on the dial, such as a display within dial 216 as illustrated in FIGS. 2G and 2H, may change the displayed information based on input received from a mobile communications device. For example, if a controller receives a transmission from a mobile communications device associated with increasing a tension cable resistance level, information displayed on dial 216 may be altered to reflect the change initiated by the mobile communications device. With reference to the top right side of FIG. 2H, the display on the face of dial 216 may present an increased resistance level number corresponding to the value input on the mobile communications device.

Referring to FIG. 7A, a control circuit 101 of exercise equipment may include a network interface 106, which may include one or more antennas for communicating wirelessly. FIG. 7A is not meant to be limiting in configuration or selection of components. Although the example illustrated in FIG. 7A shows interface 106 as being part of controller 100, in some embodiments network interface 106 including one or more antennas may be separate components from controller 100. Alternatively, the exercise equipment may be configured to communicate with a user's mobile communications device which itself may provide the network interface.

With reference to FIG. 3, electronic exercise equipment 200 and mobile communications device 224 may communicate via a communications network 306. In some embodiments, communications network 306 may include a dedicated communications network, such as a WiFi communications channel connection mobile communications device 224 with at least one processor of electronic exercise machine 200.

Some disclosed embodiments include a method for controlling electronic exercise equipment. Steps of the disclosed method may be associated with the system operations and functions previously discussed. Control may involve the use of one or more user interface elements of the exercise equipment itself, such as a multifunction dial or a touch screen. In some embodiments, control may involve a remote device in communication with the exercise equipment, such as a mobile communications device in wireless communication with the exercise equipment.

Figure 15:
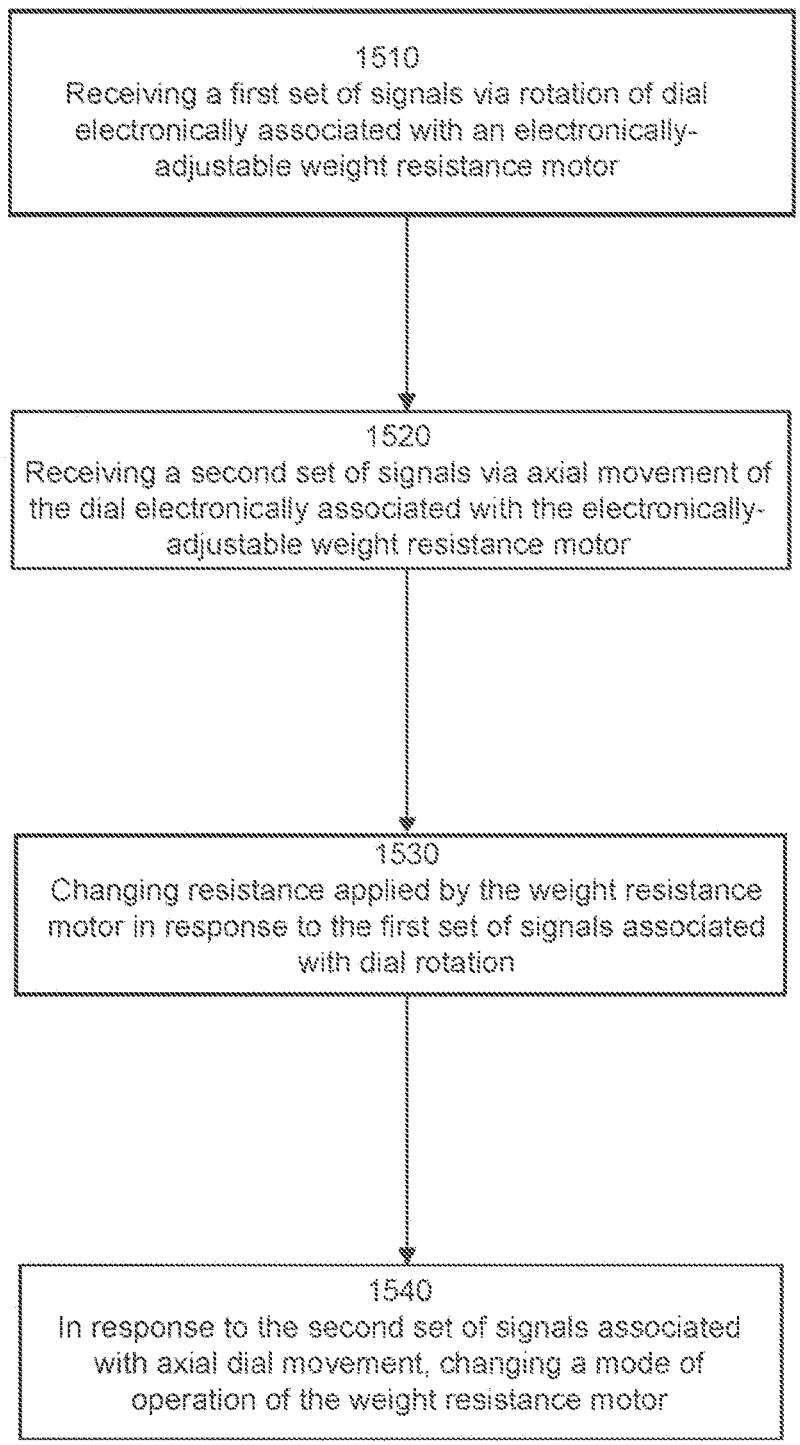
FIG. 15 is a flowchart of an exemplary method of controlling an electronically-adjustable weight resistance motor of exercise equipment, consistent with some embodiments of the present disclosure.

FIG. 15 is a flowchart illustrating an exemplary method of controlling an electronically-adjustable weight resistance motor of exercise equipment, consistent with some disclosed embodiments. In some embodiments, code with instructions for causing one or more processors to perform operations set forth in the steps in the block diagram of FIG. 15 may be stored in a non-transitory computer readable medium. Operations may be performed based on instructions executed by, for example, at least one processor such as processor 112 of FIG. 1A, alternatively illustrated as processor 150 in FIG. 1B. It is to be understood that the flowchart in FIG. 15 (or any of the other flow charts) is non-limiting and is not intended to require any particular order of operations. Some embodiments may include additional or fewer steps than those displayed in FIG. 15. Furthermore, some embodiments may involve a different order of one or more steps of FIG. 15, and the order of steps illustrated in FIG. 15 is not meant to be limiting.

In some embodiments, a first set of signals is received via rotation of a rotatable and axially movable dial electronically associated with an electronically-adjustable weight resistance motor. The first set of signals may correspond to rotational movement of the dial. The dial may be rotated by a user during operation of the exercise equipment. This process step is reflected in block 1510 in FIG. 15.

In some embodiments, a second set of signals is received via axial movement of the dial electronically associated with the electronically-adjustable weight resistance motor. The second set of signals may be associated with movement of the dial that is other than the rotational movement discussed above. In some embodiments, the dial may be configured only to rotate, and may not have the capabilities of performing other types of movement such as axial movement. This process step is reflected in block 1520 in FIG. 15.

In some embodiments, in response to the first set of signals associated with dial rotation, resistance applied by the weight resistance motor is changed in response to the first set of signals associated with dial rotation. The first set of signals may also be associated with an operational characteristic of a weight resistance motor, such that the first set of signals affects a resistance level that the resistance motor imparts on a tension cable of the exercise equipment. This process step is reflected in block 1530 in FIG. 15.

In some embodiments, in response to the second set of signals associated with axial dial movement, a mode of operation of the weight resistance motor is changed in response to the second set of signals associated with axial dial movement. In embodiments of the exercise equipment that are configured with a dial that is both rotatable and axially movable, the second set of signals may effectuate a change of the exercise equipment settings different than changing a resistance level of the resistance motor. The second set of signals may instead change an operation mode of the weight resistance motor, consistent with disclosed embodiments. This process step is reflected in block 1540 in FIG. 15.

Some disclosed embodiments involve modular electronic exercise equipment. Modular exercise equipment includes separate units that can be used alone or in combination with other units. For example, a piece of modular exercise equipment may be used in a standalone mode or can be connected or paired with another unit to create a two-module exercise equipment setup. The modules may be physically connected and/or electronically connected such as through wireless pairing of the modules using one or more wireless communication interfaces. Therefore, while modules may be physically connected, a physical connection is not necessary. Depending on design constraints more than one module may be mounted on a common surface such as a wall or a floor. The mounting may be permanent or temporary. By way of one example, FIG. 2E illustrates two modules 200A and 200B. In this example, each module is capable of operating as a standalone unit, however in the illustrated installation they are co-mounted on a common wall for usage together. Although they may be used together in the modular arrangement, they may also be used individually, depending on design constraints and particular exercises performed.

Some disclosed embodiments involve a first resistive exercise machine. A resistive exercise machine in this context includes equipment having electrical components for creating resistance to exertions by a user. Resistance may be provided by one or more electrically controlled elements. For example, electronic exercise equipment may use one or more electric resistance motors to create resistance for a user to overcome in performing an exercise. As an example, a resistance motor that uses electricity to regulate a magnetic field may apply resistance to an attached cable, such that the user must overcome the resistance force to move the cable and complete a repetition of an exercise. By way of non-limiting example, FIG. 4 illustrates a resistive motor 140 that drives a spool 218 for cable 206. The motor 140 applies a rotational resistive force on the spool 218, which transfers that resistive force to the cable 206 to which a user pulls in performing an exertion.

In some embodiments, the first resistive exercise machine may include a first housing. A housing is an outer casing or enclosure. The casing or enclosure may be partial or complete. For example, a housing may have openings therein or have open sides. Depending on design configuration, the housing may be designed to accomplish one or more of the following functions: protection of internal components, mounting or securing of internal components, and/or providing structural integrity. The housing may also contribute to the aesthetics of the exercise equipment and contribute to the look and feel of the device. Consistent with the present disclosure, a housing (e.g., motor housing) may include a rigid casing or enclosure encasement configured to protect equipment (e.g., a motor). A housing may be made of any durable material, such as metal, plastic, and/or resin. In some embodiments, a housing may include one or more vents, gaps, or holes to enable dissipation of heat. In some embodiments, a housing may include an opening therein for a power cable to connect to a power source (e.g., an electrical wall outlet and/or a battery). By way of non-limiting example, FIG. 4 illustrates a portion of housing 228. In this example, housing 228 provides support for motor 140.

Some disclosed embodiments involve a first tension cable. A tension cable may include a rope, cord, chain, belt, and/or any other band or cordage having a tensile strength for withstanding repeated applications of tension. Depending on overall design, the tension cable may include a plurality of fibers (e.g., stainless and/or galvanized steel) that may be combined and twisted to form an elongated structure, and may optionally include a coating such as nylon and/or PVC to reduce friction and wear. In some embodiments, a cable may have a tensile strength suitable for withstanding a resistance force associated with a resistance motor of an electronic exercise machine. For instance, a first end of a cable may connect to a resistive motor and a second end of the cable may connect to a moveable arm of an electronic exercise machine, allowing for a mechanical force applied to move the arm to be at least partially resisted by the resistive motor. As discussed previously, cable 206 in FIG. 4 is one example of a tension cable. Cable 206 may be threaded through an exercise machine to an accessory such as accessory 222 in FIG. 2A such that force applied to cable 206 via accessory 222 will be resisted by motor 140.

In some embodiments, the first resistive exercise machine may include a first resistive motor, in the first housing and connected to the first tension cable for applying a first resistance on the first tension cable. A resistance motor refers to a motor that applies a resistive force. Such a motor may include a one or more electromagnets configured to apply a variable electromagnetic field as resistance. For example, a level of resistance produced by a resistance motor may correspond to an amount of weight (e.g., "digital weight") needed to be overcome by muscles during performance of a weight-bearing exercise. A resistance motor may be associated with at least one processor configured to control a level of electrical current flowing therethrough, allowing the at least one processor to control attributes associated with resistance or digital weight produced by the resistance motor. Such resistance or digital weight may be applied to the first tension cable.

A brushless DC motor (BLDC motor) is one non-limiting example of a motor that can be used to provide resistance. Such a motor may be integrated into the resistance mechanism of the exercise equipment, such as through a flywheel or pulley system. By varying the voltage or current applied to the motor, the resistance level can be adjusted, providing users with different workout intensities. A motor controller may receive input signals via a user interface integrated, paired or otherwise associated with the exercise machine, or smart gym system and regulate the motor's speed and torque output accordingly. This allows users (or a program) to select and adjust the desired resistance level during workouts.

With reference to FIG. 2A, in some embodiments, the first resistive exercise machine may be a wall-mountable electronic exercise machine 200. In some embodiments, the first resistive motor may be positioned in the first housing and connected to the first tension cable for applying a first resistance on the first tension cable. In the illustrated example, a resistive motor such as resistive motor 140 may be positioned in housing 228 and connected to the cable 206 for applying a resistance on the cable 206 through spool 218 and belt 220. With reference to FIG. 2E, a first instance of T-shaped wall-mounted gym 200A may include (e.g., motor) housing 228, tension cable 206 and resistive motor 140 (not shown). Resistive motor 140 in housing 228 may be connected to tension cable 206A for applying a resistance on tension cable 206A.

In some embodiments, the first resistive exercise machine may include a user interface. A user interface refers to the means by which a user interacts with the machine (e.g., software or electronics). A user interface may include anyone or more user inputs, an electronic display, a touch-sensitive screen, a microphone, a speaker, a haptic interface, a light emitting diode (LED), one or more adjustable dials, knobs, buttons, switches, and/or levers and/or any other type of manipulatable control enabling user inputs and/or information display. For example, a user may provide one or more inputs via a user interface associated with an electronic exercise machine to initiate, select, modify, share, and/or terminate an exercise routine. Such an interface may initiate signals to at least one processor associated with an electronic exercise machine. In a similar manner, the at least one processor may transmit one or more signals to convey information via a user interface to a user of an electronic exercise machine. In the example of FIG. 2A, a dial 216 may be provided as a user interface. The dial may be both rotatable and pushable to provide user interface functions and may include a display in a central portion thereof.

In some embodiments, the first resistive exercise machine may include a pairing interface. A pairing interface may be a physical or wireless link. For example, the pairing interface may be a wired interface or a wireless interface. The pairing interface may enable the first resistive exercise machine to be selectively paired with a second resistive exercise machine. In some embodiments, the pairing interface may be part of the first resistive exercise machine, a second resistive exercise machine, or both. In other embodiments involving more than two modules, any one or more of the modules may include a pairing interface. In some embodiments, the pairing interface may be integrated into a module, and in other embodiments it may be an add-on component that is neither part of the first resistive exercise machine nor part of the second resistive exercise machine. In some embodiments, the pairing interface may take various forms. In some embodiments, the pairing of multiple resistive exercise machines may be performed by a mobile communications device running one or more applications. In some embodiments, the paired resistive exercise machines may be fully controlled by the mobile communications device.

In some disclosed embodiments the pairing interface enables the first resistive exercise machine to be selectively paired with a second resistive exercise machine having a second housing, a second tension cable, and a second resistive motor for applying a second resistance on the second tension cable. A second resistive exercise machine may be identical in structure to the first resistive exercise machine, may be a mirror image of the first resistive exercise machine, or may have a different structure.

This may enable, in some instances, a single user interface to control two exercise equipment units. For instance, the single user interface may be provided by a software application configured with a mobile communications device and/or at least one of the exercise equipment units (e.g., via a dial configured with an electronic screen). In this way, using a single interface, be it the cell phone or a control on either unit, the weight resistance on both units may be altered. In this way, for example, a person who wish to work out with 30 lbs. on each arm can change the weight on a single interface, causing the resistance of the motors of both units to change.

In some embodiments, the second resistive exercise machine may have a second housing, a second tension cable, and a second resistive motor for applying a second resistance on the second tension cable. The structures may be substantially identical between units. For example, both units in FIG. 2A share substantially the same structures. Alternatively, one unit may differ from the other (e.g., a resistive motor controlling movement of the foot pedals in elliptical machine may differ from an arm module that applies tension to handles, a T-bar of a different shape or length, etc.)

In some embodiments, the second resistive exercise machine may be specifically designed as a unit to be paired with another than already contains a user interface. In such instances, the second unit may lack its own user interface. Such embodiments may involve two versions of the resistive exercise machine, where the first type of machine having a user interface and pairing interface serves as a master controller, and the second, concise resistive exercise machine serves as a slave to the first machine. The second resistive exercise machine may have bidirectional data communication capabilities to receive commands from the first machine, and to send feedback and sensor data to a controller. By reducing the number of components of the second resistive exercise machine, the complexity and cost of adding an additional module may be reduced.

By way of example with reference to FIG. 2E, the second resistive exercise machine 200B, is a mirror image of the first resistive exercise machine 200A. In this example, both machines have a user interface, and manipulation of either user interface may control both machines. Moreover, if a smartphone or other mobile communications device is part of the pairing, that device may control both machines. Alternatively, neither machine may be offered with a built in controller, and a separate dedicated modular controller may be employed. The pairing interface (e.g., between T-shaped wall-mounted gyms 200A and 200B) may be a wired interface and/or wireless interface. As an alternative to a wired interconnection or a wireless connection between modules, mobile communications device 224 may be configured with a software application providing a pairing interface between resistive exercise machine 200A and resistive exercise machine 200B. The pairing interface may enable the first resistive exercise machine to be selectively paired with a second resistive exercise machine having a second housing, a second tension cable, and a second resistive motor for applying a second resistance on the second tension cable. In any such manner, multiple resistive exercise machines may be paired together.

In some embodiments, the first resistive exercise machine may include at least one controller. A controller refers to any electronics that manages or regulates operation of any portion of the equipment. In one example, a controller may be a processor. In another example, a controller may be a variable resistor or a logic circuit. The controller may be configured to control the resistance applied by a resistive element in the exercise machine. For example, in FIG. 1B a controller 101 having at least one processor 150 is connected to motor 140 to regulate resistance. Although memory 160 and I/O 170 is illustrated in FIG. 1B, in a broadest sense, the processor alone may be considered a controller. And although FIG. 1A illustrates control circuit 101 as with many components, this is but one example and is not intended to limit the interpretation of a controller, which as stated can be a single component or any group of components that provides a control function, such as the block diagram of controller 101 illustrated in FIG. 1B. Although FIG. 1B illustrates a control circuit with memory 160, memory may be omitted from the control circuit. Moreover, in lieu of a processor 150 (or 112 in FIG. 1A) other components may be used as a substitute in the control circuit. For example, in one example, a control circuit may be formed of a variable resistor for regulating an electrical supply to the resistance motor 140, thereby changing the resistance applied by the resistance motor.

In some embodiments, the at least one controller may be operatively interposed between the user interface and the first resistive motor. Operative interposition refers to the fact that the controller is able to exert control over the first resistive motor. Such control may regulate resistance applied by the motor. In some embodiments, the control enables a variation in mode of operation (e.g., to cause the motor to simulate differing forms of resistance. With reference to the example in FIG. 1B (which may be a different embodiment than the example of FIG. 1A), a controller 601 may be connected to motor 140, e.g., via one or more wires and/or cables, and/or a wireless communications link (e.g., WiFi or Bluetooth) to achieve one or more control functions over the motor 140. The controller 101 may be configured to output signals for altering (e.g., by increasing or decreasing) the resistance applied by a resistance motor onto a cable via a spool.

For example, in a paired mode, the controller is permitted to control components of differing resistive exercise machines.

In some disclosed embodiments, the operative interposition of the controller enables in a first mode of operation, manipulation of the user interface to alter the first resistance applied to the first tension cable, and enables in a second mode of operation where the first resistive exercise machine is paired via the pairing interface with the second resistive exercise machine, manipulation of the user interface to alter the first resistance applied to the first tension cable and the second resistance applied to the second tension cable. A mode of operation may refer to a way in which something works or an extent of available control. In an unpaired mode (a first mode), for example, manipulation of the user interface may only control a single resistive exercise machine. However, in a paired mode (a second mode), manipulation of the user interface may control both resistive exercise machines.

For example, with reference to FIG. 2E, modular electronic exercise equipment may include at least one controller such as a resistor or at least one processor 112 operatively interposed between the user interface such as dial 216A and a resistive motor. A controller may enable, in a first mode of operation, manipulation of the dial 216A to alter the first resistance applied to first tension cable 206A. The controller may enable, in a second mode of operation where the resistive exercise machine 200A is paired via the pairing interface with the second resistive exercise machine 200A, manipulation of dial 216A to alter the first resistance applied to the first tension cable 206A and the second resistance applied to the second tension cable 206B.

In some embodiments, in the first mode of operation, the first resistive exercise machine operates in a standalone manner without coordinating with another resistive exercise machine. That is, in a standalone first mode of operation, the first resistive exercise machine permits exercises using a single resistive motor and cable.

In contrast, in a second mode of operation, the two units are paired by being linked to one another. Thus, in some embodiments, manipulation of the user interface to alter the first resistance applied to the first tension cable may also result in the second resistance applied to the second tension cable of a linked second resistive exercise machine. In one embodiment, once units are paired, they default to operating in the second mode. However in other embodiments, when two units are paired, the user may be able to select between the first mode and the second mode. For example, the user may toggle a switch between the first mode of operation or second mode of operation. In some embodiments, the mode of operation may be selected via a voice command, or input on a touchscreen. In some embodiments, selection of a first or second mode of operation may be made via a user interface of a mobile communications device (such as a smart phone) in direct wireless communication with the first and second exercise equipment, or indirect communication with the exercise equipment via a server.

In some embodiments, in the second mode of operation, first resistive exercise machine is coordinated with the second resistive exercise machine via a controller. With reference to FIG. 2E, in some embodiments, the at least one controller is configured for connection to mobile communications device 224. During the second mode, the first resistance and the second resistance are controllable via the mobile communications device 224. In some embodiments, in the second mode of operation, the at least one controller (e.g., including at least one processor 112) is configured to simultaneously alter the first resistance applied to the first tension cable 206A and the second resistance applied to the second tension cable 206B. In some instances, in the second mode of operation the user interface and the at least one controller are configured such that the first resistance and the second resistance are equal.

In some embodiments, the first resistance of the first resistive exercise machine and the second resistance second resistive exercise machine each include a plurality of variable forces that fluctuate over time based on a selected program from a plurality of programs. In such instances, manipulation of the user interface to alter the first resistance may include selection of one of the plurality of programs.

In some embodiments, the first exercise machine and the second exercise machine each include a display. In the second mode of operation, the first resistance and the second resistance may be equal and may be presented on each display.

In some embodiments, the first exercise machine may be configured to be wall mountable adjacent the second exercise machine. A machine is wall mountable if it can be fixed to a wall. In some embodiments, a wall mountable machine may connect to a part of a wall, such as a stud, beam, sheathing, or other structural component of a wall. The first exercise machine may be adjacent to the second exercise machine when the two are next to each other. The first and second machines may be adjoining and in contact with one another, or in close proximity to each other on a wall, but not contacting one another. In the example shown in FIG. 2E, machines 200A and 200B are wall-mountable gyms that are adjacent to one another.

In some embodiments, the first exercise machine and the second exercise machine may be configured to mechanically interconnect. The two may mechanically interconnect by being physically joined. In some embodiments, a mechanical interconnect may involve one or more fasteners such as screws, nuts, bolts, or other fastening mechanisms. A mechanical interconnect may also include one or more couplings that physically connect the first and second exercise machines with or without the need for tools. A mechanical interconnect may include one or more wired or wireless data links for transferring electrical power, data, and/or commands between the first and second resistive exercise machines. Thus, in some embodiments, the first and the second exercise machines may be physically connected with a wired connection. In other embodiments, the first and second exercise machines may be directly wirelessly connected to one another, or may be indirectly connected to a same server (e.g., one or more controllers, one or more pairing interface, a computer, a smartphone, or a cloud server).

For example, in some embodiments, in the second mode of operation, the at least one controller may be configured to simultaneously alter the first resistance applied to the first tension cable and the second resistance applied to the second tension cable. As previously discussed, in some embodiments, the at least one controller may be a component of the first resistive exercise machine and/or the second resistive exercise machine. In some embodiments, the at least one controller may include at least one controller from the first resistive exercise machine and at least one controller from the second resistive exercise machine. In some embodiments, the at least one controller may be a component that is neither part of the first resistive exercise machine nor part of the second resistive exercise machine.

In some embodiments, the at least one controller may simultaneously alter the first resistance applied to the first tension cable and the second resistance applied to the second tension cable according to predefined exercise-related data. In some embodiments, the predefined exercise-related data may include a relationship between the first resistance and the second resistance, and/or the first and second resistance over time. In some embodiments, in the second mode of operation, the user interface and the at least one controller may be configured such that the first resistance and the second resistance are equal. In some embodiments, the first resistance and the second resistance may each include a plurality of variable forces that fluctuate over time based on a selected program from a plurality of programs. One or more of the following programs may be part of the plurality of programs: variable resistance that increase or decreases based on the force applied to the cable by a user; motor activity causing increase tension during more powerful portions of an exertion; motor activity applying constant tension throughout an exertion; and/or motor activity unique to a particular exertion of exercise. For example, the motor may apply differing resistance patterns or curves depending on selection of chest, lats, legs, arms, squat or any other class of exercise.

In some embodiments, the at least one controller may be configured such that manipulation of the user interface to alter the first resistance causes the user interface to select one of the plurality of programs. A user may choose a program through a user interface on a smart phone (or other mobile communications device) or on the resistive exercise machine itself. For example, dial 216A or 216B in FIG. 2E may be pushed to enter a program mode and may be turned to select a desired program.

In some embodiments, each of the plurality of programs may include predefined exercise-related data. In some embodiments, the predefined exercise-related data may include, for example, recommended and maximum resistance of the resistance motors 140, recommended ramp-up and ramp-down rate of the resistance motors 140, recommended hold time of the resistance motors 140, and/or any relation of the resistance and time to allow the resistance motors 140 to output resistance that is proper for the selected exercise. Such information may be presented on a paired mobile communications device or on a display on the machine itself (e.g., a display in the center of dial 216A and/or 216B).

In some embodiments, in the second mode of operation, the at least one controller may be configured to enable simultaneously control power to the first resistive exercise machine and the second resistive exercise machine via manipulation of the user interface. Manipulation involves user interaction with the interface. For example, once two exercise machines are paired, controlling the power on any single user interface may power on or power off both machines. A user may manipulate the user interface selecting one or more physical or virtual (e.g., touchscreen-based) buttons or switches, or by turning or pressing a dial on one exercise machine, and as a result, activate or deactivate both machines. For example, powering off controller and dial 216A of exercise machine 200A may deactivate both exercise machines 200A and 200B. Similarly, a control in a user interface on a paired cell phone or other mobile communications device 224 may alter power on both resistive exercise machines 200A and 200B.

In some embodiments, in the second mode of operation, the at least one controller may be configured to simultaneously selectively apply one manner of a plurality of manners of operation to the first resistive motor and the second resistive motor. In some embodiments, a manner of operation may be an operation mode of the resistance motor. A manner of operation may correspond to how the resistive motor is controlled to apply resistance to a cable during the performance of an exercise, because different exercises may require that the resistance provided by the resistive motor 140 to have different characteristics. In some embodiments, the plurality of manners of operation may include at least two of an elastic band mode, an eccentric mode, a chains mode, a vibration mode or simulating various other types of cables such as a rope or a non-elastic band; or any other effect applied to the motor by the controller. Each of the manners of operation may correspond to a different pattern of resistance levels on the motor and applied to a cable as the user performs a repetition, such that the resistance is different at different points of the user's range of motion. In an elastic band mode, the controller may cause the first and/or second resistance motor to increase resistance as the user progresses through the range of motion, to simulate the feeling of pulling an elastic band. For example, as the user pulls the cable, resistance may be increased gradually to 1.5× the starting resistance at the top of the user's range of motion in concentric phase of the movement. The increase in resistance in all modes may be linear or non-linear. In the eccentric mode, resistance may be increased in the eccentric phase of the user's movement. In eccentric mode, the controller may cause the first and/or second resistance motor to increase resistance immediately after the equipment detects that the user has reached their maximum range of motion in the concentric phase, so that the resistance level of the eccentric phase is greater than the resistance applied during the concentric phase. A chains mode may involve a gradual increase in resistance during the concentric phase, followed by a gradual decrease in resistance during the eccentric phase. Chains mode may simulate the lifting of a chain attached to a weight, where most of the chain is initially laying on a surface (e.g., the floor) and provides no resistance. As the user lifts the weight, links of the chain lift off the floor and add resistance to the weight. At the user's peak range of movement, several chain links have lifted off the floor, and the weight is at a maximum value. As the user lowers the weight, chain links return to the floor and decrease the overall resistance applied to the user. A vibration mode may involve the first and/or second resistance motors applying vibrations to the first and/or second cables, by oscillating at a certain frequency and amplitude. By vibrating the cable, a user may experience a greater workout of muscle groups used for balance and stabilization.

In some embodiments, the at least one controller may be configured for connection to a mobile communications device. A mobile communications device may include all possible types of devices capable of exchanging data using digital communications network, analog communication network or any other communications network configured to convey data. In some examples, the communications device may include a smartphone, a tablet, a smartwatch, a personal digital assistant, a desktop computer, a laptop computer, an Internet of Things (IoT) device, a dedicated terminal, a wearable communication device, and any other device that enables data communications. In some cases, a mobile communications device may provide a user interface. A smartphone is one example of a mobile communications device 224 in FIG. 2E, and reference to it herein is intended to refer to all forms of mobile communications devices.

In some embodiments, the at least one controller may be configured to receive a signal from the mobile communications device to simultaneously control resistance and/or power to the first resistive exercise machine and the second resistive exercise machine. Such control may occur via an app on the mobile communications device. For example, such an app may permit increase or decrease in resistance and/or selection of programs or modes of operation. The controller may receive a signal from the mobile communications device, and may process the received signal to execute an associated command to control the first and second resistance motors. Some signals may result in the controller controlling the resistance and/or power of the first and second resistive exercise machines in the same manner, and other signals may result in simultaneous yet different control of both machines. As an example, in some embodiments, the one manner of operation discussed above (such as elastic mode, eccentric mode, chains mode, or vibration mode) may be selected via the mobile communications device. In some embodiments, the user interface may be a touch screen of a personal mobile communications device (e.g., smart phone, tablet). In some embodiments, the at least one controller is configured for connection to a mobile communications device to thereby enable, during the second mode, the first resistance and the second resistance to be controllable via the mobile communications device as the user interface.

In some embodiments, the second exercise machine may include an additional user interface. In other words, not only will the first exercise machine include a user interface, but so too will the second machine. This may allow a user to choose either control for manipulating both machine. In some embodiments, the additional user interface of the second exercise machine may be of the same form as the user interface of the first exercise machine. In some embodiments, a user interface of the second exercise machine may include one or more different components than the first exercise machine user interface, such that adding a second exercise machine may increase the system's user interface capabilities for interacting with the user. In some embodiments, the user interface of the second exercise machine may allow a user to operate the second exercise machine as a standalone exercise machine (i.e., operative identical to the first exercise machine, or as another first exercise machine) in its first mode of operation.

In some embodiments, in the second mode of operation, the additional user interface may, like the user interface of the first resistive exercise machine, also be configured to control both the first resistance applied to the first tension cable and the second resistance applied to the second tension cable. In some embodiments, such control is performed through the at least one controller of the first resistive exercise machine. In some embodiments, this control is performed through the at least one controller of the second resistive exercise machine. In some embodiments, this control is performed through the at least one controller of both the first and the second exercise machine in a coordinated manner. In some embodiments, this control is performed through the at least one controller that is neither part of the first resistive exercise machine, nor part of the second resistive exercise machine.

In some embodiments, the user interface of the first and/or second resistive exercise machine may take various forms and may have similar components and previously discussed with respect to the user interface of the first exercise equipment. For example, in some embodiments, the user interface of the first and/or second exercise equipment may include a dial and/or a display such as a touch screen.

In some embodiments, in the second mode of operation, the first resistance and the second resistance may or may not be equal. In some embodiments, in the second mode of operation, the first resistance and the second resistance may be presented on each display. That is, a display of the first exercise machine may display a resistance associated with a first resistance motor and first cable, and a display of the second exercise machine may display a resistance associated with a second resistance motor and second cable. In some embodiments, both the first resistance and the second resistance may be presented on each of the display of the first exercise machine and the display of the second exercise machine. In some embodiments, the display only presents the respective display, i.e., the first display only presents the first resistance, the second display only present the second resistance.

Reference is made to FIG. 2E illustrating an exemplary configuration for two paired T-shaped wall-mounted gyms 200A and 200B, consistent with some disclosed embodiments. T-shaped wall-mounted gyms 200A and 200B may correspond to T-shaped wall-mounted gym 200 of FIG. 2A. FIG. 2E illustrates three wall studs 103, 105, and 107 indicated as dashed lines. In some embodiments, T-bar 204 may be configured to extend between and connect to an additional vertically wall-mountable beam 202A mounted on a third stud 103 adjacent to second stud 105 and on a side of the second stud 105 opposite the first stud 107. In some embodiments, vertically wall-mountable beam 202A, the additional vertically wall-mountable beam 202B, and the T-bar 204 cooperate for form an H-configuration, with the T-bar 204 configured to resist torquing of both the vertically wall-mountable beam 202A and the additional vertically wall-mountable beam 202B.

In some embodiments, a length of the T-bar may extend between a first stud and a second adjacent stud to which it is attached at or near the T-bar's second end. The T-bar may also connect to the resistive exercise machine at or near an end of the T-bar located at the first stud. The length of the T-bar may also vary depending on the configuration of machines; thus, the examples illustrated such as those in FIGS. 2A, and 2D-2G are not meant to limit the disclosed embodiments to any particular dimension or ratios of dimensions. In embodiments having two paired resistive exercise machines, such as the example illustrated in FIG. 2E, each machine may have its own respective T-bar 204, such that the appearance of the H-configuration may be twice as wide as the examples shown. In such embodiments, the two T-bar of each individual resistive exercise machine may be connected to each other in addition to their connections to a stud such as second stud 105. In some embodiments, a length of the T-bar may be extendible or adjustable, to extend and connect a single T-bar to both the first and second machines, and in some embodiments, a single, non-adjustable T-bar may be used between two machines. In any of the disclosed embodiments, the T-bar may be connectable to a first and second resistive exercise machine.

FIG. 2E further shows devices 200A and 200B each comprised of a vertical beam and joined by a single T-bar in an H-configuration (i.e., the T-bar of a single device becomes an H-bar when two devices share the T-bar). Devices 200A and 200B are illustrated as wall-mounted and adjacent resistive exercise machines.

Some embodiments include a method of selectively pairing a first resistive exercise machine with a second resistive exercise machine. Selective pairing involves a user selectable link between two or more particular machines. If two machines are linked by choice, they are selectively linked (as opposed to a situation where no one choses to link two machines). In some embodiments, the second resistive exercise machine may serve as an accessory or peripheral attachment to the first resistive exercise machine, and does not operate in a standalone mode without the presence of a first machine.

Some embodiments involve receiving at least one first signal in response to manipulation of a user interface in a first mode of operation where the first resistive exercise machine that is not paired to the second resistive exercise machine. In a first, standalone mode as discussed earlier, a single unit of exercise equipment unit may permit exercises using a single resistive motor and cable. If that single unit is not paired with a second unit, even if the second unit is in the vicinity, in the first mode of operation, control of the first unit will have no effect on the second unit. By way of example, before the two exercise machines 200A and 200B in FIG. 2E are paired, control of one machine will have no impact on the other.

Figure 16:
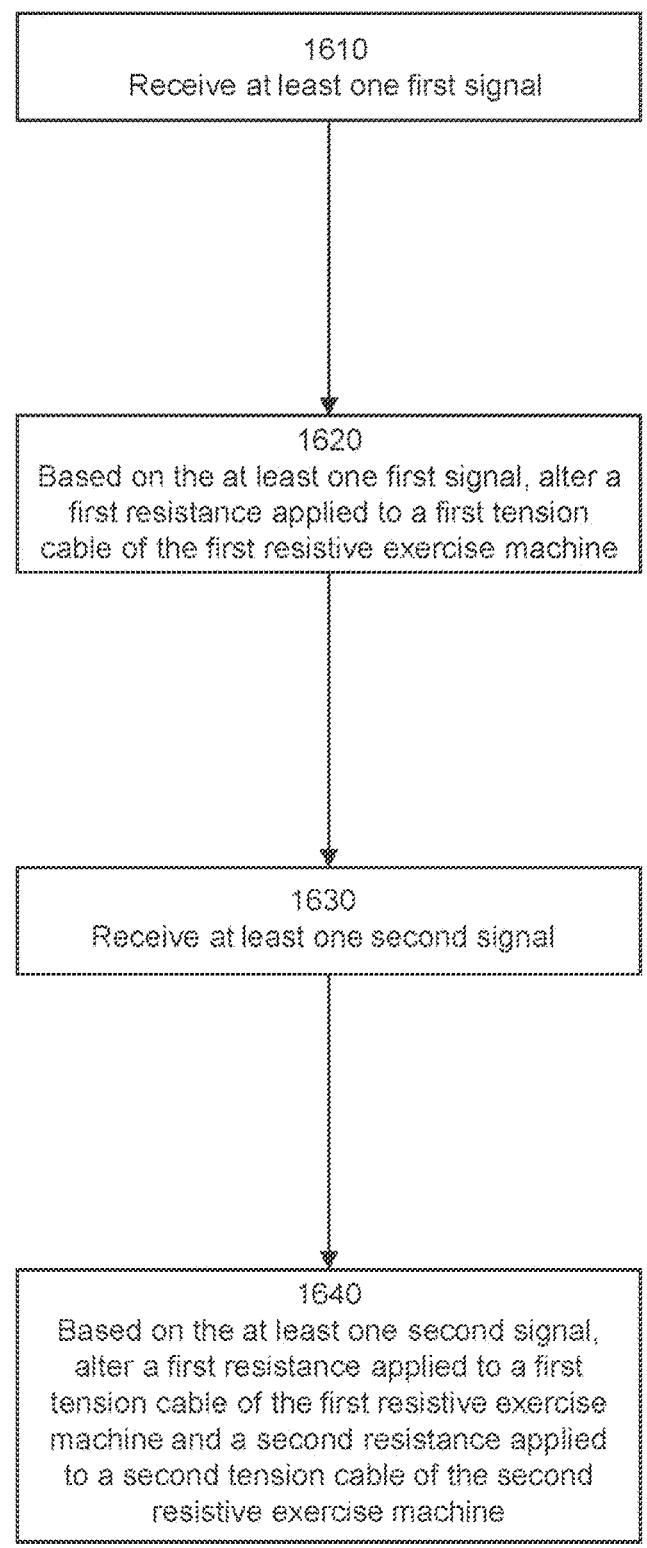
FIG. 16 is a flowchart illustrating a method of selectively pairing a first resistive exercise machine with a second resistive exercise machine consistent with embodiments of the present disclosure.

Receiving the first signal is reflected in block 1218 in FIG. 16.

In some embodiments, upon receiving the at least one first signal, the at least one processor may alter a first resistance applied to a first tension cable connected to a first resistive motor of the first resistive exercise machine based on the at least one first signal. That is, because the two units are not yet paired, the first signal controls a first resistance on only the first motor, but not the second. The first resistance may be altered by increasing or decreasing a level of resistance, or by modifying a pattern of resistance applied to a tension cable such as by applying one or more manners of operation discussed herein. Altering the first tension is reflected in block 1620 in FIG. 16.

Some embodiments involve receiving at least one second signal in response to manipulation of the user interface in a second mode of operation where the first resistive exercise machine is paired to the second resistive exercise machine. In the second, paired mode, two adjacent exercise equipment units may be electronically paired and operate in a synchronized manner, for coordinated workouts using both motors and cables simultaneously. Receiving the second signal is reflected in block 1630 in FIG. 16.

In some embodiments, the user may subsequently manipulate the user interface to switch from the first mode of operation to the second mode of operation.

Some disclosed embodiments involve in response to the second signal, altering a first resistance applied to a first tension cable connected to a first resistive motor of the first resistive exercise machine and altering a second resistance applied to a second tension cable connected to a second resistive motor of the second resistive exercise machine, based on the at least one second signal. As discussed previously, once two units are paired, as is the case when the at least one second signal is generated, then both machines may respond to a command from a single user interface. This process step is reflected in block 1640 in FIG. 16.

In some embodiments, code with instructions for causing one or more processors to perform operations set forth in the steps in the block diagram of FIG. 2E may be stored in a non-transitory computer readable medium. Operations may be performed based on instructions executed by, for example, at least one processor such as processor 112 of FIG. 1A, alternatively illustrated by a processor 150 in FIG. 1B.

Smooth Operation

The term "smooth" may refer to a limitation on unwanted resistance change rates. The unwanted resistance change rate may be less than a predefined unwanted resistance change threshold.

The term "smooth" may refer to a lack of resistance irregularities—for example lack of predefined jumps in the resistance values.

The term "smooth" may refer to having substantially zero deviations from the desired resistance—for example lack of deviations above 1, 5, 10 and the like percent from the desired resistance.

Resistance based exercise includes resisting movements made by a user. The resistance should mimic a weight that is moved (for example lifted) by the user.

Once set by the user, the resistance should be virtually constant—without unwanted abrupt changes in the resistance. It is beneficial to provide a smooth exercise experience in which the resistance does not unwantedly abruptly change.

There is provided an exercise equipment that includes a user interface that may be held by a user during exercise. The user interface is in mechanical communication with a cable.

The exercise equipment also includes a cable transfer unit that is configured to smoothly convey the cable through the frame, and a resistance source that smoothly applies a resistance on the cable.

The cable may follow a path in which the cable turns multiple times within the exercise equipment. The cable is kept within the path regardless of any type of movements made by the user. The keeping of the cable within the path contributes to the smooth exercise experience.

At least a part of the path is formed by the cable transfer unit. At least part of the path may be formed by the resistance source.

The cable may be kept within the path by various means—such as limiting the distance between adjacent sheaves that are followed by the user interface and/or by having a cable that is relatively rigid, and/or by maintaining the cable relatively tense within the path—such as not to exit the path formed by mechanical elements such as sheaves.

The cable may be allowed to perform relatively limited transversal movement with the path. The limited transversal movement may not exceed the diameter of the cable—or may not exceed a fraction of the diameter of the cable. The limitation of the transversal movement may involve providing grooves that fit (for example may be slightly larger than the cable—for example by up to 5% 10%, 15%, 20%, 30% and the like from the diameter of the cable) and/or may have grooves that are deep enough (for example more than 30% or more of the diameter of the cable)—thereby limiting the transversal movements.

The cable may exhibit both durability and relative rigidity. Example of cables are provided below:

| Rope Type | Diameter | Material |
| --- | --- | --- |
| Dyneema DM20 XBO | 3 mm | Dyneema with coating |
| Orion 500 | 3 mm | Polyester core with polyester sleeve |
| Orion 500 | 3 mm | Polyester core with polyester sleeve |
| Vectran V12 | ⅛ inch | Vectran no sleeve |
| Kevlar | 3 mm | Kevlar core with polyester sleeve |
| Ocean 3000 | 3 mm | Dyneema no coating |
| Vectran mini-V | 3 mm | Double braid |
| HTS 90 | ⅛ inch | Dyneema sk90 |
| Marlow Excel vectran | 3 mm | Vectran core + polyester sleeve |
| Marlow Excel racing | 3 mm | Dyneema core + polyester sleeve |
| Dy-PES | 3 mm | Dyneema core + premium polyester sleeve |
| Dyneema single braid | 2 mm | Dyneema SK78 |

The exercise equipment may further include a frame that includes a vertically wall-mountable beam and one or more brackets for connecting the vertically wall-mountable beam to a wall. Examples of a vertically wall-mountable beam (denoted 202) and one or more brackets (denoted 230 and 236) are included in FIGS. 2A and 4.

The Resistance Source

The resistance source is configured to smoothly apply a resistance on the cable while a user pulls the cable away from a part of the frame. The part of the frame may be an arm, the vertically wall-mountable beam, and the like. The movement can be made in any direction that increases the distance between the user interface and the part of the frame.

The resistance source includes an electronically-adjustable weight resistance motor (such as motor 140 of FIG. 4), a spool (such as spool 218 of FIG. 4), at least one processor (such as at least one processor 112 of FIG. 1) and mechanical support elements such as a housing (denoted 228 in FIG. 4).

The motor may exhibit at least one of the following:
  a. Have a motor cogging less than 0.04NM—or less than any other desired threshold.
  b. Ratio of Rotor diameter to number of poles should be less than 11:1 (for example—rotor diameter 110 and have 10 poles)—or less than any other desired value.
  c. Have a segmented stator.
  d. Reduce cogging by skewing the rotor and/or the stator stack.

According to an embodiment, the smoothness is also facilitated by having sheaves that interface with the cable that have a radius that is at least 8, 9, 10 times (or even more) than a radius of the cable.

According to an embodiment, the smoothness is also facilitated by having an angle that does not exceed 5, 8, 10, 12, 15 degrees between an angle of a segment of a cable that approaches a sheave and a tangential axis or longitudinal axis of the portion of the sheeve at the first point of contact of the cable with the portion.

FIG. 4 illustrates that the spool is associated with the motor via a belt, allowing motor 140 to exert rotational resistance on spool 218. It should be noted that the spool may be associated with the motor in other manner—for example the spool may be directly rotated by the motor—or having the motor rotate a pole that in turn rotates the spool.

The motor is configured to smoothly rotate the belt and the belt is configured to smoothly rotate the spool.

It should be noted that there may be more than a single belt or one or more other interfacing elements between the motor and the spool.

The belt may provide a smooth interface between the motor and the spool. For example—a surface (such as an inner surface) of the belt that contacts the spool may be smooth, may be without transversal bumps (for example may be without transversal teeth) and/or may be without transversal recesses. That surface may include longitudinal bumps (for example may have longitudinal teeth) and/or longitudinal recesses.

The belt may have a symmetrical cross section along its circumference.

The spool may be shaped and/or sized such as to reduce and even prevent significant transversal movements of any part of the cable that is winded on the spool. For example— the spool may be threaded—for example having a spiral thread having a thread width that substantially equals the diameter of the cable—or may be shaped and sized to limit the transversal movement of the cable. FIG. 17F illustrates a cross sectional view and a side view of a spool 218 that has a spiral thread 218-3. FIG. 17F also illustrates upper side recesses 218-1 and lower side recesses 218-2 that are part of the spiral thread, whereas each thread is shaped and sized to hold a single segment of the cable. A single winding of cable 206 is illustrated in the cross sectional view.

The exercise equipment may be configured to limit the number of cable windings on the spool to a single winding— thereby preventing irregularities in unwinding process associated with having multiple windings. The limitation of the number of cable windings may be obtained, for example, by limiting an overall length of the cable part that can be wound on the spool—for example to be less than the overall length of the spool that can form a single winding on the spool. For example—the overall length of the cable can be long enough to facilitate a longest user movement in relation to the frame, the length of the cable path till reaching the spool, and the length of the cable that can form a single winding on the spool.

The Cable Transfer Unit

The cable transfer unit transfers the cable from the spool to the interfacing unit that is held by a user.

The cable transfer unit of FIGS. 17A-17E is located at least partially within exercise equipment that includes vertically wall-mountable beam 202, and an arm 212 that is rotatable in relation to the vertically wall-mountable beam and is selectively positionable along the vertically wall-mountable beam. The arm 212 includes a wrist 238. Cable 206 extends from the wrist.

Figure 17A:
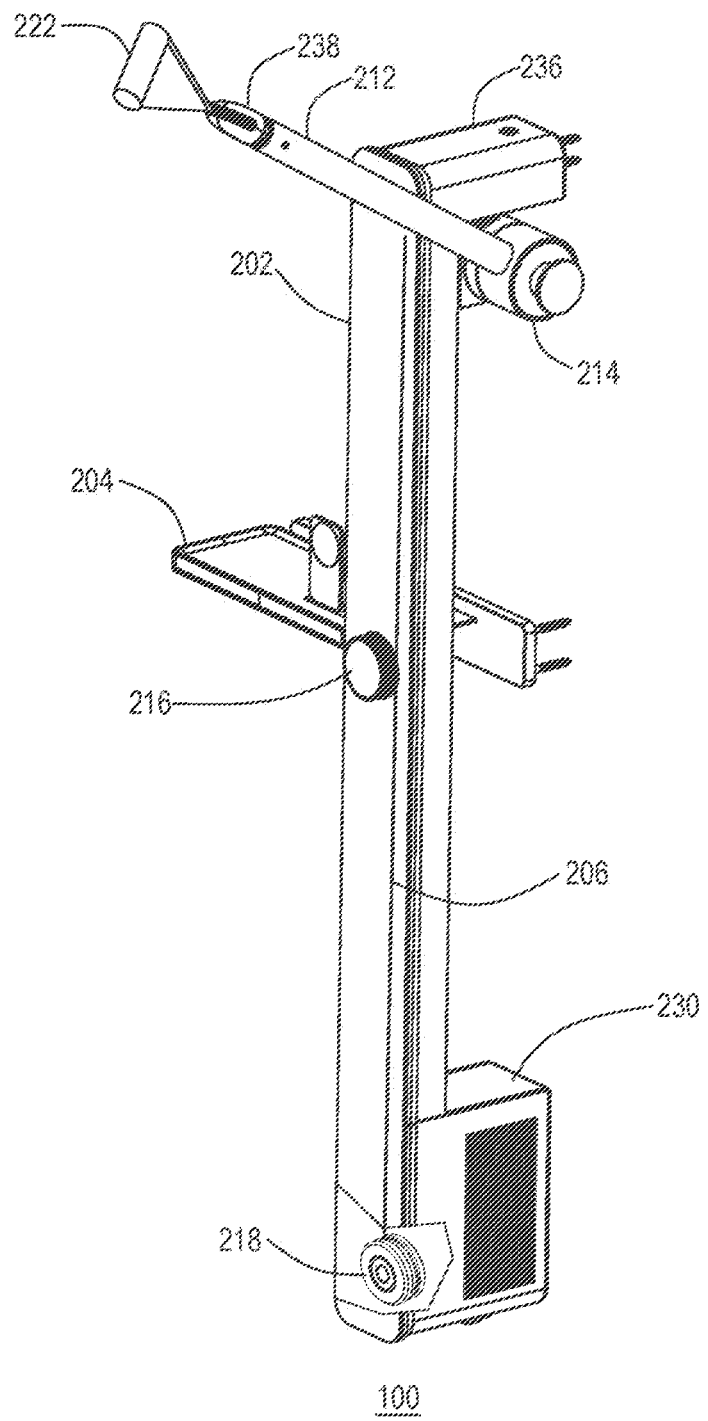
FIG. 17A illustrates an example of an exercise equipment consistent with embodiments of the present disclosure.

FIG. 17A also illustrates handle 222 (an example of a user interface that is held by the user), an upper bracket 236, a lower bracket 230, shoulder 214, T-bar 204, dial 216 and other components that are illustrated in previous figures such as FIGS. 2A-2H, 9A-9F, 11 and 13A-13C).

The cable transfer unit includes a cable conduit 1701 formed within the vertically wall-mountable beam 202, a first vertical sheave 1703, a second vertical sheave 1705 (in FIGS. 17A-17B the first and second vertical grooves are parallel to each other), a third vertical sheave 1707, a first arm sheave 1709 that follows the rotation of arm 212, and a pair of wrist sheaves 1711 and 1713 that are located (at least in part) within wrist 238. Any sheave may be non-vertical.

A sheave is referred to a vertical sheave when its rotation axis is horizontal. A vertical sheave may have any yaw axis.

The cable 206 is elevated from the spool and passes through the cable conduit 1701, contacts the front and top portions of a groove of the first vertical sheave 1703, continues to contact the top and rear portions of a groove of the second vertical sheave 1705, continues to contact the left and bottom portions of a groove of the third vertical sheave 1707, continues to contact the bottom and right portions of a groove of the first arm sheave 1709 and passes through an inner space formed (at least in part) by interior positions of the grooves of the pair of wrist sheaves 1711 and 1713.

In order to smoothly follow the rotation of arm 212, the cable, when passing between the bottom of the groove of the vertical sheave 1707 and the bottom of the groove of the first arm sheave 1709 is located at an axis of rotation of a shoulder 214 that is connected to the arm.

Figure 17B:
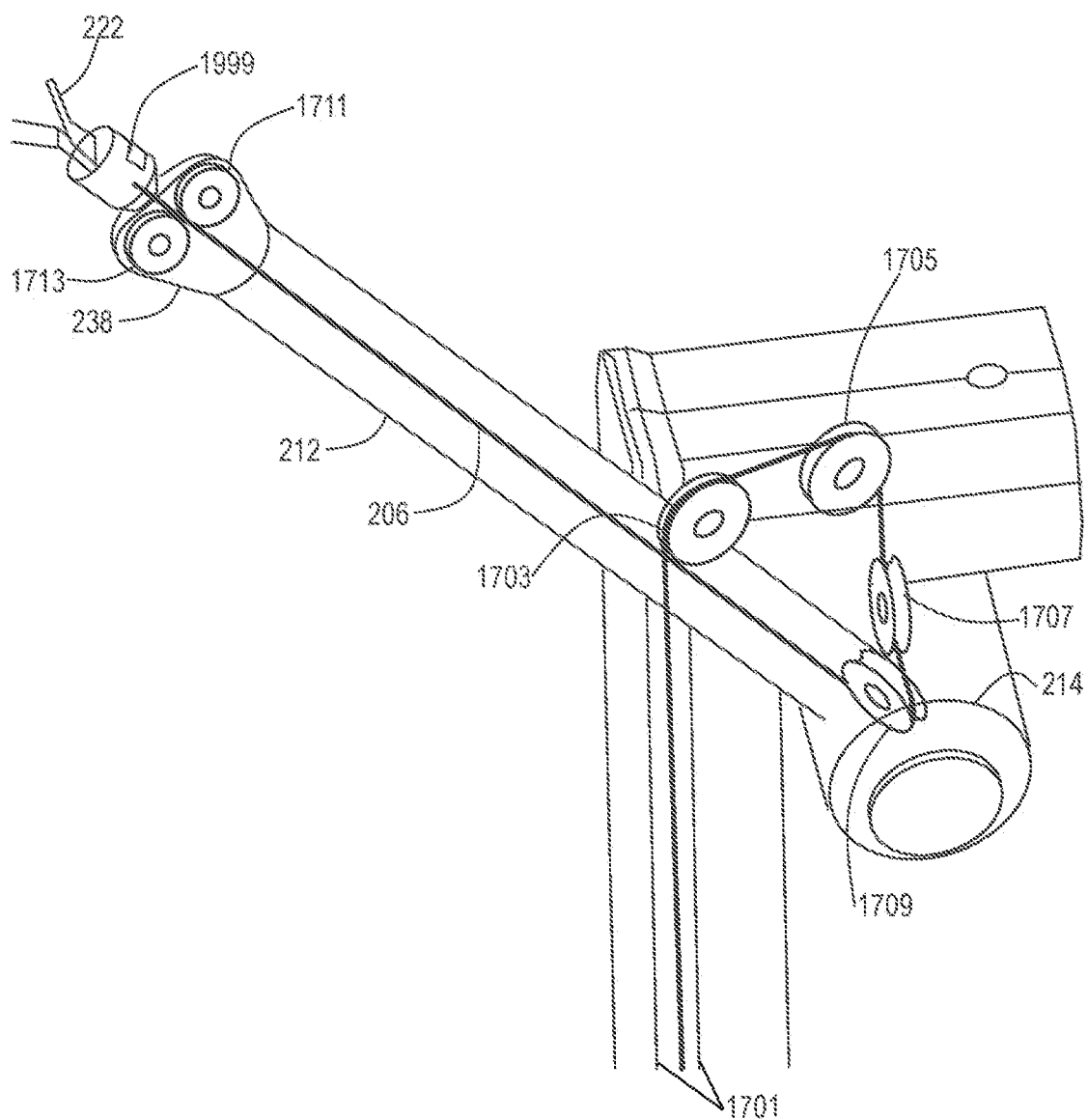
FIG. 17B illustrates an example of some part of an exercise equipment consistent with embodiments of the present disclosure.
Figure 17C:
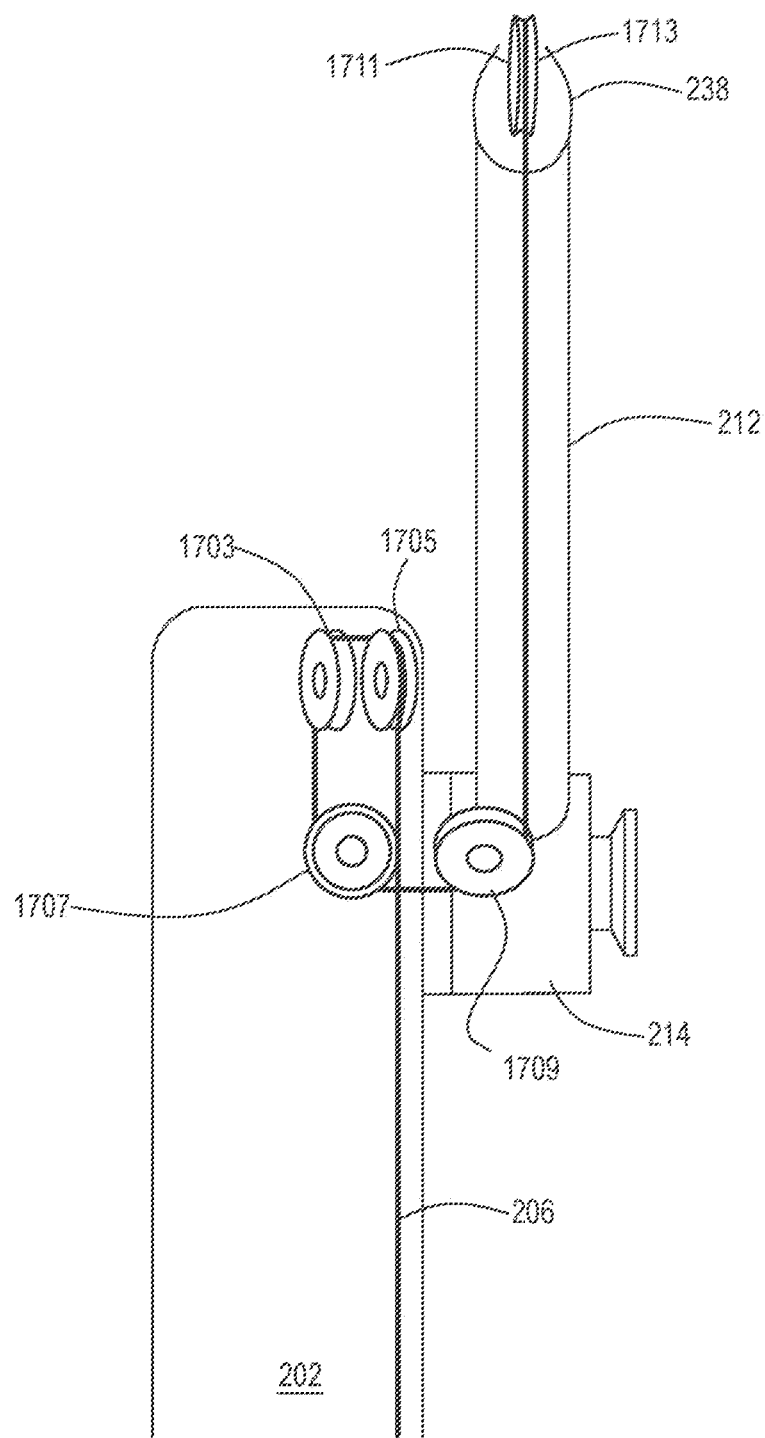
FIG. 17C illustrates an example of some part of an exercise equipment consistent with embodiments of the present disclosure.
Figure 17D:
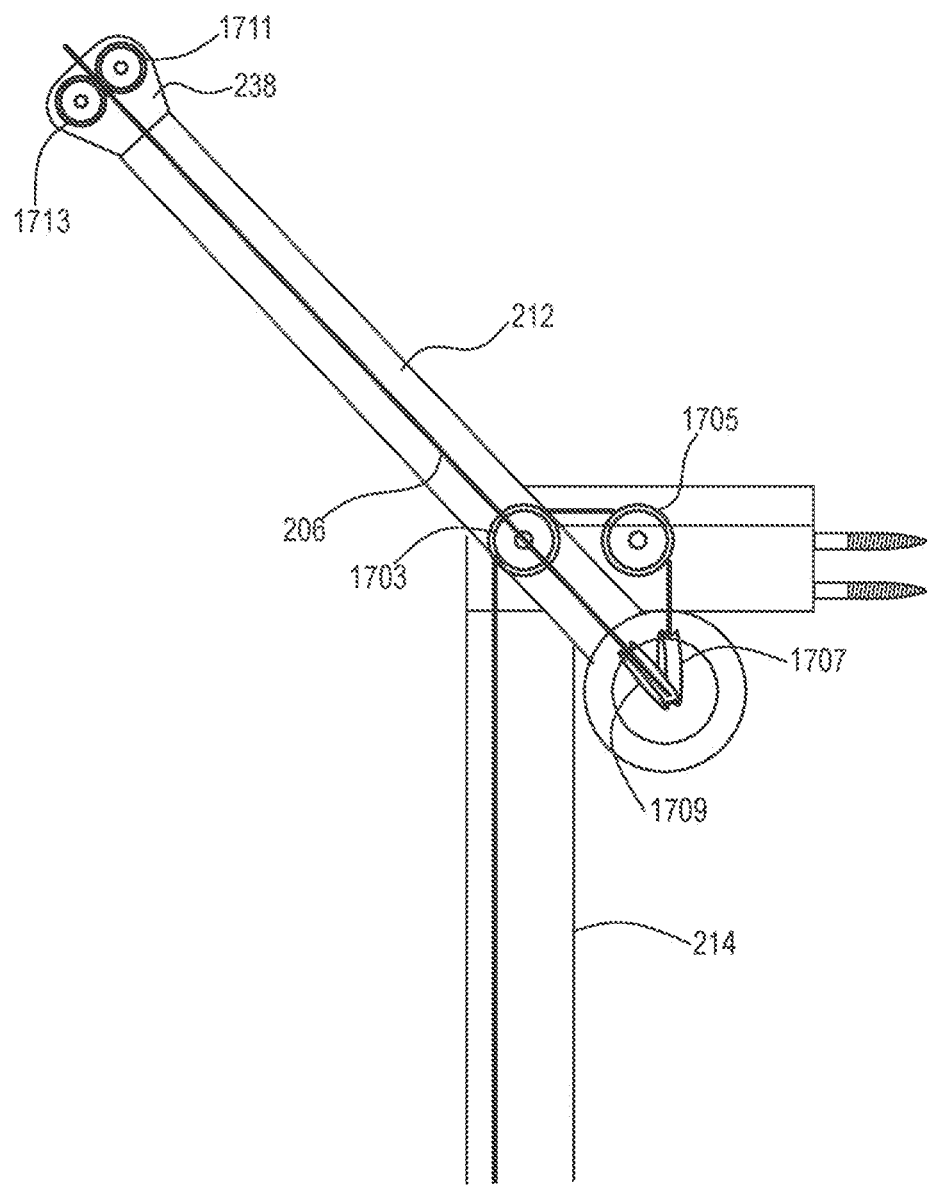
FIG. 17D illustrates an example of some part of an exercise equipment consistent with embodiments of the present disclosure.

FIG. 17B illustrates that from a top point of view—the first vertical sheave 1703 and the second vertical sheave 1705 are oriented by an acute angle to the other sheaves.

The different sheaves are spaced apart from each other, can be accessed from many directions, have accessible grooves that are not shielded (or at least are mostly not shielded), and define a cable path that includes relatively relaxed turns (for example does not include one or more dense "S" turns). One or more of these properties greatly simplify the replacement of the cable.

There may be any number of sheaves—although it may be beneficial to have as few sheaves as possible. The location of any of the sheaves and/or the orientation of any of the sheaves may differ from those illustrated in FIGS. 17A-17E.

The wrist may rotate along an axis and the pair of wrist sheaves 1711 and 1713 may rotate along with the wrist—without virtually impacting the resistance applied on the cable.

The at least one processor may apply any control scheme in order to control the applied resistance on the cable.

According to an embodiment—the resistance source includes an electronically-adjustable weight resistance motor that is a linear motor. The linear motor may be located along (or within) the entire vertically wall-mountable beam 202—or along at least a part of the vertically wall-mountable beam 202—and may not require a spool.

There may be provided a method for operating the exercise equipment.

The method may include:
a. obtaining information regarding a desired resistance to be applied on a cable;
b. smoothly applying, by a resistance source, the desired resistance on the cable while a user pulls the cable away from a part of a frame of the exercise equipment, the frame comprises a vertically wall-mountable beam, the exercise equipment further comprising one or more brackets for connecting the vertically wall-mountable beam to a wall; and
c. Smoothly conveying the cable through a frame of the exercise equipment, by a cable transfer unit.

Installing the Exercise Equipment

The following text may refer to anchoring the exercise equipment to wall studs. It should be noted that the exercise equipment may be anchored to other wall elements such as concrete poles, building blocks and the like.

There is provided an installation template that greatly simplifies the installation of the exercise equipment. Even a single layman can install the exercise equipment using the template.

The template allows to align different parts of the exercise equipment to one or more wall studs, and enables to accurately position the exercise equipment on the wall. The accurate positioning includes accurately setting the height (y-axis) of the exercise equipment, accurately setting the roll angle of the exercise equipment (for example—making sure than a vertically wall-mountable beam of the exercise equipment is vertical) and accurately setting the x-axis position of the exercise equipment.

According to an embodiment, the template includes a template body, a spirit level that is attached to the template body (for leveling the template) and multiple holes. The template may also include height range markers and/or attachment elements such as tapes. See, for example template 1800 of FIG. 18A that includes template body 1801, spirit level 1806, multiple holes such as 1811, 1812, 1813, 1814, 1815, 1816, 1817, 1818, and height range markers 1822.

The multiple holes may be located at different x-axis coordinates and/or at different y-axis coordinates. For example—holes 1811, 1812, 1813, 1814, 1815 and 1816 are located at different heights. Yet for another example—holes 1817 and 1817 are located at different x-axis coordinates that holes 1811-1816.

The exercise equipment includes a vertical wall-mounted beam. The vertical wall-mounted beam may be subjected to significant torque forces that may act to cause the beam to rotate, which, without further support, might pull the beam off the wall. This risk may be mitigated using mechanical elements that are anchored to the wall at y-axis coordinates that are located to the side of the vertical wall-mounted beam.

Figure 18A:
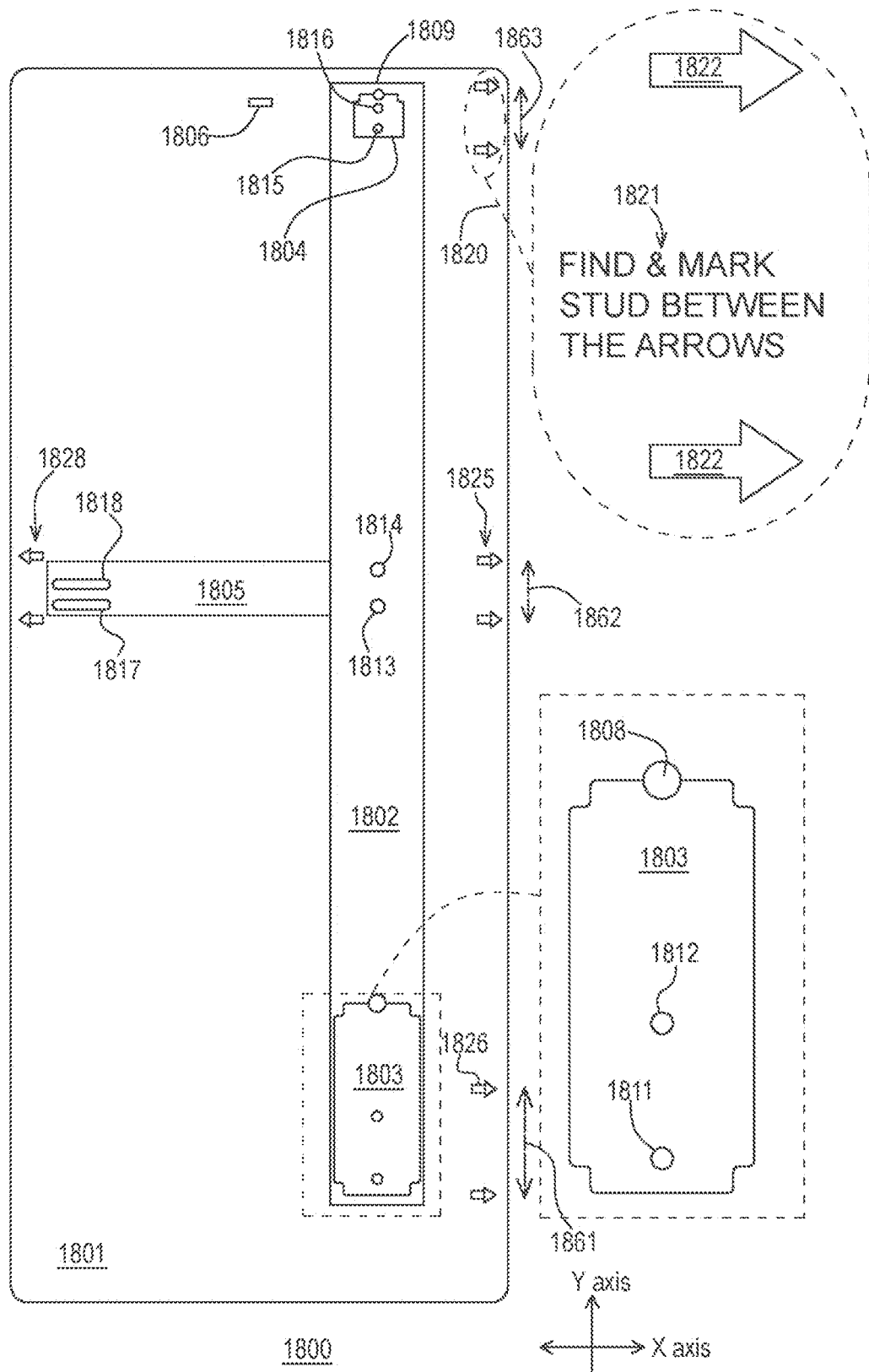
FIG. 18A illustrates an example of a template consistent with embodiments of the present disclosure.

According to an embodiment, the multiple holes includes a group of holes that are located within a vertical region of the template body. The group of holes may be used for anchoring the vertical wall-mounted beam. In FIG. 18A these holes include holes 1811-1816.

Figure 18B:
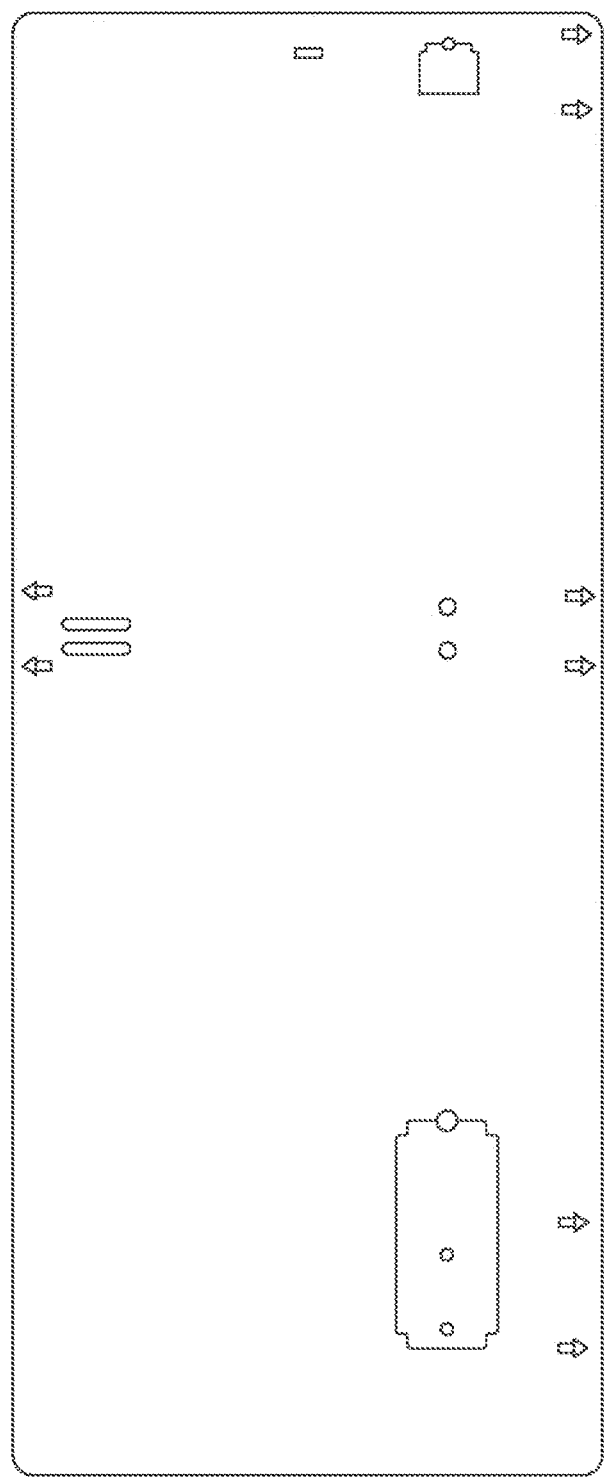
FIG. 18B illustrates an example of a template consistent with embodiments of the present disclosure.

One or more dimensions of the vertical region are related to one or more corresponding dimensions of a vertically wall-mountable beam of the exercise equipment. In FIG. 18A the vertical region is denoted 1802. FIG. 18B illustrates a template body on which the borders of the vertical region are not printed.

The dimensions are related in the sense that the one or more dimensions (for example width and/or height) of the vertical region do not exceed (or may equal to) the corresponding dimensions of the vertically wall-mountable beam. Alternatively, the one or more dimensions (for example width and/or height) of the vertical region may exceed by up to a predefined factor (for example up to 1.2, 1.5, 1.7 and the like) from the corresponding dimensions of the vertical wall-mounted beam. In the latter case the holes of the brackets may be located to the side of the vertical wall-mounted beam.

The vertical region may have vertices that may be located at the locations of holes of the groups of holes. Alternatively, the vertical region may exceed (for example by a factor that does not exceed 1.1, 1.3, 1.5) a region defined solely by holes of the group of holes.

The placement of the groups of holes within this vertical region may guarantee that the holes are positioned at locations that are directly behind a vertically wall-mountable beam (denoted 202 in other figures)—and not far away from the vertically wall-mountable beam (once installed). In case where at least some of the holes of the brackets are located to the side of the vertically wall-mountable beam, the vertical region may exceed the projection of the vertically wall-mountable beam on the wall.

The template and the vertical region may be shaped and sized for mounting the frame of the equipment exercise. According to an embodiment—the height of the vertical region exceeds 80% of the height of the template and the width of the vertical region does not exceed 25% of the width of the template.

It should be noted that the holes may be located within regions that differ from the vertical region—and may have any shape and/or size. See, for example, holes 1816 and 1817 in FIG. 18A.

According to an embodiment, one or more holes of multiple holes are located within one or more detachable segments of the template body. The positioning of one or more holes within the detachable segments allows the installer to detach the one or more detachable segments thereby exposing the wall, and to position (within the space exposed by the removal of the detachable segments) one or more brackets that anchor the frame of the exercise equipment to the wall. In FIG. 18A there are illustrations of a lower detachable segment 1803 and an upper detachable segment 1804.

The group of holes includes sub-groups of holes. At least two different sub-groups are located at different height ranges. There may be any number of height ranges. For example—there may be an upper height range and a lower height range. There may be one or more intermediate height ranges. This enables to install different brackets at different heights. In FIG. 18A there are an upper height range 1863, an intermediate height range 1862 and a lower height range 1861. FIG. 18A illustrates three sub-groups—a lower sub-group that includes holes 1811 and 1812, an intermediate sub-group that includes holes 1813 and 1814, and a upper sub-group that include holes 1815 and 1816.

According to an embodiment, the template includes height range markers that are positioned in proximity (for example up to 0.1, 1, 5, 10 centimeter and the like) to a longitudinal edge of the template body and mark the different height ranges. In FIG. 18A there are four pairs of height range markers—the pairs are denoted 1822, 1825, 1826 and 1828. FIG. 18A also illustrates that the height range markers can be printed in proximity to installation instructions such as installation instructions FIND & MARK STUD BETWEEN THE ARROWS 1821 that belong to region 1820—that also include height range markers 1822. For simplicity of explanation other installation instructions that are printed on the template and not shown.

The installer may position the template at a desired height and level the template and then attach alignment markers such as tape segments or other detachable elements to the wall. The tape segments or other detachable elements may be aligned with the longitudinal edge of the template.

The tape segments or other detachable elements once attached—are used for alignment of the template—for positioning the template (and afterwards the exercise equipment) at the desired location. The alignment markers can be seen through at least some of the holes of the multiple holes.

The detachable segments may include an upper detachable segment that is located at a highest height range of the different height ranges and a lower detachable segment that is located at a lowest height range of the different height ranges.

According to an embodiment, the multiple holes include (a) a first sub-groups of holes that are located at different y-axis ranges within the vertical region (for example—see FIG. 18A—holes 1811-1816), and (b) a second sub-groups of holes (for example—see FIG. 18A—gup-group of holes 1817-1818 versus sub-group of holes 1813 and 1814) that are located at different x-axis ranges within a horizontal region 1805 of the template body.

A distance between two second sub-groups may equal a distance between adjacent wall studs. When attaching the exercise equipment to concrete walls or block walls—the distance may equal a distance between wall locations that are strong enough to support the exercise equipment.

The multiple holes may include a shared sub-group of holes that is located at an overlap region between the vertical region and the horizontal region (for example—see FIG. 18A—holes 1813-1814).

The multiple holes may include another group of holes that are located outside the vertical region (for example—see FIG. 18A—holes 1817-1818). These holes may be used to support a horizontal or non-vertical element of the frame—such as the T-bar.

The holes of the group of holes have a circular shape. The holes of the other group of holes have an elongated shape—which provides more flexibility in the positioning of the T-bar.

The holes of the group of holes are arranged in pairs and the holes of the other group of holes form one or more pairs.

According to an embodiment, the first sub group of holes and/or the second sub group of holes are located within one or more detachable segment of the template body. For example—see FIG. 18A—holes 1811-1812 at the lower detachable region 1803 and holes 1815-1816 are located at the upper detachable region 1804.

Figure 19A:
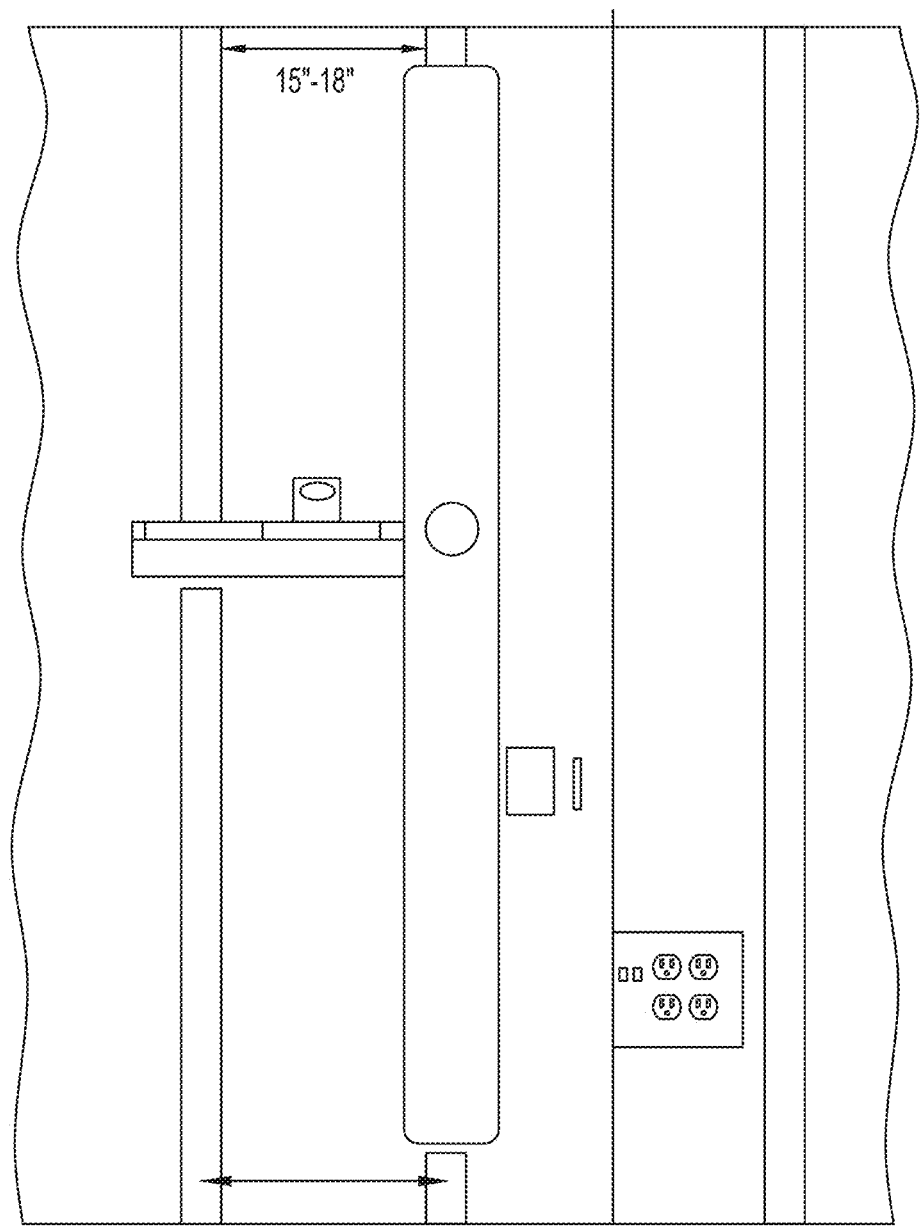
FIG. 19A illustrates an example of installing instructions consistent with embodiments of the present disclosure.
Figure 19B:
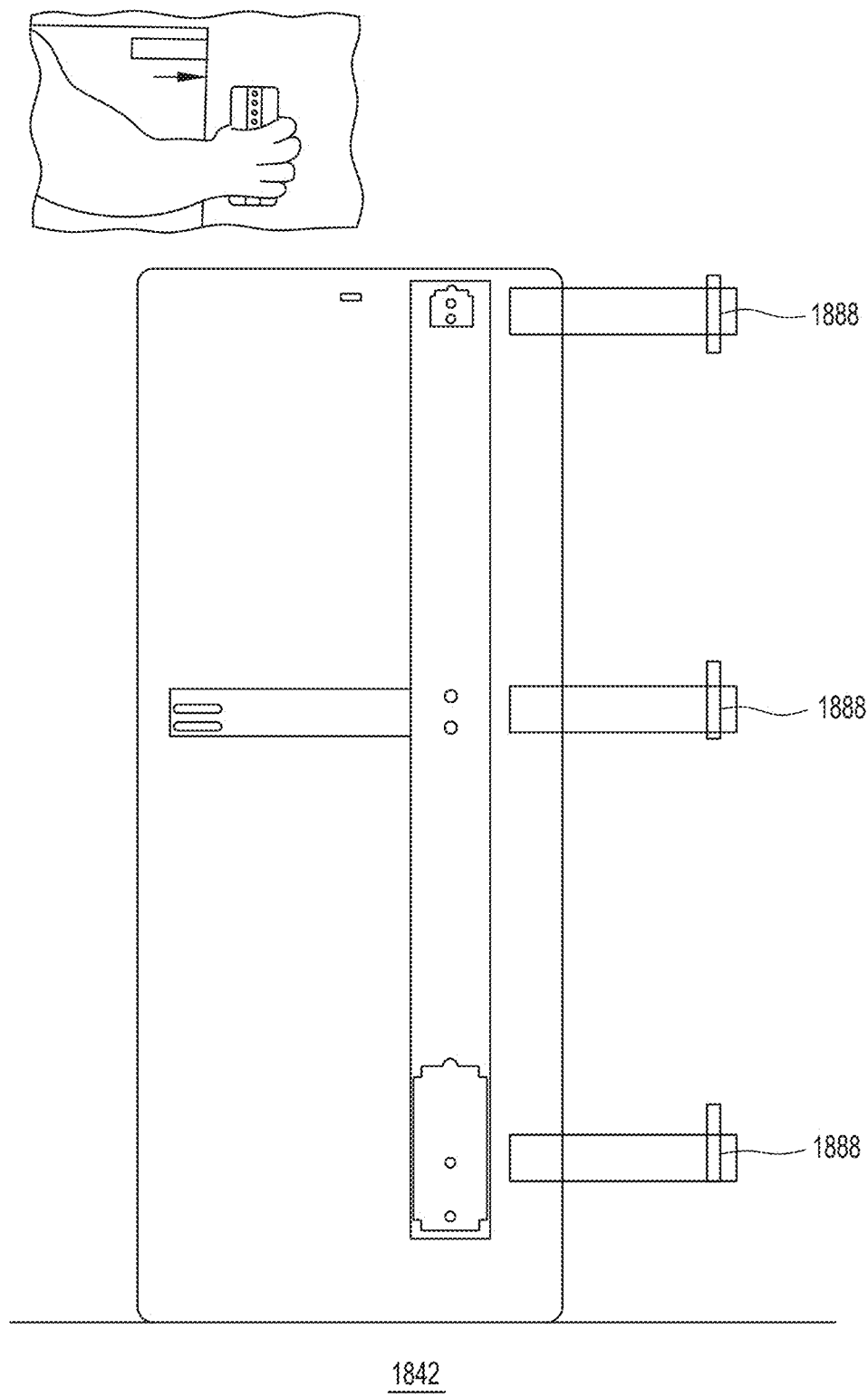
FIG. 19B illustrates an example of installing instructions consistent with embodiments of the present disclosure.
Figure 19C:
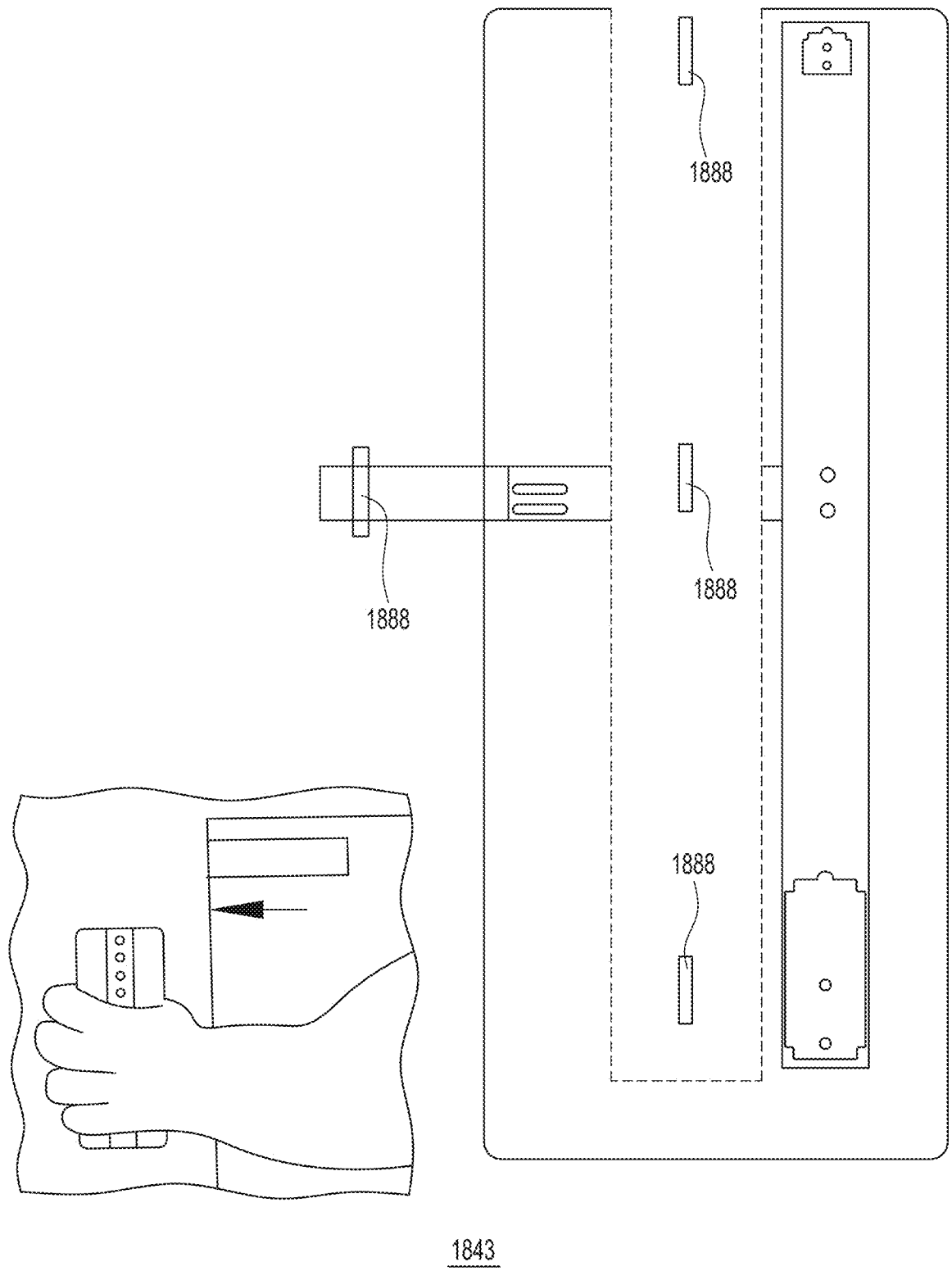
FIG. 19C illustrates an example of installing instructions consistent with embodiments of the present disclosure.
Figure 19D:
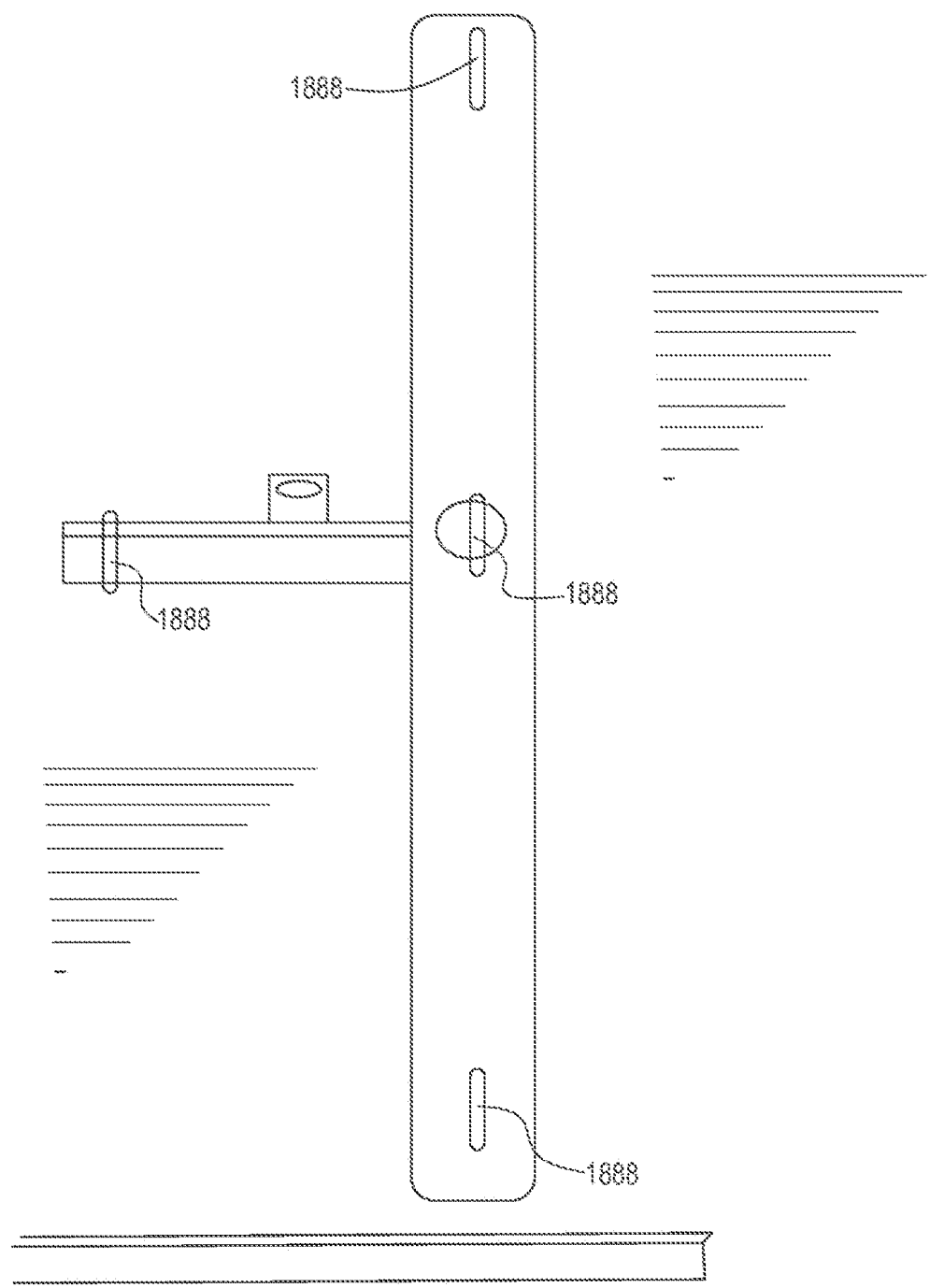
FIG. 19D illustrates an example of installing instructions consistent with embodiments of the present disclosure.
Figure 19E:
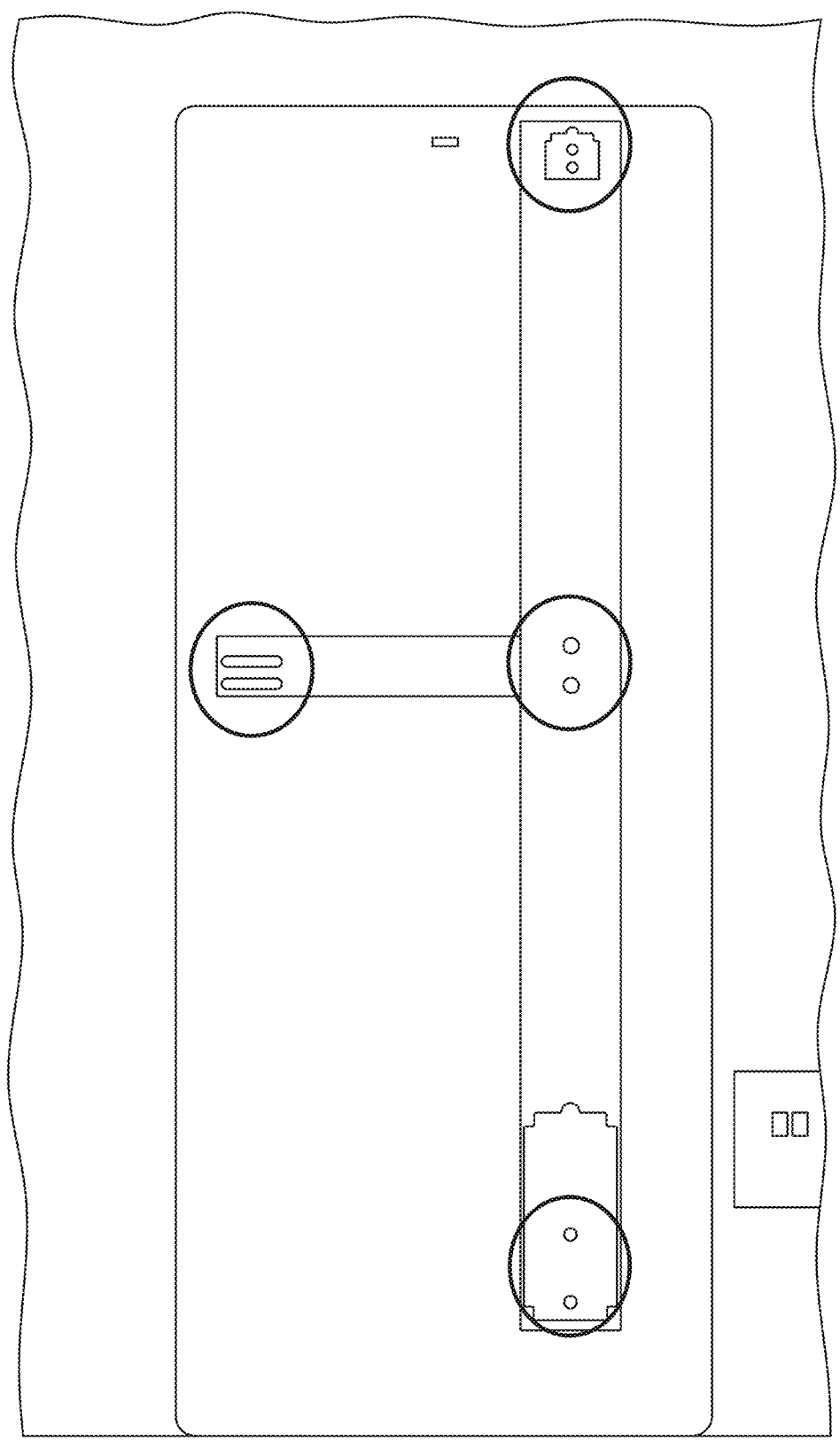
FIG. 19E illustrates an example of installing instructions consistent with embodiments of the present disclosure.
Figure 19F:
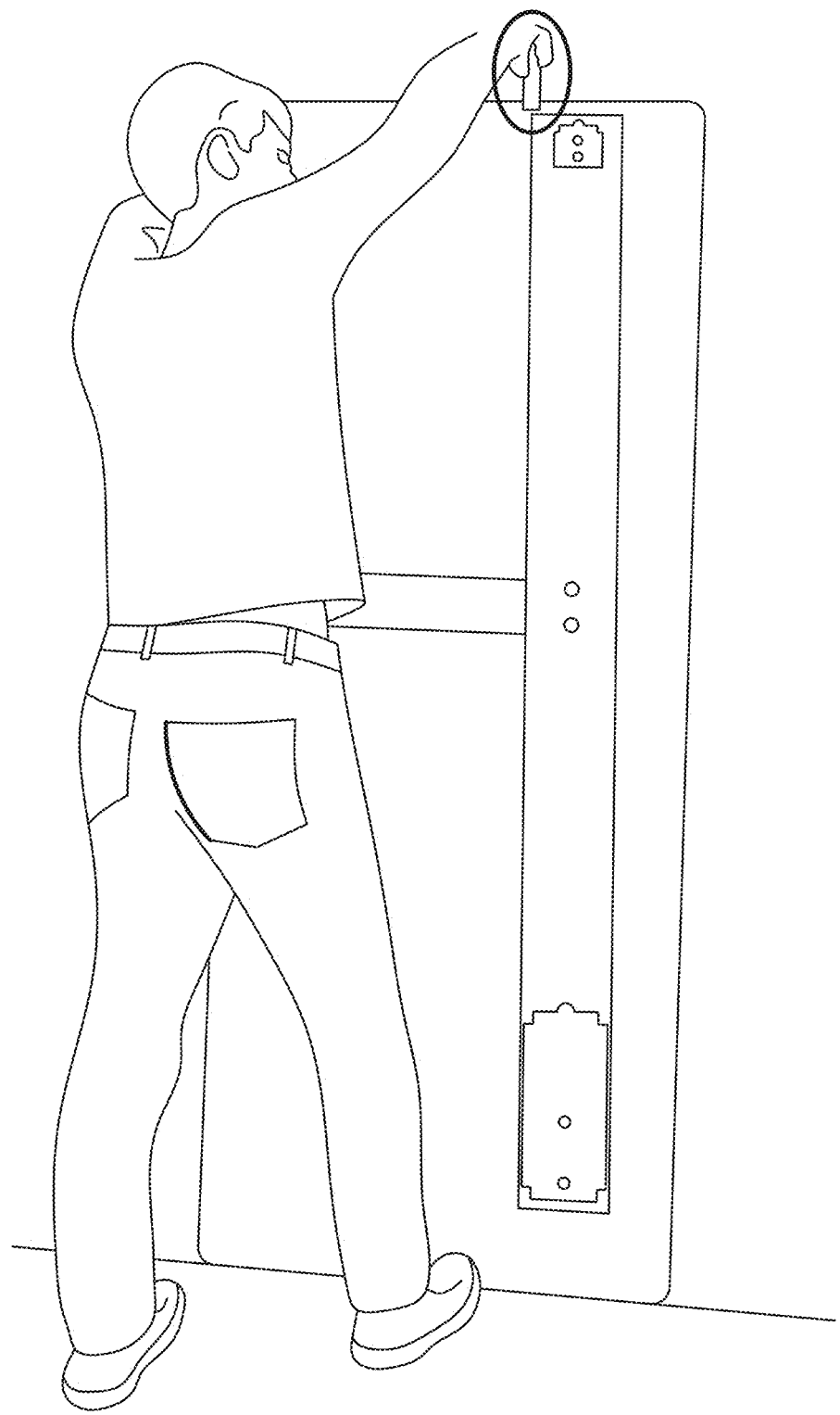
FIG. 19F illustrates an example of installing instructions consistent with embodiments of the present disclosure.
Figure 19G:
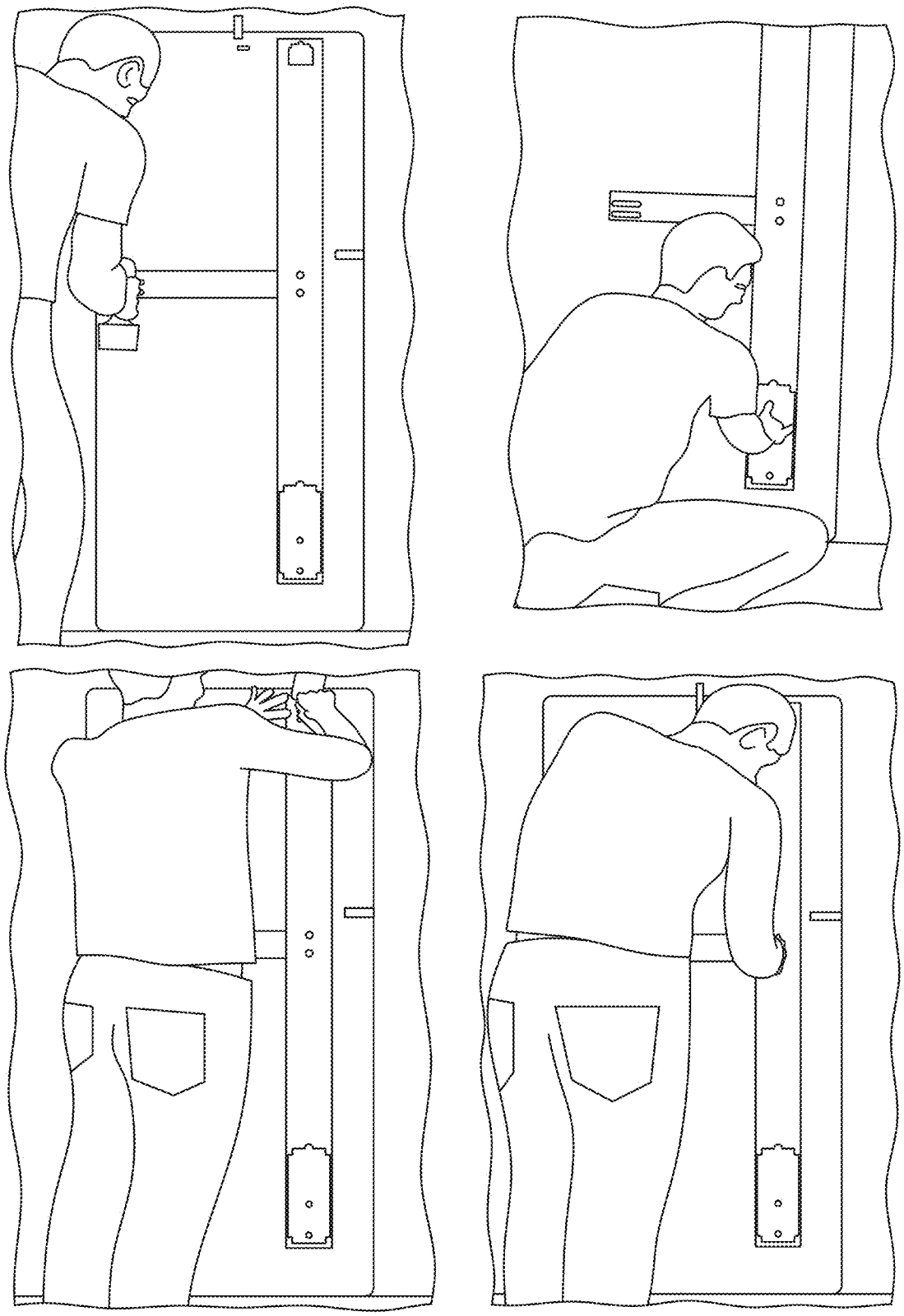
FIG. 19G illustrates an example of installing instructions consistent with embodiments of the present disclosure.
Figure 19H:
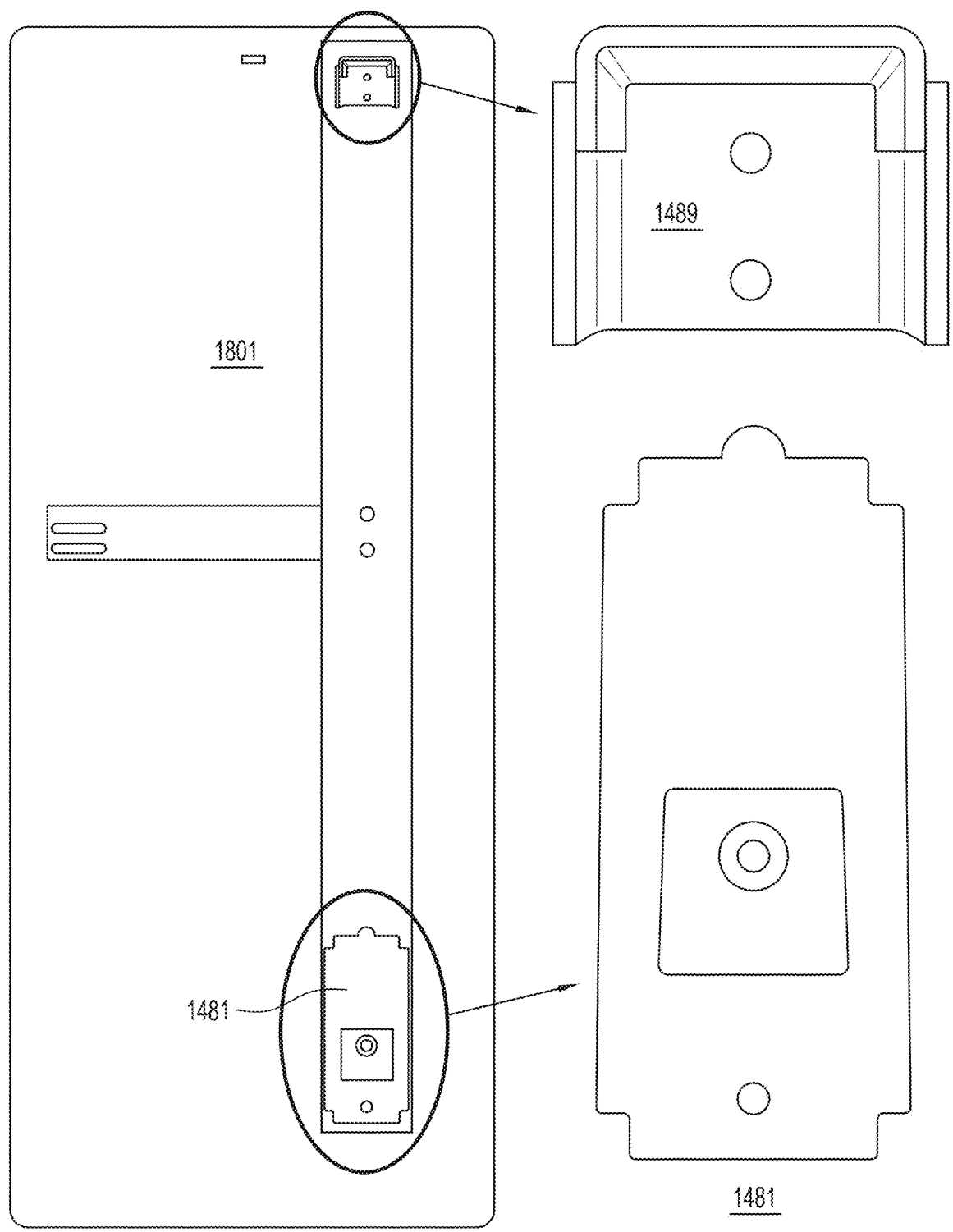
FIG. 19H illustrates an example of an installation process of the exercise equipment consistent with embodiments of the present disclosure.

According to an embodiment, there are provided one or more brackets and wall interfaces to interface with the brackets. In FIG. 19H there are lower wall interface 1481 and upper wall interface 1489. There wall interfaces may interface with upper bracket 230 and lower bracket 236 of previous figures.

The one or more wall interfaces may include a lower wall interface that is shaped and sized to fit within a lower space formed when a lower detachable segment of the detachable segments is removed. See—FIG. 18C that illustrates upper space 1832 exposed when the upper detachable region is removed from the template, and lower space 1832 exposed when the lower detachable region is removed from the template.

Figure 18C:
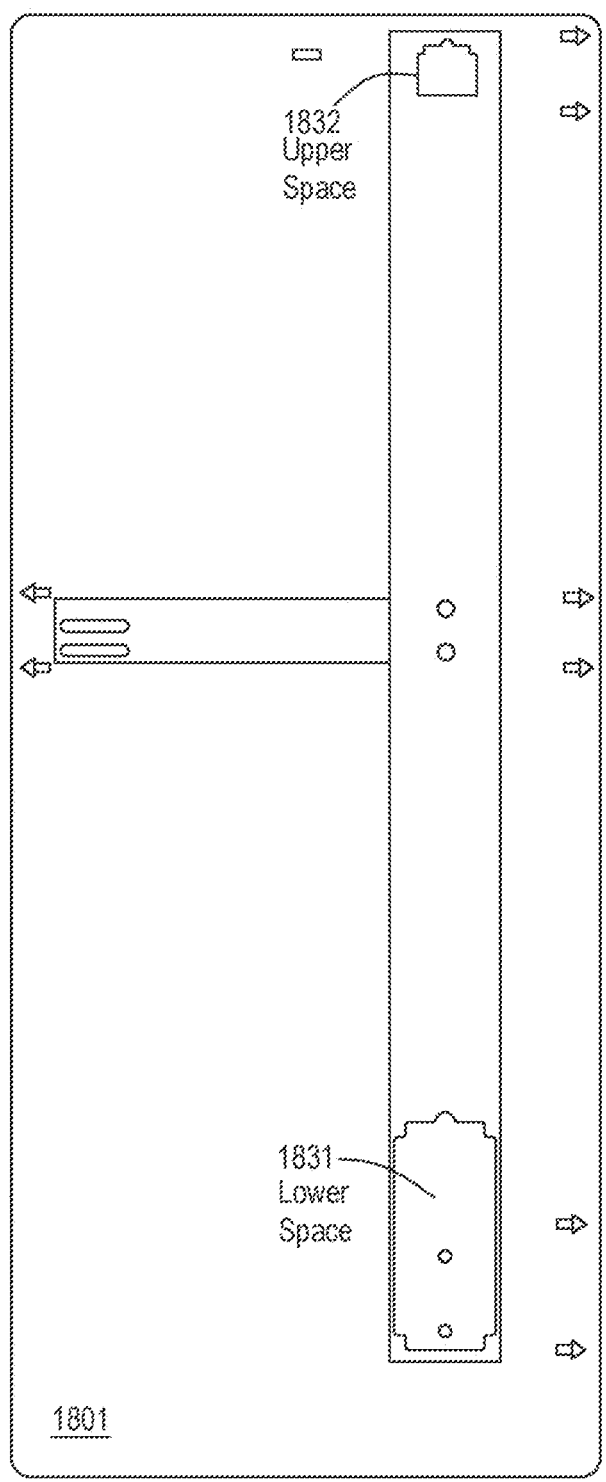
FIG. 18C illustrates an example of a template consistent with embodiments of the present disclosure.
Figure 18D:
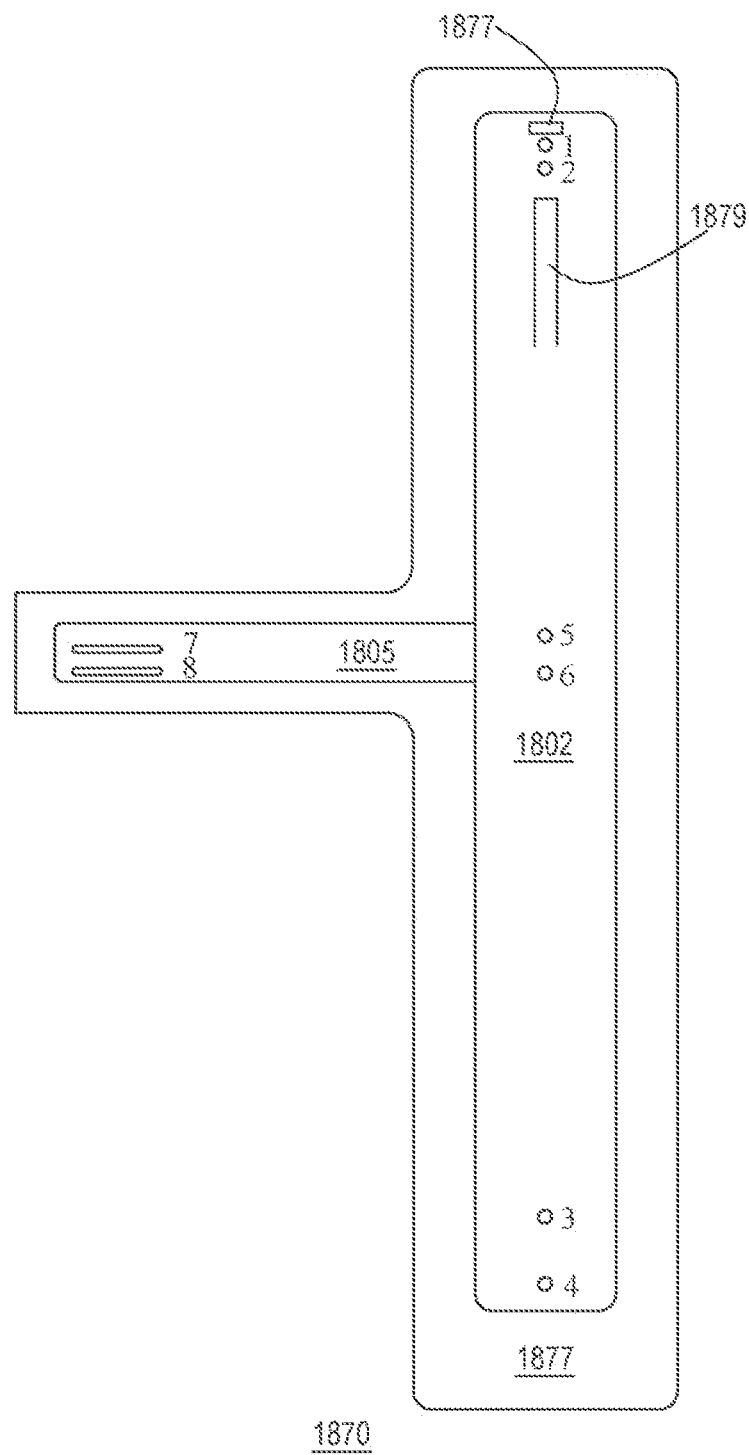
FIG. 18D illustrates an example of a template consistent with embodiments of the present disclosure.
Figure 18E:
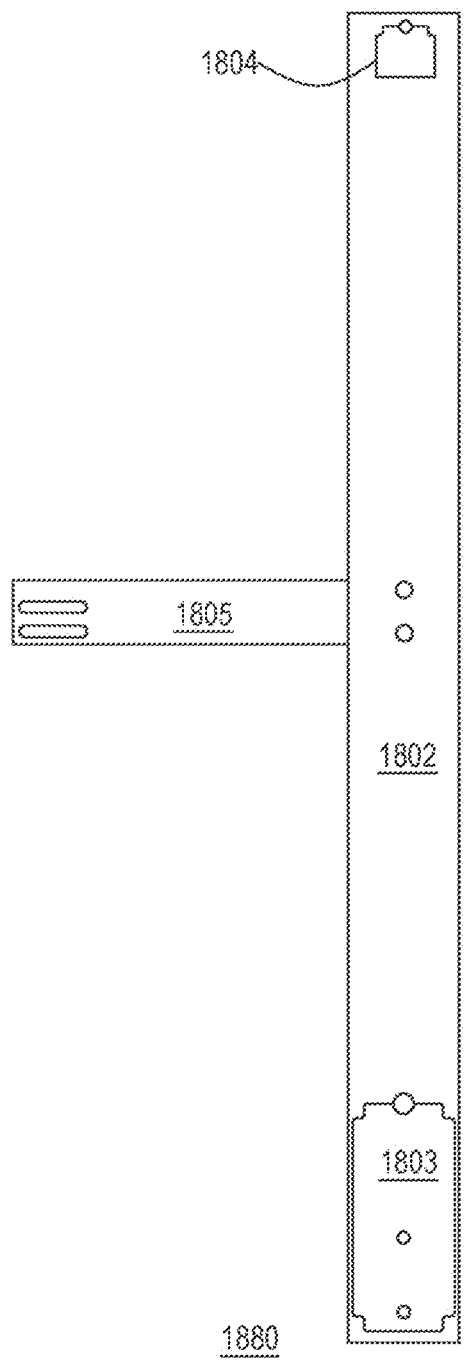
FIG. 18E illustrates an example of a template consistent with embodiments of the present disclosure.

Although FIGS. 18A-18C illustrate the template by having a substantially rectangular shape—the template may have other shapes—for example it may be substantially limited to the vertical region 1802 and the horizontal region 1805 (see template 1880 of FIG. 18E) or include an additional region that surrounds the vertical region 1802 and the horizontal region 1805 (see additional region 1877 of template 1870 of FIG. 18D. The template may have any shape. Either one of the templates of FIGS. 18E and 18D may include any elements of the templates of any figure of 18-18C. FIG. 18D also illustrates having numbers that are assigned to the different holes—for brevity of installation.

Figure 19I:
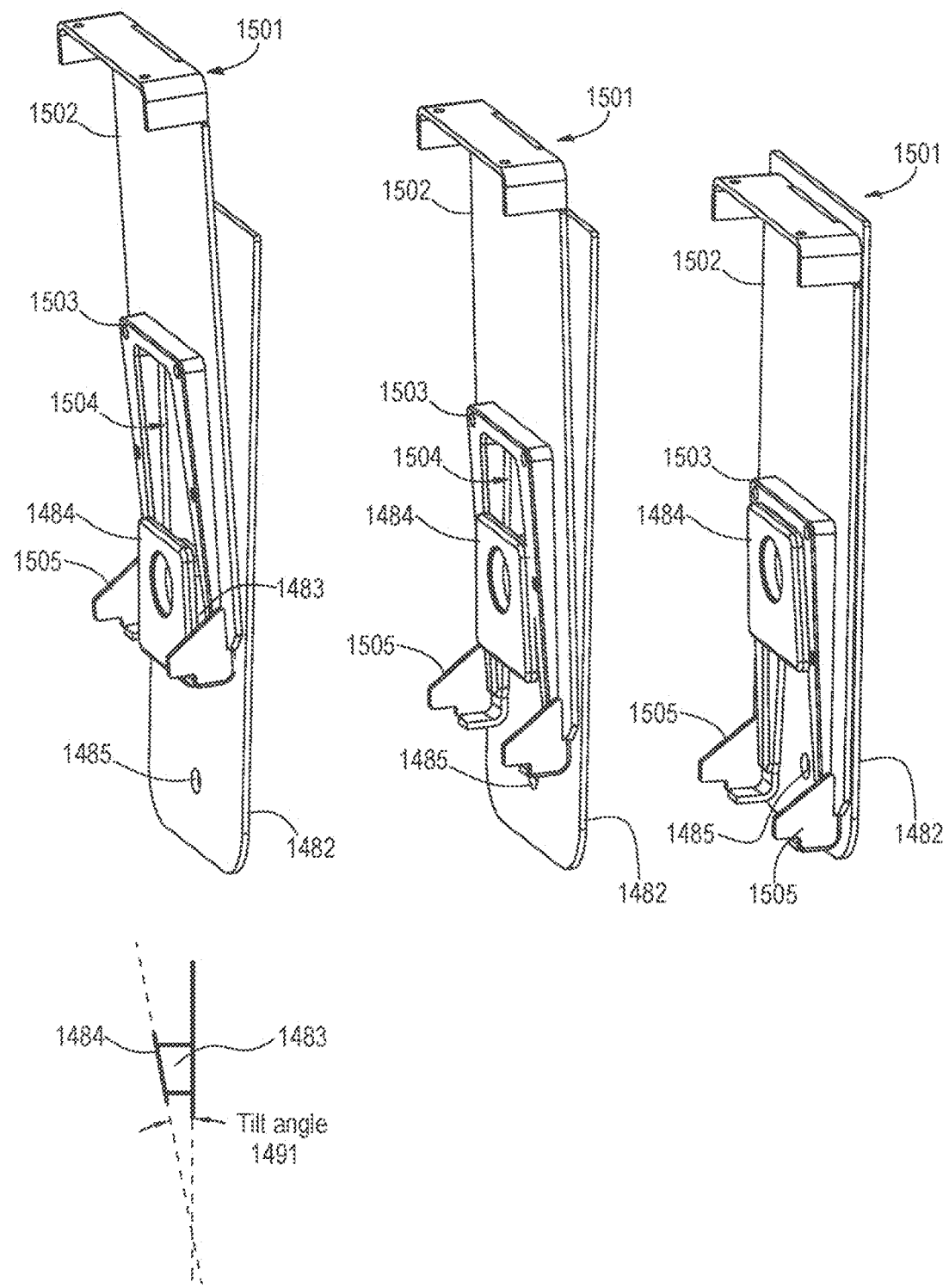
FIG. 19I illustrates an example of an installation process of the exercise equipment consistent with embodiments of the present disclosure.
Figure 19J:
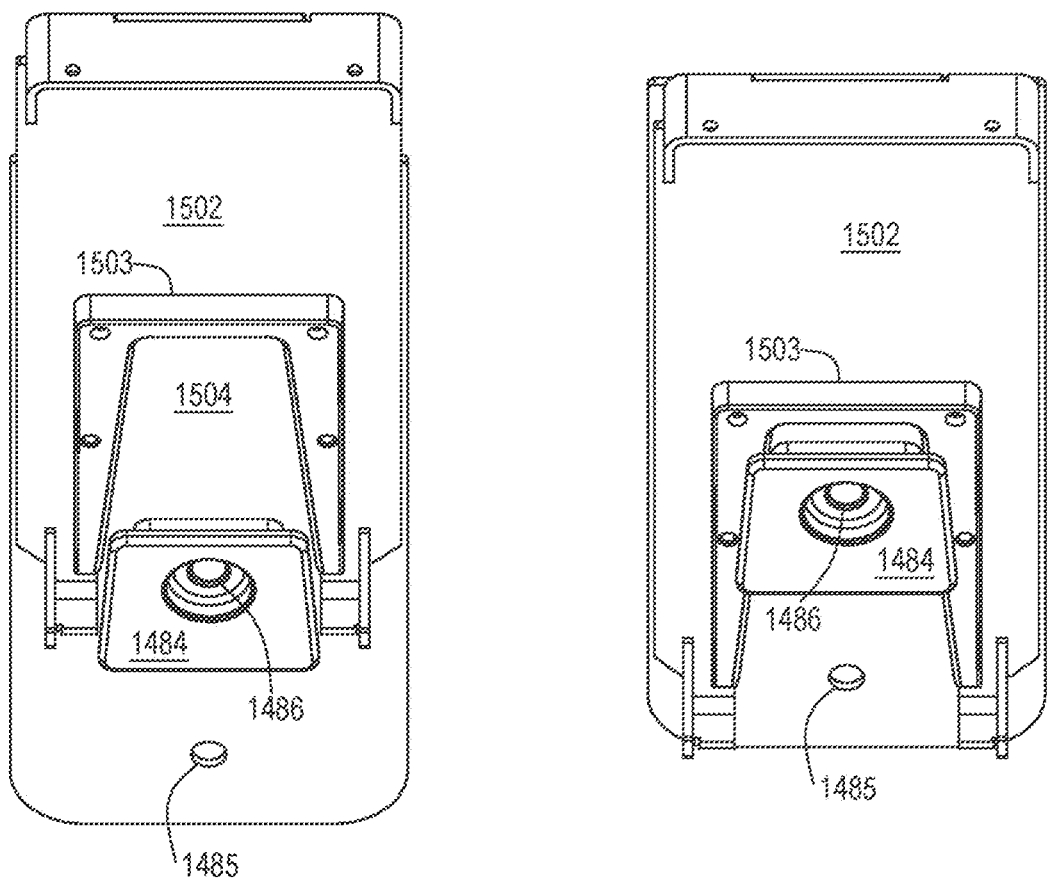
FIG. 19J illustrates an example of an installation process of the exercise equipment consistent with embodiments of the present disclosure.
Figure 19K:
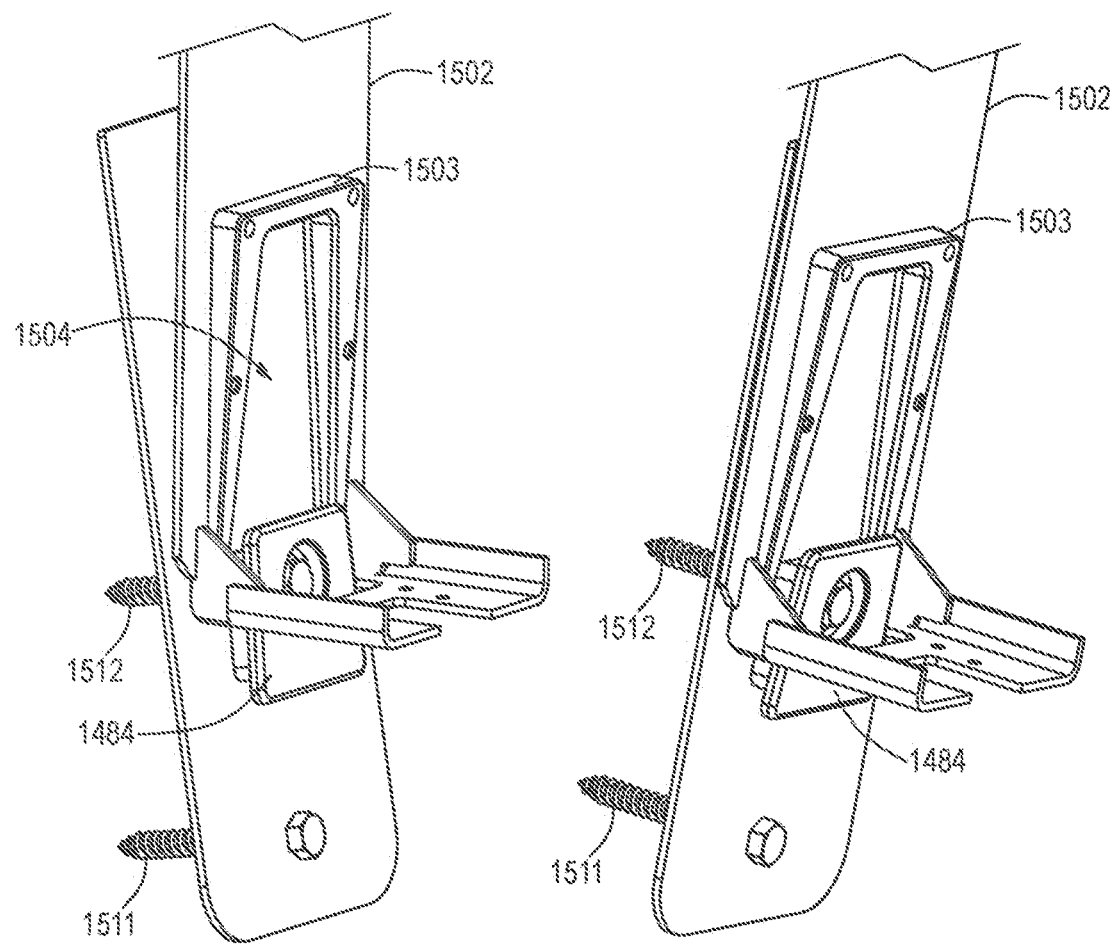
FIG. 19K illustrates an example of an installation process of the exercise equipment consistent with embodiments of the present disclosure.
Figure 19L:
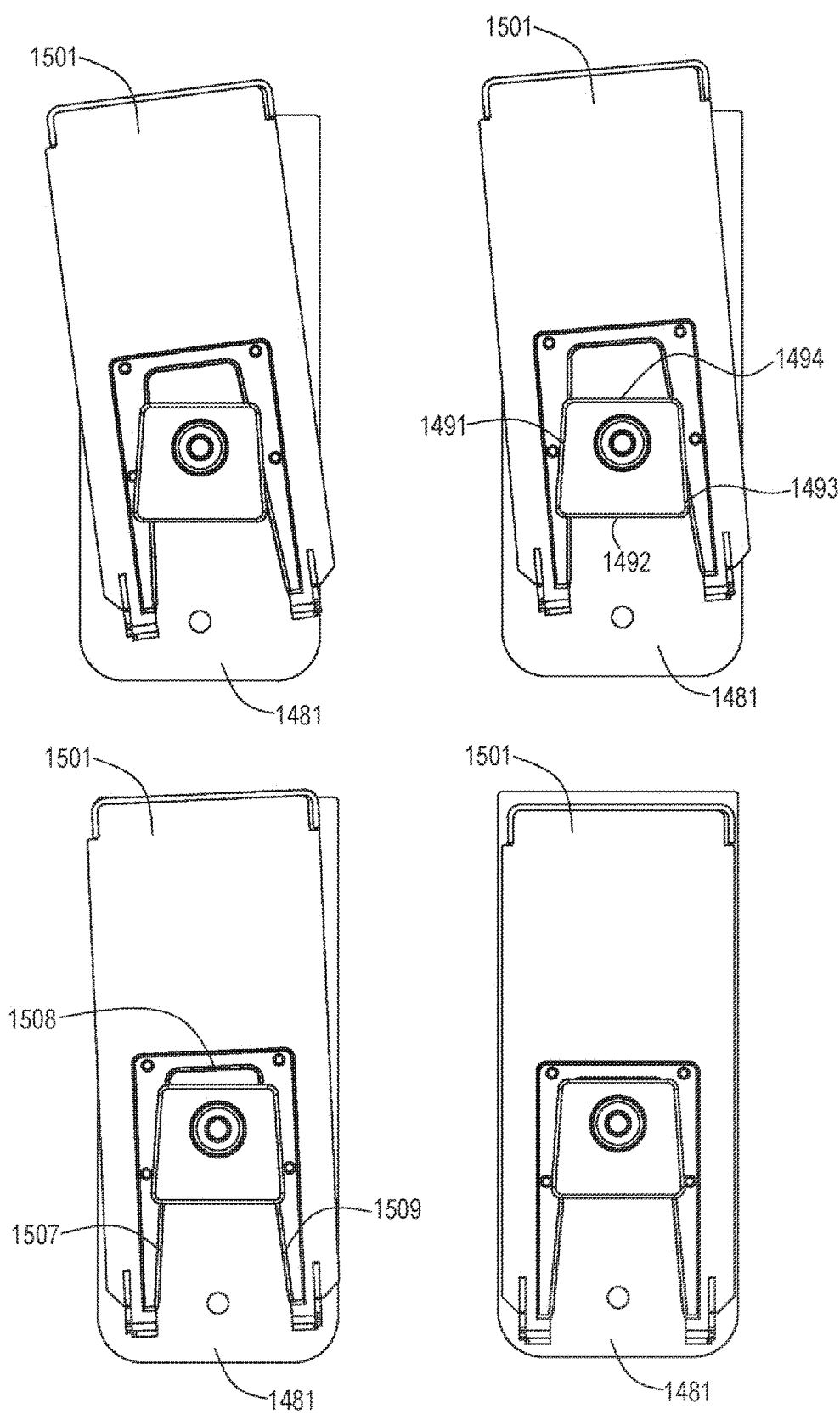
FIG. 19L illustrates an example of an installation process of the exercise equipment consistent with embodiments of the present disclosure.

The lower wall interface may include a tilted interface that has a base and a top, wherein the base is wider than the top. FIGS. 19I-19K illustrates the lower wall interface as including a base surface (such as plate 1481), an intermediate support element 1483 and a tilted interface (such as plate 1484) that is supported by the intermediate support element 1482 and is tilted by a tile angle 1491 in relation to the base surface—to provide a tilted gap between the tilted interface and the plate—which eases the installation of the exercise equipment (especially an exercise equipment interface 1501) on the lower wall interface—as the tilted interface does not require the installer to initially position the exercise equipment interface within a narrow gap that his borders are parallel to each other—the exercise equipment interface may be initially inserted when not exactly parallel to the wall to which the lower wall interface is secured—and then can be tilted towards the wall.

The one or more wall interfaces may include an upper wall interface that is shaped and sized to fit within a upper space formed when a upper detachable segment of the detachable segments is removed. The exercise equipment interface (denoted 1501 in FIGS. 19I-19L) is a part of the frame of the exercise equipment and includes an interface plate 1502 and a frame 1503 that extends from the interface plate to define an opening 1504. In FIGS. 19I-19L the opening gradually expands from its top to its bottom, and has a top portion that fits the intermediate support element, and a bottom portion that is wider than the intermediate support element—which enables to easily mount the exercise equipment interface on the lower wall interface—even if initially the exercise equipment interface and the lower wall interface are not aligned. The top portion of the opening may be narrower than the tilted interface—in order to allow the exercise equipment interface to be held by the tilted interface.

According to an embodiment—a through hole 1486 is formed in the tilted interface
  at the location of first hole 1812 of the template. FIG. 19K illustrates first screw 1511 that passes through the hole 1485 and a second screw that passes through hole 1486.

Figure 19M:
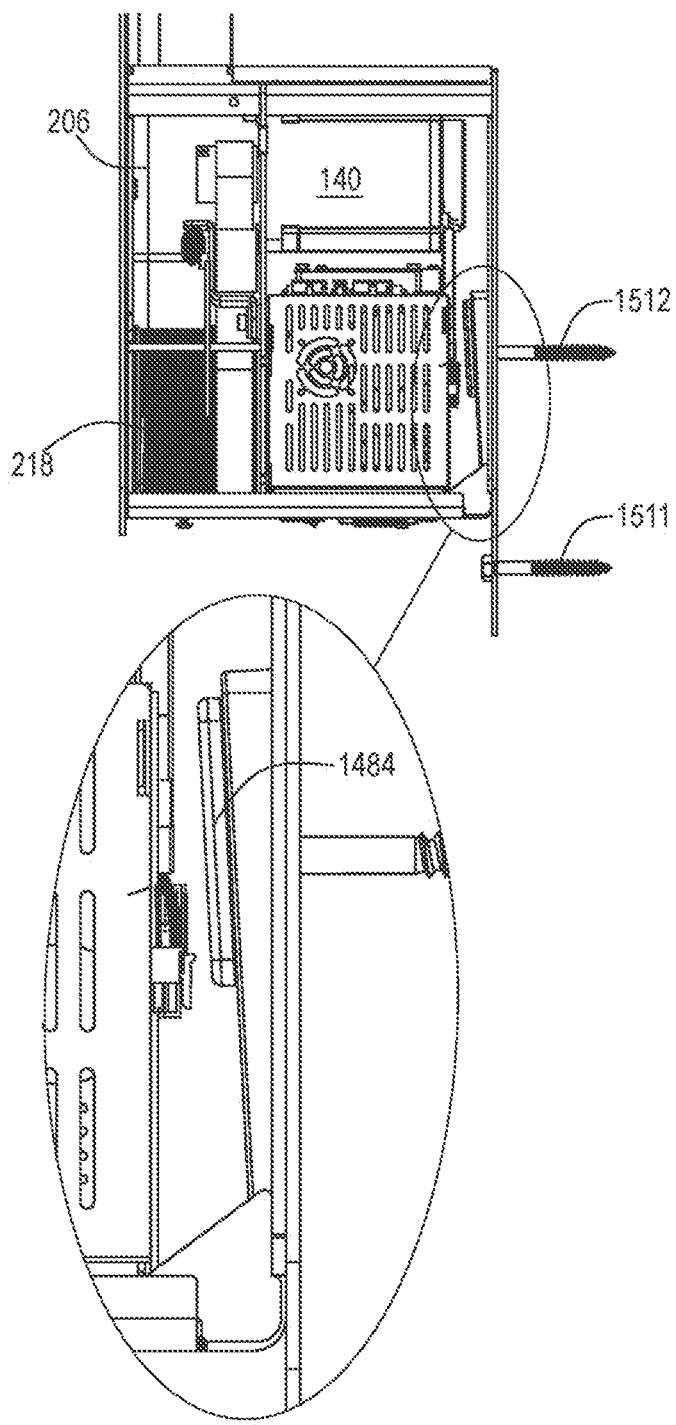
FIG. 19M illustrates an example of an installation process of the exercise equipment consistent with embodiments of the present disclosure.

FIG. 19M illustrates the first screw 1511, the second screw 1512, the tilted interface 1481 that are used to mount the exercise equipment. FIG. 19M illustrates some of the parts of the exercise equipment that are located to the lower part of the exercise equipment.

There may be any number of wall interfaces—for example there may be more than two wall interfaces. One wall interface may be located to the side of the other wall interface.

The template may also include one or more attachment tapes for attaching the template to a wall—once the template is leveled and positioned at the desired location.

The attachment tapes may be double sided adhesive tapes.

In order to further ease the installation the template may include installation instructions that are printed on the template body or provided in any other manner—digital instructions, video and the like.

The template may form a part of an exercise equipment package. This may reduce the environmental footprint of the template and may reduce the overall size of the exercise equipment package.

The template may include graphical information indicative of the shape and size of at least some parts of the frame of the exercise equipment—such as the vertical wall-mounted beam and the T-bar.

The installation process may include the following steps:
a. Using a stud finder to locate the studs at the height of the height range markers of the template. If the wall does not include studs, the installation process may include finding the locations of other supporting areas that are strong enough to support the exercise equipment.
b. Positioning the template a desired height (but to the side of the desired location), leveling the template and attaching alignment markers (denoted 1888 in FIGS. 19B, 19C and 19D) to the wall (at the location of the stud) at one or more height ranges that correspond to one or more height range markers located in proximity of a longitudinal range of the template. In FIG. 19D the various parts of the excise equipment are shown on the wall—but this is only for illustration of the alignment instructions). The alignment markers may be aligned with one longitudinal edge of the template. It should be noted that instead of using alignment markers—the installer may use a pen or a pencil and draw alignment signs on the wall. The template may include one or more windows to see the drawn alignment signs and/or to see the alignment markers. FIG. 18D illustrates a window 1879 for seeing drawn alignment signs or alignment markers positioned behind the template. Step (b) may be repeated—after moving the template—to position one or more alignment markers at one or more height ranges that correspond to one or more height range markers located in proximity of another longitudinal edge of the template. For example—there may be three height range on one side of the template and a single height range on the other side of the template. Any number of height ranges may be provided on each side of the template.
c. Positioning the template in the desired location (in both x-axis and y-axis)—by aligning at least some of the holes formed in the template with the alignment markers. This step also includes leveling the template.
d. Attaching the template to the wall.
e. Drilling pre-drill holes in the wall (through the multiple holes).
f. Removing the detachable segments of the template body.
g. Positioning the wall interfaces in the spaces exposed due to the removal of the detachable segments.
h. Leveling the wall interfaces and securing the wall interfaces to the wall.

FIGS. 19A-19G illustrates examples of installing instructions 1841-1847.

According to an embodiment, the securing of the wall interfaces to the wall is followed by (see FIGS. 23A-23I):

a. Mounting the exercise equipment on the bottom wall interface.
b. Rotating the top exercise equipment towards the top wall interface.
c. Fastening the exercise equipment to the top wall interface.—See for example screw 1563 of FIG. 23E.
d. Fastening (see FIGS. 9A-9G) bracket 918 to the wall using screws 1571-1574 that mesh with wall plugs 1581-1584 formed in the hole and securing the T-bar 204 to the vertically wall-mountable beam 202.

For simplicity of explanation, FIGS. 23A-23I include only the following reference numbers:
a. Vertically wall-mountable beam 202
b. Lower bracket 230.
c. Top bracket 236.
d. Bracket 918 for fastening the T-bar to the wall.
e. Lower wall interface 1480.
f. Top wall interface 1489 for interfacing with top bracket 236.
g. First and second screws 1511 and 1512 for fastening the low bracket to the lower wall interface 1480.
h. Third and fourth screws 1561 and 1562 for fastening the top bracket to the top wall interface 1489.
i. Screws 1563 and 1571-1574.
j. Wall plugs 1581-1584, 1585-1586 (for receiving screws 1512 and 1511) and 1587-1588 (for receiving screws 1562 and 1561). In various figures of the current application the wall plugs were not shown for simplicity of explanation.

Cable Replacement

Any reference to an exercise equipment in relation to cable replacement (or in relation to any other matter) is applicable mutatis mutandis to a method for operating the cable replacement in relation to the cable replacement (or in relation to any other matter).

FIGS. 20A, 20B, 20C, 20D, 20E and 20F illustrate an example of parts that participate in a cable replacement process.

The cable may be replaced from time to time. According to an embodiment the exercise equipment is designed to allow an easy replacement of the cable. The exercise equipment includes cable replacement assistance elements such as openings for receiving a new cable, and guides for allowing the inserted cable to easily propagate to its destination.

According to an embodiment, the cable replacement assistance elements are designed to enable an easy replacement of the cable, with minimal disassembly steps and minimal assembly steps.

Figure 20A:
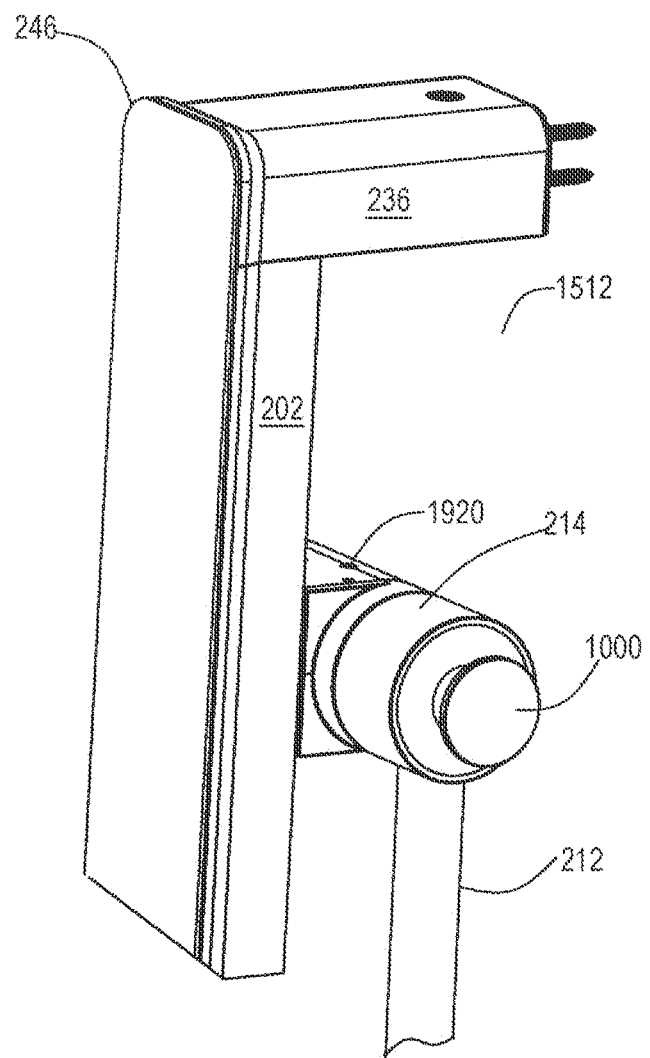
FIG. 20A illustrates an example of parts that participate in a cable replacement process.
Figure 20B:
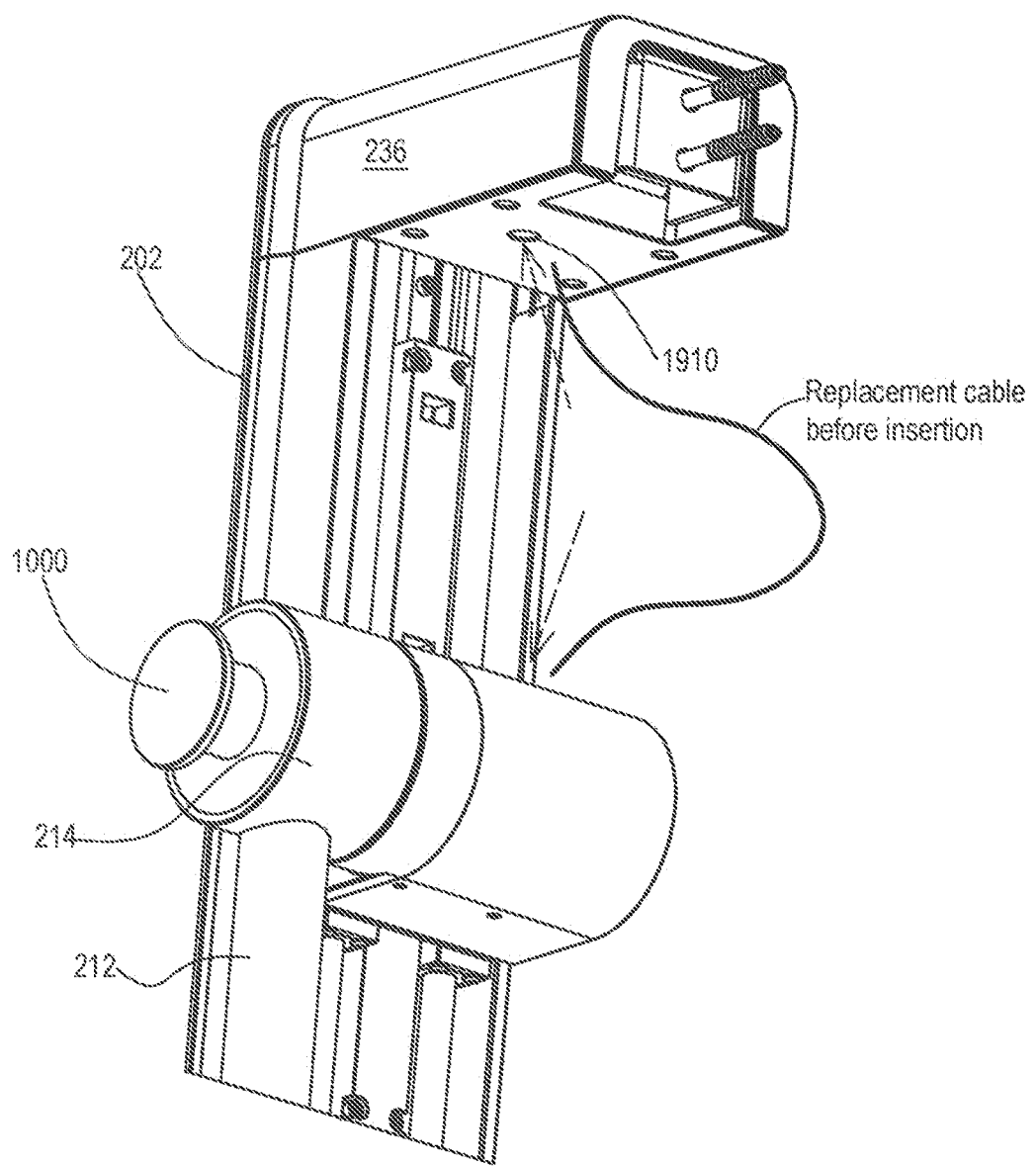
FIG. 20B illustrates an example of parts that participate in a cable replacement process.
Figure 20C:
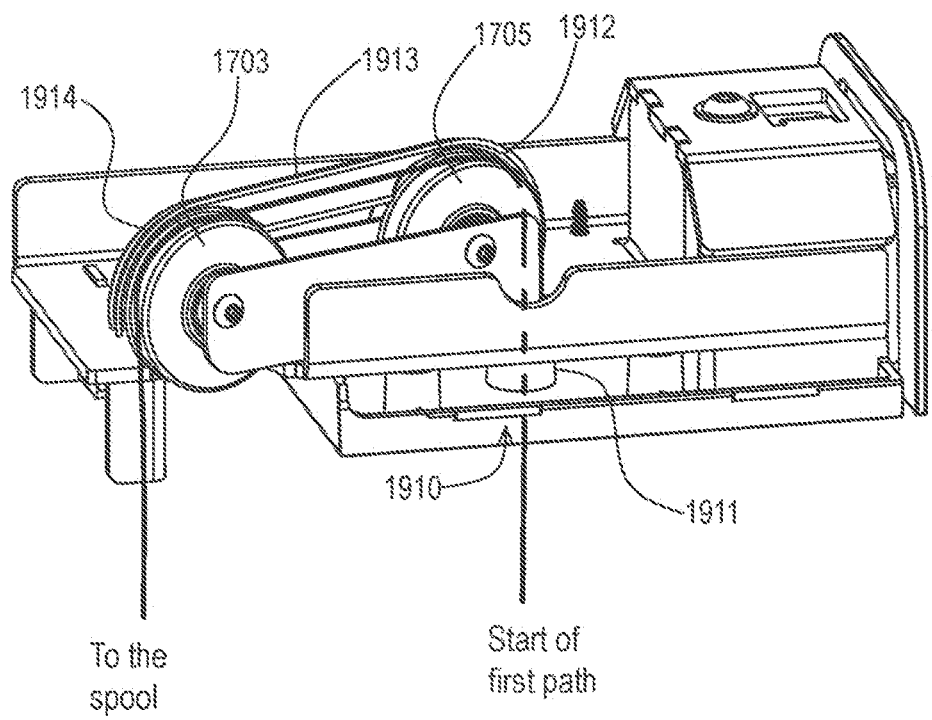
FIG. 20C illustrates an example of parts that participate in a cable replacement process.
Figure 20D:
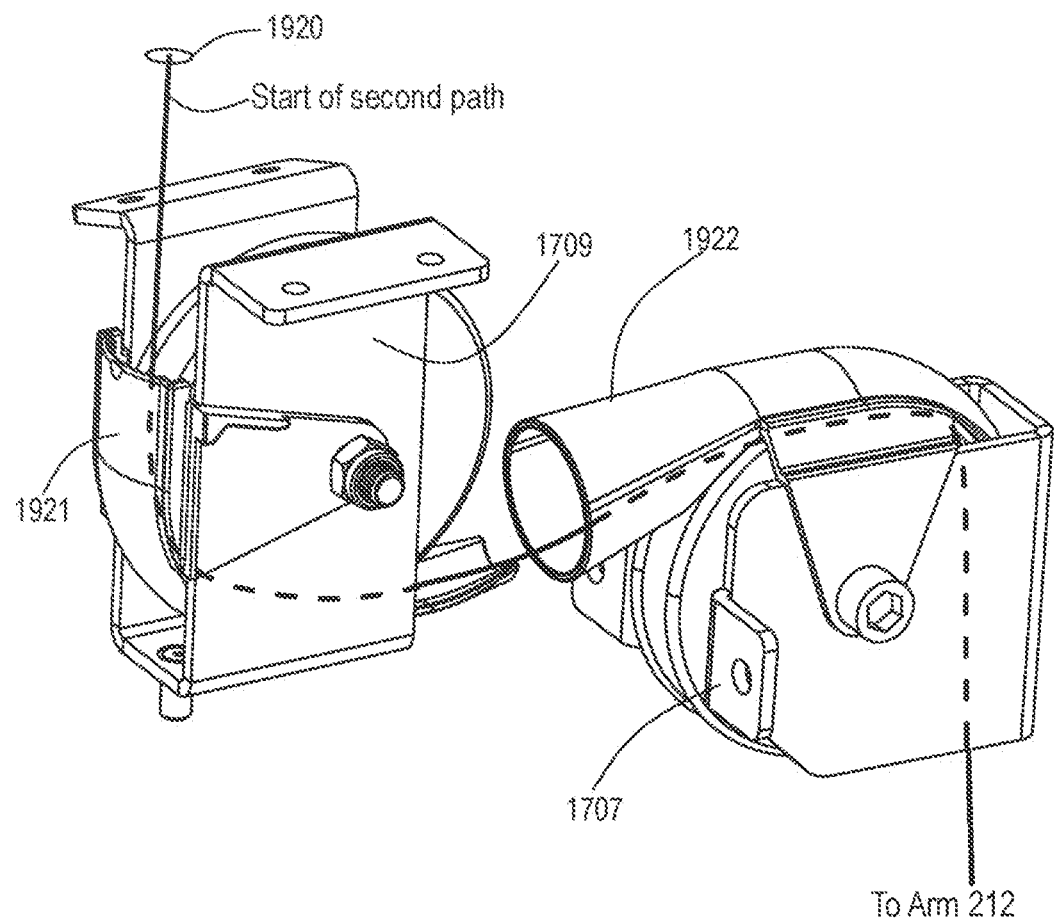
FIG. 20D illustrates an example of parts that participate in a cable replacement process.

According to an embodiment the cable insertion includes (a) inserting one part of a cable to an upper opening 1910 (formed, for example, in the upper bracket 236 as shown for example in FIG. 20B) and guiding the cable through a first path, and (b) inserting a second part of the cable to a lower opening 1920 (formed for example in the rotatable shoulder 214) and guiding the cable through a second path.

Figure 17E:
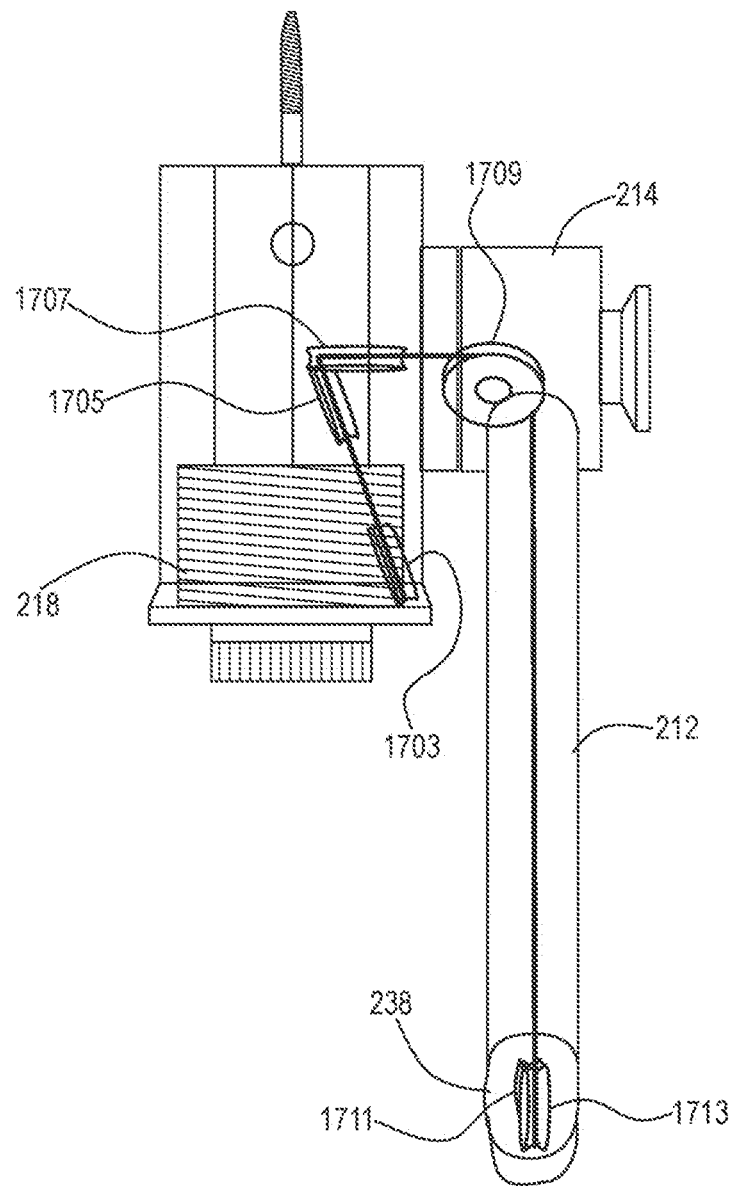
FIG. 17E illustrates an example of some part of an exercise equipment consistent with embodiments of the present disclosure.
Figure 17F:
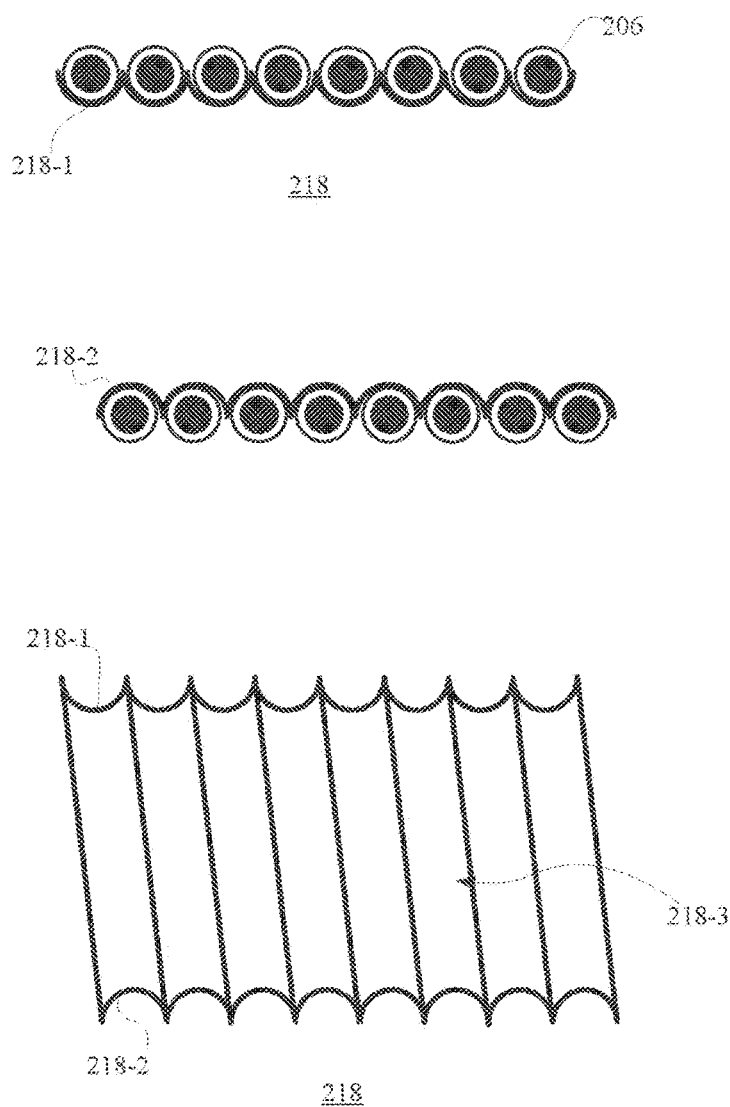
FIG. 17F illustrates an example of a part of a spool that has a spiral thread consistent with embodiments of the present disclosure.

According to an embodiment, the first path passes through first guiding elements including covers and/or tunnels 1911, 1912, 1913 and 1914 (some of which are associated with the first vertical sheave 1703, and the second vertical sheave 1705), and other pathways till reaching the spool 218 (see FIGS. 17A and 17E). The first end of the cable is then fastened to the spool or to any other element in mechanical communication with the spool.

According to an embodiment, the second path passes through second guiding elements including covers and/or tunnels 1921, and 1922 (some of which are associated with the third vertical sheave 1707, and the first arm sheave 1709), through an inner space formed (at least in part) by interior positions of the grooves of the pair of wrist sheaves 1711 and 1713, and having a second end of the cable fastened to an interface (such snap interface 1999 that is detachably coupled to exercise accessory 222—as illustrated in the left upper end of FIG. 17B) that follows the wrist sheaves.

The assembly and removal of the cable may require opening a faceplate 246 (FIG. 20A) affixed to the vertically wall-mountable beam 202.

The removal of the cable may include releasing it from the interface (such as snap interface 1999 of FIG. 17B, and releasing from the spool.

Figure 20E:
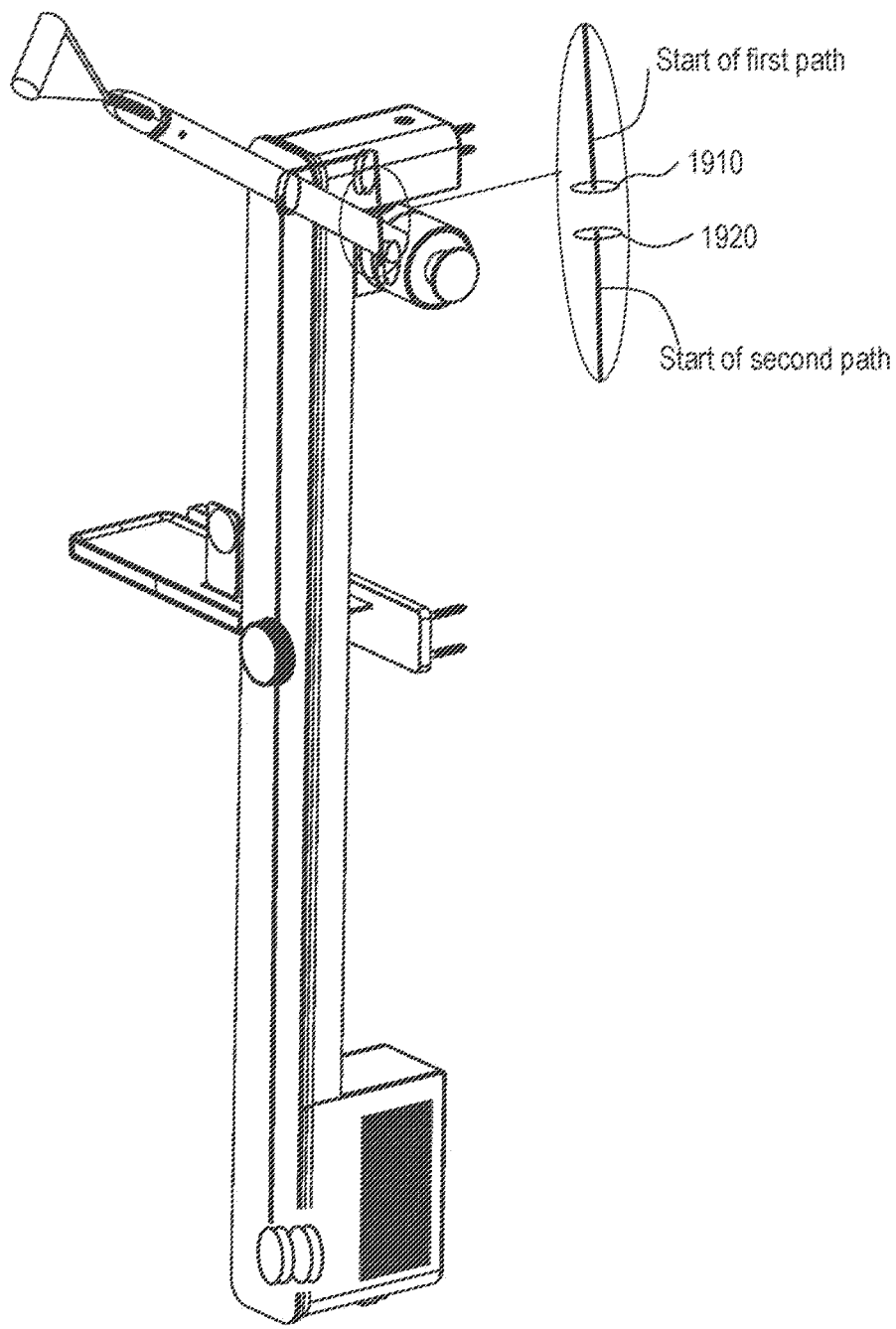
FIG. 20E illustrates an example of parts that participate in a cable replacement process.

FIG. 20E illustrates the border between the first path and the second path—the border is located between openings 1910 and 1920.

Figure 20F:
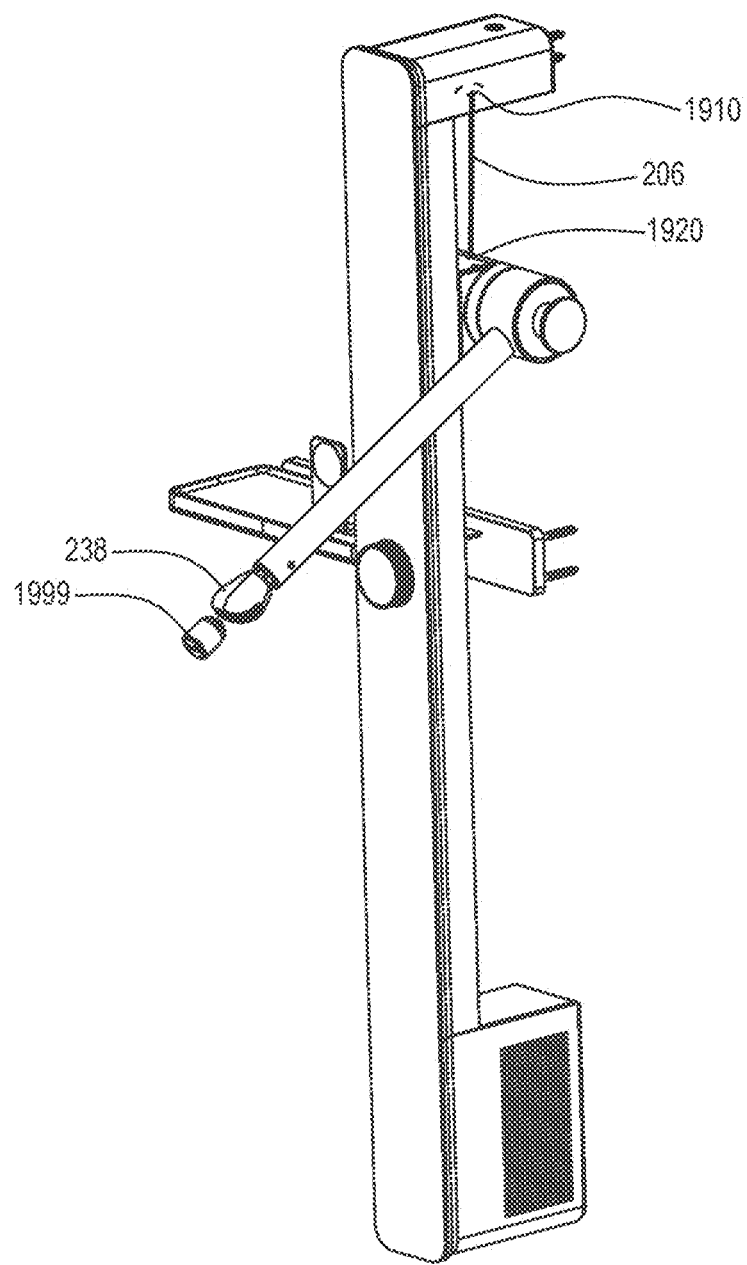
FIG. 20F illustrates an example of parts that participate in a cable replacement process.

FIG. 20F illustrates an example of the exercise equipment, the first opening 1910 (located at the bottom of the top bracket), second opening 1920, the arm, wrist 238 and snap interface 1999. The first path lies between the first opening and the spool, while the second path lies between the second opening and the snap interface 1999.

The first and second openings may be formed in any other part of the exercise equipment that—especially at locations that are proximate to sheaves. For example—the second openings may be formed at a housing or other structural element movable with the trolley.

The suggested exercise equipment allows the replacement of the cable in a user friendly manner, safe and simple manner. There is no need to dismantle multiple parts of the exercise equipment, no need to specifically guide the cable through sheaves.

According to an embodiment the installment of a replacement cable includes (following a removal of the replaced cable):
a. Positioning a first end of the cable through the first opening and pushing the first part of the cable (which terminates with the first end) until it reaches the spool. The spool can be exposed by removing a panel or using a spool opening.
b. Connecting the first end of the cable to the spool—using a connector or a knot.
c. Positioning a second end of the cable through the second opening and pushing the second part of the cable (which terminates with the second end) until it exits the wrist and/or reaches the snap interface (or other interface).
d. Connecting the second end of the cable to the snap interface or other interface—using a connector or a knot.

According to an embodiment the removal of a replaced cable includes:
a. Disconnecting a first end of the replaced cable from the spool.
b. Disconnecting a second end of the replaced cable from the snap or other interface.

Figure 20G:
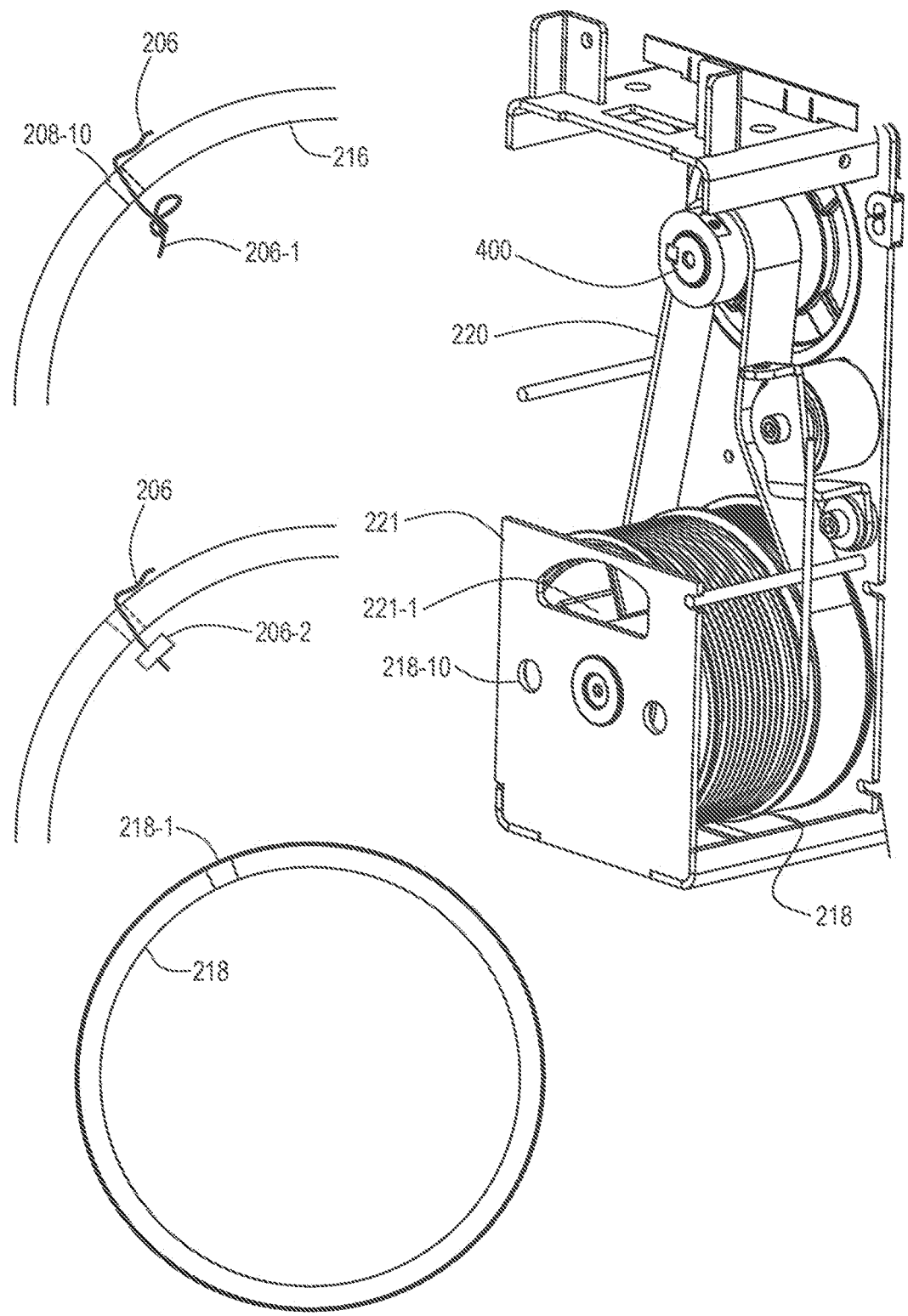
FIG. 20G illustrates an example of parts that participate in a cable replacement process.

FIG. 20G illustrates an example of a spool 218 that includes a through hole 218-10 through which the cable 206 may pass through and have its end held (see holder 206-2) or tied (see tie 20-6) in order to keep the cable held by the spool 218. Once the cable has to be removed—the end of the cable is released and the cable can be extracted from the exercise equipment. During a replacement of the replacement rope the end of the replacement rope passes through the through hole and is fastened or tied within the interior of the spool.

The exercise equipment includes an interface such as plate 221 that includes openings 221-1 for allowing access to the through hole and the end of the cable—once the faceplate is released or opened.

Figure 20H:
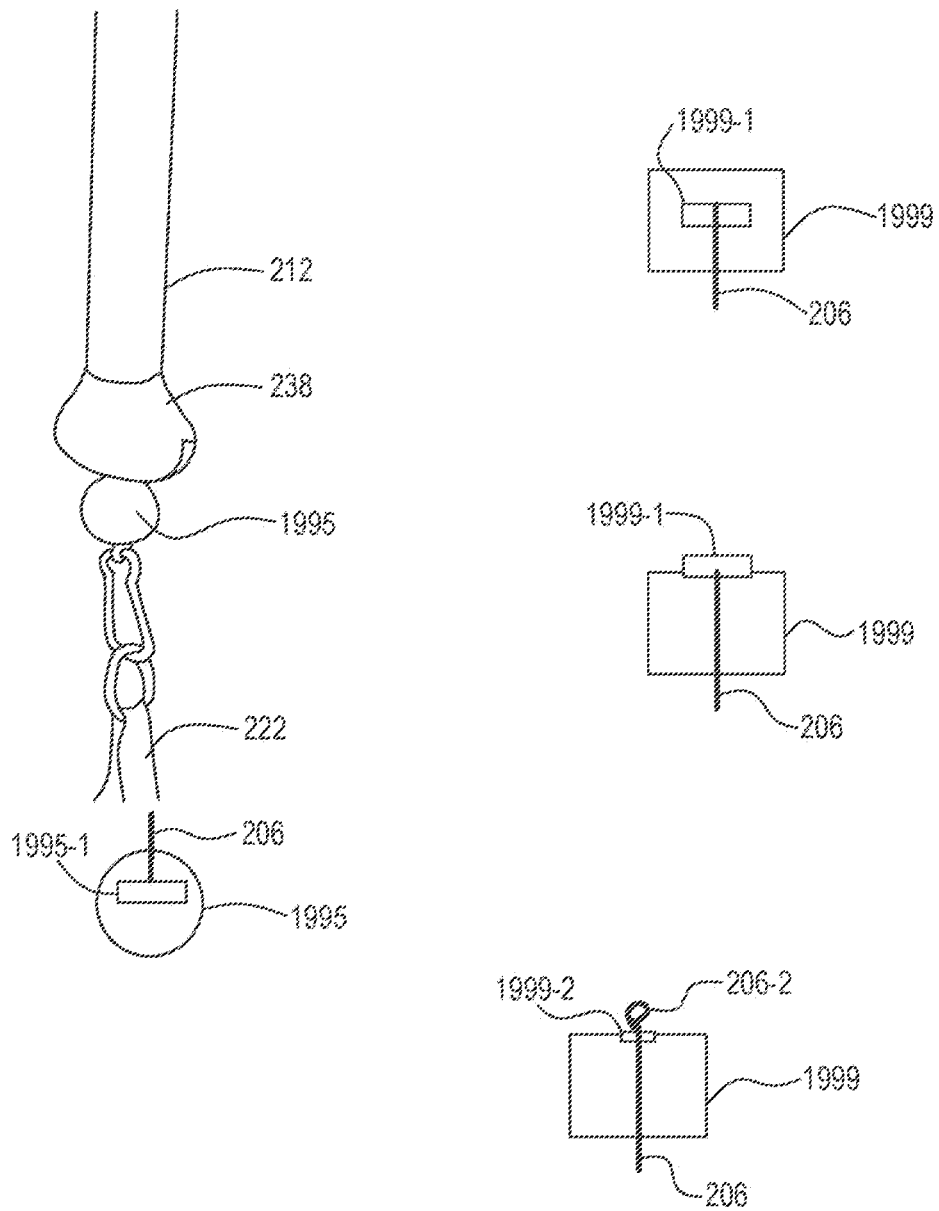
FIG. 20H illustrates an example of parts that participate in a cable replacement process.
Figure 21A:
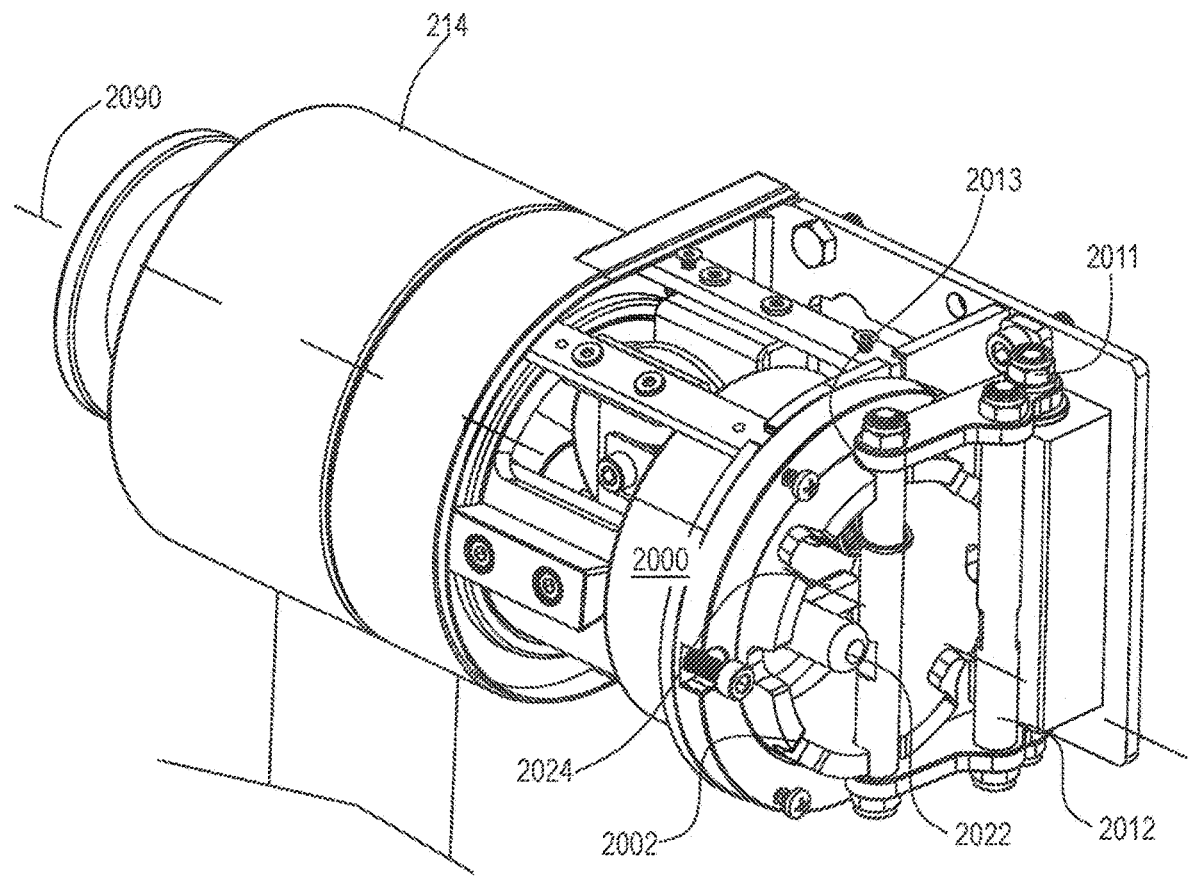
FIG. 21A illustrates an example of parts that participate in a arm rotation and fixation process.
Figure 21B:
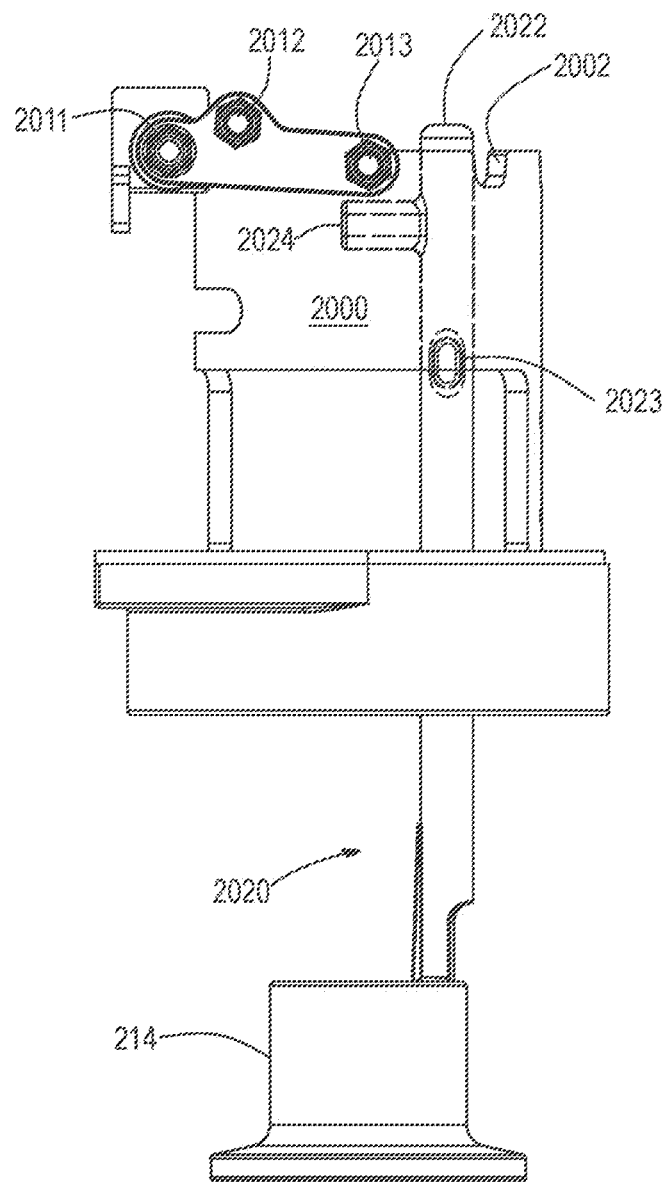
FIG. 21B illustrates an example of parts that participate in a arm rotation and fixation process.
Figure 21C:
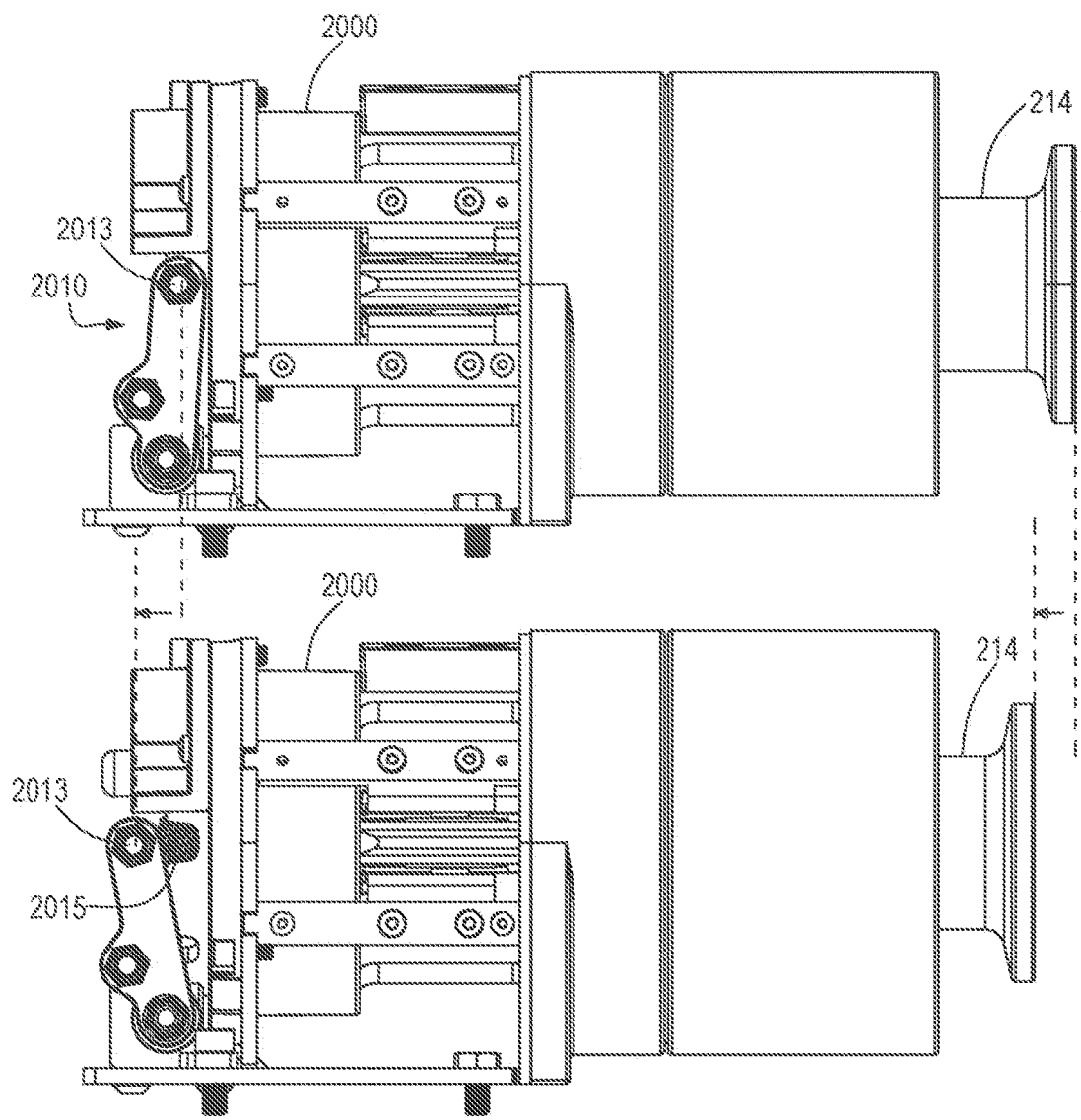
FIG. 21C illustrates an example of parts that participate in a arm rotation and fixation process.
Figure 21D:
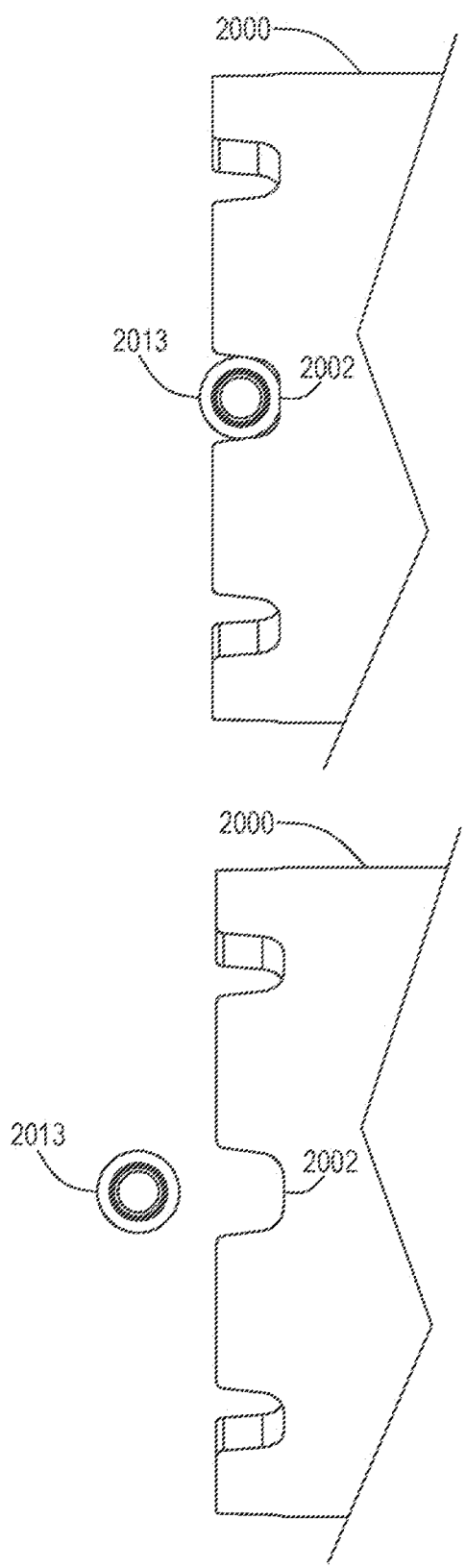
FIG. 21D illustrates an example of parts that participate in a arm rotation and fixation process.
Figure 21E:
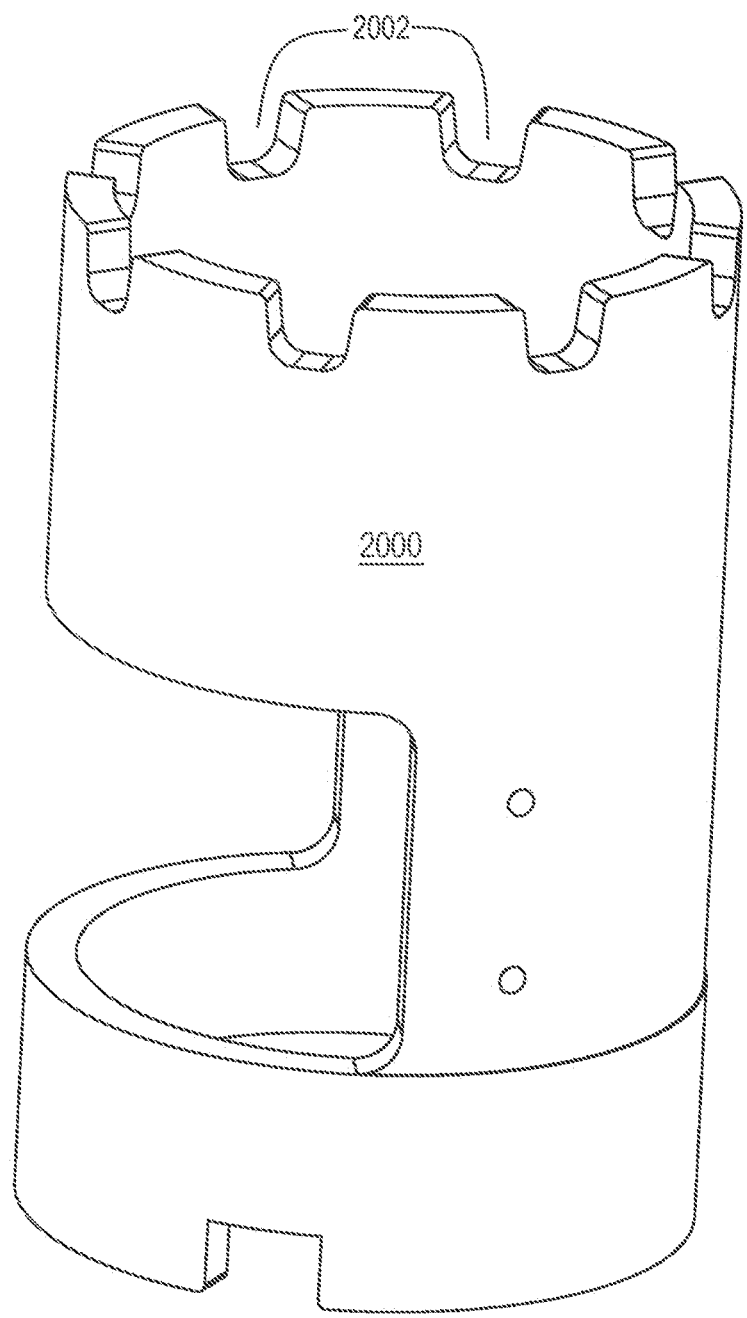
FIG. 21E illustrates an example of parts that participate in a arm rotation and fixation process.
Figure 21F:
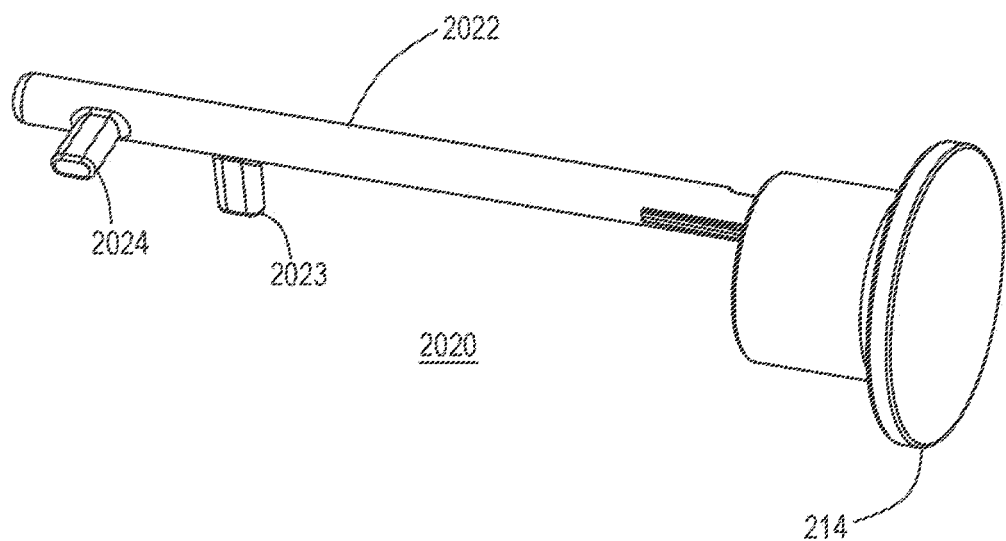
FIG. 21F illustrates an example of parts that participate in a arm rotation and fixation process.
Figure 21G:
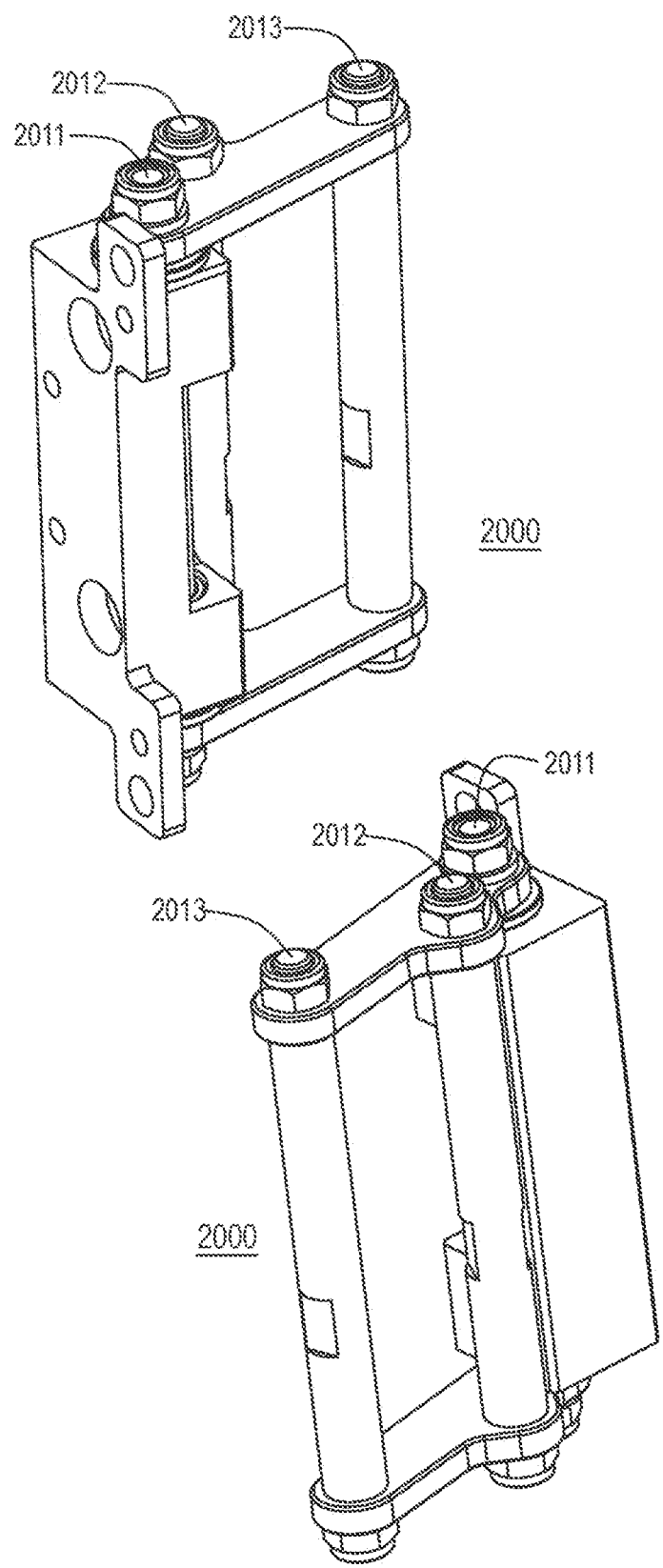
FIG. 21G illustrates an example of parts that participate in a arm rotation and fixation process.
Figure 21H:
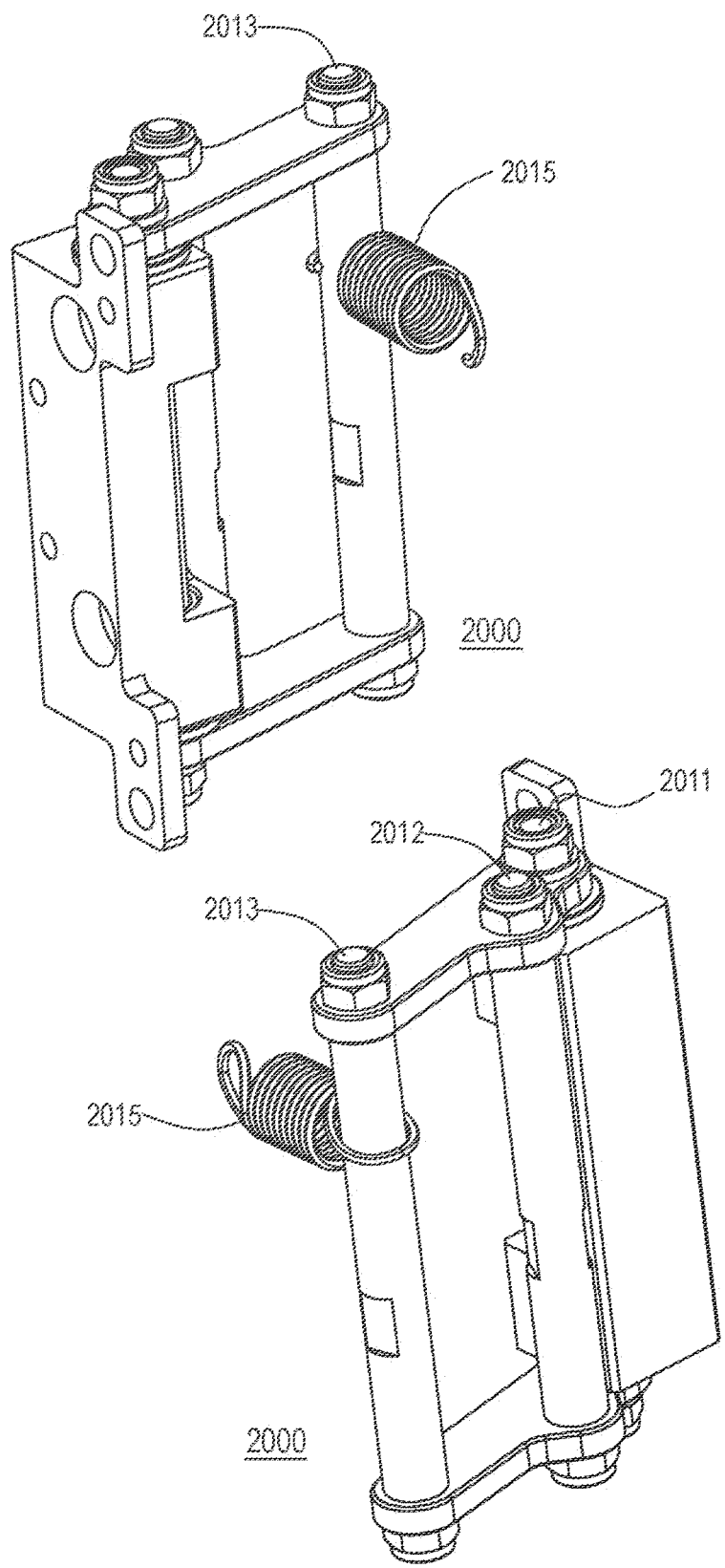
FIG. 21H illustrates an example of parts that participate in an arm rotation and fixation process.

FIG. 20H illustrates examples of two user interfaces— such as ball shaped user interface 1995 and snap interface that are detachably coupled to exercise accessory 222. The interfaces hold the cable—either by a holder (1995-1 or 1999-1) or being tied in a manner that keeps the cable held to these interfaces. Any holder may be used.

The Arm Position Adjustment

Reference is made to FIGS. 21A-21H illustrating a non-limiting example of a shoulder 214 to which shoulder knob 1000 is integrated for use in adjusting arm positions in the exercise equipment. In some embodiments, shoulder of 214 may include:

a. A rotatable unit 2000 with multiple grooves 2002 that corresponds to multiple rotational angles of the arm. The rotatable unit is in mechanical communication with the knob so that a pushing of the know allows the ram to rotate the arm about axis of rotation 2090 causes the rotatable unit 2000 to rotate (when unlocked).

b. A locking mechanism 2010 that includes a locking rod 2013 that is configured to move between an open position and a locking position in which the locking rod is positioned within a pair of grooves 2002 and is pressed against the pair of grooves using a fastening element such as spring 2015. The locking mechanism is illustrated as including a pivot rod 2011, an additional rod 2012 and the locking rod 2013.

c. A lock controller 2020 (FIGS. 21B and 21F) that is in mechanical communication with the knob—and is configured to move (for example linearly move) towards the locking mechanism 2010 thereby moving the locking mechanism to open position, or move away from the locking mechanism 2000 thereby allowing the locking mechanism to move to the locking position.

A user, when wishing to change an angle of the arm, pushes the knob forwards and allows the rotation of the arm till reaching a desired arm angle, and then allows (for example by releasing the knob to and allowing the locking mechanism to lock the rotatable unit.

According to an embodiment, the lock controller 2020 includes a lock controller rod 2022 (FIG. 21A, 21F), a locking rod manipulator such as first teeth 2024 and a spring holding element such as second teeth 2023. The locking rod manipulator contacts the locking rod 2013 at one location, while the spring 2015 is connected to the spring holding element.

According to an embodiment the shoulder of FIGS. 21A-21H replaces the mechanism illustrated in FIGS. A14-14C and related text.

Resistance Multiplier

It is desirable to increase the resistance felt by the user, even in relation to the resistance applied by the exercise equipment.

There is provided a resistance multiplier (FIGS. 22A and 22B) that multiplies by a factor that exceeds one (for example, by any integer or non-integer number that exceeds one).

According to an embodiment there is provided an add on unit that includes a frame that is mechanically coupled to a pulley system. The pulley system may include any number of sheaves and cable arrangements—to determine the resistance multiplication factor.

The frame may be connected to the floor or any other working surface. Alternatively the frame is not fixed to a working surface but the user may step on it. Alternatively, there is no frame and a working surface such as the floor may include mechanical interfaces for holding the pulley system.

According to an embodiment, the cable used by the pulley system is the cable of the exercise equipment.

According to an embodiment, the cable of the exercise system is connected by one or more connectors or interfaces to the cable of the pulley system.

Figure 22A:
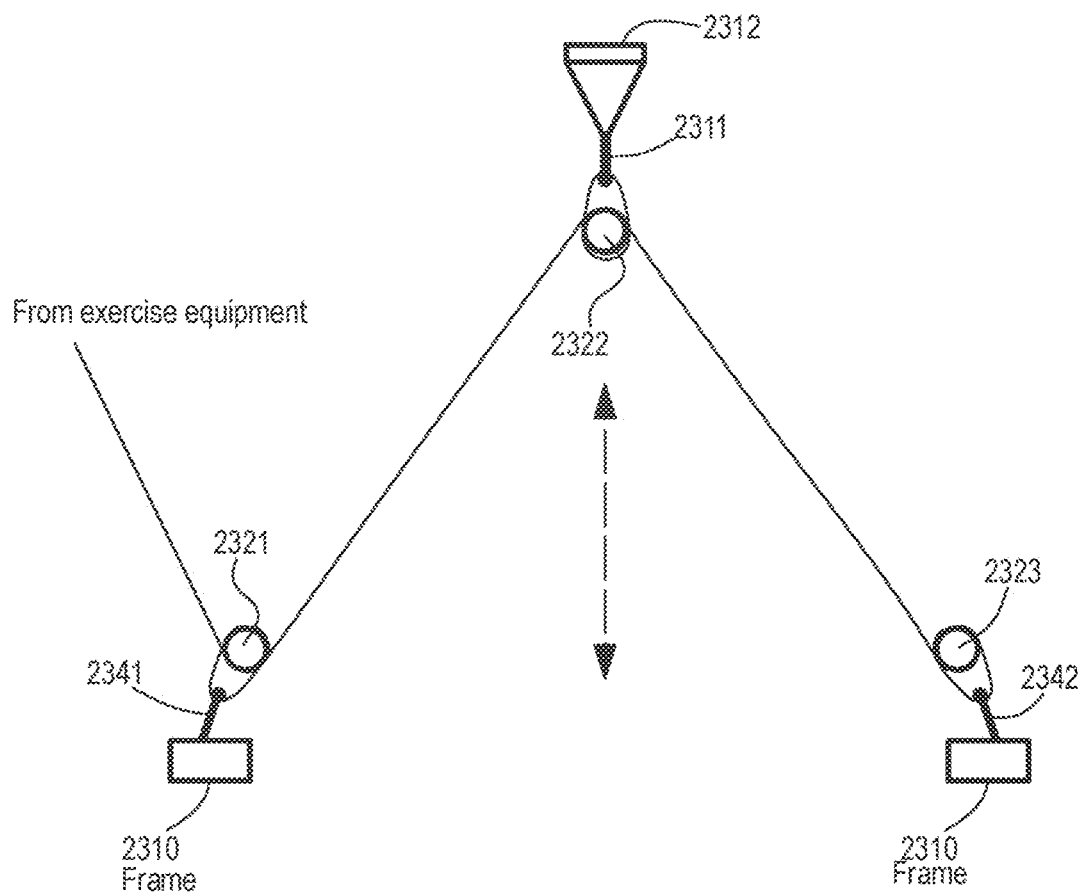
FIG. 22A illustrates a pulley system.
Figure 22B:
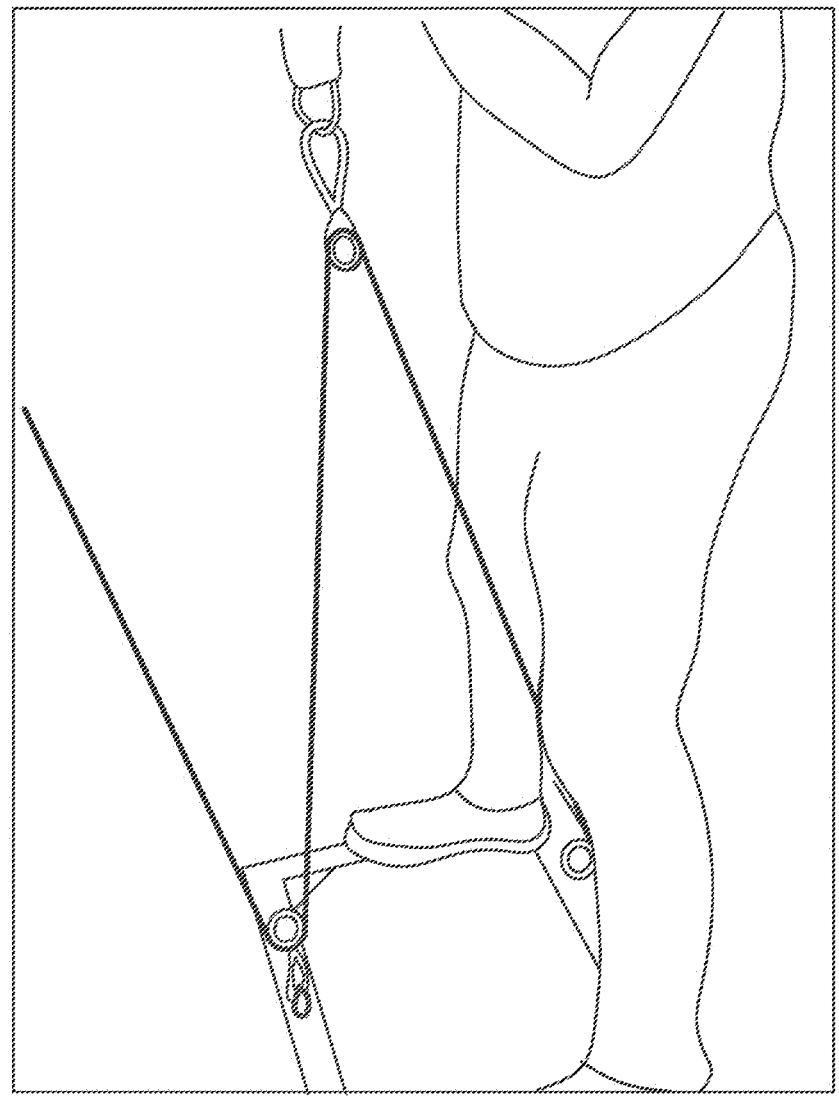
FIG. 22B illustrates a pulley system.
Figure 23A:
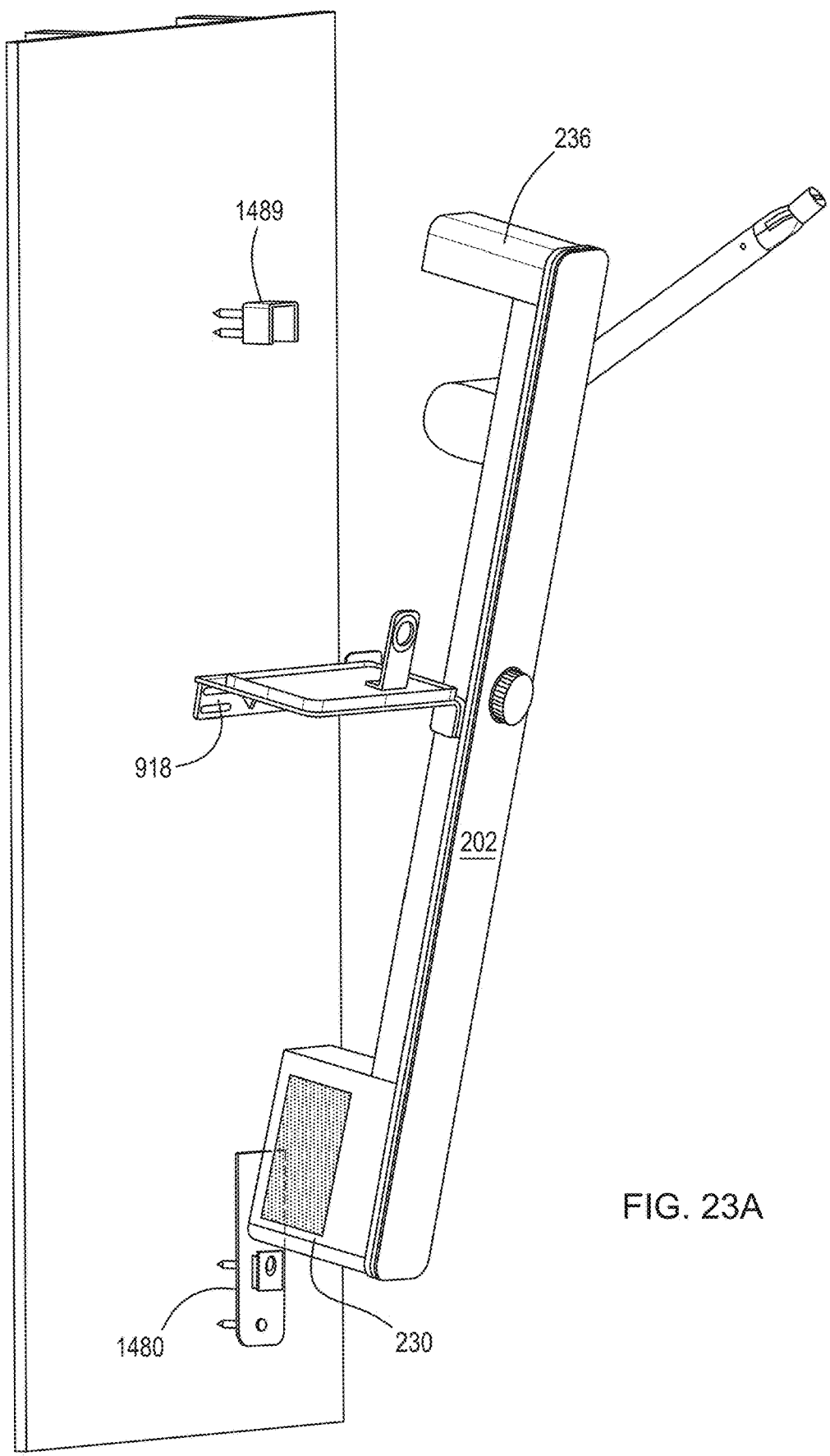
FIGS. 23A-23I illustrate various installation steps.
Figure 23B:
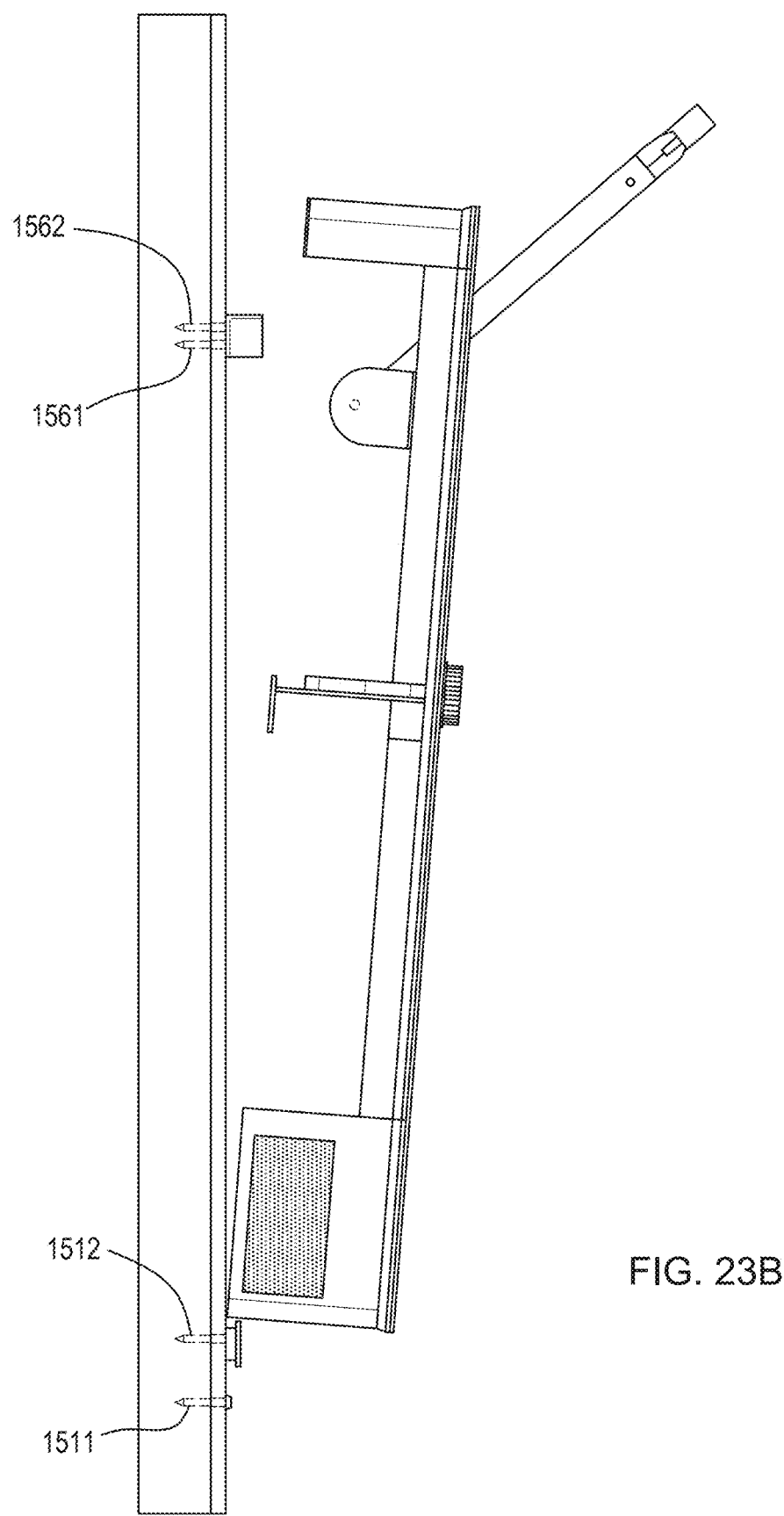
Figure 23C:
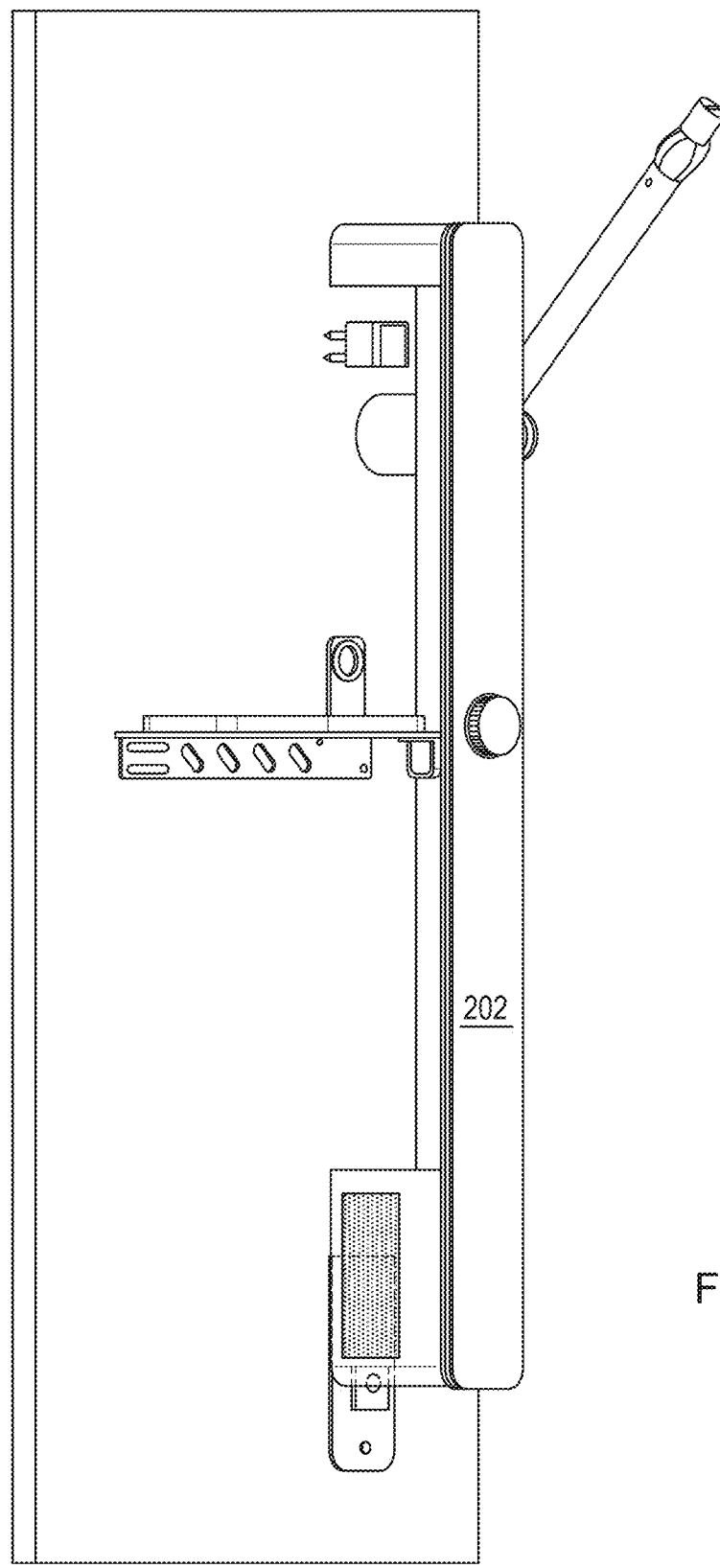
Figure 23D:
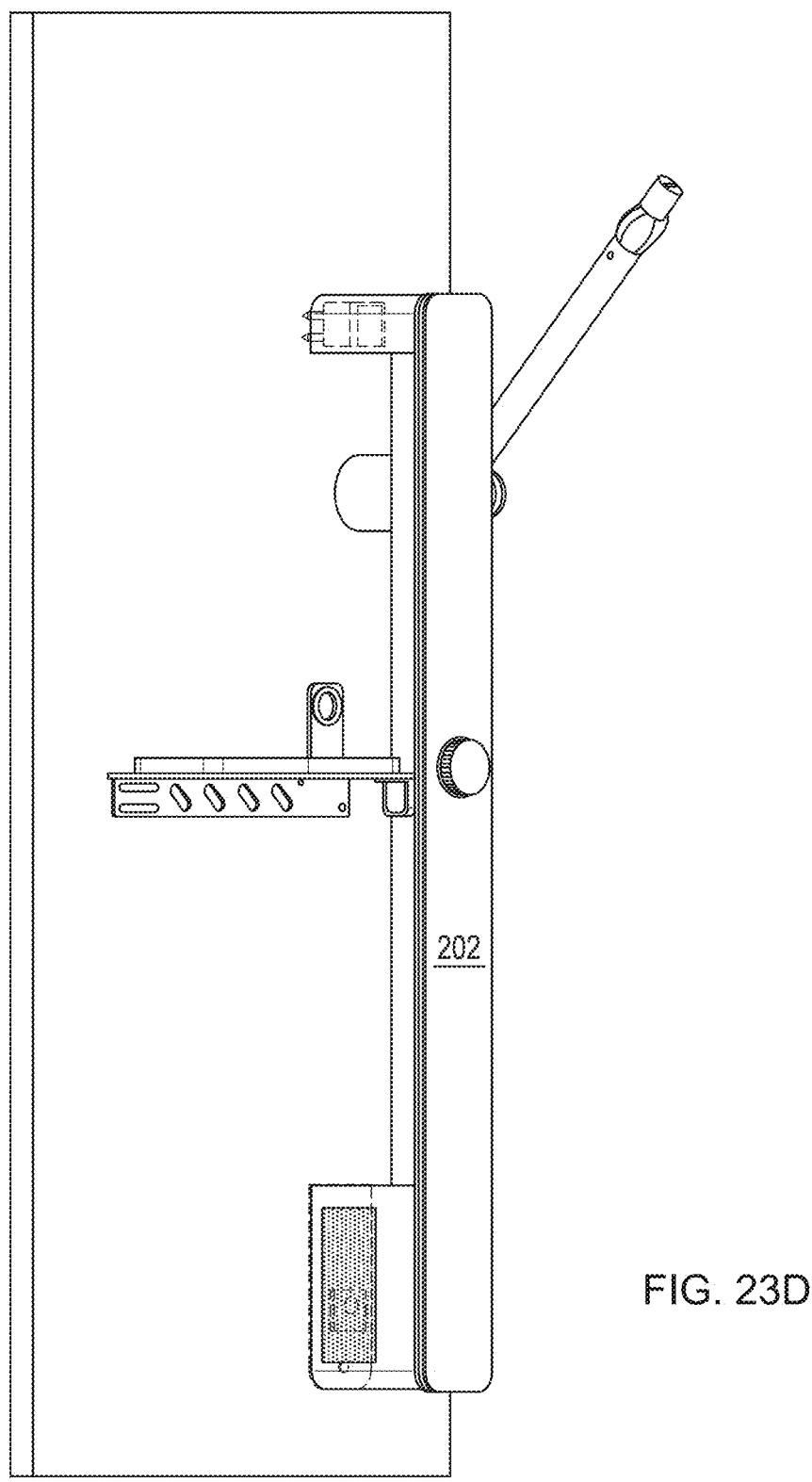
Figure 23E:
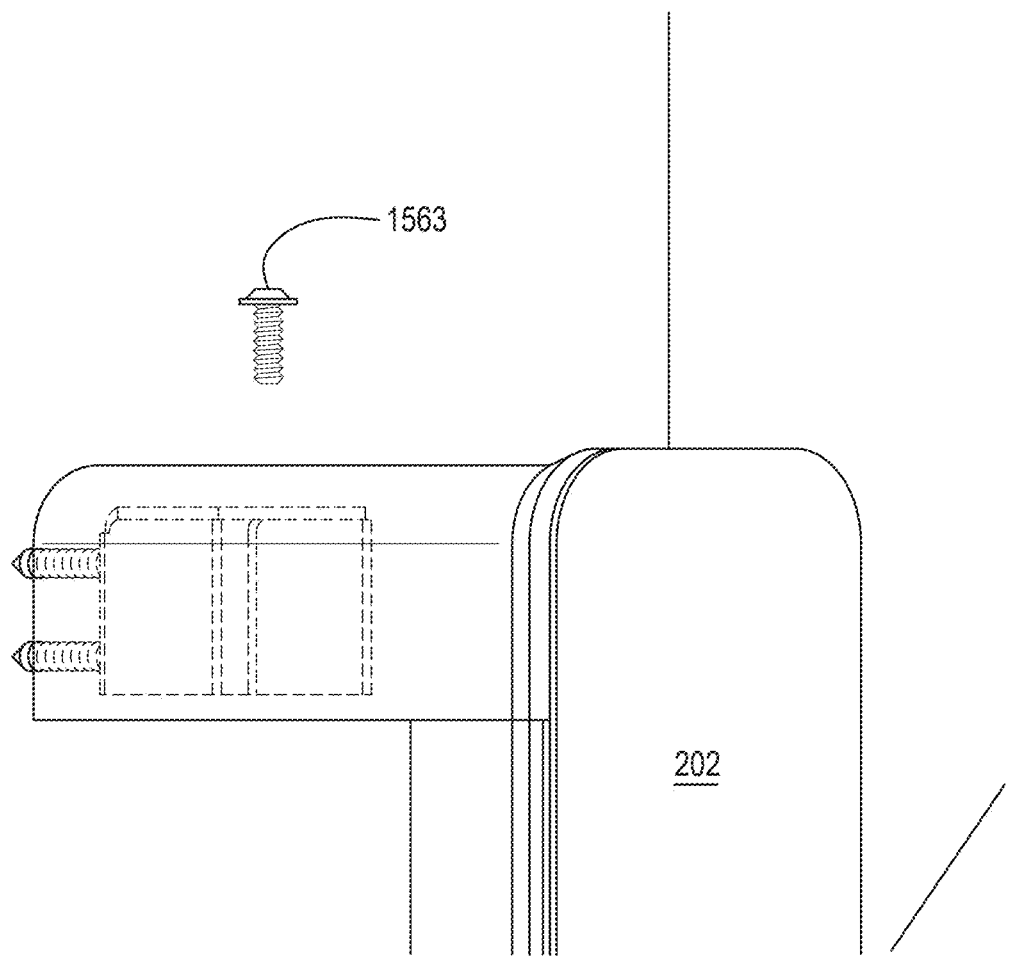
Figure 23F:
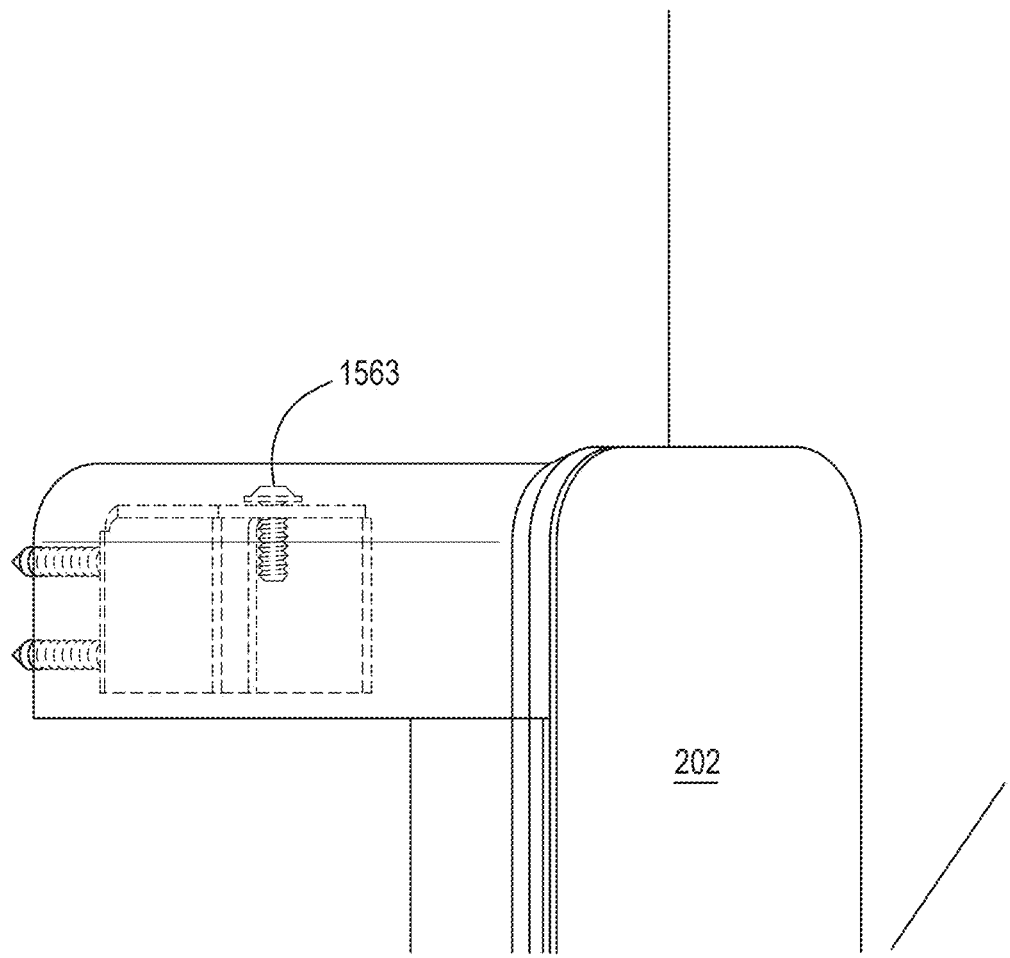
Figure 23G:
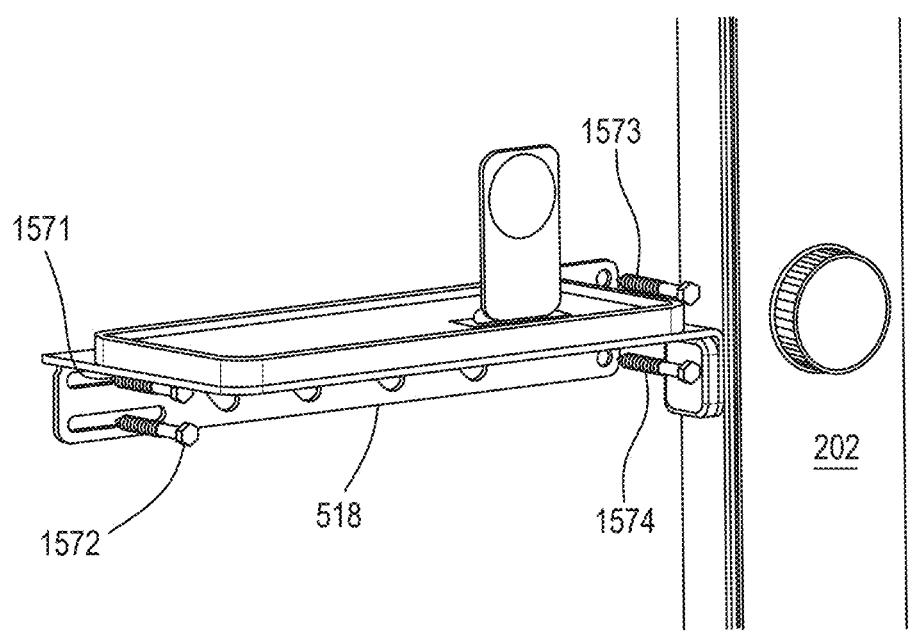
Figure 23H:
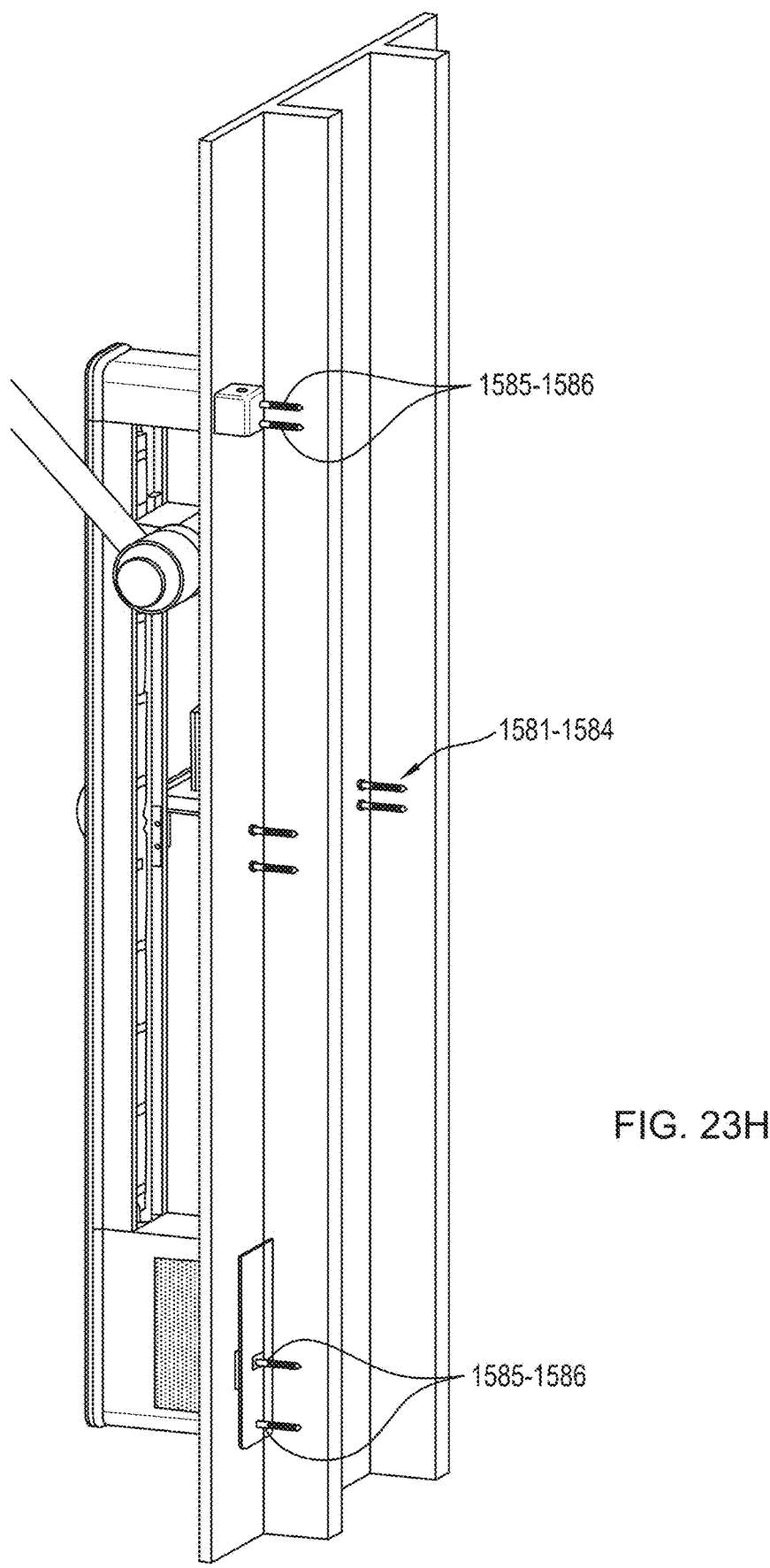
Figure 23I:
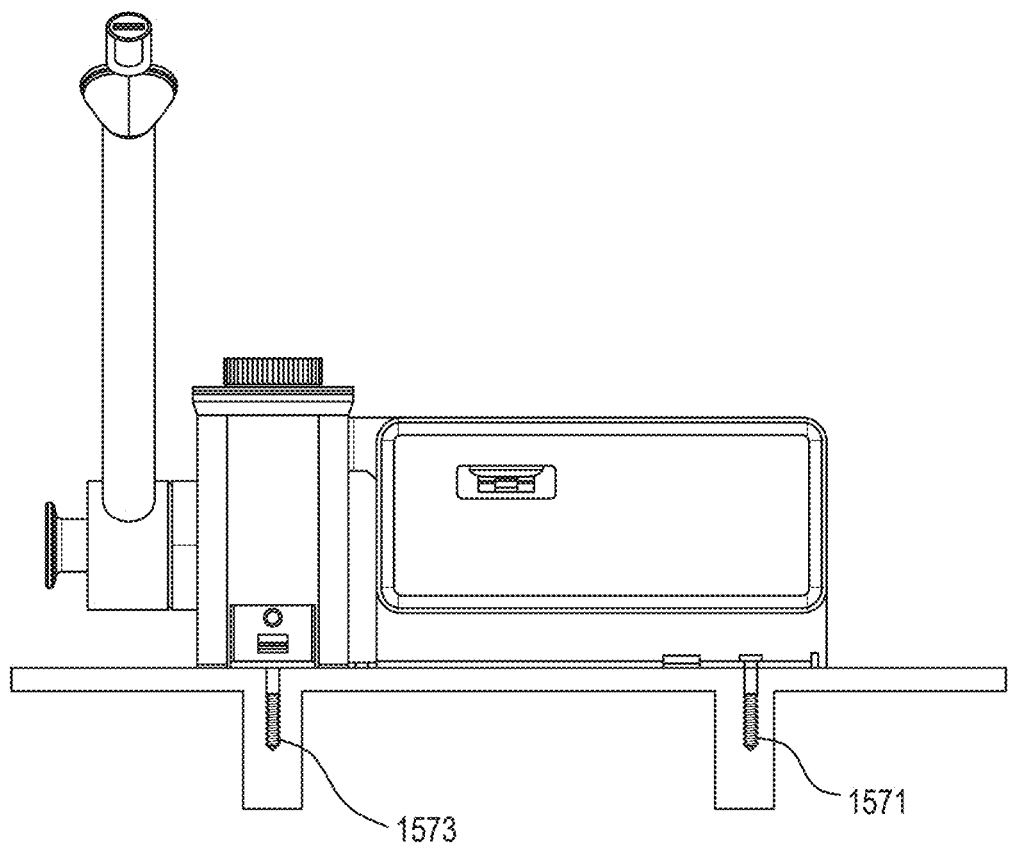

FIGS. 22A-22B illustrates a rectangular frame 2310 on which the user steps, the cable of the exercise system passes through (a) a first add on sheave 2321 that is mechanically coupled to the frame using a first frame interface 2341, (b) a second add on sheave 2322 that is mechanically coupled, via a user interface such as a user carabiner 2311 and a handle 2312 (or other user interface), and through (c) a third add on sheave 2323 that is mechanically coupled to another part of the frame—for example through second frame interface 2342.

The user can position the second add on sheave at any point of the cable between the first and second frame carabiner to impact the resistance multiplication factor.

The Frame may be of any shape and/or size. The mechanical elements of FIGS. 22A-22B may be replaced by other mechanical coupling elements.

According to an embodiment, there is provided an exercise equipment that includes a frame that includes a vertically wall-mountable beam; one or more brackets for connecting the vertically wall-mountable beam to a wall; an arm that rotatable in relation to the vertically wall-mountable beam and is selectively positionable along the vertically wall-mountable beam; a cable; a resistance source that is configured to apply a resistance on the cable while a user pulls the cable away from a part of the frame; a cable transfer unit that is configured to convey the cable through a cable path formed within the frame; and cable replacement elements that are configured to receive different segments of a replacement cable (for example a first part and a second part of the replacement cable) and position the replacement cable within the cable transfer unit and through the cable path.

According to an embodiment, the frame includes openings for receiving the different segments of the cable.

According to an embodiment, the cable replacement elements include guiding elements that link the openings to the cable path.

According to an embodiment, the cable transfer unit includes sheaves, wherein the guiding elements are positioned between the openings and a surroundings of the sheaves.

According to an embodiment, the openings includes a first opening and a second opening.

According to an embodiment, the first opening is followed by first guiding elements related to a first sheave (for example sheave 1705 of FIG. 20C), wherein the first opening, the first guiding elements and the first sheave belong to a first path that leads to a distal end of the arm.

According to an embodiment, the second opening is followed by second guiding elements related to a second sheave (for example sheave 1709 of FIG. 20D), wherein the second opening, the second guiding elements and the second sheave belong to a second path that leads to the resistance source.

According to an embodiment, the first opening is formed in a bracket of the one or more brackets and the second opening is formed in a rotatable shoulder mechanically coupled to the arm.

According to an embodiment, the first opening faces the second opening.

According to an embodiment, there is provided an exercise equipment, that includes (i) a frame that includes a vertically wall-mountable beam; (ii) one or more brackets for connecting the vertically wall-mountable beam to a wall; (iii) a trolley for riding the vertically wall-mountable beam and being configured to lock at differing positions along the wall-mountable beam; (iv) a shoulder that is rotatably coupled, to the trolley; (v) an arm connected to and rotatable with the shoulder, the arm and the shoulder being configured to lock at differing rotation positions relative to the trolley.

The rotatable shoulder includes: a rotatable unit (for example rotating unit 2000 of FIG. 21B) that includes multiple grooves that corresponds to the different rotation positions, a locking mechanism that includes a locking element, a lock controller that is configured to move the locking mechanism between (a) a locking position in which the locking element is positioned within some of grooves of the multiple grooves and locks the rotatable unit to a position corresponding to one of the differing rotation positions, and (b) an open position in which the locking element is disengaged from any of the grooves and facilitates a rotation of the rotating unit.

According to an embodiment, the exercise equipment includes a knob extending from the shoulder, the knob being movable in a first direction to move, using the lock controller, the locking mechanism in the open position, and being movable in a second direction to enable longitudinal movement of the trolley along the vertically wall-mountable beam.

According to an embodiment, the locking element is a locking rod.

According to an embodiment, the locking unit further includes a pivot rod providing an axis of rotation of the locking unit.

According to an embodiment, the axis of rotation of the locking unit is oriented to an axis of rotation of the rotating unit.

According to an embodiment, the exercise equipment includes a spring that holds the locking rod against the rotating unit, when positioned in the locking position.

According to an embodiment, the lock controller includes a spring holding element for supporting the spring.

According to an embodiment, the lock controller includes a lock controller rod, a rod manipulator that extends from the lock controller knob and a spring holding element that extends from the lock controller rod and is oriented to the rod manipulator.

According to an embodiment, there is provided an exercise equipment, includes a frame that includes a vertically wall-mountable beam; one or more brackets for connecting the vertically wall-mountable beam to a wall; an arm that rotatable in relation to the vertically wall-mountable beam and is selectively positionable along the vertically wall-mountable beam; a cable; a resistance source that is configured to smoothly apply a resistance on the cable while a user pulls the cable away, using a user interface, from a part of the frame; and a cable transfer unit that is configured to smoothly convey the cable; a trolley system that is configured to receive the cable. The user interface is mechanically coupled to a segment of the cable that passes through the trolley system.

According to an embodiment, the exercise equipment includes a pulley system holding element configured to maintain the pulley system at a fixed position.

According to an embodiment, the pulley system holding element is a mountable frame.

According to an embodiment, there is provided an exercise equipment that includes a frame that includes a vertically wall-mountable beam; one or more brackets for connecting the vertically wall-mountable beam to a wall; a resistance source that is configured to apply a resistance on the cable while a user pulls the cable away from a part of the frame; a first cable openings (for example first opening 1910 of FIG. 20E) for receiving a first end of a replacement cable, a second cable opening (openings (for example second opening 1920 of FIG. 20E) for receiving a second end of the replacement cable; cable conduits for (i) directing the first end of the replacement cable that is pushed through the first cable opening towards a first end of a cable path, and (ii) directing the second end of the replacement cable that is pushed through the second cable opening towards a second end of the cable path, the cable path located between an output interface and a resistance source that is configured to apply a resistance on the cable while a user pulls the cable away from a part of the frame.

Any reference to an exercise equipment that includes a frame that includes a vertically wall-mountable beam and also includes one or more brackets for connecting the vertically wall-mountable beam to a wall—should be applied mutatis mutandis to an exercise equipment that is not wall-mountable—for example an exercise equipment that is self-sustained and does not required mounting and/or to an exercise equipment that is mounted—but not on a wall—for example ceiling mounted, and the like. In any one of these examples the frame may include one or more beams or structural elements that are not vertically wall mounted beams or not vertically wall mounted structural elements.

According to an embodiment, there is provided an exercise equipment that includes a frame that includes a vertically wall-mountable beam; one or more brackets for connecting the vertically wall-mountable beam to a wall; a cable; a resistance source that is configured to smoothly apply a resistance on the cable while a user pulls the cable away from a part of the frame; and a cable transfer unit that is configured to smoothly convey the cable through the frame.

According to an embodiment, the resistance source includes an electronically-adjustable weight resistance motor.

According to an embodiment, the exercise equipment includes a spool, wherein the electronically-adjustable weight resistance motor is configured to smoothly rotate the spool.

According to an embodiment, the spool is a threaded spool.

According to an embodiment, the spool is a spiral threaded spool.

According to an embodiment, the cable is configured to form a single winding on the threaded spool.

According to an embodiment, the exercise equipment includes a belt, wherein the electronically-adjustable weight resistance motor is configured to smoothly rotate the belt, wherein the belt is configured to rotate the spool.

According to an embodiment, the belt lacks transversal teeth.

According to an embodiment, the belt includes one or more longitudinal teeth.

According to an embodiment, the resistance source includes an electronically-adjustable weight resistance linear motor.

According to an embodiment, the electronically-adjustable weight resistance linear motor is located within the vertically wall-mountable beam.

According to an embodiment, the cable transfer unit includes one or more vertical sheaves and one or more horizontal sheaves.

According to an embodiment, the cable transfer unit includes sheaves that includes grooves for receiving the cable.

According to an embodiment, the cable transfer unit is configured to prevent the cable from exiting a cable path defined by the cable transfer unit.

According to an embodiment, the cable transfer unit includes one or more vertical sheaves and one or more horizontal sheaves.

According to an embodiment, the exercise equipment includes an arm that rotatable in relation to the vertically wall-mountable beam and is selectively positionable along the vertically wall-mountable beam.

According to an embodiment, the arm includes a wrist, wherein the cable extends from the wrist.

According to an embodiment, the cable passes through a pair of sheaves of the cable transfer unit.

According to an embodiment, a distance between the pair of sheaves is smaller than a diameter of the cable.

According to an embodiment, the cable includes a vectran core that is surrounded by a polyester sleeve.

According to an embodiment, the cable transfer unit consists essentially of four sheaves.

According to an embodiment, the cable transfer unit consists essentially of six sheaves.

According to an embodiment, the cable transfer unit includes four sheaves.

According to an embodiment, the cable transfer unit includes a cable conduit, and a group of sheaves, the group of sheaves includes a first sheave, a second sheave, a third sheave, a first arm sheave that follows a rotation of an arm of the exercise equipment.

According to an embodiment, the cable, once placed within the cable transfer unit, passes through the cable conduit, contacts a front portion and a top portion of a groove of the first sheave, contacts a rear portion and a top portion of a groove of the second sheave, contacts a left portion and a bottom portion of a groove of the third sheave, contacts a bottom portion and a right portion of a groove of the first arm sheave.

According to an embodiment, the group of sheaves also includes a pair of wrist sheaves that are located, at least in part, within a wrist of the arm.

According to an embodiment, the cable, once placed within the cable transfer unit, passes through an inner space formed, at least in part, by interior portions of grooves of the pair of wrist sheaves.

According to an embodiment, a bottom of a groove of the third sheave and a bottom of a groove of the first arm sheave are aligned with an axis of rotation of a shoulder that is connected to the arm.

According to an embodiment, the first sheave and the second sheave are oriented by an acute angle to one or more other sheaves of the cable transfer unit.

According to an embodiment, different sheaves of the group of sheaves are spaced apart from each other.

According to an embodiment, different sheaves of the group of sheaves are accessible from multiple directions.

According to an embodiment, grooves of different sheaves of the group of sheaves are not shielded.

According to an embodiment, the cable, once placed within the cable transfer unit, contacts up to one third of any of the grooves of the group of sheaves.

According to an embodiment, the resistance source includes an electronically-adjustable weight resistance motor, wherein the electronically-adjustable weight resistance motor exhibits a cogging less than zero point zero four NM.

According to an embodiment, the resistance source includes an electronically-adjustable weight resistance motor, wherein the electronically-adjustable weight resistance motor exhibits a ratio of a rotor diameter to number of poles of less than eleven to one.

According to an embodiment, there is provided a method for operating an exercise equipment, the method includes: obtaining information regarding a desired resistance to be applied on a cable; smoothly applying, by a resistance source, the desired resistance on the cable while a user pulls the cable away from a part of a frame of the exercise equipment, the frame includes a vertically wall-mountable beam, the exercise equipment includes one or more brackets for connecting the vertically wall-mountable beam to a wall; and smoothly conveying the cable through a frame of the exercise equipment, by a cable transfer unit.

According to an embodiment, there is provided an exercise equipment that includes a frame; a cable; a resistance source that is configured to smoothly apply a resistance on the cable while a user pulls the cable away from a part of the frame; and a cable transfer unit that is configured to smoothly convey the cable through the frame.

According to an embodiment, there is provided a template for mounting exercise equipment on a wall, the template includes: a template body; a spirit level that is attached to the template body; and multiple holes, the multiple holes includes a group of holes that are located within a vertical region of the template body, wherein one or more dimensions of the vertical region are related to one or more corresponding dimensions of a vertically wall-mountable beam of the exercise equipment; wherein one or more holes of multiple holes are located within detachable segments of the template body.

According to an embodiment, the group of holes includes sub-groups of holes, wherein different sub-groups are located at different height ranges.

According to an embodiment, the template includes height range markers that are positioned in proximity to a longitudinal edge of the template body and mark the different height ranges.

According to an embodiment, the detachable segments includes an upper detachable segment located at a highest height range of the different height ranges and a lower detachable segment located at a lowest height range of the different height ranges and a lower.

According to an embodiment, the template includes attachment tapes for attaching the template to a wall.

According to an embodiment, the attachment tapes are double sided adhesive tapes.

According to an embodiment, the template includes installation instructions that are printed on the template body.

According to an embodiment, the one or more dimensions includes a height of the vertical region.

According to an embodiment, the one or more dimensions includes a width of the vertical region.

According to an embodiment, the template forms a part of an exercise equipment package.

According to an embodiment, the multiple holes includes another group of holes that are located outside the vertical region.

According to an embodiment, the holes of the group of holes have a circular shape and wherein the holes of the other group of holes have an elongated shape.

According to an embodiment, the holes of the group of holes are arranged in pairs and wherein the holes of the other group of holes form one or more pairs.

According to an embodiment, there is provided an installation kit that includes: a template for mounting exercise equipment on a wall, the template includes: (i) a template body; a spirit level that is attached to the template body; and multiple holes, the multiple holes includes a group of holes that are located within a vertical region of the template body; and wherein one or more holes of multiple holes are located within detachable segments of the template body; a bottom exercise equipment interface that is shaped and size to fit within a bottom space formed when a bottom detachable segment of the detachable segments is removed; and an upper exercise equipment interface that is shaped and size to fit within an upper space formed when an upper detachable segment of the detachable segments is removed.

According to an embodiment, the one or more dimensions of the vertical region does exceed one or more corresponding dimensions of a vertically wall-mountable beam of the exercise equipment.

According to an embodiment, the bottom exercise equipment interface includes a tilted interface that has a base and a top, wherein the base is wider than the top.

According to an embodiment, there is provided a template for mounting exercise equipment on a wall, the template includes: a template body; a spirit level that is attached to the template body; a vertical region of the template body, wherein a height of the vertical region exceeds eighty percent of the height of the template and a width of the vertical region does not exceed twenty five percent of a width of the template; and multiple holes, wherein at least some holes of the multiple holes are located within the vertical region.

According to an embodiment, one or more holes of multiple holes are located within detachable segments of the template body.

According to an embodiment, there is provided a template for mounting exercise equipment on a wall, the template includes: a template body; a spirit level that is attached to the template body; first sub-groups of holes that are located at different y-axis ranges within a vertical region of the template body; second sub-groups of holes that are located at different x-axis ranges within a horizontal region of the template body.

According to an embodiment, the template includes a shared sub-group of holes that is located at an overlap region between the vertical region and the horizontal region.

According to an embodiment, at least one sub group of the first sub group and the second subgroup is located within the detachable segment of the template body.

According to an embodiment, holes of a first sub-group of holes have a circular shape and wherein holes of a second sub-group of holes have an elongated shape.

According to an embodiment, a distance between two second sub-groups equals a distance between adjacent wall studs.

According to an embodiment there is provided a method for mounting exercise equipment on a wall, the method includes: attaching a template on the wall while the template is leveled; the template includes: a template body; a spirit level that is attached to the template body; and multiple holes, the multiple holes includes a group of holes that are located within a vertical region of the template body, wherein one or more dimensions of the vertical region are related to one or more corresponding dimensions of a vertically wall-mountable beam of the exercise equipment; wherein one or more holes of multiple holes are located within detachable segments of the template body; drilling holes using the template; fixing one or more exercise equipment interfaces to the wall, using the holes; and attaching the exercise equipment to the exercise equipment interfaces.

The method is applicable to any template and/or any exercise equipment illustrated in the application.

According to an embodiment, there is provided an exercise equipment that includes a frame that includes a vertically wall-mountable beam; one or more exercise equipment interface s for connecting the vertically wall-mountable beam to a wall; a trolley for riding the vertically wall-mountable beam and being configured to lock at differing positions along the wall-mountable beam; a shoulder that is rotatably coupled, to the trolley; an arm connected to and rotatable with the shoulder, the arm and the shoulder being configured to lock at differing rotation positions relative to the trolley; wherein the rotatable shoulder includes a rotatable unit that includes multiple grooves that corresponds to the different rotation positions; a locking mechanism that includes a locking element; a lock controller that is configured to move the locking mechanism between (a) a locking position in which the locking element is positioned within some of grooves of the multiple grooves and locks the rotatable unit to a position corresponding to one of the differing rotation positions, and (b) an open position in which the locking element is disengaged from any of the grooves and facilitates a rotation of the rotating unit.

According to an embodiment, the exercise equipment includes a knob extending from the shoulder, the knob being movable in a first direction to move, using the lock controller, the locking mechanism in the open position, and being movable in a second direction to enable longitudinal movement of the trolley along the vertically wall-mountable beam.

According to an embodiment, the locking element is a locking rod.

According to an embodiment, the locking unit includes a pivot rod providing an axis of rotation of the locking unit.

According to an embodiment, the axis of rotation of the locking unit is oriented to an axis of rotation of the rotating unit.

According to an embodiment, the exercise equipment includes a spring that holds the locking rod against the rotating unit, when positioned in the locking position.

According to an embodiment, the lock controller includes a spring holding element for supporting the spring.

According to an embodiment, the lock controller includes a lock controller rod, a rod manipulator that extends from the lock controller knob and a spring holding element that extends from the lock controller rod and is oriented to the rod manipulator.

According to an embodiment, there is provided an exercise equipment that includes a frame that includes a vertically wall-mountable beam; one or more exercise equipment interface s for connecting the vertically wall-mountable beam to a wall; an arm that is rotatable in relation to the vertically wall-mountable beam and is selectively positionable along the vertically wall-mountable beam; a cable; a resistance source that is configured to apply a resistance on the cable while a user pulls the cable away, using a user interface, from a part of the frame; a cable transfer unit that is configured to convey the cable; a pulley system that is configured to receive the cable; wherein the user interface is mechanically coupled to a segment of the cable that passes through the pulley system.

According to an embodiment, the exercise equipment includes a pulley system holding element configured to maintain the pulley system at a fixed position.

According to an embodiment, the pulley system holding element is a mountable frame.

According to an embodiment, there is provided an exercise equipment that includes a frame that includes a vertically wall-mountable beam; one or more exercise equipment interface s for connecting the vertically wall-mountable beam to a wall; an arm that rotatable in relation to the vertically wall-mountable beam and is selectively positionable along the vertically wall-mountable beam; a cable; a resistance source that is configured to apply a resistance on the cable while a user pulls the cable away from a part of the frame; a cable transfer unit that is configured to convey the cable through a cable path formed within the frame; and cable replacement elements that are configured to receive different segments of a replacement cable and position the replacement cable within the cable transfer unit and through the cable path.

According to an embodiment, the frame includes openings for receiving the different segments of the cable.

According to an embodiment, the cable replacement elements include guiding elements that link the openings to the cable path.

According to an embodiment, the cable transfer unit includes sheaves, wherein the guiding elements are positioned between the openings and the surroundings of the sheaves.

According to an embodiment, the openings includes a first opening and a second opening.

According to an embodiment, the first opening is followed by first guiding elements related to a first sheave, wherein the first opening, the first guiding elements and the first sheave belong to a first path that leads to a distal end of the arm.

According to an embodiment, the second opening is followed by second guiding elements related to a second sheave, wherein the second opening, the second guiding elements and the second sheave belong to a second path that leads to the resistance source.

According to an embodiment, the first opening is formed in a exercise equipment interface of the one or more exercise equipment interface s and the second opening is formed in a rotatable shoulder mechanically coupled to the arm.

According to an embodiment, the first opening faces the second opening.

According to an embodiment, there is provided an exercise equipment that includes a frame that includes a first frame element (that may be static or may be movable, may be a bar or may be any other structural element); an arm that rotatable in relation to first frame element the vertically wall-mountable beam and is selectively positionable along the vertically wall-mountable beam; a cable; a resistance source that is configured to apply a resistance on the cable while a user pulls the cable away from a part of the frame; a cable transfer unit that is configured to convey the cable through a cable path formed within the frame; and cable replacement elements that are configured to receive different segments of a replacement cable and position the replacement cable within the cable transfer unit and through the cable path.

According to an embodiment, there is provided an exercise equipment that includes a frame a resistance source that is configured to apply a resistance on the cable while a user pulls the cable away from a part of the frame; a first cable openings for receiving a first end of a replacement cable; a second cable opening for receiving a second end of the replacement cable; cable conduits for (i) directing the first end of the replacement cable that is pushed through the first cable opening towards a first end of a cable path, and (ii) directing the second end of the replacement cable that is pushed through the second cable opening towards a second end of the cable path, the cable path located between an output interface and a resistance source that is configured to smoothly apply a resistance on the cable while a user pulls the cable away from a part of the frame.

Any combination of any elements and/or components may be provided. For example—an exercise equipment that exhibits smoothness may also benefit from the cable replacement method. Yet for another example—the power multiplier may be associated with any of the exercise equipment illustrated in the application. Yet for a further example—the combination of the rotatable unit, the locking mechanism, and the lock controller of FIGS. 21A-21H (or the mechanism illustrated in FIGS. 13B, 13C, 14A-14C) may be included in any of the exercise equipment illustrated in the application.

Any reference to an exercise equipment should be applied mutatis mutandis to a method for using the exercise equipment and/or to a method for installing the exercise equipment and/or to a method for maintaining the exercise equipment (for example by cable replacement).

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C, C++, JAVA, PHP, PYTHON, RUBY, PERL, BASH, or other programming or scripting languages. One or more of such software sections or modules may be integrated into a computer system, non-transitory computer readable media, or existing communications software. The programs, modules, or code may also be implemented or replicated as firmware or circuit logic.

Moreover, while illustrative embodiments have been described herein, the scope may include any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. An exercise equipment, comprising:
a frame comprising openings for receiving a cable;
an arm rotatably coupled to and selectively positionable along at least a portion of the frame;
a resistance source that is configured to apply a resistance on a cable while a user pulls the cable away from a part of the frame;
a cable transfer unit that is configured to convey the cable through a cable path formed within the frame, wherein the cable transfer unit comprises a first set of one or more sheaves positioned within the frame, each of the one or more sheaves comprising a rim on which the cable is received; and
cable receiving elements that are configured to receive different segments of the cable and position the cable within the cable transfer unit and through the cable path, wherein the cable receiving elements comprise a first set of one or more guiding elements positioned along the cable path within the frame and mounted to said first set of one or more sheaves, each of the one or more guiding elements comprising a cover or tunnel with a curvature corresponding at least partially with that of at least one of the one or more sheaves, being positioned between a respective opening of said openings and surroundings of at least one of the one or more sheaves, and sufficiently covering at least a part of the rim so as to guide and position the cable onto the rim and around said first set of one or more sheaves.

2. The exercise equipment according to claim 1, wherein the frame comprises a first frame element being a vertically wall-mountable beam.

3. The exercise equipment according to claim 2, further comprising one or more brackets for connecting the vertically wall-mountable beam to a wall.

4. The exercise equipment according to claim 1, wherein the cable receiving elements comprise a second set of one or more guiding elements, wherein the first set of one or more guiding elements and the second set of one or more guiding elements link the openings to the cable path.

5. The exercise equipment according to claim 4, wherein the cable transfer unit comprises a second set of one or more sheaves, wherein the first set of one or more guiding elements are positioned between one of the openings and the surroundings of the first set of one or more sheaves, and the second set of one or more guiding elements are positioned between another one of the openings and the surroundings of the second set of one or more sheaves.

6. The exercise equipment according to claim 5, wherein the openings comprise a first opening and a second opening.

7. The exercise equipment according to claim 6, wherein the first opening is followed by a first guiding element of the first set of one or more guiding elements related to a first sheave of the first set of one or more sheaves, wherein the first opening, the first guiding element and the first sheave belong to a first path that leads to the resistance source.

8. The exercise equipment according to claim 6, wherein the second opening is followed by a second guiding element of the second set of one or more guiding elements related to a second sheave of the second set of one or more sheaves, wherein the second opening, the second guiding element and the second sheave belong to a second path that leads to a distal end of the arm.

9. The exercise equipment according to claim 8, wherein the second guiding element leads to cable from the second sheave into a third guiding element related to a third sheave.

10. The exercise equipment according to claim 6, wherein the first opening is formed in a bracket of the one or more brackets and the second opening is formed in a rotatable shoulder mechanically coupled to the arm.

11. The exercise equipment according to claim 10, wherein the first opening faces the second opening.

12. The exercise equipment according to claim 1, wherein the openings are operable to allow inserting therethrough said different segments of the cable when the cable is inserted to the exercise equipment.

13. The exercise equipment according to claim 12, wherein the first set of one or more guiding elements are configured to guide and position the cable onto the first set of one or more sheaves while the cable is inserted through the openings and advanced along the cable path.

14. The exercise equipment according to claim 1, wherein the first set of one or more sheaves each include a groove defining at least a part of the cable path, wherein the groove and a corresponding guiding element of the first set of one or more guiding elements together define an at least partially closed part of the cable path.

15. The exercise equipment according to claim 1, wherein at least a part of the cable path extends in an inner lumen within the frame.

16. The exercise equipment according to claim 15, wherein the first set of one or more sheaves are located within the inner lumen.

17. The exercise equipment according to claim 16, wherein the frame at least partially obstructs access to the first set of one or more sheaves.

18. The exercise equipment according to claim 1, wherein the cable constitutes a replacement cable which replaces an original cable of the exercise equipment.

19. The exercise equipment according to claim 1, wherein the cover or tunnel have a semi-tubular or tubular structure, respectively.

20. The exercise equipment according to claim 1, wherein, for each of the openings into the frame, at least one of the guiding elements is located directly behind the opening so as to guide a cable inserted through the opening.

21. The exercise equipment according to claim 1, further comprising the cable.

22. An exercise equipment, comprising:
a frame comprising openings for receiving a cable;
a resistance source that is configured to apply a resistance on a cable while a user pulls the cable away from a part of the frame;
a first cable opening formed in the frame for receiving a first end of the cable;
a second cable opening, spaced apart from the first cable opening, for receiving a second end of the cable;
cable conduits comprising a first set of one or more guiding elements positioned along the cable path within the frame and mounted to a first set of one or more sheaves, each of the one or more guiding elements comprising a cover or tunnel with a curvature corresponding at least partially with that of at least one of the one or more sheaves, being positioned between a respective opening of said openings and surroundings of at least one of the one or more sheaves, and sufficiently covering at least a part of the rim so as to guide and position the cable onto the rim and around said first set of one or more sheaves for (i) directing the first end of the cable that is pushed through the first cable opening towards a first end of a cable path, and (ii) directing the second end of the cable that is pushed through the second cable opening towards a second end of the cable path, the cable path located between an output interface and a resistance source that is configured to smoothly apply a resistance on the cable while a user pulls the cable away from a part of the frame, at least one of the cable conduits being located inside an inner lumen of the frame and extending towards the resistance source.

23. The exercise equipment according to claim 22, wherein the frame comprises a first frame element that is a vertically wall-mountable beam.

24. The exercise equipment according to claim 23, further comprising one or more brackets for connecting the vertically wall-mountable beam to a wall.

25. The exercise equipment according to claim 24, further comprising an arm that is rotatable in relation to the vertically wall-mountable beam and is selectively positionable along the vertically wall-mountable beam.

26. The exercise equipment according to claim 25, wherein the first cable opening is formed in a bracket of the one or more brackets and the second cable opening is formed in a rotatable shoulder mechanically coupled to the arm.

27. The exercise equipment according to claim 26, wherein the first cable opening faces the second cable opening.

28. The exercise equipment according to claim 22, wherein the first cable opening is followed by a first guiding element related to a first sheave, wherein the first cable opening, the first guiding element and the first sheave belong to a first path that leads to the resistance source.

29. The exercise equipment according to claim 22, wherein the second cable opening is followed by a second guiding element related to a second sheave, wherein the second cable opening, the second guiding element and the second sheave belong to a second path that leads to a distal end of the arm.

30. The exercise equipment according to claim 22, wherein the at least one cable conduit defines its own inner volume inside the frame.

* * * * *